US012174661B2

(12) United States Patent
Furukawa et al.

(10) Patent No.: US 12,174,661 B2
(45) Date of Patent: Dec. 24, 2024

(54) WEARABLE IMAGE PICKUP APPARATUS, PORTABLE DEVICE AND CALIBRATOR THAT COMMUNICATE WITH IMAGE PICKUP APPARATUS, CONTROL METHODS THEREFOR, AND STORAGE MEDIA STORING CONTROL PROGRAMS THEREFOR

(71) Applicant: CANON KABUSHIKI KAISHA, Tokyo (JP)

(72) Inventors: Nobuyuki Furukawa, Tokyo (JP); Takuya Imaizumi, Kanagawa (JP); Koichi Ito, Tokyo (JP); Akari Hayashi, Kanagawa (JP); Tohru Ishibashi, Tokyo (JP); Emi Kondo, Tokyo (JP); Takumi Ishikawa, Tokyo (JP); Takashi Kawakami, Kanagawa (JP); Mineo Uchida, Kanagawa (JP); Takuma Yamazaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 151 days.

(21) Appl. No.: 17/688,387

(22) Filed: Mar. 7, 2022

(65) Prior Publication Data
US 2022/0294937 A1 Sep. 15, 2022

(30) Foreign Application Priority Data

Mar. 12, 2021 (JP) .................. 2021-040848
Feb. 28, 2022 (JP) .................. 2022-029152

(51) Int. Cl.
G06F 1/16 (2006.01)
G06F 3/01 (2006.01)
(Continued)

(52) U.S. Cl.
CPC .............. G06F 1/163 (2013.01); G06F 3/012 (2013.01); H04N 5/33 (2013.01); H04N 23/51 (2023.01); H04N 23/6811 (2023.01)

(58) Field of Classification Search
None
See application file for complete search history.

(56) References Cited

U.S. PATENT DOCUMENTS

2009/0046815 A1  2/2009 Oh et al.
2014/0306874 A1  10/2014 Finocchio et al.
(Continued)

FOREIGN PATENT DOCUMENTS

CN  105259654 A  1/2016
EP  3136724 A1   3/2017
(Continued)

OTHER PUBLICATIONS

Ruiz, et al., "Fine-Grained Head Pose Estimation Without Keypoints", The IEEE Conference on Computer Vision and Pattern Recognition (CVPR) Workshops, Oct. 2, 2017.
(Continued)

Primary Examiner — Quan Pham
(74) Attorney, Agent, or Firm — Canon U.S.A., Inc. IP Division

(57) ABSTRACT

A wearable image pickup apparatus that eliminates manual change of an image pickup direction during picking up an image and can easily obtain an image that records experience while focusing attention on the experience. An image pickup apparatus includes an observation direction detection unit that is worn on a body other than a head of a user, an image pickup unit that is worn on the body of the user, a memory device that stores a set of instructions, and at least one processor that executes the set of instructions to: detect an observation direction of the user by the observation
(Continued)

direction detection unit, pick up an image by the image pickup unit, and output an output image corresponding to the observation direction based on the image picked up by the image pickup unit.

63 Claims, 105 Drawing Sheets

(51) Int. Cl.
  *H04N 5/33* (2023.01)
  *H04N 23/51* (2023.01)
  *H04N 23/68* (2023.01)

(56) References Cited

U.S. PATENT DOCUMENTS

| | | |
|---|---|---|
| 2014/0355767 A1 | 12/2014 | Virette et al. |
| 2015/0177829 A1* | 6/2015 | Sakuta ................ G06F 3/0346 345/156 |
| 2015/0310263 A1 | 10/2015 | Zhang et al. |
| 2015/0316981 A1 | 11/2015 | Sellen et al. |
| 2017/0085841 A1 | 3/2017 | Hagiwara |
| 2017/0199579 A1 | 7/2017 | Chen et al. |
| 2018/0234674 A1* | 8/2018 | Smith ................ H04N 23/698 |
| 2020/0304718 A1 | 9/2020 | Toriumi et al. |
| 2021/0034904 A1 | 2/2021 | Lee et al. |
| 2021/0266681 A1* | 8/2021 | Wexler ................ G06V 20/20 |

FOREIGN PATENT DOCUMENTS

| | | |
|---|---|---|
| EP | 3163422 A1 | 5/2017 |
| GB | 2607151 A | 11/2022 |
| GB | 2611154 A | 3/2023 |
| JP | 2005322077 A | 11/2005 |
| JP | 2007074033 A | 3/2007 |
| JP | 2012039359 A | 2/2012 |
| JP | 2015149552 A | 8/2015 |
| JP | 2017060078 A | 3/2017 |
| WO | 2013065868 A1 | 5/2013 |

OTHER PUBLICATIONS

Yamazoe et al.; "A body-mounted camera system for head-pose estimation and user-view image synthesis"; Image and Vision Computing, vol. 25, Issue 12, Dec. 3, 2007, pp. 1848-1855.

Jiang et al.; "Real-time 3D Display Based on OpenGL of Binocular Camera"; Instrumentation Technology, Issue 6 (2012), pp. 26-31, Jun. 15, 2012.

* cited by examiner

OBJECT

IMAGE ON IMAGE SENSOR

DEVELOPMENT AREA

EXTRACTION AND DEVELOPMENT

AFTER DISTORTION CORRECTION PROCESS

AFTER IMAGE STABILIZATION

MOVEMENT OF OBSERVATION CENTER

DETECTED FACE DIRECTION

DETECTED FACE DIRECTION AFTER SMOOTHING

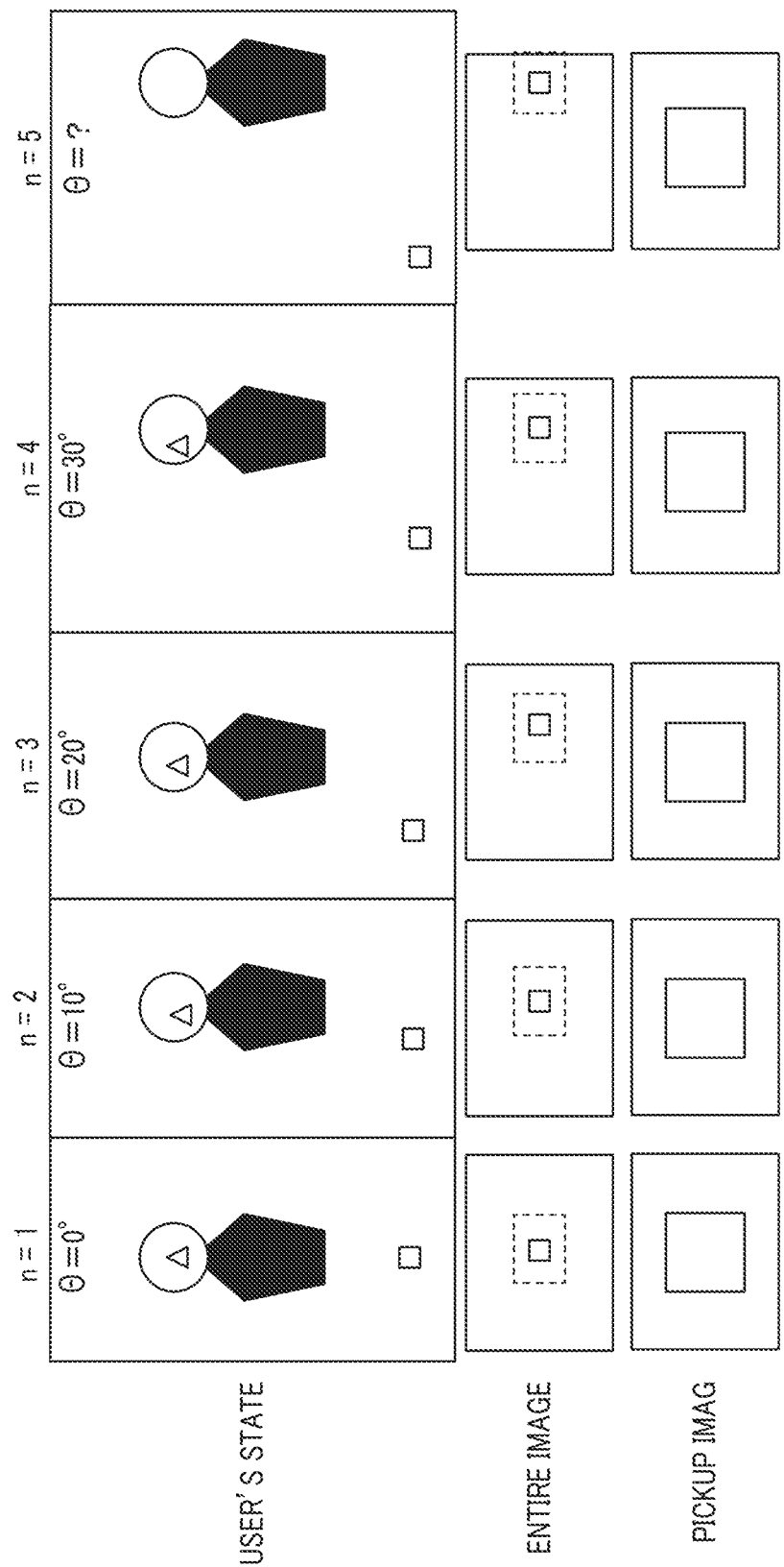

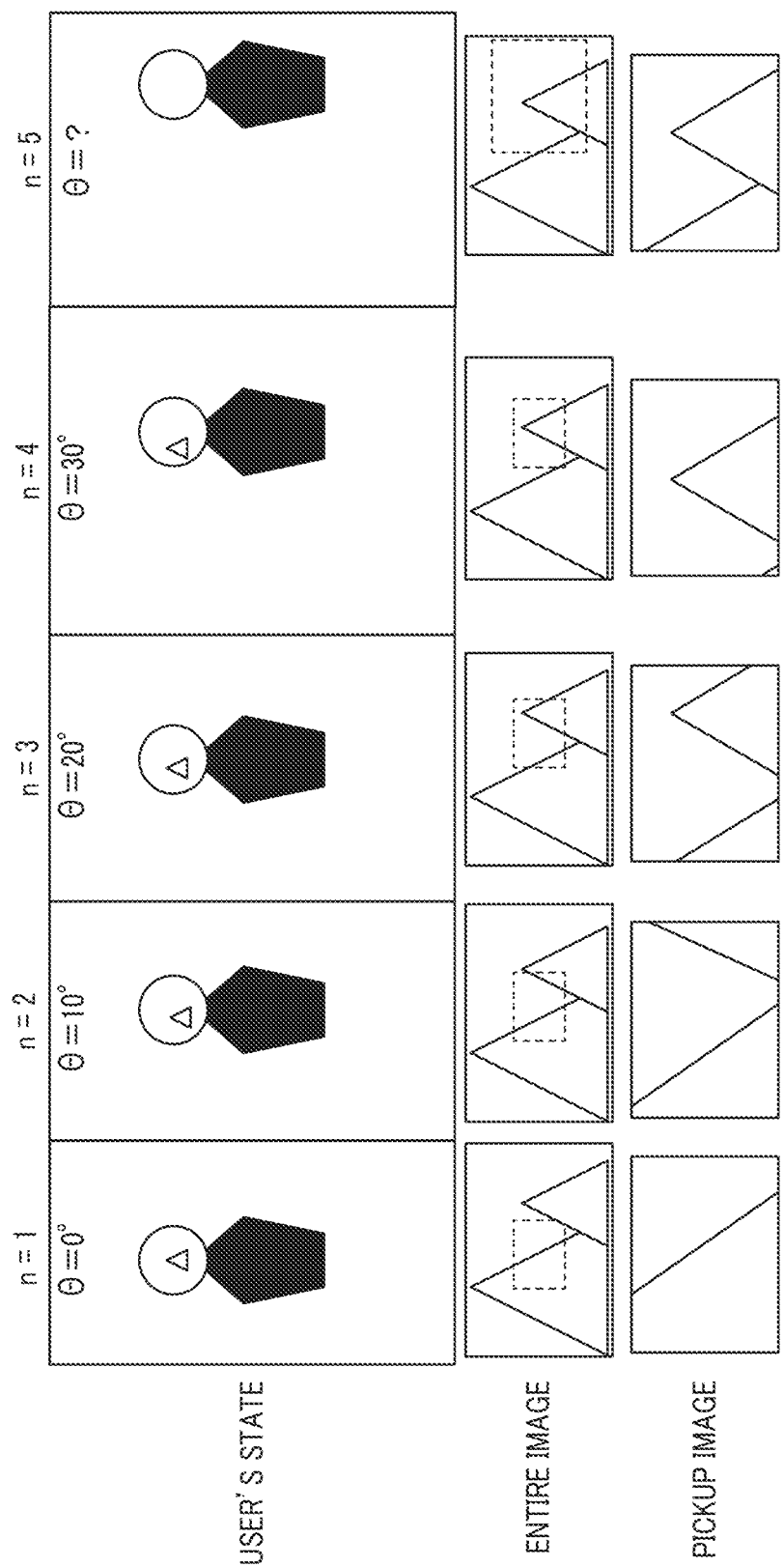

FRONT DIRECTION  RIGHT 45 DEGREES  RIGHT 90 DEGREES

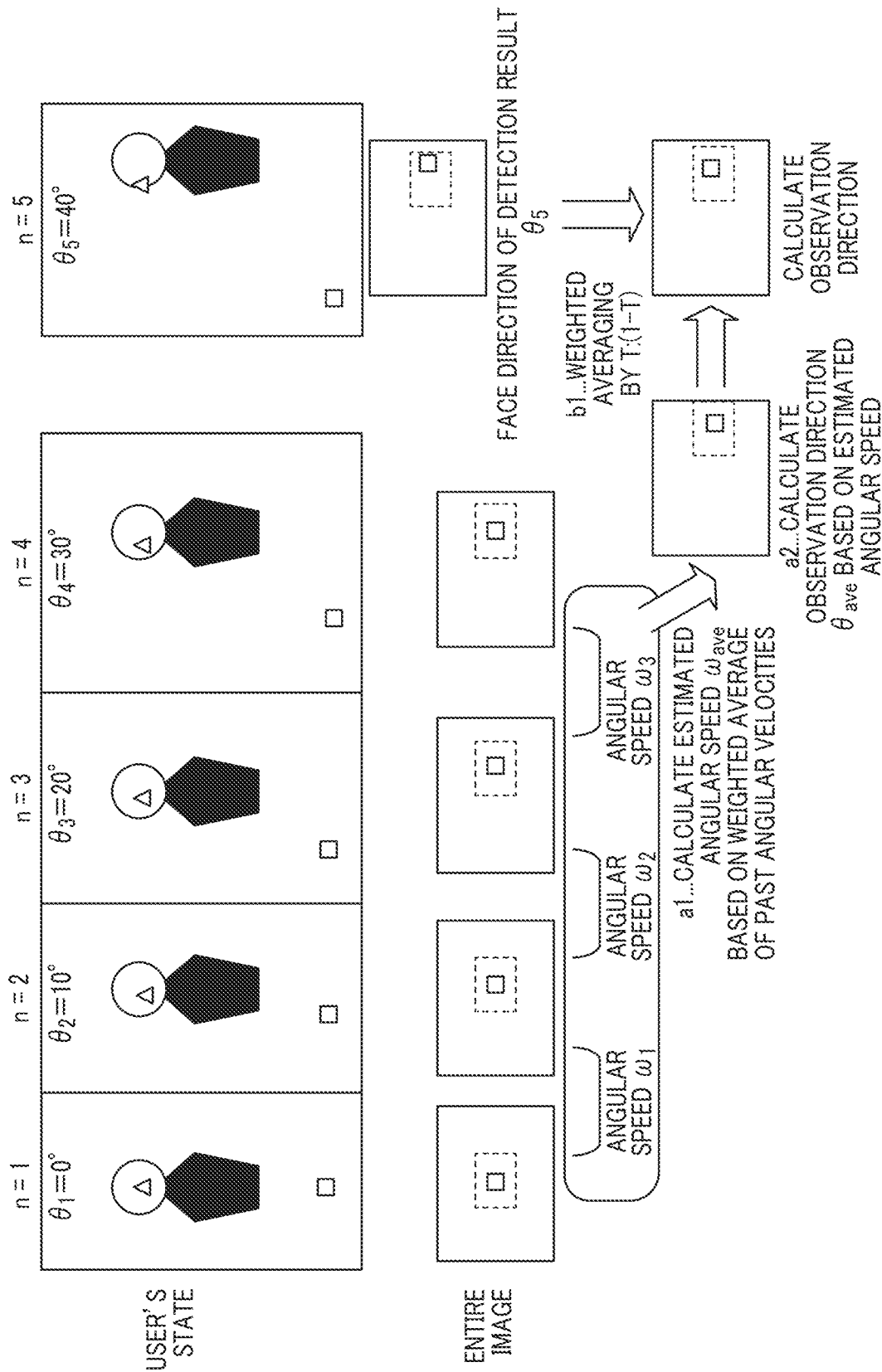

WEARABLE IMAGE PICKUP APPARATUS, PORTABLE DEVICE AND CALIBRATOR THAT COMMUNICATE WITH IMAGE PICKUP APPARATUS, CONTROL METHODS THEREFOR, AND STORAGE MEDIA STORING CONTROL PROGRAMS THEREFOR

BACKGROUND

Field of the Disclosure

The present disclosure relates to a wearable image pickup apparatus, a portable device and calibrator that communicate with the image pickup apparatus, control methods therefor, and storage media storing control programs therefor, and in particular, relates to an image pickup apparatus used as an action camera, a portable device, a calibrator, control methods therefor, and storage media storing control programs therefor.

Description of the Related Art

When a user picks up an image of an object with a camera, the user needs to continue directing the camera toward the object. Accordingly, the user is difficult to manage actions other than an image pickup action because the user is busy in an image pickup operation. And the user is difficult to focus attention on experience at a place of the user because the user focuses attention on the image pickup operation.

For example, about the image pickup operation, a parent as the user cannot play with a child as an object during an image pickup operation, and the image pickup operation becomes impossible while playing with the child.

Moreover, about the focusing of attention, when the user picks up an image while watching a sport game, the user cannot cheer or cannot remember game contents, and the image pickup operation becomes impossible while focusing attention to watch the sport game. Similarly, when a user picks up images during group travel, the user cannot experience impression of the same level as other members, and when priority is given to experience, the image pickup is neglected.

Japanese Laid-Open Patent Publication (Kokai) No. 2007-74033 (JP 2007-74033A) discloses a technique that uses a second camera that picks up a user in addition to a first camera that picks up an object. This technique calculates a moving direction and visual-line direction of a user from an image picked up by the second camera, determines an image pickup direction of the first camera, and picks up an image of an object estimated on the basis of user's taste and state.

Moreover, Japanese Laid-Open Patent Publication (Kokai) No. 2017-60078 (JP 2017-60078A) (Counterpart of US Patent Application 20170085841) disclose an image recording system including a sensor device that is attached to a user's head and an image pickup apparatus that is separately attached to a user's body or a bag. The sensor device consists of a gyro sensor or an acceleration sensor and detects a user's observation direction. The image pickup apparatus picks up an image in the observation direction detected by the sensor device.

However, since the second camera of JP 2007-74033A picks up an image of the user from a position distant from the user, the second camera needs high optical performance in order to calculate the moving direction and visual-line direction of the user from the image picked up by the second camera. Moreover, since high arithmetic processing capability is needed for processing the image picked up by the second camera, a scale of an apparatus becomes large. Furthermore, even if the high optical performance and the high arithmetic processing capability are satisfied, the user's observation direction cannot be precisely calculated. Accordingly, since an object that the user wants to pick up cannot be estimated with sufficient accuracy on the basis of the user's taste and state, an image other than what is wanted by the user may be picked up.

Moreover, since the sensor device of JP 2017-60078A directly detects a user's observation direction, the user needs to equip the head with the sensor device, which cannot solve troublesomeness in attaching any device to the head as mentioned above. Moreover, when the sensor device consists of a gyro sensor or an acceleration sensor, certain accuracy can be obtained in detection of a relative observation direction. However, since accuracy of detection of an absolute observation direction, especially in the horizontal rotation direction, cannot be obtained, there is an issue in a practical application.

SUMMARY

Embodiments of the present disclosure provide a wearable image pickup apparatus, a portable device and a calibrator that communicate with the image pickup apparatus, control methods therefor, and storage media storing control programs therefor, which eliminate manual change of an image pickup direction during picking up an image and can easily obtain an image that records experience while focusing attention on the experience.

Accordingly, embodiments of the present disclosure provide an image pickup apparatus including an observation direction detection unit that is worn on a body other than a head of a user, an image pickup unit that is worn on the body of the user, a memory device that stores a set of instructions, and at least one processor that executes the set of instructions to: detect an observation direction of the user by the observation direction detection unit, pick up an image by the image pickup unit, and output an output image corresponding to the observation direction based on the image picked up by the image pickup unit.

According to embodiments of the present disclosure, manual change of an image pickup direction during picking up an image becomes unnecessary, and an image that records experience can be easily obtained while focusing attention on the experience.

Further features of the present disclosure will become apparent from the following description of exemplary embodiments with reference to the attached drawings.

BRIEF DESCRIPTION OF THE DRAWINGS

FIG. 36A is a view showing relationships between an observation direction detection state of the user and a pickup image for respective frames according to the sixth embodiment.

FIG. 36B is a view showing relationships between an observation direction detection state of the user and a pickup image for respective frames in an object lost mode according to the sixth embodiment.

FIG. 40 is a schematic view showing an observation direction determination process in obtaining the face direction in the seventh embodiment.

DESCRIPTION OF THE EMBODIMENTS

Figure 1A:
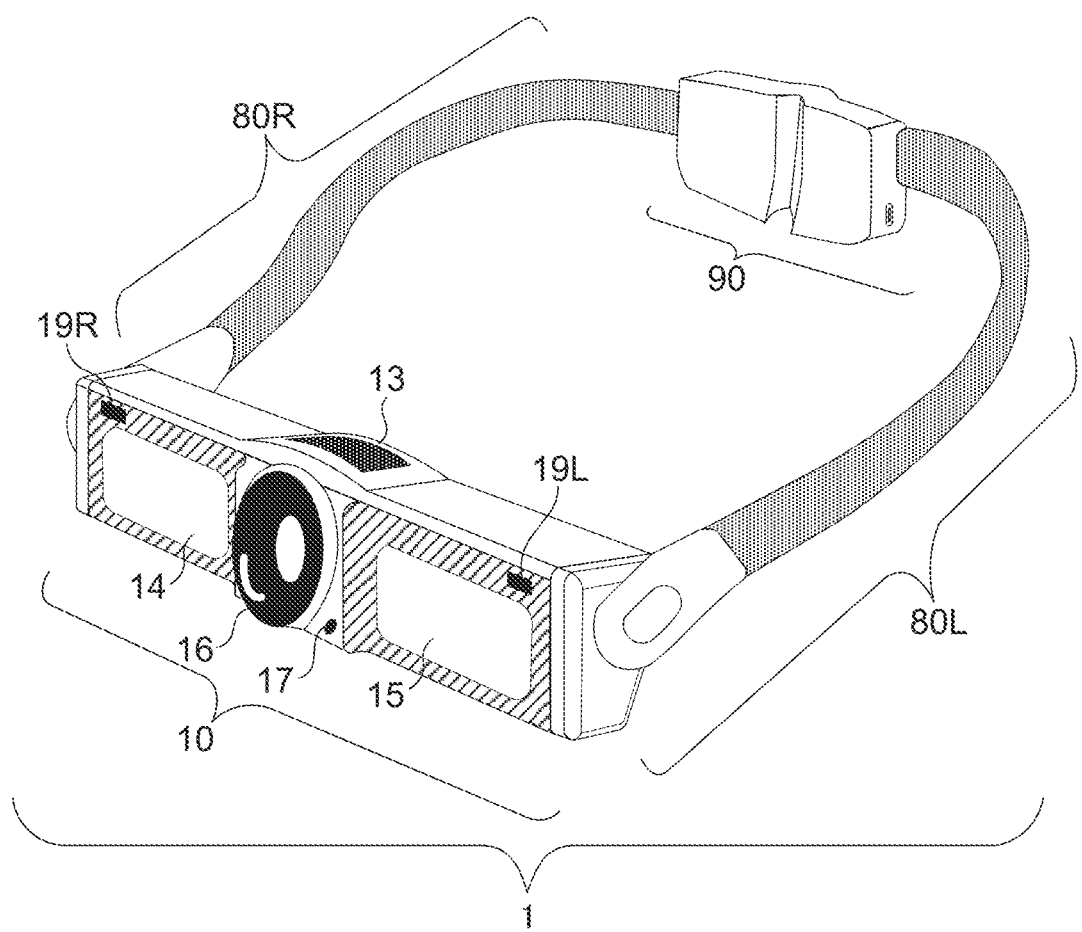
FIG. 1A is an external view showing a camera body including an image-pickup/detection unit as an image pickup apparatus according to a first embodiment.

Hereafter, embodiments according to the present disclosure will be described in detail by referring to the drawings.

First, some methods for achieving both an image pickup operation and focusing of attention on experience will be considered. There is a method that fixes a camera to a head using a fixing-to-head accessory to pick up an image in an observing direction. This enables the user to pick up an image without being occupied with the image pickup operation. Moreover, there is also a method that picks up an image in a wide area with an entire-celestial-sphere camera during experience. This enables a user to focus attention on the experience. After the experience, the user extracts a necessary image part from picked-up entire-celestial-sphere image and edit it to leave the image of the experience.

Figure 63A:
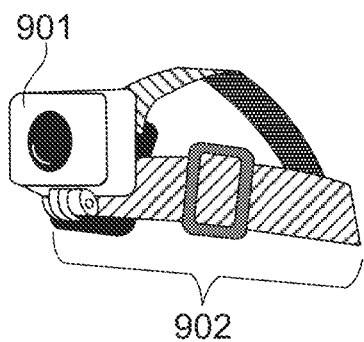
FIG. 63A and FIG. 63B are views showing a configuration example of a camera fixed to a head using a conventional fixing-to-head accessory.
Figure 63B:
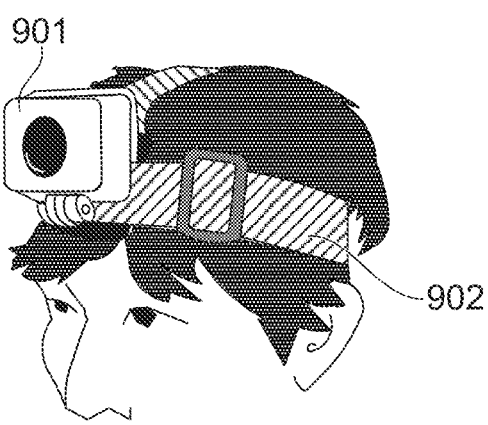

However, the former method needs a troublesome action that equips the head with the fixing-to-head accessory 902 to which a main body of an action camera 901 is fixed as shown in FIG. 63A. Moreover, as shown in FIG. 63B, when the user equips the head with the action camera 901 with the fixing-to-head accessory 902, appearance is bad and also a hairstyle of the user is also disheveled. Furthermore, the user feels uneasy about the existence of the fixing-to-head accessory 902 and the action camera 901 because of their weights and worries about bad appearance to third persons. Accordingly, the user may be difficult to pick up an image because the user cannot focus attention on experience in the state shown in FIG. 63B or because the user feels resistance to the style shown in FIG. 63B.

Figure 64:
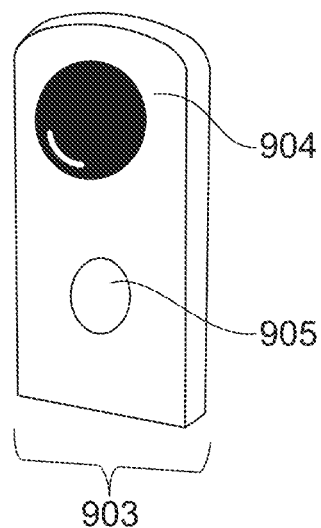
FIG. 64 is a view showing a configuration example of a conventional entire-celestial-sphere camera.

In the meantime, the latter method needs series of operations, such as image conversion and extraction position designation. For example, an entire-celestial-sphere camera 903 equipped with a lens 904 and an image pickup button 905 as shown in FIG. 64 is known. The lens 904 is one of a pair of fish-eye lenses for picking up half-celestial-sphere images provided in both sides of a housing of the entire celestial sphere camera 903. The entire-celestial-sphere camera 903 picks up an entire-celestial-sphere image using these fish-eye lenses. Then, the entire celestial sphere image is obtained by combining the images picked up using the pair of fish-eye lenses.

Figure 65A:
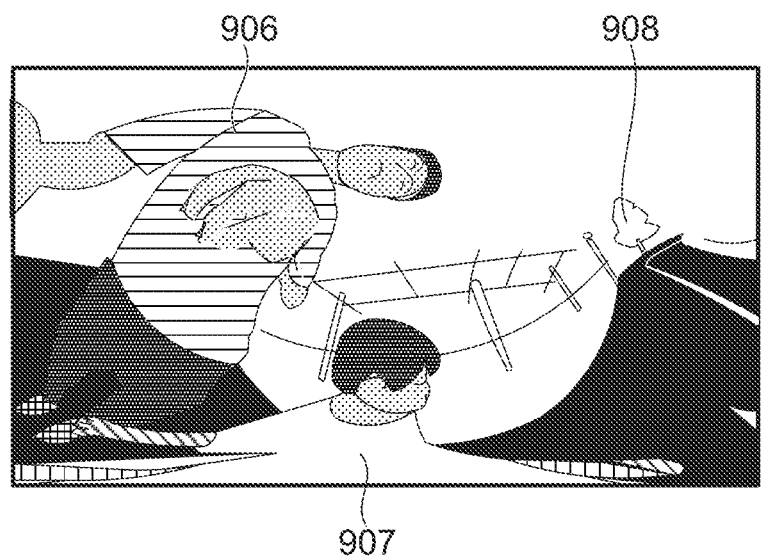
FIG. 65A, FIG. 65B, and FIG. 65C are views showing examples of conversion processes of the image picked up by the entire-celestial-sphere camera in FIG. 64.
Figure 65B:
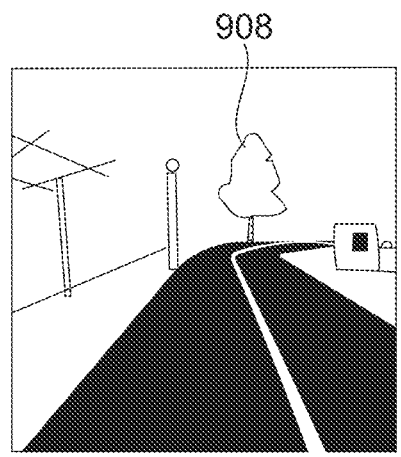
Figure 65C:
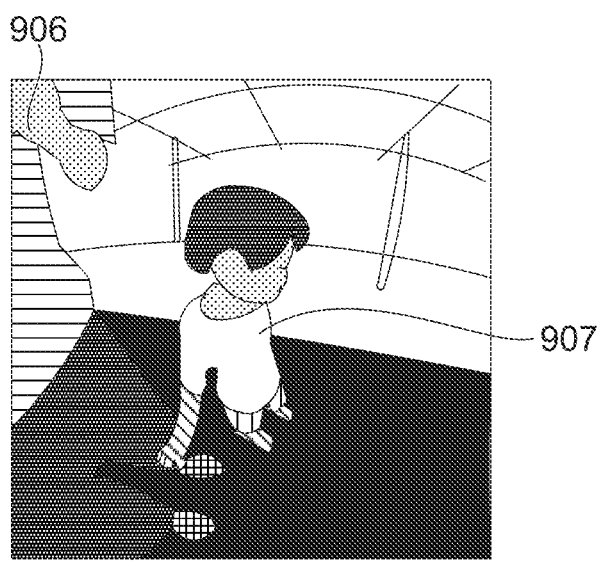

FIG. 65A, FIG. 65B, and FIG. 65C are views showing examples of conversion processes of the image picked up by the entire-celestial-sphere camera 903.

FIG. 65A shows an example of the entire-celestial-sphere image obtained by the entire celestial sphere camera 903, and a user 906, a child 907, and a tree 908 are included as objects. Since this image is an entire-celestial-sphere image obtained by combining projection images of the pair of fish-eye lenses, the user 906 is distorted greatly. Moreover, since a body part of the child 907 who is the object that the user 906 wants to pick up is located in a peripheral part of a pickup area of the lens 904, the body part distorts greatly in right and left and is extended. In the meantime, since the tree 908 is the object located in front of the lens 904, the tree 908 is picked up without great distortion.

In order to generate an image of a visual field at which people are usually looking from the image shown in FIG. 65A, it is necessary to extract a part of the image, to perform plane conversion, and to display.

FIG. 65B is an image located in front of the lens 904 that is extracted from the image shown in FIG. 65A. In the image in FIG. 65B, the tree 908 is shown in the center in the visual field at which people are usually looking. However, since the image in FIG. 65B does not include the child 907 who the user 906 wants to pick up, the user has to change an extraction position. Specifically, in this case, it is necessary to move the extraction position leftward and downward by 30° from the tree 908 in FIG. 65A. FIG. 65C shows a displayed image that is obtained by extracting the moved position and by performing the plane conversion. In this way, in order to obtain the image in FIG. 65C that the user wants to pick up from the image in FIG. 65A, the user has to extract a necessary area and has to perform the plane conversion. Accordingly, although the user can focus attention on experience during the experience (during image pickup), subsequent workload becomes huge. Accordingly, configurations of embodiments that solve the above-mentioned issues are devised.

FIG. 1A through FIG. 1D are views for describing a camera system consisting of a camera body 1 and a display apparatus 800 that is separated from the camera body 1. The camera body 1 includes an image-pickup/detection unit 10 as a wearable image pickup apparatus according to a first embodiment. Although the camera body 1 and the display apparatus 800 are separated devices in this embodiment, they may be integrated.

FIG. 1A is an external view showing the camera body 1. The camera body 1 is provided with the image-pickup/ detection unit 10, a battery unit (power source unit) 90, a right connection member 80R, and a left connection member 80L as shown in FIG. 1A. The right connection member 80R connects the image-pickup/detection unit 10 and the battery unit 90 on the right side of a user's body (left side in FIG. 1A). The left connection member 80L connects the image-pickup/detection unit 10 and the battery unit 90 on the left side of the user's body (right side in FIG. 1A).

The image-pickup/detection unit 10 is provided with a face direction detection window 13, a start switch 14, a stop switch 15, an image pickup lens 16, an LED 17, and microphones 19L and 19R.

The face direction detection window 13 permits transmission of infrared light projected from infrared LEDs 22 (FIG. 5: infrared irradiation unit) built in the image-pickup/detection unit 10 to detect positions of face parts of the user. The face direction detection window 13 also permits transmission of reflected infrared light from the face.

The start switch 14 is used to start an image pickup operation. The stop switch 15 is used to stop the image pickup operation. The image pickup lens 16 guides light to be picked up to a solid state image sensor 42 (FIG. 5) inside the image-pickup/detection unit 10. The LED 17 indicates a state that the image pickup operation is on-going or a warning.

The microphones 19R and 19L take in peripheral sound. The microphone 19L takes in sound of the left side of user's periphery (right side in FIG. 1A). The microphone 19R takes in sound of the right side of the user's periphery (left side in FIG. 1A).

Figure 1B:
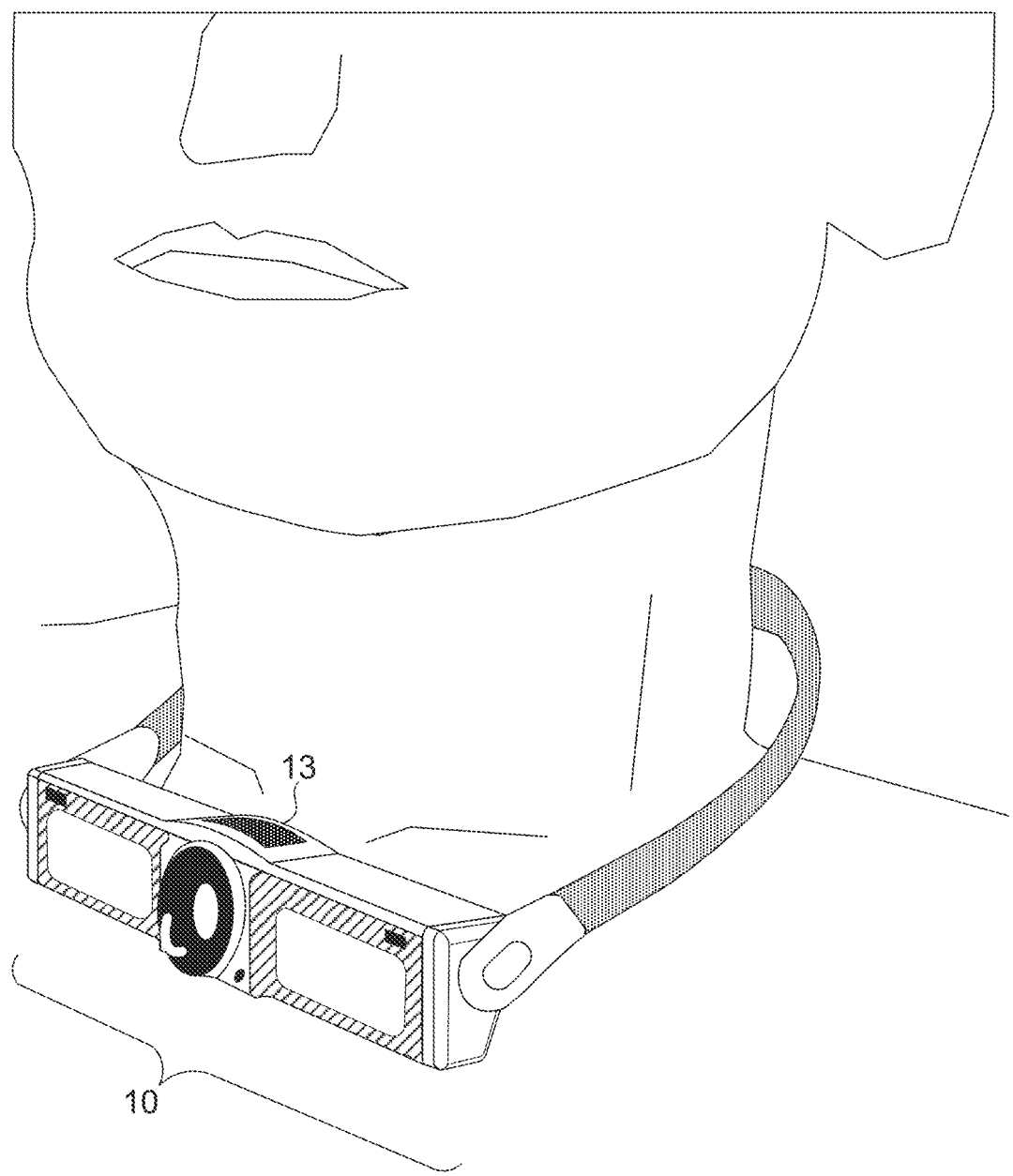
FIG. 1B is a view showing a state where a user wears the camera body.

FIG. 1B is a view showing a state where the user wears the camera body 1. When the user wears the camera body 1 so that the battery unit 90 will come to a user's back side and the image-pickup/detection unit 10 will come to the front side of the user's body, the image-pickup/detection unit 10 is supported while being energized in a direction toward a chest by the left and right connection members 80L and 80R that are respectively connected to the left and right ends of the image-pickup/detection unit 10. Thereby, the image-pickup/detection unit 10 is positioned in front of clavicles of the user. At this time, the face direction detection window 13 is located under a jaw of the user. An infrared condenser lens 26 shown in FIG. 2E mentioned later is arranged inside the face direction detection window 13. An optical axis (detection optical axis) of the infrared condenser lens 26 is directed to the user's face and is directed to a different direction from an optical axis (image pickup optical axis) of the image pickup lens 16. A face direction detection unit 20 (see FIG. 5) including the infrared condenser lens 26 detects a user's observation direction on the basis of positions of face parts. This enables an image pickup unit 40 mentioned later to pick up an image of an object in the observation direction.

Adjustment of the setting position due to individual difference of a body shape and difference in clothes will be mentioned later. Moreover, since the image-pickup/detection unit 10 is arranged in the front side of the body and the battery unit 90 is arranged in the back face in this way, weight of the camera body 1 is distributed, which reduces user's fatigue and reduces displacement of the camera body 1 due to centrifugal force caused by movement of the user.

Although the example in which the user wears the camera body 1 so that the image-pickup/detection unit 10 will be located in front of the clavicles of the user is described, the embodiment is not limited to this example. That is, the user may wear the camera body 1 in any position of the user's body other than the head as long as the camera body 1 can detect the user's observation direction and the image pickup unit 40 can pick up an image in an object in the observation direction.

Figure 1C:
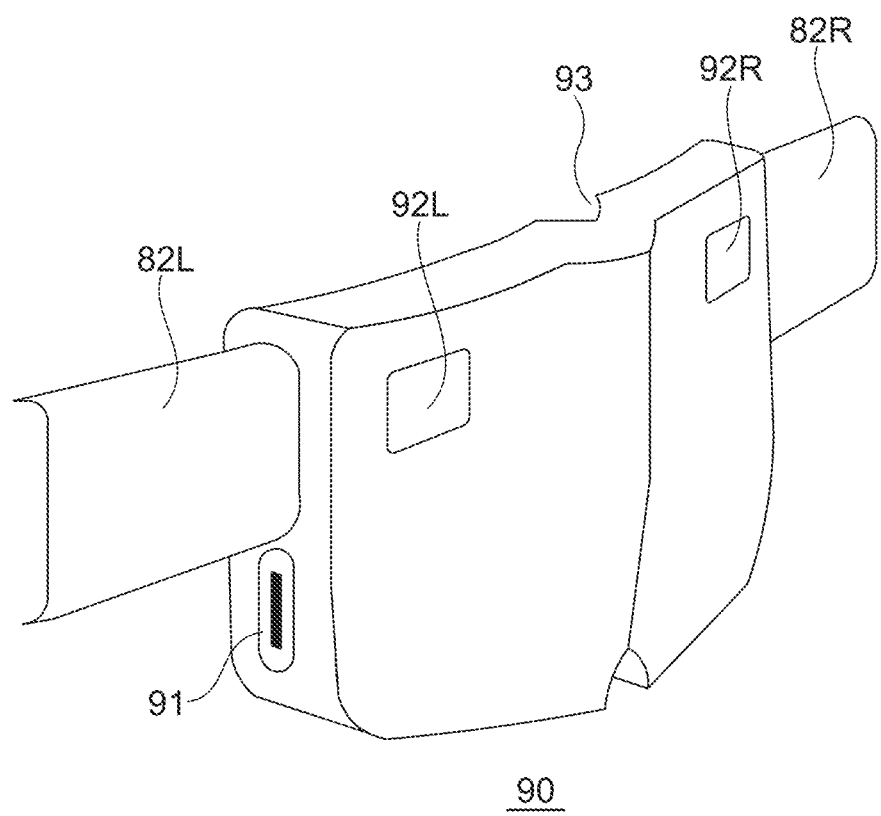
FIG. 1C is a view showing a battery unit in the camera body viewed from a rear side in FIG. 1A.

FIG. 1C is a view showing the battery unit 90 viewed from a rear side in FIG. 1A. The battery unit 90 is provided with a charge cable inserting slot 91, adjustment buttons 92L and 92R, and a backbone escape cutout 93 in FIG. 1C.

A charge cable (not shown) can be connected to the charge cable inserting slot 91. Batteries 94L and 94R (see FIG. 3A) are charged through the charge cable and electric power is supplied to the image-pickup/detection unit 10 through the charge cable.

Adjustment buttons 92L and 92R are used to adjust the respective lengths of the band parts 82L and 82R of the left and right connection members 80L and 80R. The adjustment button 92L is used to adjust the left band part 82L, and the adjustment button 92R is used to adjust the right band part 82R. Although the lengths of the band parts 82L and 82R are independently adjusted with the adjustment buttons 92L and 92R in the embodiment, the lengths of the band parts 82L and 82R may be simultaneously adjusted with one button.

The backbone escape cutout 93 is formed to escape the backbone of the user so that the battery unit 90 will not touch the backbone. Since the backbone escape cutout 93 escapes a convex part of the backbone of the body, displeasure of wearing is reduced and lateral displacement of the battery unit 90 is prevented.

Figure 1D:
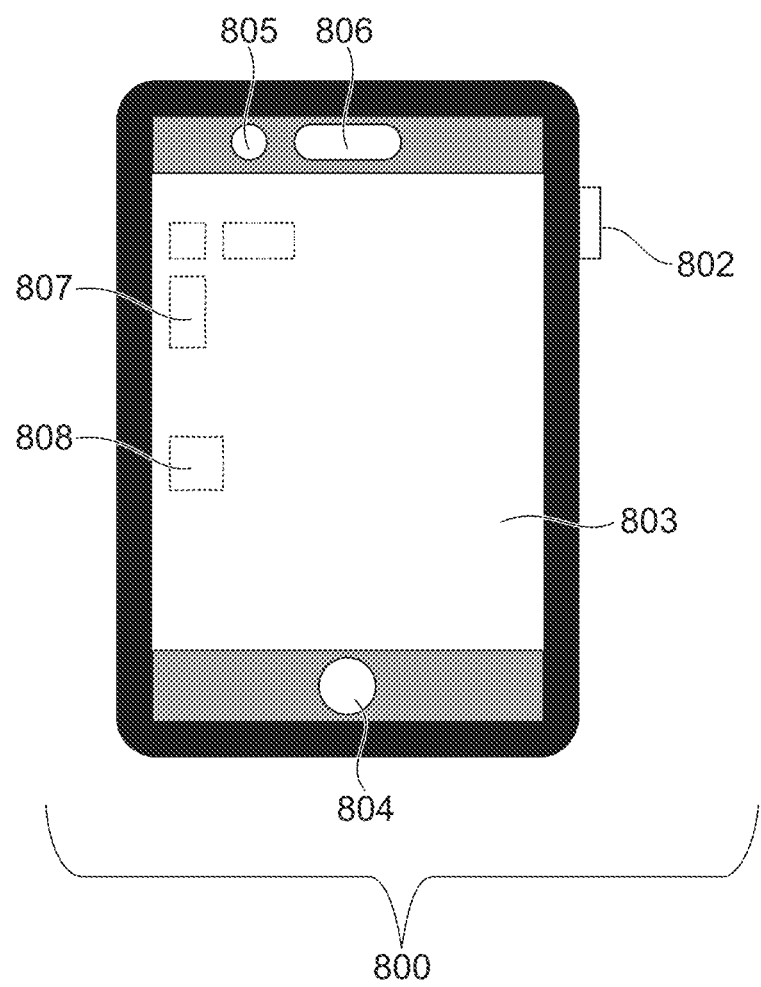
FIG. 1D is an external view showing a display apparatus as a portable device according to the first embodiment that is separated from the camera body.

FIG. 1D is an external view showing the display apparatus 800 as a portable device according to the first embodiment that is separated from the camera body 1. As shown in FIG. 1D, the display apparatus 800 is provided with an A-button 802, a display unit 803, a B-button 804, an in-camera 805, a face sensor 806, an angular speed sensor 807, and an acceleration sensor 808. Moreover, the display apparatus 800 is provided with a wireless LAN unit (not shown in FIG. 1D) that enables high-speed connection with the camera body 1.

The A-button 802 has a function of a power button of the display apparatus 800. The display apparatus 800 receives an ON/OFF operation by a long press of the A-button 802 and receives a designation of another process timing by a short press of the A-button 802.

The display unit 803 is used to check an image picked up by the camera body 1 and can display a menu screen required for setting. In this embodiment, a transparent touch sensor that is provided on the surface of the display unit 803 receives a touch operation to a screen (for example, a menu screen) that is displaying.

The B-button 804 functions as a calibration button 854 used for a calibration process mentioned later.

The in-camera 805 can pick up an image of a person who is observing the display apparatus 800.

The face sensor 806 detects a face shape and an observation direction of the person who is observing the display apparatus 800. A concrete configuration of the face sensor 806 is not limited. For example, a structural optical sensor, a ToF (Time of Flight) sensor, and a milliwave radar may be employed.

Since the angular speed sensor 807 is built in the display apparatus 800, it is shown by a dotted line as a meaning of a perspective view. Since the display apparatus 800 of this embodiment is also provided with a function of the calibrator mentioned later, a triaxle gyro sensor that enables detection in X, Y, and Z directions is provided.

The acceleration sensor 808 detects a posture of the display apparatus 800. It should be noted that a general smart phone is employed as the display apparatus 800 according to this embodiment. The camera system of the embodiment is achieved by adjusting firmware in the smart phone to firmware of the camera body 1. In the meantime, the camera system of the embodiment can be achieved by adjusting the firmware of the camera body 1 to an application and OS of the smart phone as the display apparatus 800.

FIG. 2A through FIG. 2F are views describing the image-pickup/detection unit 10 in detail. In views from FIG. 2A, a component that has the same function of a part that has been already described is indicated by the same reference numeral and its description in this specification is omitted.

Figure 2A:
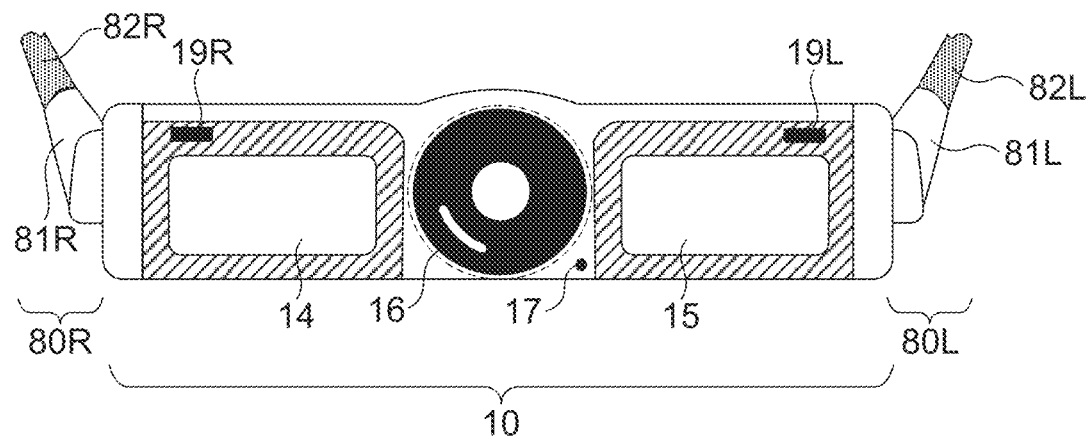
FIG. 2A is a front view showing the image-pickup/detection unit in the camera body.

FIG. 2A is a front view showing the image-pickup/detection unit 10. The right connection member 80R has the band part 82R and an angle-holding member 81R of hard material that holds an angle with respect to the image-pickup/detection unit 10. The left connection member 80L has the band part 82L and an angle-holding member 81L similarly.

Figure 2B:
FIG. 2B is a view showing a shape of a band part of a connection member in the camera body.

FIG. 2B is a view showing the shapes of the band parts 82L and 82R of the left and right connection members 80L and 80R. In FIG. 2B, the angle holding members 81L and 81R are shown as transparent members in order to show the shapes of the band parts 82L and 82R. The band part 82L is provided with a left connecting surface 83L and an electric cable 84 that are arranged at the left side of the user's body (right side in FIG. 2B) when the user wears the camera body 1. The band part 82R is provided with a right connecting surface 83R arranged at the right side of the user's body (left side in FIG. 2B) when the user wears the camera body 1.

The left connecting surface 83L is connected with the angle holding member 81L, and its sectional shape is an ellipse but is not a perfect circle. The right connecting surface 83R also has a similar elliptical shape. The right connecting surface 83R and left connecting surface 83L are arranged symmetrically in a reverse V-shape. That is, the distance between the right connecting surface 83R and the left connecting surface 83L becomes shorter toward the upper side from the lower side in FIG. 2B. Thereby, since the long axis directions of sections of the left and right connecting surfaces 83L and 83R match the user's body when the user hangs the camera body 1, the band parts 82L and 82R touch the user's body comfortably and movement of the image-pickup/detection unit 10 in the left-and-right direction and front-and-back direction can be prevented.

The electric cable (a power supply member) 84 is wired inside the band part 82L and electrically connects the battery unit 90 and the image-pickup/detection unit 10. The electric cable 84 connects the power source of the battery unit 90 to the image-pickup/detection unit 10 or transfers an electrical signal with an external apparatus.

Figure 2C:
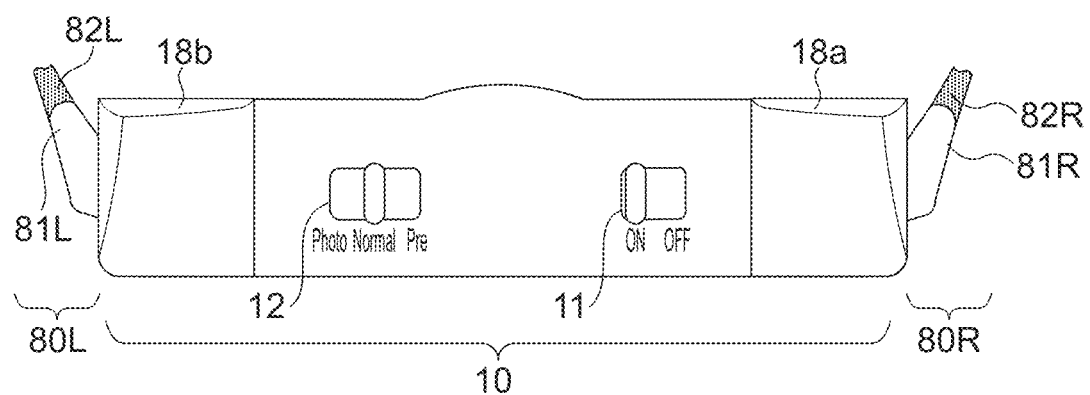
FIG. 2C is a rear view showing the image-pickup/detection unit.

FIG. 2C is a rear view showing the image-pickup/detection unit 10. FIG. 2C shows the side that contacts to the user's body. That is, FIG. 2C is a view viewed from the opposite side of FIG. 2A. Accordingly, the positional relationship between the right connection member 80R and the left connection member 80L is contrary to FIG. 2A.

The image-pickup/detection unit 10 is provided with a power switch 11, an image pickup mode switch 12, and chest contact pads 18a and 18b at the back side. The power switch 11 is used to switch ON/OFF of the power of the camera body 1. Although the power switch 11 of this embodiment is a slide lever type, it is not limited to this. For example, the power switch 11 may be a push type switch or may be a switch that is integrally constituted with a slide cover (not shown) of the image pickup lens 16.

The image pickup mode switch (a change member) 12 is used to change an image pickup mode, i.e., is used to change a mode in connection with an image pickup operation. In this embodiment, the image pickup mode switch 12 is used to select the image pickup mode from among a still image mode, a video image mode, and a below-mentioned preset mode that is set using the display apparatus 800. In this embodiment, the image pickup mode switch 12 is a slide lever switch that can select one of "Photo", "Normal", and "Pre" shown in FIG. 2C. The image pickup mode shifts to the still image mode by sliding to "Photo", shifts to the video image mode by sliding to "Normal", and shifts to the preset mode by sliding to "Pre". It should be noted that the configuration of the image pickup mode switch 12 is not limited to the embodiment as long as a switch can change the image pickup mode. For example, the image pickup mode switch 12 may consist of three buttons of "Photo", "Normal", and "Pre".

The chest contact pads (fixing members) 18a and 18b touch the user's body when the image-pickup/detection unit 10 is energized to the user's body. As shown in FIG. 2A, the image-pickup/detection unit 10 is formed so that a lateral (left-and-right) overall length will become longer than a vertical (up-and-down) overall length in wearing the camera body 1. The chest contact pads 18a and 18b are respectively arranged in vicinities of right and left ends of the image-pickup/detection unit 10. This arrangement reduces rotational blur in the left-and-right direction during the image pickup operation of the camera body 1. Moreover, the chest contact pads 18a and 18b prevent the power switch 11 and the image pickup mode switch 12 from touching the user's body. Furthermore, the chest contact pads 18a and 18b prevent heat transmission to the user's body even if the image-pickup/detection unit 10 heats up due to a long-time image pickup operation and are used for the adjustment of the angle of the image-pickup/detection unit 10.

Figure 2D:
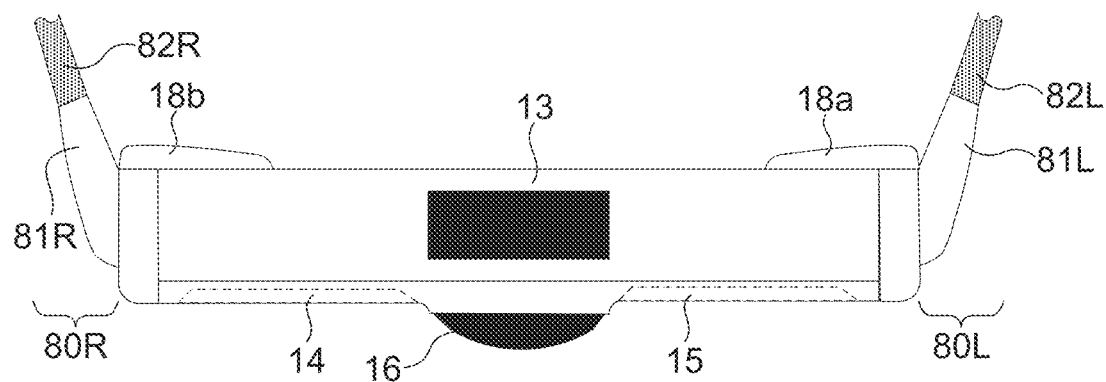
FIG. 2D is a top view showing the image-pickup/detection unit.

FIG. 2D is a top view showing the image-pickup/detection unit 10. As shown in FIG. 2D, the face direction detection window 13 is provided in the central part of the top surface of the image-pickup/detection unit 10, and the chest contact pads 18a and 18b are projected from the image-pickup/detection unit 10.

Figure 2E:
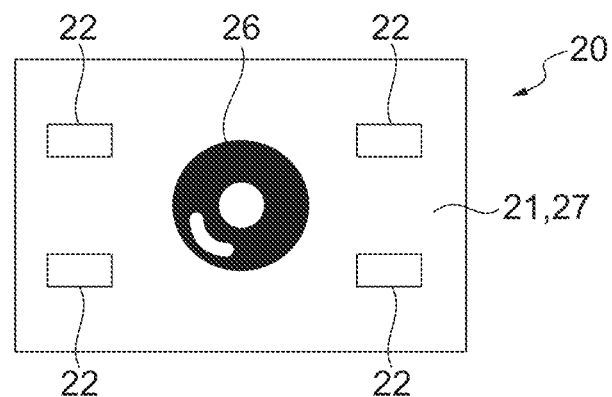
FIG. 2E is a view showing a configuration of a face direction detection unit arranged inside the image-pickup/detection unit and under a face direction detection window in the camera body.

FIG. 2E is a view showing a configuration of the face direction detection unit 20 arranged inside the image-pickup/detection unit 10 and under the face direction detection window 13. The face direction detection unit 20 is provided with the infrared LEDs 22 and the infrared condenser lens 26. The face direction detection unit 20 is also provided with an infrared LED lighting circuit 21 and an infrared detection device 27 shown in FIG. 5 mentioned later.

The infrared LEDs 22 project infrared light 23 (FIG. 5) toward the user. The infrared condenser lens 26 images reflected light 25 (FIG. 5) from the user in projecting the infrared light 23 from the infrared LEDs 22s onto a sensor (not shown) of the infrared detection device 27.

Figure 2F:
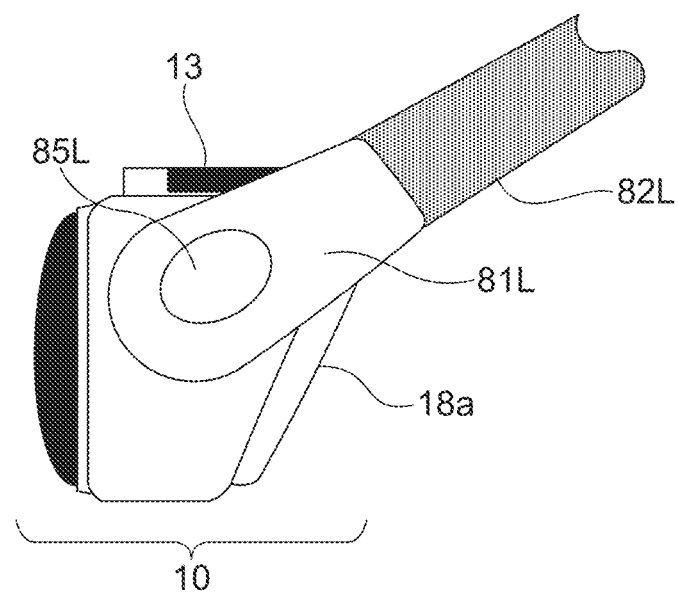
FIG. 2F is a view showing a state where a user wears the camera body viewed from a left side of the user.

FIG. 2F is a view showing a state where a user wears the camera body 1 viewed from a left side of the user.

An angle adjustment button 85L is provided in the angle holding member 81L and is used in adjusting the angle of the image-pickup/detection unit 10. An angle adjustment button (not shown in FIG. 2F) is provided in the opposite angle holding member 81R in the symmetrical position of the angle adjustment button 85L.

Although the angle adjustment buttons are actually visible in FIG. 2A, FIG. 2C, and FIG. 2D, they are omitted to simplify the description.

When moving the angle holding member 81L upward or downward in FIG. 2F while pressing the angle adjustment button 85L, the user can change the angle between the image-pickup/detection unit 10 and the angle holding member 81L. The right side is the same as the left side. Moreover, projection angles of the chest contact pads 18a and 18b can be changed. The functions of these two kinds of angle change members (the angle adjustment buttons and chest contact pads) can adjust the image-pickup/detection unit 10 so as to keep the optical axis of the image pickup lens 16 horizontally irrespective of individual difference of a chest position shape.

Figure 3A:
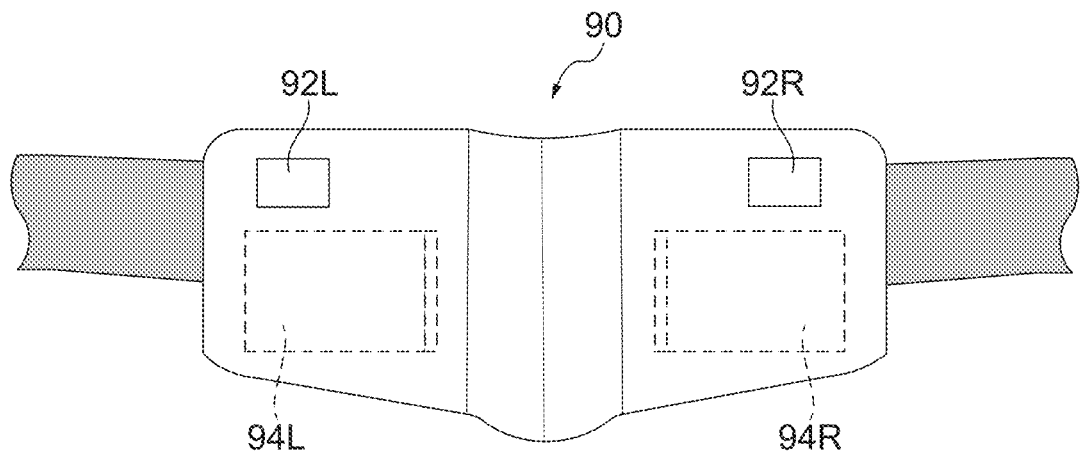
FIG. 3A, FIG. 3B, and FIG. 3C are views showing details of the battery unit.
Figure 3B:
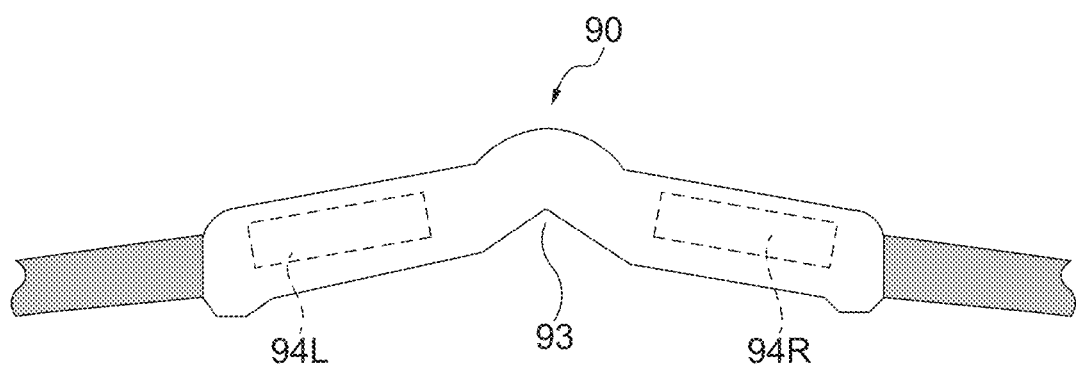
Figure 3C:
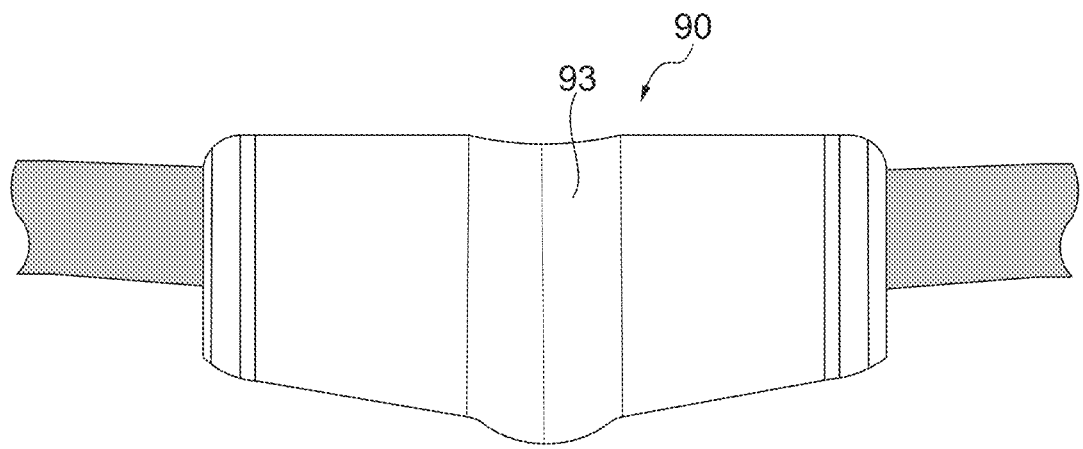

FIG. 3A, FIG. 3B, and FIG. 3C are views showing details of the battery unit 90. FIG. 3A is a partially transparent back view showing the battery unit 90.

As shown in FIG. 3A, the left battery 94L and right battery 94R are symmetrically mounted inside the battery unit 90 in order to achieve weight balance. In this way, since the left and right batteries 94L and 94R are arranged symmetrically with the central part of the battery unit 90, the weight balance in the left-and-right direction is achieved and the position displacement of the camera body 1 is prevented. It should be noted that the battery unit 90 may mount a single battery.

FIG. 3B is a top view showing the battery unit 90. The batteries 94L and 94R are shown as the transparent members also in FIG. 3B.

As shown in FIG. 3B, since the batteries 94L and 94R are symmetrically arranged at both the sides of the backbone escape cutout 93, the user can wear the battery unit 90 that is relatively heavy without any burden.

FIG. 3C is a rear view showing the battery unit 90. FIG. 3C is the view viewed from the side touched to the user's body, i.e., is the view viewed from the opposite side of FIG. 3A. As shown in FIG. 3C, the backbone escape cutout 93 is provided in the center along the backbone of the user.

Figure 4:
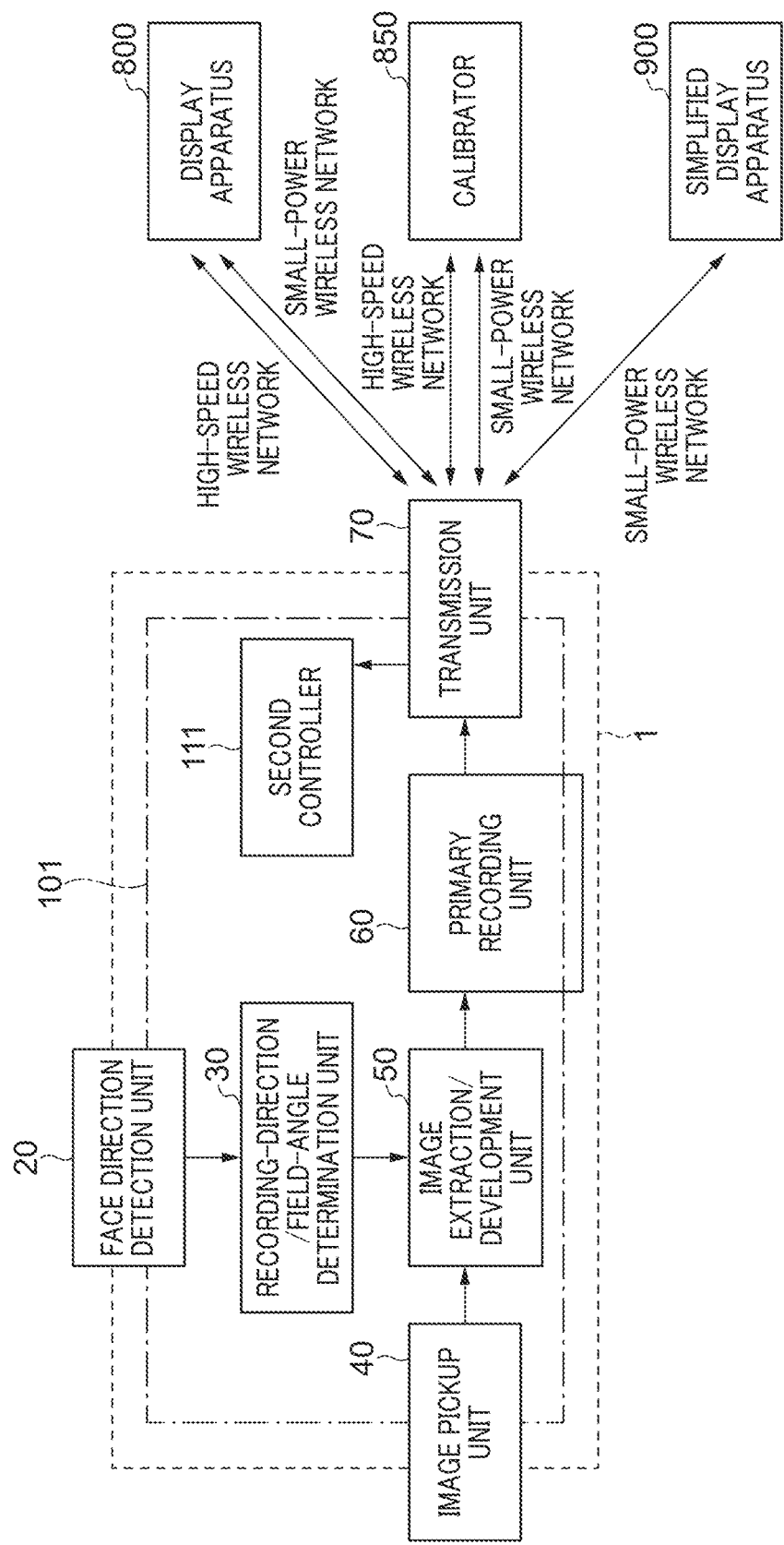
FIG. 4 is a functional block diagram showing the camera body according the first embodiment.

FIG. 4 is a functional block diagram showing the camera body 1. Hereinafter, the process executed by the camera body 1 will be described roughly using FIG. 4. Details will be mentioned later. As shown in FIG. 4, the camera body 1 is provided with the face direction detection unit 20, a recording-direction/field-angle determination unit 30, the image pickup unit 40, an image extraction/development unit 50, a primary recording unit 60, a transmission unit 70, and a second controller 111. These functional blocks are achieved by control of an overall control CPU 101 (FIG. 5) that controls the entire camera body 1.

The face direction detection unit 20 (an observation direction detection unit) is a functional block executed by the above-mentioned infrared LEDs 22, the infrared detection device 27, etc. The face direction detection unit 20 estimates an observation direction by detecting the face direction and passes the observation direction to the recording-direction/field-angle determination unit 30.

The recording-direction/field-angle determination unit (a recording direction determination unit) 30 determines information about a position and an area that will be extracted from an image picked up by the image pickup unit 40 by performing various calculations on the basis of the observation direction estimated by the face direction detection unit 20. And then, the information is passed to the image extraction/development unit 50.

The image pickup unit 40 forms a wide-angle image of the object and passes the image to the image extraction/development unit 50. The image extraction/development unit (a development unit) 50 extracts an image that the user looks at from the image passed from the image pickup unit 40 by using the information passed from the recording-direction/field-angle determination unit 30. Then, the image extraction/development unit 50 develops the extracted image and passes the developed image to the primary recording unit 60.

The primary recording unit 60 is a functional block constituted by a primary memory 103 (FIG. 5) etc., records image information, and passes the image information to the transmission unit 70 at a required timing. The transmission unit (an image output unit) 70 is wirelessly connected with predetermined communication parties, such as the display apparatus (FIG. 1D) 800, a calibrator 850, and a simplified display device 900, and communicates with these.

The display apparatus 800 is connectable to the transmission unit 70 through a high-speed wireless LAN (hereinafter referred to as a "high-speed wireless network"). In this embodiment, the high-speed wireless network employs wireless communication corresponding to the IEEE802.11ax (Wi-Fi 6) standard. In the meantime, wireless communication corresponding to other standards, such as the Wi-Fi 4 standard and the Wi-Fi 5 standard, may be employed. Moreover, the display apparatus 800 may be a dedicated apparatus developed for the camera body 1 or may be a general smart phone, a tablet terminal, etc.

In addition, the display apparatus 800 may be connected to the transmission unit 70 through a small-power wireless network, may be connected through both the high-speed wireless network and small-power wireless network, or may be connected while switching the networks. In this embodiment, large amount data like an image file of a video image mentioned later is transmitted through the high-speed wireless network, and small amount data and data that does not need quick transmission are transmitted through the small-power wireless network. Although the Bluetooth is used for the small-power wireless network in this embodiment, other short-distance wireless communications, such as the NFC (Near Field Communication), may be employed.

The calibrator 850 performs initial setting and individual setting of the camera body 1, and is connectable to the transmission unit 70 through the high-speed wireless network in the same manner as the display apparatus 800. Details of the calibrator 850 are mentioned later. Moreover, the display apparatus 800 may have the function of the calibrator 850.

The simplified display device 900 is connectable to the transmission unit 70 only through the small-power wireless network, for example. Although the simplified display device 900 cannot perform communication of a video image with the transmission units 70 due to time restriction, it can transmit an image pickup start/stop timing and can be used to image check at a composition check level. Moreover, the simplified display device 900 may be a dedicated apparatus developed for the camera body 1 as well as the display apparatus 800 or may be a smart watch.

Figure 5:
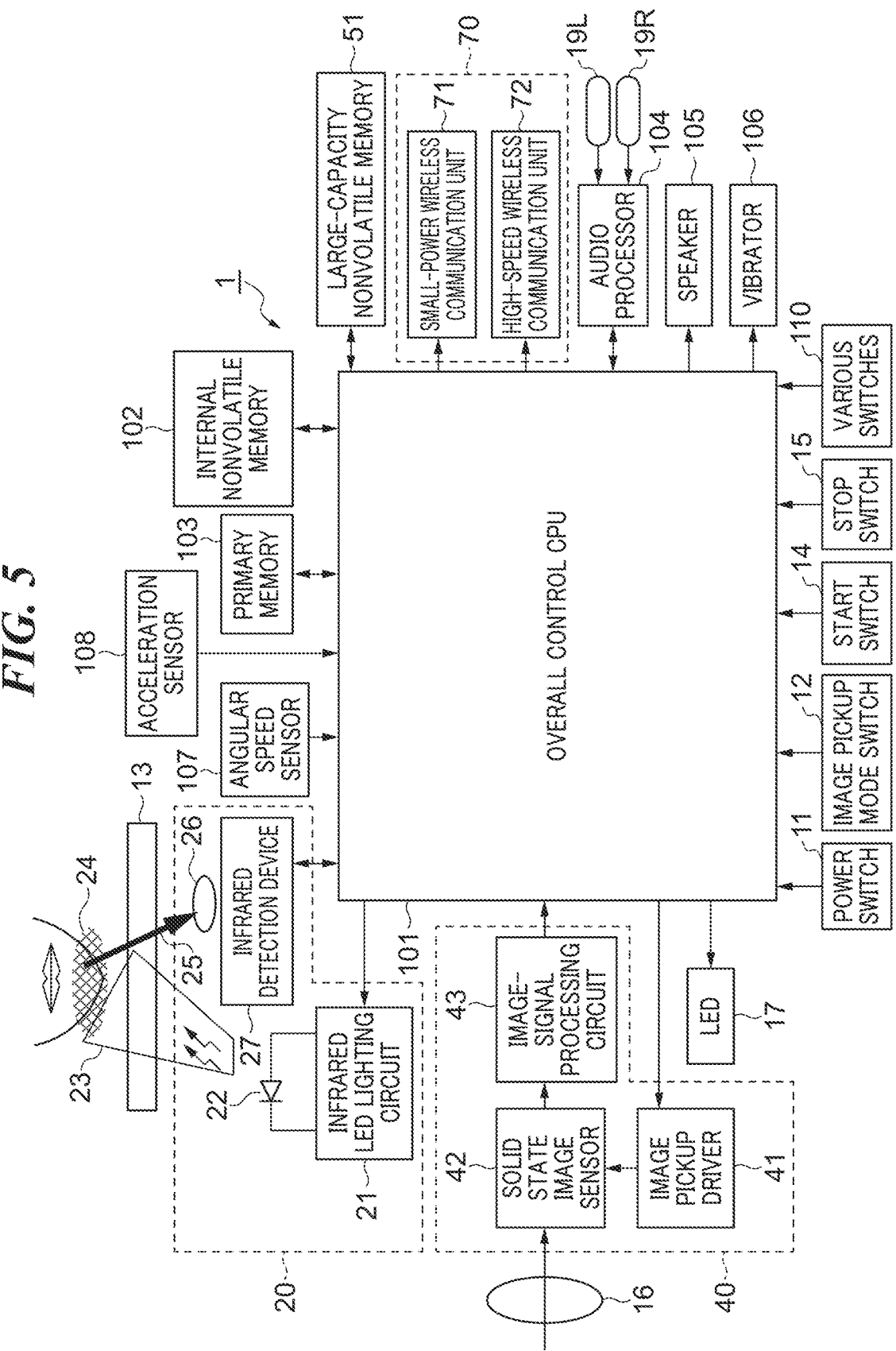
FIG. 5 is a block diagram showing a hardware configuration of the camera body according to the first embodiment.

FIG. 5 is a block diagram showing a hardware configuration of the camera body 1. Moreover, the configurations and functions described using FIG. 1A through FIG. 1C are indicated by the same reference numerals and their detailed descriptions will be omitted.

As shown in FIG. 5, the camera body 1 is provided with the overall control CPU 101, power switch 11, image pickup mode switch 12, face direction detection window 13, start switch 14, stop switch 15, image pickup lens 16, and LED 17.

The camera body 1 is provided with the infrared LED lighting circuit 21, infrared LEDs 22, infrared condenser lens 26, and infrared detection device 27 that constitute the face direction detection unit 20 (FIG. 4).

Moreover, the camera body 1 is provided with the image pickup unit 40 (FIG. 4), which consists of an image pickup driver 41, a solid state image sensor 42, and an image signal processing circuit 43, and the transmission unit 70 (FIG. 4), which consists of a small-power wireless communication unit 71 and high-speed wireless communication unit 72.

Although the camera body 1 has the single image pickup unit 40 in this embodiment, it may have two or more image pickup units in order to pick up a 3D image, to pick up an image of which a field angle is wider than an image obtained by a single image pickup unit, or to pick up images in different directions.

The camera body 1 is provided with various memories, such as a large-capacity nonvolatile memory 51, an internal nonvolatile memory 102, and the primary memory 103 degree again. Furthermore, the camera body 1 is provided with an audio processor 104, a speaker 105, a vibrator 106, an angular speed sensor 107, an acceleration sensor 108, and various switches 110.

The switches like the power switch 11, which are described using FIG. 2C, are connected to the overall control CPU 101. The overall control CPU 101 controls the entire camera body 1. The recording-direction/field-angle determination unit 30, image extraction/development unit 50, and second controller 111 in FIG. 4 are achieved by overall control CPU 101.

The infrared LED lighting circuit 21 controls lighting and extinction of the infrared LEDs 22 (FIG. 2E) to control projection of the infrared light 23 directed to the user from the infrared LEDs 22.

The face direction detection window 13 is constituted by a visible light cut filter that almost cuts off visible light and sufficiently permits transmission of the infrared light 23 and its reflected light 25 that belong to infrared region. The infrared condenser lens 26 condenses the reflected light 25.

The infrared detection device (an infrared detection unit) 27 has a sensor that detects the reflected light 25 condensed by the infrared condenser lens 26. The sensor converts an image formed by the condensed reflected light 25 into sensor data and passes the sensor data to the overall control CPU 101.

As shown in FIG. 1B, when the user wears the camera body 1, the face direction detection window 13 is located under a user's jaw. Accordingly, as shown in FIG. 5, the infrared light 23 projected from the infrared LEDs 22 transmits the face direction detection window 13 and an infrared irradiation surface 24 near the user's jaw is irradiated with the infrared light 23. Moreover, the reflected light 25 reflected from the infrared irradiation surface 24 transmits the face direction detection window 13 and is condensed by the infrared condenser lens 26 onto the sensor in the infrared detection device 27.

The various switches 110 are not shown in FIG. 1A through FIG. 1C. The various switches 110 are used to execute functions that are unrelated to this embodiment.

The image pickup driver 41 includes a timing generator, generates various timing signals, outputs the timing signals to sections related to the image pickup operation, and drives the solid state image sensor 42. The solid state image sensor 42 outputs the signal obtained by photoelectric conversion of the object image formed through the image pickup lens 16 (FIG. 1A) to the image signal processing circuit 43.

The image signal processing circuit 43 generates the pickup image data by applying a clamp process and an A/D conversion process, etc. to the signal from the solid state image sensor 42 and outputs the pickup image data to the overall control CPU 101.

The internal nonvolatile memory 102 is constituted by a flash memory etc. and stores a boot program for the overall control CPU 101 and set values of various program modes. In this embodiment, a set value of an observation visual field (field angle) and a set value of an effect level of an image stabilization process are recorded.

The primary memory 103 is constituted by a RAM etc. and temporarily stores processing image data and a calculation result of the overall control CPU 101.

The large-capacity nonvolatile memory 51 stores image data. In this embodiment, the large-capacity nonvolatile memory 51 is a semiconductor memory that is not detachable. However, the large-capacity nonvolatile memory 51 may be constituted by a detachable storage medium like an SD card, and may be used together with the internal nonvolatile memory 102.

The small-power wireless communication unit 71 exchanges data with the display apparatus 800, the calibrator 850, and the simplified display device 900 through the small-power wireless network. The high-speed wireless communication unit 72 exchanges data with the display apparatus 800 and the calibrator 850 through the high-speed wireless network.

The audio processor 104 processes outside sound (analog signal) collected by the microphones 19L and 19R and generates an audio signal.

In order to notify the user of a state of the camera body 1 and to warn the user, the LED 17 emits light, the speaker 105 outputs sound, and the vibrator 106 vibrates.

The angular speed sensor 107 uses a gyro etc. and detects movement of the camera body 1 as gyro data. The acceleration sensor 108 detects the posture of the image-pickup/detection unit 10.

Figure 6:
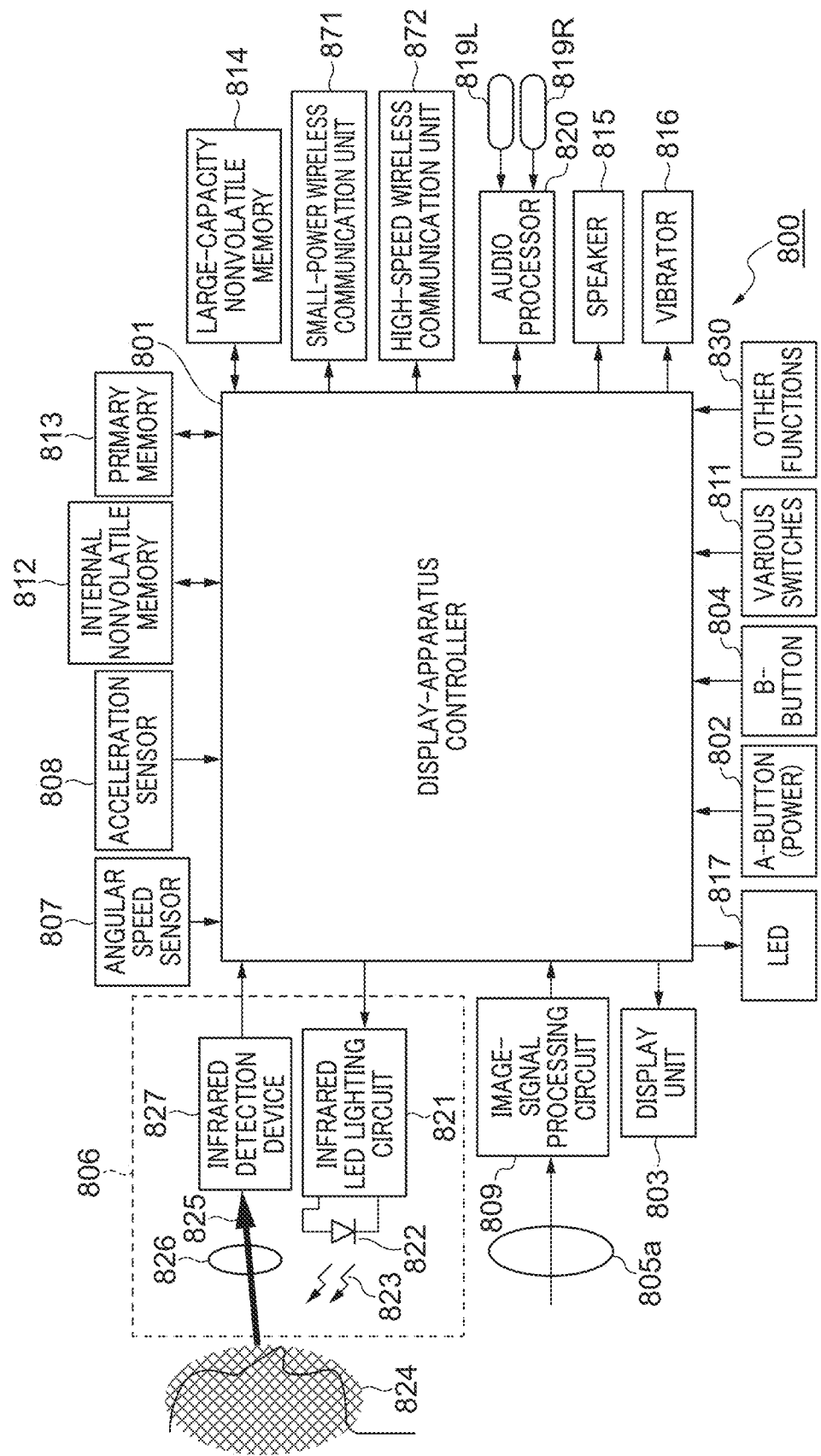
FIG. 6 is a block diagram showing a hardware configuration of the display apparatus according to the first embodiment.

FIG. 6 is a block diagram showing a hardware configuration of the display apparatus 800. The components that have been described using FIG. 1D are indicated by the same reference numerals and their descriptions will be omitted to simplify the description. As shown in FIG. 6, the display apparatus 800 is provided with a display-apparatus controller 801, the A-button 802, the display unit 803, the B-button 804, the face sensor 806, the angular speed sensor 807, the acceleration sensor 808, an image signal processing circuit 809, and various switches 811.

Moreover, the display apparatus 800 is provided with an internal nonvolatile memory 812, a primary memory 813, a large-capacity nonvolatile memory 814, a speaker 815, a vibrator 816, an LED 817, an audio processor 820, a small-power wireless communication unit 871, and a high-speed wireless communication unit 872. The above-mentioned components are connected to the display-apparatus controller 801.

The display-apparatus controller 801 is constituted by a CPU and controls the display apparatus 800.

The image signal processing circuit 809 bears equivalent functions with the image pickup driver 41, solid state image sensor 42, and image signal processing circuit 43 inside the camera body 1. The image signal processing circuit 809 constitutes the in-camera 805 in FIG. 1D together with an in-camera lens 805a. The display-apparatus controller 801 processes the data output from the image signal processing circuit 809. The contents of the process of the data will be mentioned later.

The various switches 811 are used to execute functions that are unrelated to this embodiment.

The angular speed sensor 807 uses a gyro etc. and detects movement of the display apparatus 800. The acceleration sensor 808 detects a posture of the display apparatus 800.

The internal nonvolatile memory 812 is constituted by a flash memory etc. and stores a boot program for the display-apparatus controller 801 and set values of various program modes.

The primary memory 813 is constituted by a RAM etc. and temporarily stores processing image data and a calculation result of the image signal processing circuit 809. In this embodiment, when a video image is recording, gyro data detected with the angular speed sensor 107 at pickup time of each frame is stored into the primary memory 813 in association with the frame.

The large-capacity nonvolatile memory 51 stores image data of the display apparatus 800. In this embodiment, the large-capacity nonvolatile memory 814 is constituted by a detachable memory like an SD card. It should be noted that the large-capacity nonvolatile memory 814 may be constituted by a fixed memory as with the large-capacity nonvolatile memory 51 in the camera body 1.

In order to notify the user of a state of the display apparatus 800 and to warn the user, the LED 817 emits light, the speaker 815 outputs sound, and the vibrator 816 vibrates.

The audio processor 820 processes outside sound (analog signal) collected by the microphones 819L and 819R and generates an audio signal.

The small-power wireless communication unit 871 exchanges data with the camera body 1 through the small-power wireless network. The high-speed wireless communication unit 872 exchanges data with the camera body 1 through the high-speed wireless network.

The face sensor (a face detection unit) 806 is provided with an infrared LED lighting circuit 821 and infrared LEDs 822, an infrared condenser lens 826, and an infrared detection device 827.

The infrared LED lighting circuit 821 has the function similar to that of the infrared LED lighting circuit 21 in FIG. 5 and controls lighting and extinction of the infrared LEDs 822 to control projection of the infrared light 823 directed to the user from the infrared LEDs 822. The infrared condenser lens 826 condenses the reflected light 825.

The infrared detection device (an infrared detection unit) 827 has a sensor that detects the reflected light 825 condensed by the infrared condenser lens 826. The sensor converts the condensed reflected light 825 into sensor data and passes the sensor data to the display-apparatus controller 801.

When the face sensor 806 shown in FIG. 1D is directed to the user, an infrared irradiation surface 824 that is the entire face of the user is irradiated with the infrared light 823 projected from the infrared LEDs 822 as shown in FIG. 6. Moreover, the reflected light 825 reflected from the infrared irradiation surface 824 is condensed by the infrared condenser lens 826 onto the sensor in the infrared detection device 827.

Other functions 830 are functions of a smart phone, such as a telephone function, that are not related to the embodiment.

Figure 7A:
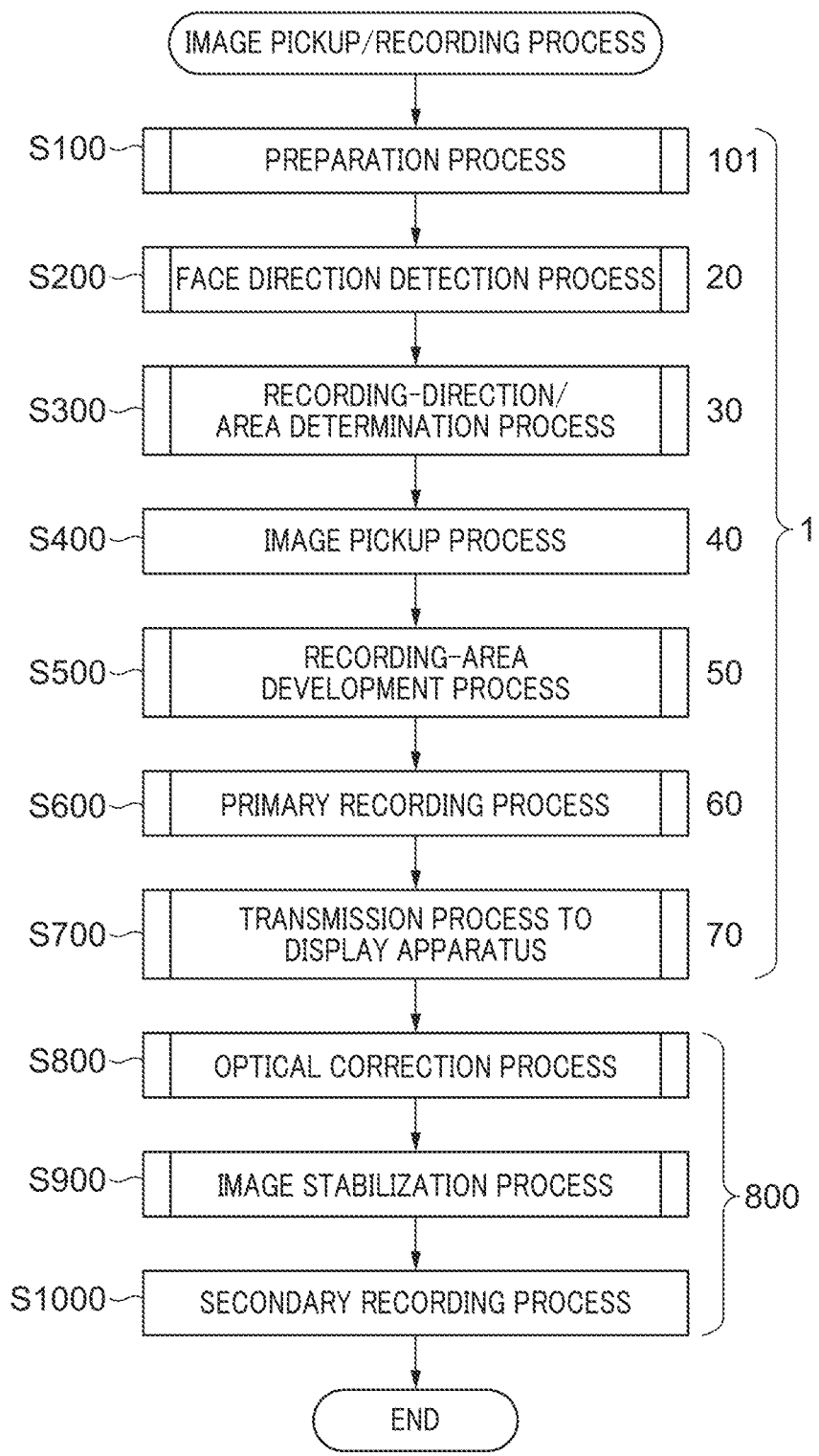
FIG. 7A is a flowchart schematically showing an image pickup/recording process according to the first embodiment executed by the camera body and display apparatus.

Hereinafter, how to use the camera body 1 and display apparatus 800 will be described. FIG. 7A is a flowchart schematically showing an image pickup/recording process according to the first embodiment executed by the camera body 1 and display apparatus 800.

In order to assist the description, a reference numeral (in FIG. 4 or FIG. 5) of a unit that executes a process in each step is shown on a right side of each step in FIG. 7A. That is, steps S100 through S700 in FIG. 7A are executed by the camera body 1, and steps S800 through S1000 in FIG. 7A are executed by the display apparatus 800.

When the power switch 11 is set to ON and power of the camera body 1 turns ON, the overall control CPU 101 is activated and reads a boot program from the internal nonvolatile memory 102. After that, in a step S100, the overall control CPU 101 executes a preparation process that performs setting of the camera body 1 before an image pickup operation. Details of the preparation process will be mentioned later using FIG. 7B.

In a step S200, a face direction detection process that estimates an observation direction based on a face direction detected by the face direction detection unit 20 is executed. Details of the face direction detection process will be mentioned later using FIG. 7C. This process is executed at a predetermined frame rate.

In a step S300, the recording-direction/field-angle determination unit 30 executes a recording-direction/area determination process. Details of the recording-direction/area determination process will be mentioned later using FIG. 7D. In a step S400, the image pickup unit 40 picks up an image and generates pickup image data.

In the step S500, the image extraction/development unit 50 extracts an image from the pickup image data generated in the step S400 according to the recording-direction/field-angle information determined in the step S300 and performs a recording area development process that develops the extracted area. Details of the recording area development process will be mentioned later using FIG. 7E.

In a step S600, the primary recording unit (an image recording unit) 60 executes the primary recording process that stores the image developed in the step S500 into the primary memory 103 as image data. Details of the primary recording process will be mentioned later using FIG. 14.

In the step S700, the transmission unit 70 executes a transmission process to the display apparatus 800 that wirelessly transmits the image primarily recorded in the step S600 to the display apparatus 800 at a designated timing. Details of the transfer process to the display apparatus 800 will be mentioned later using FIG. 16.

The steps from the step S800 is executed by the display apparatus 800. In the step S800, the display-apparatus controller 801 executes an optical correction process that corrects optical aberrations of the image transferred from the camera body 1 in the step S700. Details of the optical correction process will be mentioned later using FIG. 17.

In a step S900, the display-apparatus controller 801 applies an image stabilization process to the image of which optical aberrations have been corrected in the step S800. Details of the image stabilization process will be mentioned later using FIG. 19.

It should be noted that the order of the step S800 and the step S900 may be inverted. That is, the image stabilization process may be executed in advance of the optical correction process.

The display-apparatus controller (a video recording unit) 801 executes a secondary recording process that records the image to which the optical correction process in the step S800 and the image stabilization process in the step S900 have been applied into the large-capacity nonvolatile memory 814 in the step S1000. And then, the display-apparatus controller 801 finishes this process.

Figure 7B:
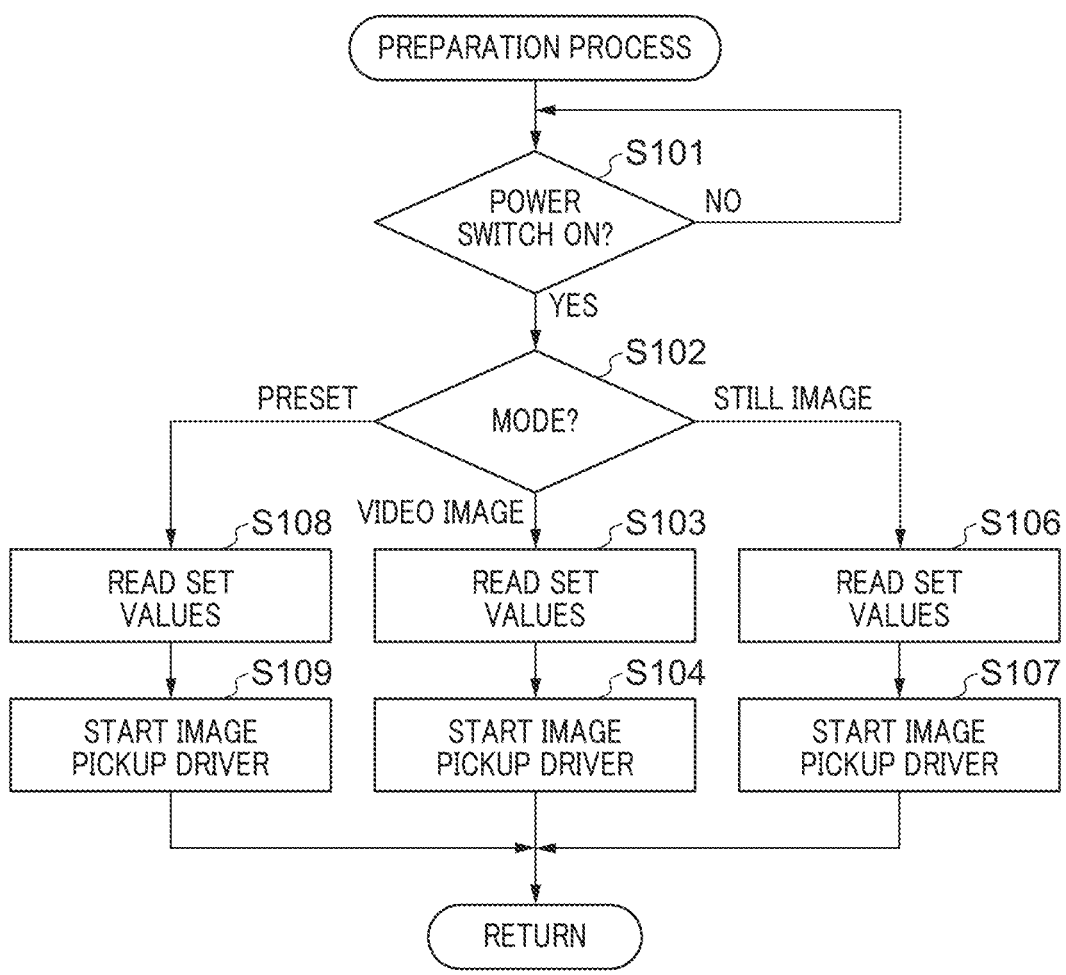
FIG. 7B is a flowchart showing a subroutine of a preparation process in a step S100 in FIG. 7A according to the first embodiment.

Next, the processes (subroutines) in the respective steps in FIG. 7A will be described in detail using FIG. 7B through FIG. 7F and other drawings in the order of the processes. FIG. 7B is a flowchart showing a subroutine of the preparation process in the step S100 in FIG. 7A. Hereinafter, this process is described using the components shown in FIG. 2A through FIG. 2F and FIG. 5.

It is determined whether the power switch 11 is ON in a step S101. The process waits when the power is OFF. When the power becomes ON, the process proceeds to a step S102. In the step S102, the mode selected by the image pickup mode switch 12 is determined. As a result of the determination, when the mode selected by the image pickup mode switch 12 is the video image mode, the process proceeds to a step S103.

In the step S103, various set values of the video image mode are read from the internal nonvolatile memory 102 and are stored into the primary memory 103. Then, the process proceeds to a step S104. The various set values of the video image mode include a field-angle set value $V_{ang}$ and an image stabilization level. The field-angle set value $V_{ang}$ is preset to 90° in this embodiment. The image stabilization level is selected from among "Strong", "Middle", and "OFF".

In the step S104, an operation of the image pickup driver 41 for the video image mode is started. And then, the process exits this subroutine. As a result of the determination in the step S102, when the mode selected by the image pickup mode switch 12 is the still image mode, the process proceeds to a step S106.

In the step S106, various set values of the still image mode are read from the internal nonvolatile memory 102 and are stored into the primary memory 103. Then, the process proceeds to a step S107. The various set values of the still image mode include the field-angle set value $V_{ang}$ and then image stabilization level. The field-angle set value $V_{ang}$ is preset to 45° in this embodiment. The image stabilization level is selected from among "Strong", "Middle", and "OFF".

In the step S107, an operation of the image pickup driver 41 for the still image mode is started. And then, the process exits this subroutine.

As the result of the determination in the step S102, when the mode selected by the image pickup mode switch 12 is the preset mode, the process proceeds to a step S108. The preset mode is one of the three image pickup modes that can be changed by the image pickup mode switch 12. In the preset mode, the image pickup mode of the camera body 1 can be changed by an external device like the display apparatus 800. That is, the preset mode is for a custom image pickup operation. Since the camera body 1 is a compact wearable device, operation switches, a setting screen, etc. for changing advanced set values are not mounted on the camera body 1. The advanced set values are changed by an external device like the display apparatus 800.

For example, a case where the user would like to change the field angle from 90° to 110° while picking up a video image continuously is considered. In such a case, the following operations are needed. Since the field angle is set to 90° in a regular video image mode, the user performs the video image pickup operation in the regular video image mode, once finishes the video image pickup operation, displays the setting screen on the display apparatus 800, and changes the field angle to 110° on the setting screen. However, the operations to the display apparatus 800 during a certain event are troublesome.

In the meantime, when the preset mode is preset to a video image pickup operation at the field angle of 110°, the user can change the field angle in the video image pickup operation to 110° immediately by only sliding the image pickup mode switch 12 to "Pre" after finishing the video image pickup operation at the field angle of 90°. That is, the user is not required to suspend the current operation and to perform the above-mentioned troublesome operations.

It should be noted that contents of the preset mode may include the image stabilization level ("Strong", "Middle", or "OFF") and a set value of voice recognition that is not described in this embodiment in addition to the field angle.

In the step S108, various set values of the preset mode are read from the internal nonvolatile memory 102 and are stored into the primary memory 103. Then, the process proceeds to a step S109. The various set values of the preset mode include the field-angle set value $V_{ang}$ and the image stabilization level that is selected from among "Strong", "Middle", and "OFF".

In the step S109, an operation of the image pickup driver 41 for the preset mode is started. And then, the process exits this subroutine.

Figure 13:
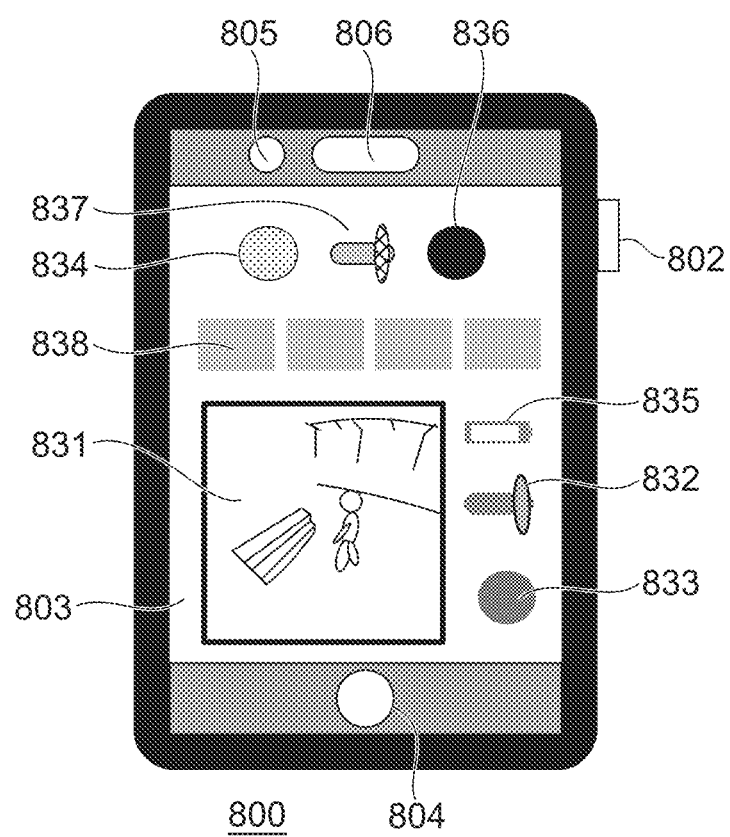
FIG. 13 is a view showing a menu screen for setting various set values of a video image mode that is displayed on a display unit of the display apparatus before an image pickup operation of the camera body.

Hereinafter, the various set values of the video image mode read in the step S103 will be describe using FIG. 13. FIG. 13 is a view showing a menu screen for setting the various set values of the video image mode that is displayed on the display unit 803 of the display apparatus 800 before an image pickup operation of the camera body 1. The components that have been described using FIG. 1D are indicated by the same reference numerals and their descriptions will be omitted. The display unit 803 has a touch panel function and will be described under the presumption that it functions by touch operations, such as a swipe operation.

As shown in FIG. 13, the menu screen includes a preview screen 831, a zoom lever 832, a recording start/stop button 833, a switch 834, a battery residue indicator 835, a button 836, a lever 837, and an icon display area 838. The user can check the image picked up by the camera body 1, a zoom amount, and a field angle on the preview screen 831.

The user can change a zoom setting (a field angle) by shifting the zoom lever 832 rightward or leftward. This embodiment describes a case where the field-angle set value $V_{ang}$ can be selected from among 45°, 90°, 110°, and 130°. In the meantime, the field-angle set value $V_{ang}$ may be set to a value other than the four values by operating the zoom lever 832.

The recording start/stop button 833 is a toggle switch that has both of the function of the start switch 14 and the function of the stop switch 15. The switch 834 is used to switch "OFF" and "ON" of the image stabilization process. The battery residue indicator 835 displays battery residue of the camera body 1. The button 836 is used to change a mode.

The lever 837 is used to set the image stabilization level. Although the image stabilization level can be set to "Strong" or "Middle" in this embodiment, another image stabilization level, for example "Weak", may be set. Moreover, the image stabilization level may be set steplessly. A plurality of thumbnail icons for preview are displayed in the icon display area 838.

Figure 7C:
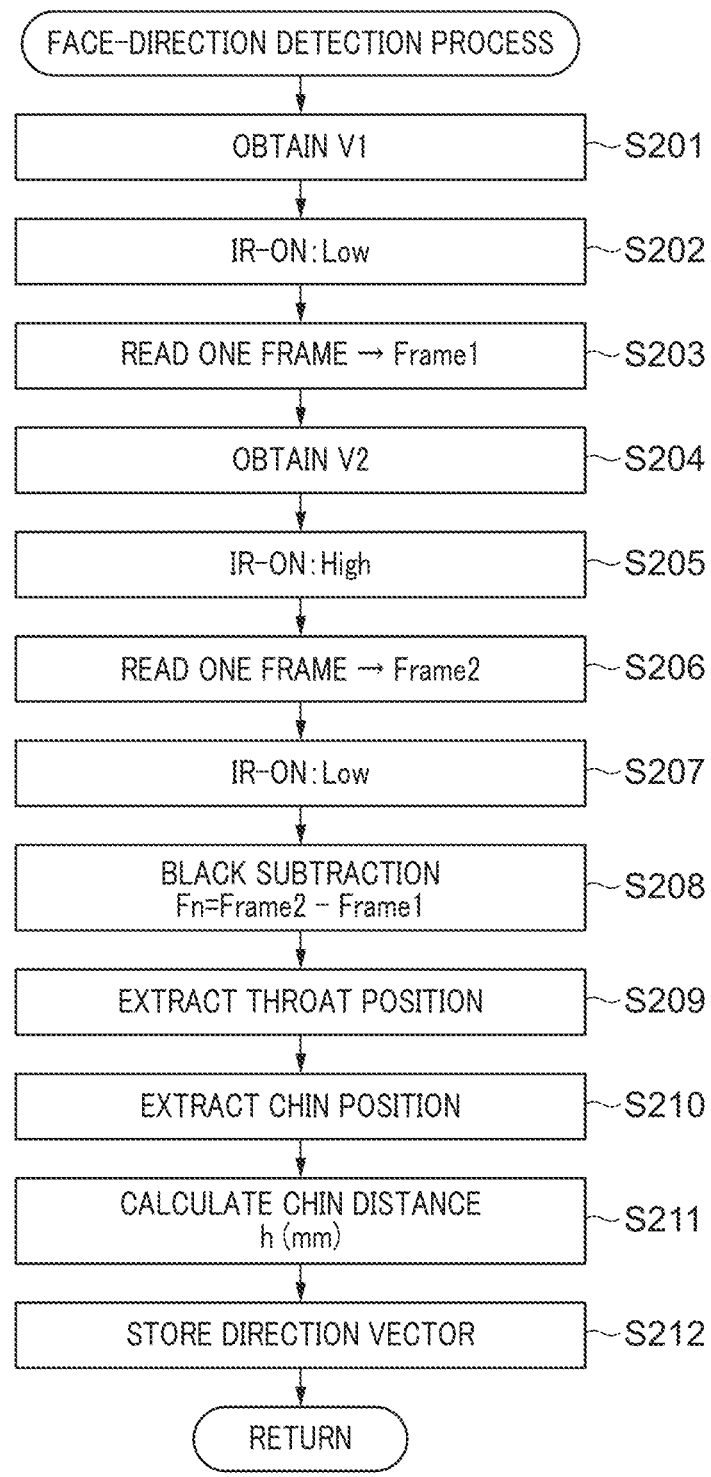
FIG. 7C is a flowchart showing a subroutine of a face direction detection process in a step S200 in FIG. 7A according to the first embodiment.

FIG. 7C is a flowchart showing a subroutine of the face direction detection process in the step S200 in FIG. 7A. Before describing the details of this process, a face direction detection method using infrared light will be described using FIG. 8A through FIG. 8K.

Figure 8A:
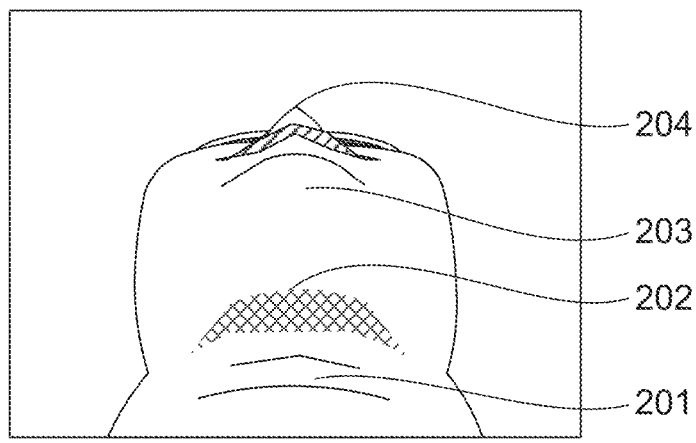
FIG. 8A is a view showing an image of a user viewed from the face direction detection window.

FIG. 8A is a view showing the visible light image of a user's face looked at from the position of the face direction detection window 13. The image in FIG. 8A is equivalent to an image picked up by a visible-light image sensor on the assumption that the face direction detection window 13 permits transmission of visible light and that the visible-light image sensor is mounted in the infrared detection device 27. The image in FIG. 8A includes a neck front part 201 above clavicles of the user, a root 202 of a jaw, a chin 203, and a face 204 including a nose.

Figure 8B:
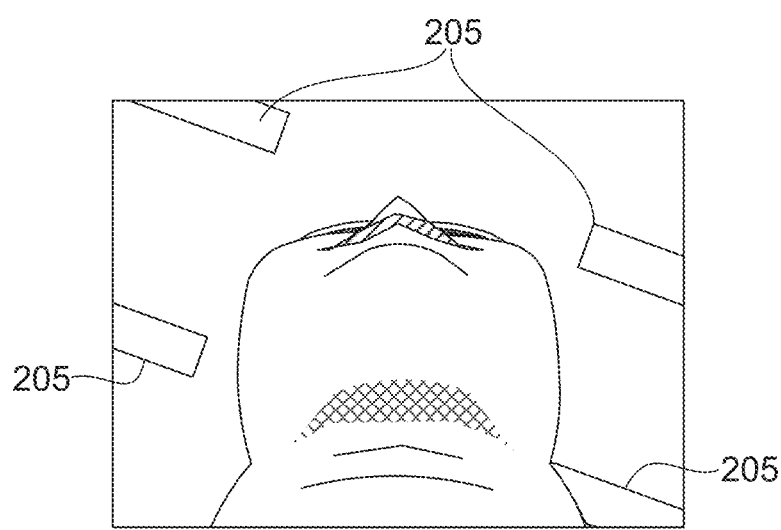
FIG. 8B is a view showing a case where fluorescent lamps in a room appear as background in the image of the user viewed from the face direction detection window.

FIG. 8B is a view showing a case where fluorescent lamps in a room appear as background in the visible-light image of the user shown in FIG. 8A. The fluorescent lamps 205 around the user appear in the visible-light image in FIG. 8B. In this way, since various backgrounds appear in a user's image according to a use condition, it becomes difficult that the face direction detection unit 20 or the overall control CPU 101 cuts out a face image from a visible-light image. In the meantime, although there is a technique that cuts such an image by using an AI etc., the technique is not suitable for the camera body 1 as a portable device because the overall control CPU 101 is required to have high performance.

Accordingly, the camera body 1 of the first embodiment detects a user's face using an infrared image. Since the face direction detection window 13 is constituted by a visible light cut filter, visible light is not transmitted mostly. Accordingly, an image obtained by the infrared detection device 27 is different from the images in FIG. 8A and FIG. 8B.

Figure 8C:
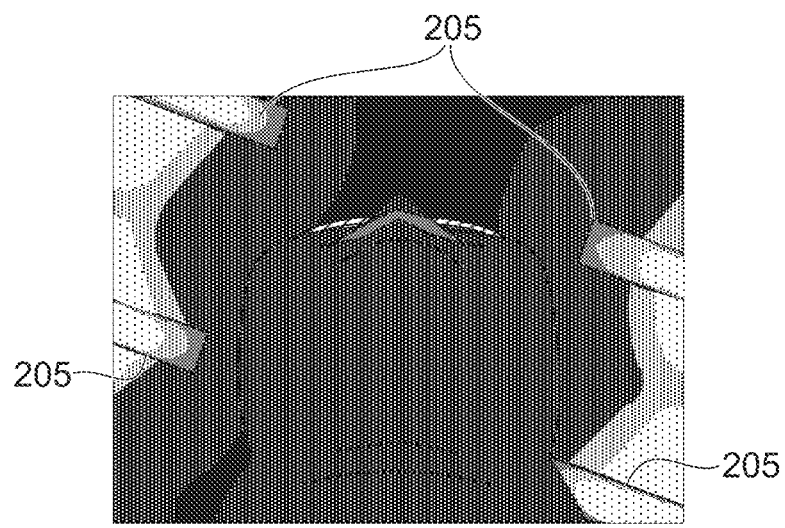
FIG. 8C is a view showing an image obtained by imaging the user and fluorescent lamps as background shown in FIG. 8B onto a sensor of the infrared detection device through the face direction detection window in a state where infrared LEDs of the infrared detection device are not lightened.

FIG. 8C is a view showing an infrared image obtained by imaging the user and fluorescent lamps as background shown in FIG. 8B onto the sensor of the infrared detection device 27 through the face direction detection window 13 in a state where the infrared LEDs 22 are not lightened.

In the infrared image in FIG. 8C, the user's neck and jaw are dark. In the meantime, since the fluorescent lamps 205 emit an infrared component in addition to the visible light, they are slightly bright.

Figure 8D:
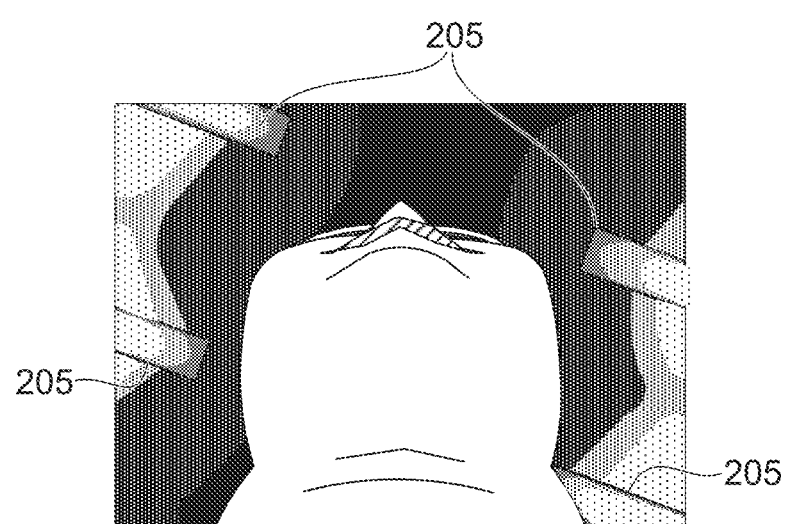
FIG. 8D is a view showing an image obtained by imaging the user and fluorescent lamps as background shown in FIG. 8B onto the sensor of the infrared detection device through the face direction detection window in a state where the infrared LEDs are lightened.

FIG. 8D is a view showing an image obtained by imaging the user and fluorescent lamps as background shown in FIG. 8B onto the sensor of the infrared detection device 27 through the face direction detection window 13 in a state where the infrared LEDs 22 are lightened.

Figure 8E:
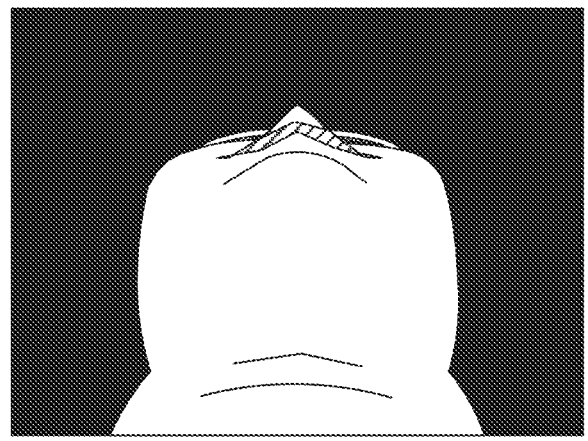
FIG. 8E is a view showing a difference image that is calculated by subtracting the image in FIG. 8C from the image in FIG. 8D.

In the image in FIG. 8D, the user's neck and jaw are bright. In the meantime, unlike FIG. 8C, the brightness around the fluorescent lamps 205 has not changed. FIG. 8E is a view showing a difference image that is calculated by subtracting the image in FIG. 8C from the image in FIG. 8D. The user's face emerges.

In this way, the overall control CPU (an image obtainment unit) 101 obtains the difference image (hereinafter referred to as a face image) by calculating the difference between the image formed on the sensor of the infrared detection device 27 in the state where the infrared LEDs 22 are lightened and the image formed on the sensor in the state where the infrared LEDs 22 are not lightened.

The face direction detection unit 20 of this embodiment employs a method that obtains a face image by extracting infrared reflection intensity as a two-dimensional image by the infrared detection device 27. The sensor of the infrared detection device 27 employs a configuration similar to a general image sensor and obtains a face image frame-by-frame. A vertical synchronization signal (hereinafter referred to as a V-signal) that obtains frame synchronization is generated by the infrared detection device 27 and is output to the overall control CPU 101.

Figure 9:
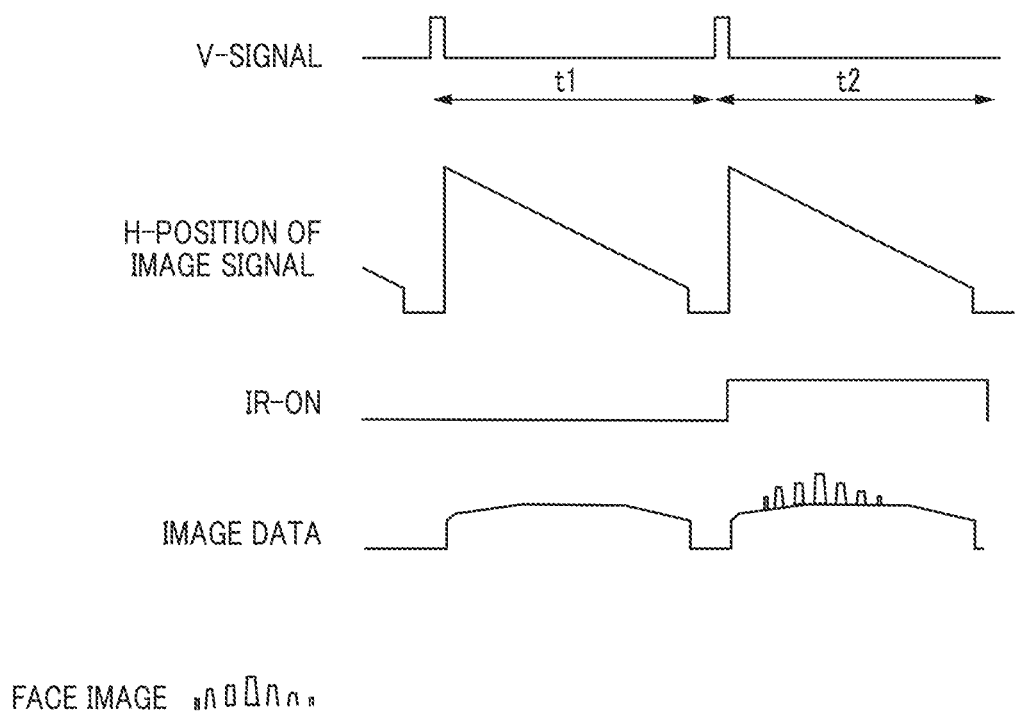
FIG. 9 is a timing chart showing a lighting timing of the infrared LEDs and related signals.

FIG. 9 is a timing chart showing timings of lighting and extinction of the infrared LEDs 22 and related signals. A V-signal output from the infrared detection device 27, an H-position of the image signal output from the sensor of the infrared detection device 27, an IR-ON signal output to the infrared LED lighting circuit 21 from the overall control CPU 101, and pickup image data output to the overall control CPU 101 from the sensor of the infrared detection device 27 are shown in FIG. 9 in the order from the top. The horizontal time axes of these four signals are identical.

When the V-signal becomes High, timings of the frame synchronization and timings of lighting and extinction of the infrared LEDs 22 are obtained. FIG. 9 shows a first face image obtainment period t1 and a second face image obtainment period t2.

The infrared detection device 27 controls the operation of the sensor so that the H-position of the image signal will synchronize with the V-signal as shown in FIG. 9. Since the sensor of the infrared detection device 27 employs the configuration similar to a general image sensor as mentioned above and its operation is well-known, a detailed description of the control method is omitted.

The overall control CPU 101 controls switching of the IR-ON signal between High and Low in synchronization with the V-signal. Specifically, the overall control CPU 101 outputs the IR-ON signal of Low to the infrared LED lighting circuit 21 during the period t1 and outputs the IR-ON signal of High to the infrared LED lighting circuit 21 during the second period t2.

The infrared LED lighting circuit 21 lightens the infrared LEDs 22 to project the infrared light 23 to the user during the High period of the IR-ON signal. In the meantime, the infrared LED lighting circuit 21 switches the infrared LEDs 22 off during the Low period of the IR-ON signal.

A vertical axis of the pickup image data indicates a signal intensity that is a light receiving amount of the reflected light 25. Since the infrared LEDs 22 are not lightened during the first period t1, no reflected light comes from the user's face and pickup image data as shown in FIG. 8C is obtained. In the meantime, since the infrared LEDs 22 are lightened during the second period t2, the reflected light 25 comes from the user's face and pickup image data as shown in FIG.

8D is obtained. Accordingly, the signal intensity in the period t2 increases from the signal intensity in the period t1 by the reflected light 25 from the user's face.

A face image indicated in the bottom in FIG. 9 is obtained by subtracting the image pickup data during the first period t1 from the image pickup data during the second period t2. As a result of the subtraction, face image data in which only the component of the reflected light 25 from the user's face is extracted is obtained.

FIG. 7C shows the face direction detection process in the step S200 that includes the operations described using FIG. 8C through FIG. 8E and FIG. 9.

In a step S201, a timing V1 at which the first period t1 starts is obtained when the V-signal output from the infrared detection device 27 becomes High. When the timing V1 is obtained, the process proceeds to a step S202. In the step S202, the IR-ON signal is set to Low and is output to the infrared LED lighting circuit 21. Thereby, the infrared LEDs 22 are not lightened.

In a step S203, one frame of pickup image data output from the infrared detection device 27 during the first period t1 is read. The image data is temporarily stored into the primary memory 103 as Frame1.

In a step S204, a timing V2 at which the second period t2 starts is obtained when the V-signal output from the infrared detection device 27 becomes High. When the timing V2 is obtained, the process proceeds to a step S205.

In the step S205, the IR-ON signal is set to High and is output to the infrared LED lighting circuit 21. Thereby, the infrared LEDs 22 are lightened.

In a step S206, one frame of pickup image data output from the infrared detection device 27 during the second period t2 is read. The image data is temporarily stored into the primary memory 103 as Frame2.

In a step S207, the IR-ON signal is set to Low and is output to the infrared LED lighting circuit 21. Thereby, the infrared LEDs 22 are not lightened.

In a step S208, Frame1 and Frame2 are read from the primary memory 103, and light intensity Fn of the reflected light 25 from the user corresponding to the face image shown in FIG. 9 is calculated by subtracting Frame1 from Frame2. This process is generally called black subtraction.

In a step S209, a throat position (a head rotation center) is extracted from the light intensity Fn. First, the overall control CPU (a division unit) 101 divides the face image into a plurality of distance areas that will be described using FIG. 8F on the basis of the light intensity Fn.

Figure 8F:
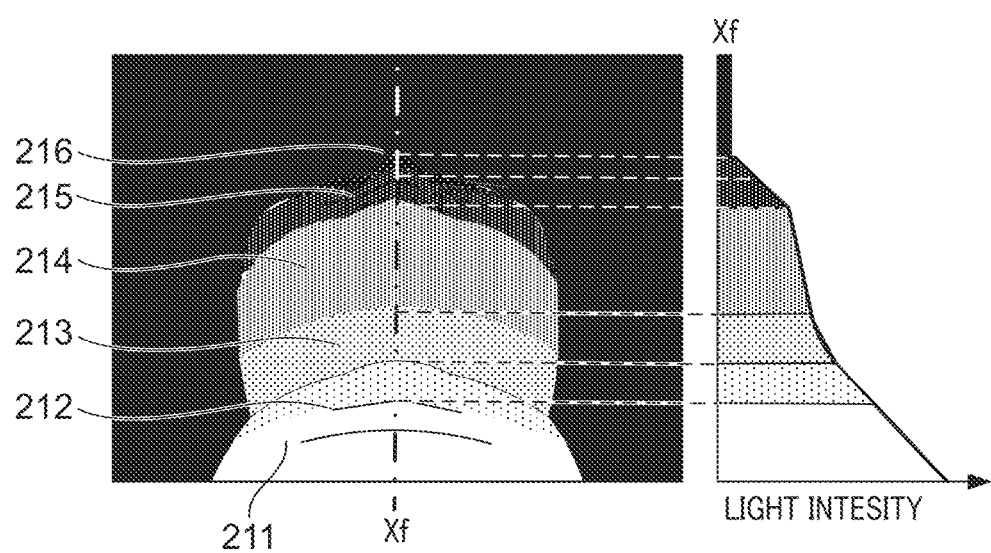
FIG. 8F is a view showing a result obtained by adjusting shades of the difference image in FIG. 8E so as to fit with a scale of light intensities of reflected components of infrared light projected to a face and neck of the user.

FIG. 8F is a view showing a result obtained by adjusting shades of the difference image shown in FIG. 8E so as to fit with a scale of light intensity of the reflected light 25 of the infrared light 23 projected to the face and neck of the user. FIG. 8F shows light intensity distribution about sections of the face and neck of the user.

The face image on the left side in FIG. 8F shows the light intensity distribution of the reflected light 25 in the face image shown in FIG. 8E by gray steps applied to the respective divided areas. An Xf axis is added in a direction from the central part of the user's neck toward the chin. In a graph on the right side in FIG. 8F, a horizontal axis shows the light intensity on the Xf axis of the face image and a vertical axis shows the Xf axis. The light intensity shown by the horizontal axis increases as going rightward. The face image in FIG. 8F is divided into six areas (distance areas) 211 through 216 according to the light intensity.

The area 211 is an area where the light intensity is the strongest and is shown by white among the gray steps. The area 212 is an area where the light intensity falls slightly than the area 211 and is shown by quite bright gray among the gray steps. The area 213 is an area where the light intensity falls still more than the area 212 and is shown by bright gray among the gray steps.

The area 214 is an area where the light intensity falls still more than the area 213 and is shown by middle gray among the gray steps. The area 215 is an area where the light intensity falls still more than the area 214 and is shown by slightly dark gray among the gray steps.

The area 216 is an area where the light intensity is the weakest and is shown by the darkest gray among the gray steps. The area above the area 216 is shown by black showing no light intensity.

The light intensity will be described in detail using FIG. 10A through FIG. 10D. FIG. 10A through FIG. 10D are views describing movement of the user's face in the vertical direction and show states observed from the left side of the user.

Figure 10A:
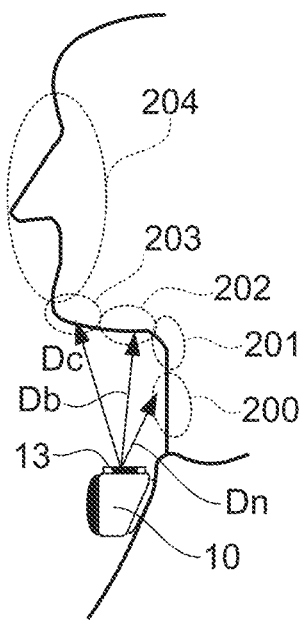
FIG. 10A through FIG. 10D are views describing movements of the user's face in a vertical direction.

FIG. 10A is a view showing a state where the user faces the front. There is the image-pickup/detection unit 10 in front of the clavicles of the user. Moreover, the infrared light 23 of the infrared LEDs 22 irradiates the lower part of the user's head from the face direction detection window 13 mounted in the upper portion of the image-pickup/detection unit 10. A distance Dn from the face direction detection window 13 to the throat 200 above the clavicles of the user, a distance Db from the face direction detection window 13 to the root 202 of the jaw, and a distance Dc from the face direction detection window 13 to the chin 203 satisfy a relation of Dn<Db<Dc. Since light intensity is in inverse proportion to the square of distance, the light intensity in the image formed by the reflected light 25 on the sensor of the infrared irradiation surface 24 becomes gradually weak in the order of the throat 200, the root 202 of the jaw, and the chin 203. Moreover, since the distance from the face direction detection window 13 to the face 204 including the nose is still longer than the distance Dc, the light intensity in the image corresponding to the face 204 becomes still weaker. That is, in the case as shown in FIG. 10A, the image having the light intensity distribution shown in FIG. 8F is obtained.

It should be noted that the configuration of the face direction detection unit 20 is not limited to the configuration shown in this embodiment as long as the face direction of the user can be detected. For example, an infrared pattern may be projected from the infrared LEDs (an infrared pattern irradiation unit) 22, and the sensor (an infrared pattern detection unit) of the infrared detection device 27 may detect the infrared pattern reflected from an irradiation target. In this case, it is preferable that the sensor of the infrared detection device 27 is constituted by a structural optical sensor. Moreover, the sensor of the infrared detection device 27 may be a sensor (an infrared phase comparison unit) that compares the phase of the infrared light 23 and the phase of the reflected light 25. For example, a ToF sensor may be employed.

Figure 8G:
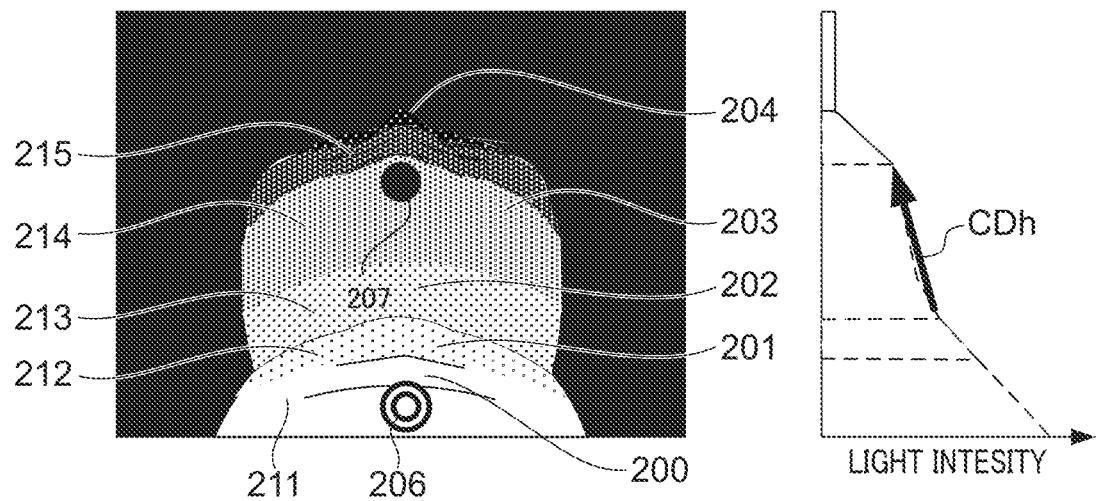
FIG. 8G is a view obtained by superimposing reference numerals denoting parts of a user's body, a double circle showing a throat position, and a black circle showing a chin position on FIG. 8F.

Next, the extraction of the throat position in the step S209 in FIG. 7C will be described using FIG. 8G. A left image in FIG. 8G is obtained by superimposing the reference numerals denoting the parts of the user's body shown in FIG. 10A, a double circle showing the throat position, and a black circle showing the chin position on FIG. 8F.

The white area 211 corresponds to the throat 200 (FIG. 10A), the quite bright gray area 212 corresponds to the neck front part 201 (FIG. 10A), and the bright gray area 213 corresponds to the root 202 of the jaw (FIG. 10A). Moreover, the middle gray area 214 corresponds to the chin 203 (FIG. 10A), and the slightly dark gray area 215 corresponds to a lip located in the lower part of the face 204 (FIG. 10A) and a face lower part around the lip. Furthermore, the darkest gray area 216 corresponds to the nose located in the center of the face 204 (FIG. 10A) and a face upper part around the nose.

Since the difference between the distances Db and Dc is relatively small as compared with the differences between the other distances from the face direction detection window 13 to other parts of the user as shown in FIG. 10A, the difference between the reflected light intensities in the bright gray area 213 and the middle gray area 214 is also small.

In the meantime, since the distance Dn is the shortest distance among the distances from the face direction detection window 13 to the parts of the user as shown in FIG. 10A, the reflection light intensity in the white area 211 corresponding to the throat 200 becomes the strongest.

Accordingly, the overall control CPU (a setting unit) 101 determines that the area 211 corresponds to the throat 200 and its periphery, and then, sets the position 206 (indicated by the double circle in FIG. 8G), which is located at the center in the lateral direction and is the nearest to the image-pickup/detection unit 10, as the position of the head rotation center (hereinafter referred to as a throat position 206). The processes up to the moment are the contents performed in the step S209 in FIG. 7C.

Next, the extraction of the chin position in the step S210 in FIG. 7C will be described using FIG. 8G. In the image in FIG. 8G, the middle gray area 214 that is brighter than the area 215 corresponding to the face lower part including the lip of the face 204 includes the chin. A graph on the right side in FIG. 8G shows that the light intensity falls sharply in the area 215 adjacent to the area 214 because the change rate of the distance from the face direction detection window 13 becomes large. The overall control CPU 101 determines that the brighter area 214 adjacent to the area 215 in which the light intensity falls sharply is a chin area. Furthermore, the overall control CPU 101 calculates (extracts) the position (indicated by the black circle shown in FIG. 8G), which is located at the center in the lateral direction in the area 214 and is the farthest from the throat position 206, as the chin position 207.

Figure 8H:
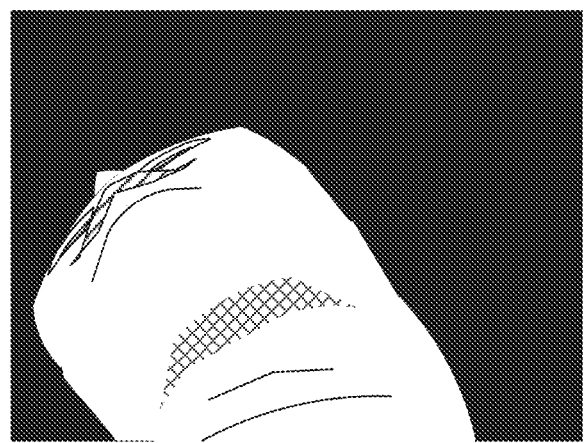
FIG. 8H is a view showing a difference image calculated by the similar method as FIG. 8E in directing the user's face to the right.
Figure 8I:
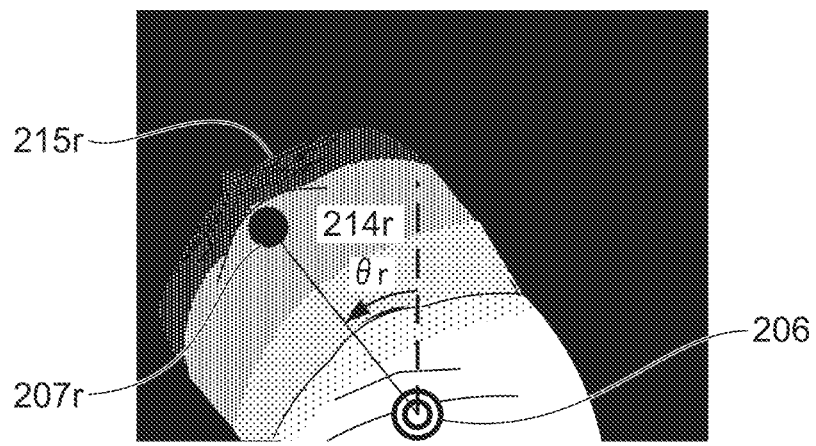
FIG. 8I is a view showing a result obtained by adjusting shades of the difference image in FIG. 8H so as to fit with a scale of light intensities of reflected components of infrared light projected to a face and neck of the user and by superimposing the double circle showing the throat position and the black circle showing the chin position.

For example, FIG. 8H and FIG. 8I show changes in directing the face to the right. FIG. 8H is a view showing a difference image calculated by the similar method as FIG. 8E in directing the user's face to the right. FIG. 8I is a view showing a result obtained by adjusting shades of the difference image in FIG. 8H so as to fit with a scale of light intensities of reflected components of the infrared light projected to the face and neck of the user and by superimposing the double circle showing the throat position 206 as the position of the head rotation center and the black circle showing the chin position 207r.

Since the user's face is directed to the right, the area 214 moves to an area 214r shown in FIG. 8I that is located in the left side when it is looked up from the image-pickup/ detection unit 10. The area 215 corresponding to the face lower part including the lip in the face 204 also moves to an area 215r that is located in the left side when it is looked up from the image-pickup/detection unit 10.

Accordingly, the overall control CPU 101 determines that the brighter area 214r adjacent to the area 215r in which the light intensity falls sharply is the chin area. Furthermore, the overall control CPU 101 calculates (extracts) the position (indicated by the black circle shown in FIG. 8I), which is located at the center in the lateral direction in the area 214r and is the farthest from the throat position 206, as the chin position 207r.

After that, the overall control CPU 101 finds a moving angle θr that shows the rotational movement to the right from the chin position 207 in the image in FIG. 8G to the chin position 207r in FIG. 8I around the throat position 206. As shown in FIG. 8I, the moving angle θr is an angle of movement of the user's face in a lateral direction.

The angle of face (hereinafter, referred to as a face angle) of the user in the lateral direction is calculated in the step S210 from the chin position detected by the infrared detection device 27 of the face direction detection unit (a three-dimensional detection sensor) 20.

Figure 10B:
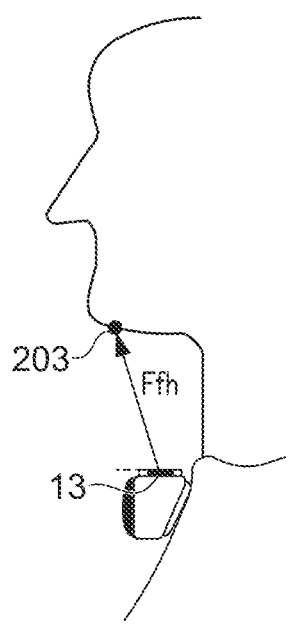
Figure 10C:
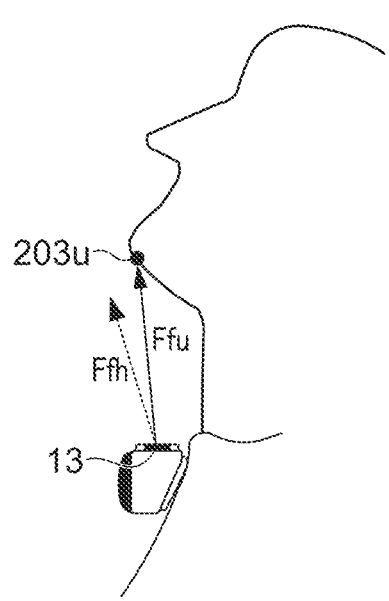

Next, detection of the face directed upward will be described. FIG. 10B is a view showing a state that the user directs the face horizontally. FIG. 10C is a view showing a state that the user directs the face upward by 33° from the horizontal direction.

The distance from the face direction detection window 13 to the chin 203 is Ffh in FIG. 10B, and the distance from the face direction detection window 13 to the chin 203u is Ffu in FIG. 10C. Since the chin 203u moves upwards together with the face, the distance Ffu becomes longer than the distance Ffh as shown in FIG. 10C.

Figure 8J:
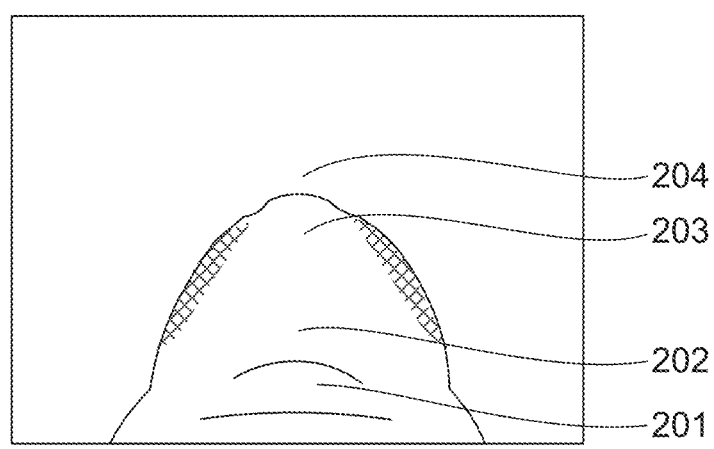
FIG. 8J is a view showing an image of the user who directs the face upward by 33° viewed from the face direction detection window.
Figure 8K:
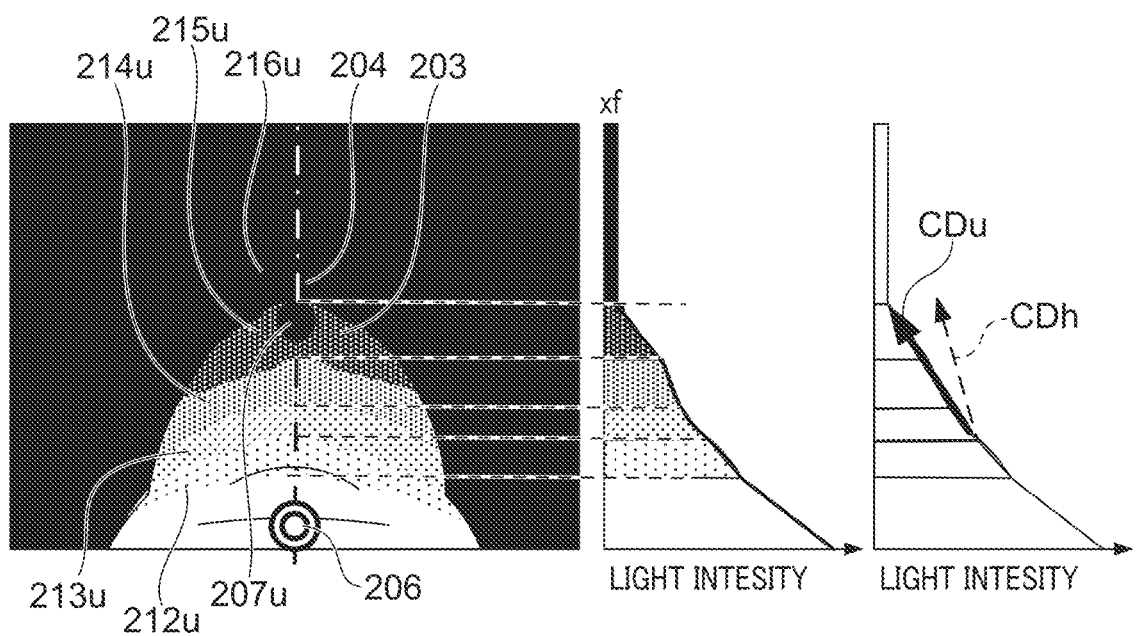
FIG. 8K is a view showing a result obtained by adjusting shades of a difference image, which is calculated by the similar method as FIG. 8E in a case that the user directs the face upward by 33°, so as to fit with a scale of light intensities of reflected components of infrared light projected to a face and neck of the user and by superimposing the double circle showing the throat position and the black circle showing the chin position.

FIG. 8J is a view showing an image of the user who directs the face upward by 33° from the horizontal direction viewed from the face direction detection window 13. Since the user directs the face upward as shown in FIG. 10C, the face 204 including the lip and nose cannot be seen from the face direction detection window 13 located under the user's jaw. The chin 203 and its neck side are seen. FIG. 8K shows distribution of the light intensity of the reflected light 25 in irradiating the user in the state shown in FIG. 10C with the infrared light 23. An image on the left side in FIG. 8K is a view showing a result obtained by adjusting shades of the difference image calculated by the same method as FIG. 8E so as to fit with a scale of light intensities of reflected components of the infrared light projected to the face and neck of the user and by superimposing the double circle showing the throat position 206 and the black circle showing the chin position 207u. Two graphs in FIG. 8K show density changes of the left image. The left graph is equivalent to the graph in FIG. 8F and the right graph is equivalent to the graph in FIG. 8G.

Six areas 211u, 212u, 213u, 214u, 215u, and 216u divided according to the light intensity in FIG. 8K are indicated by adding "u" to the reference numerals of the same light intensity areas shown in FIG. 8F. Although the light intensity of the user's chin 203 is included in the middle gray area 214 in FIG. 8F, it shifts to the black side and is included in the slightly dark gray area 215u in FIG. 8K. In this way, since the distance Ffu is longer than the distance Ffh as shown in FIG. 10C, the infrared detection device 27 can detect that the light intensity of the reflected light 25 from the chin 203 is weakened in inverse proportion to the square of distance.

Figure 10D:
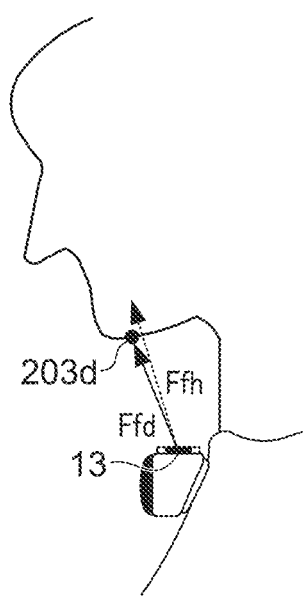

Next, detection of the face directed downward will be described. FIG. 10D is a view showing a state that the user directs the face downward by 22° from the horizontal direction. In FIG. 10D, a distance from the face direction detection window 13 to the chin 203d is Ffd.

Since the chin 203u moves downward together with the face, the distance Ffd becomes shorter than the distance Ffh as shown in FIG. 10D and the light intensity of the reflected light 25 at the chin 203 becomes stronger.

Returning back to FIG. 7C, in a step S211, the overall control CPU (a distance calculation unit) 101 calculates the distance from the chin position to the face direction detection window 13 on the basis of the light intensity of the chin position detected by the infrared detection device 27 of the face direction detection unit (three-dimensional detection sensor) 20. A face angle in the vertical direction is also calculated on the basis of this.

In a step S212, the overall control CPU 101 stores the face angle θh in the lateral direction (a first detecting direction) obtained in the step S210 and the face angle θv in the vertical direction (a second detecting direction) obtained in the step S211 into the primary memory 103 as a three-dimensional observation direction vi ("i" is arbitrary reference numeral) of the user. For example, when the user is observing the front center, the face angle θh in the lateral direction is 0° and the face angle θv in the vertical direction is 0°. Accordingly, the observation direction vo in this case is represented by vector information (0°, 0°). Moreover, when the user is observing in a 45-degree-right direction, the observation direction vr is represented by vector information (45°, 0°).

Although the face angle in the vertical direction is calculated by detecting the distance from the face direction detection window 13 in the step S211, the face angle may be calculated by another method. For example, change of the face angle may be calculated by comparing change levels of the light intensity of the chin 203. That is, the change of the face angle may be calculated by comparing a gradient CDh of the reflected light intensity from the root 202 of the jaw to the chin 203 in the graph in FIG. 8G with a gradient CDu of the reflected light intensity from the root 202 of the jaw to the chin 203 in the graph in FIG. 8K.

Figure 7D:
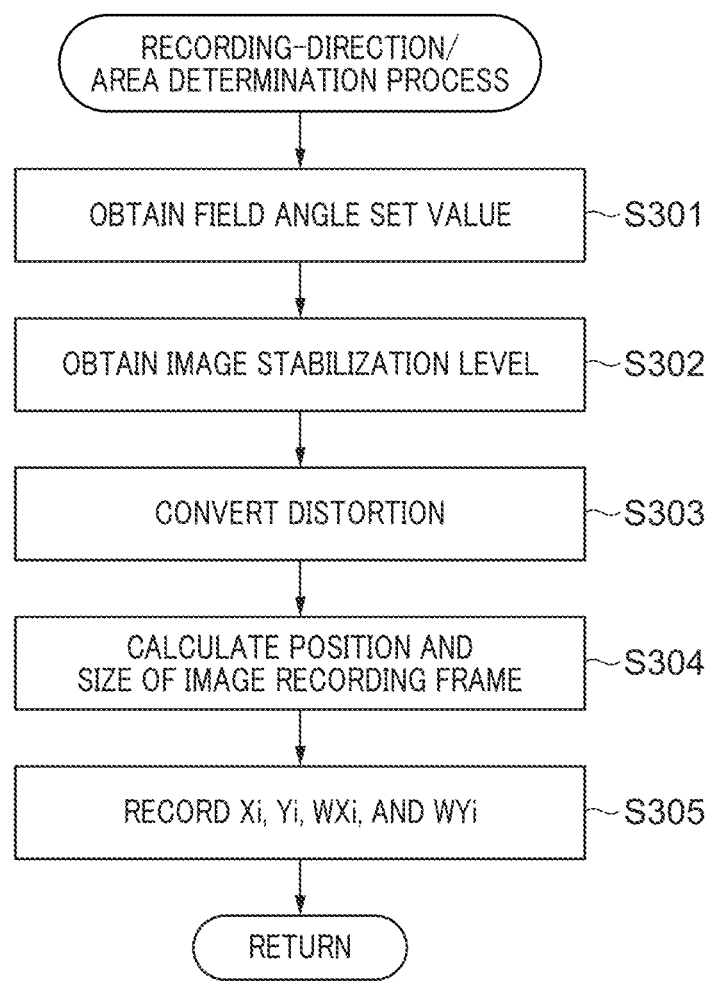
FIG. 7D is a flowchart showing a subroutine of a recording-direction/area determination process in a step S300 in FIG. 7A according to the first embodiment.

FIG. 7D is a flowchart showing a subroutine of the recording-direction/area determination process in the step S300 in FIG. 7A. Before describing details of this process, a superwide-angle image that is subjected to determine a recording direction and a recording area in this embodiment will be described first using FIG. 11A.

In the camera body 1 of this embodiment, the image pickup unit 40 picks up a superwide-angle image of the periphery of the image-pickup/detection unit 10 using the superwide-angle image pickup lens 16. An image of an observation direction can be obtained by extracting a part of the superwide-angle image.

Figure 11A:
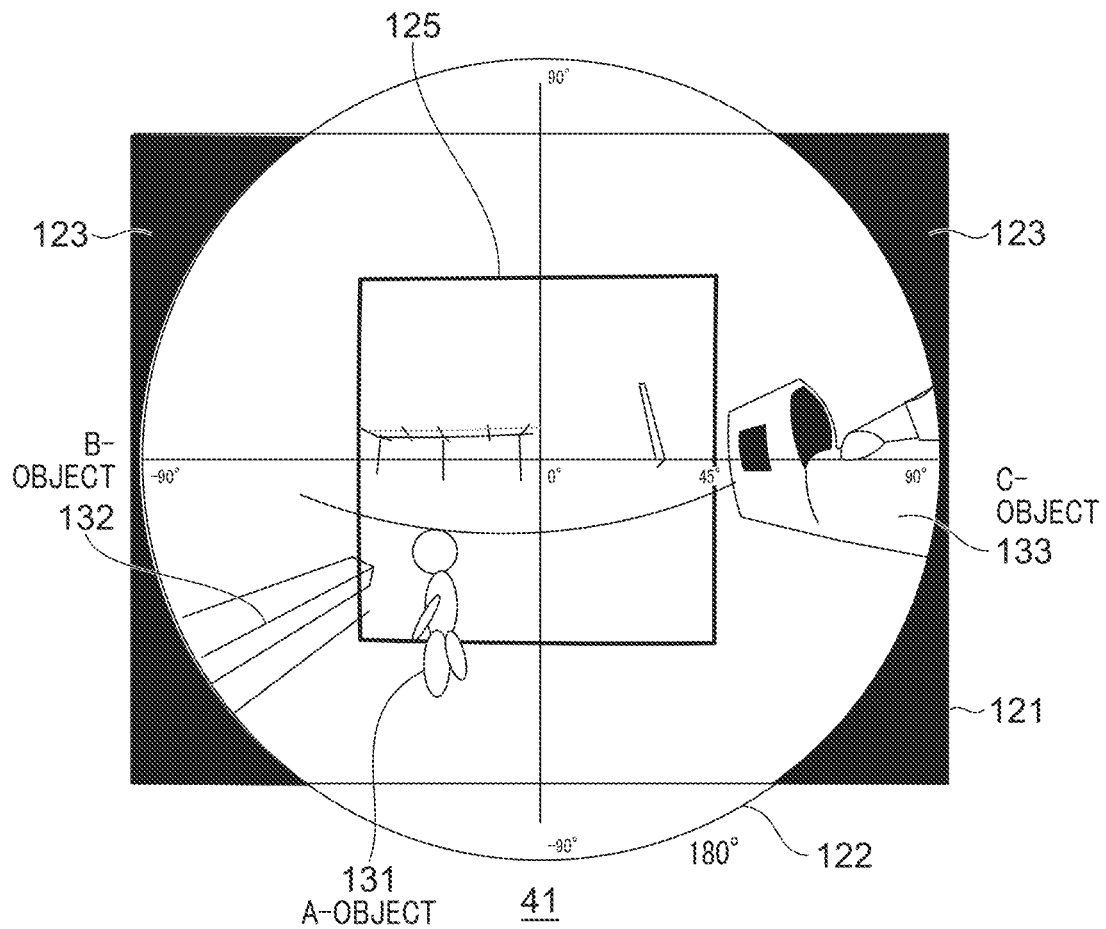
FIG. 11A is a view showing a target visual field set in a superwide-angle image picked up by an image pickup unit of the camera body in a case where the user faces the front.

FIG. 11A is a view showing a target visual field 125 set in a superwide-angle image picked up by the image pickup unit 40 in a case where the user faces the front. As shown in FIG. 11A, a pixel area 121 that can be picked up by the solid state image sensor 42 is a rectangular area. Moreover, an effective projection area (a predetermined area) 122 is an area of a circular half-celestial sphere image that is a fish-eye image projected on the solid state image sensor 42 by the image pickup lens 16. The image pickup lens 16 is adjusted so that the center of the pixel area 121 will match the center of the effective projection area 122.

The outermost periphery of the circular effective projection area 122 shows a position where a visual field angle is 180°. When the user is looking at the center in both the vertical and horizontal directions, an angular range of the target visual field 125 that is picked up and recorded becomes 90° (a half of the visual field angle) centered on the center of the effective projection area 122. It should be noted that the image pickup lens 16 of this embodiment can also introduce light outside the effective projection area 122 and can project light within the maximum visual field angle (about 192°) to the solid state image sensor 42 to form a fish-eye image. However, the optical performance falls greatly in the area outside the effective projection area 122. For example, resolution falls extremely, light amount falls, and distortion increases. Accordingly, in this embodiment, an image of an observation direction is extracted as a recording area only from the inside of the image (hereinafter referred to as a superwide-angle image, simply) projected on the pixel area 121 within a half-celestial sphere image displayed on the effective projection area 122.

Since the size of the effective projection area 122 in the vertical direction is larger than the size of the short side of the pixel area 121, the upper and lower ends of the image in the effective projection area 122 are out of the pixel area 121 in this embodiment. However, the relationship between the areas is not limited to this. For example, the optical system may be designed so that the entire effective projection area 122 will be included in the pixel area 121 by changing the configuration of the image pickup lens 16.

Invalid pixel areas 123 are parts of the pixel area 121 that are not included in the effective projection area 122. The target visual field 125 shows an area of an image of a user's observation direction that will be extracted from the superwide-angle image. In the example shown in FIG. 11A, the target visual field 125 is prescribed by left, right, upper, and lower field angles each of which is 45° (the visual field angle is 90°) centered on the observation direction. In the example of FIG. 11A, since the user faces the front, the center of the target visual field 125 (the observation direction vo) matches the center of the effective projection area 122.

The superwide-angle image shown in FIG. 11A includes an A-object 131 that is a child, a B-object 132 that shows steps that the child (A-object) is trying to climb, and a C-object 133 that is locomotive-type playground equipment.

Next, details of the recording-direction/area determination process in the step S300 in FIG. 7A will be described. FIG. 7D shows the recording-direction/area determination process executed in order to extract an image of an observation direction from the superwide-angle image described using FIG. 11A. Hereinafter, this process is described using FIG. 12A through FIG. 12G that show concrete examples of the target visual field 125.

In a step S301, a field-angle set value $V_{ang}$ that is set in advance is obtained by reading from the primary memory 103. In this embodiment, the internal nonvolatile memory 102 stores all the available field angles (45°, 90°, 110°, and 130°) as field-angle set values $V_{ang}$. The image extraction/development unit 50 extracts an image of an observation direction in an area defined by the field-angle set value $V_{ang}$ from the superwide-angle image. Moreover, the field-angle set value $V_{ang}$ included in the various set values read from the internal nonvolatile memory 102 in one of the steps S103, S106, and S108 in FIG. 7B is established and is being stored in the primary memory 103.

Moreover, in the step S301, the observation direction vi determined in the step S212 is determined as the recording direction, an image in the target visual field 125 of which the center is designated by the observation direction vi and of which an area is defined by the obtained field-angle set value $V_{ang}$ is extracted from the superwide-angle image, and the extracted image is stored into the primary memory 103.

Figure 11B:
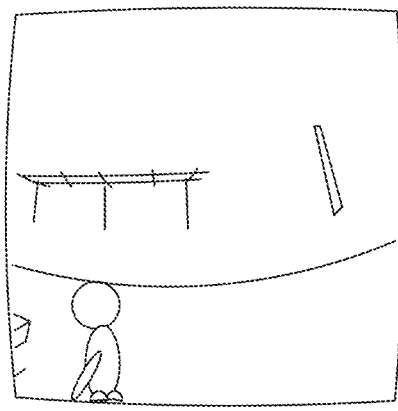
FIG. 11B is a view showing an image in the target visual field extracted from the superwide-angle image in FIG. 11A.

For example, when the field-angle set value $V_{ang}$ is 90° and the observation direction vo (vector information (0°, 0°)) is detected through the face direction detection process (FIG. 7C), the target visual field 125 of which the center matches the center O of the effective projection area 122 and of which the angular widths in the horizontal and vertical directions are 90° (FIG. 11A) is established. FIG. 11B is a view showing the image in the target visual field 125 extracted from the superwide-angle image in FIG. 11A. That is, the overall control CPU (a relative position setting unit) 101 sets the angle of the face direction detected by the face direction detection unit 20 to the observation direction vi that is the vector information showing the relative position of the target visual field 125 with respect to the superwide-angle image.

In the case of the observation direction vo, since the influence of the optical distortion caused by the image pickup lens 16 can be disregarded mostly, the shape of the established target visual field 125 is almost identical to the shape of a target visual field 125o (FIG. 12A) after converting the distortion in a step S303 mentions later. Hereinafter, a target visual field after applying the distortion conversion in the case of the observation direction vi is called a target visual field 125i.

In a step S302, an image stabilization level that is set in advance is obtained by reading from the primary memory 103. In this embodiment, the image stabilization level included in the various set values read from the internal nonvolatile memory 102 in one of the steps S103, S106, and S108 in FIG. 7B is established and is being stored in the primary memory 103.

Moreover, in the step S302, an image-stabilization-margin pixel number $P_{is}$ is set on the basis of the obtained image stabilization level. In the image stabilization process, an image following in a direction opposite to a blur direction is obtained according to a blur amount of the image-pickup/detection unit 10. Accordingly, in this embodiment, an image stabilization margin required for the image stabilization is established around the target visual field 125i.

Moreover, in this embodiment, a table that keeps values of the image-stabilization-margin pixel number $P_{is}$ in association with respective image stabilization levels is stored in the internal nonvolatile memory 102. For example, when the image stabilization level is "middle", "100 pixels" that is the image-stabilization-margin pixel number $P_{is}$ corresponding to the level "middle" is read from the above-mentioned table. And then, an image stabilization margin of which width is 100 pixels is established around the target visual field.

Figure 12A:
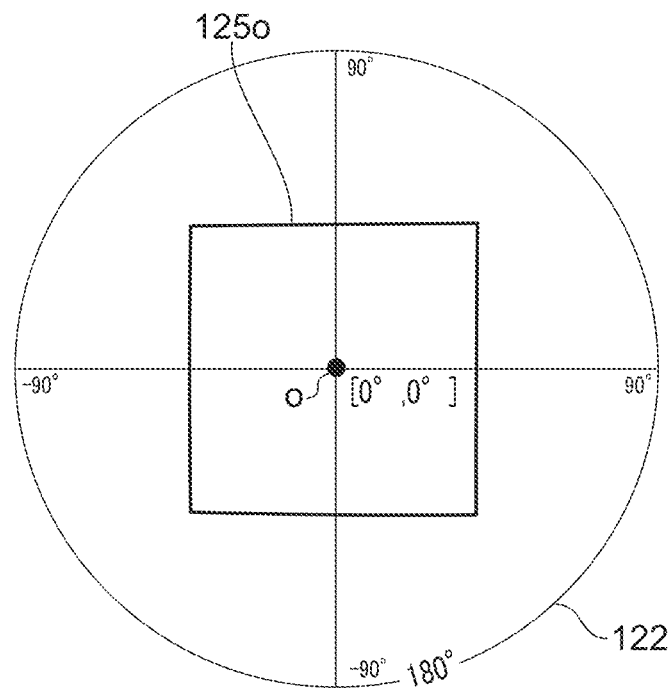
FIG. 12A is a view showing an example of the target visual field set in the superwide-angle image.
Figure 12B:
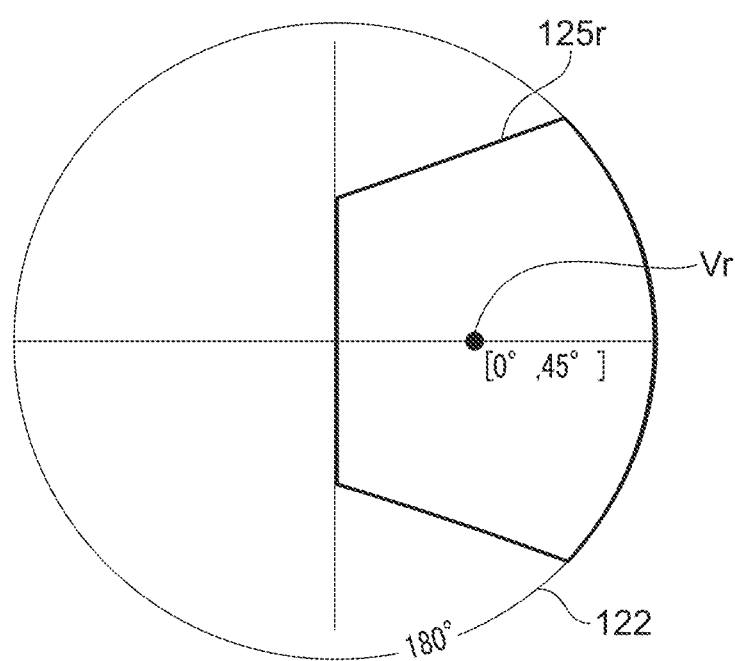
FIG. 12B is a view showing an example of the target visual field set in the superwide-angle image in a case where the field-angle set value is identical to that of the target visual field in FIG. 12A and where the observation direction differs.
Figure 12C:
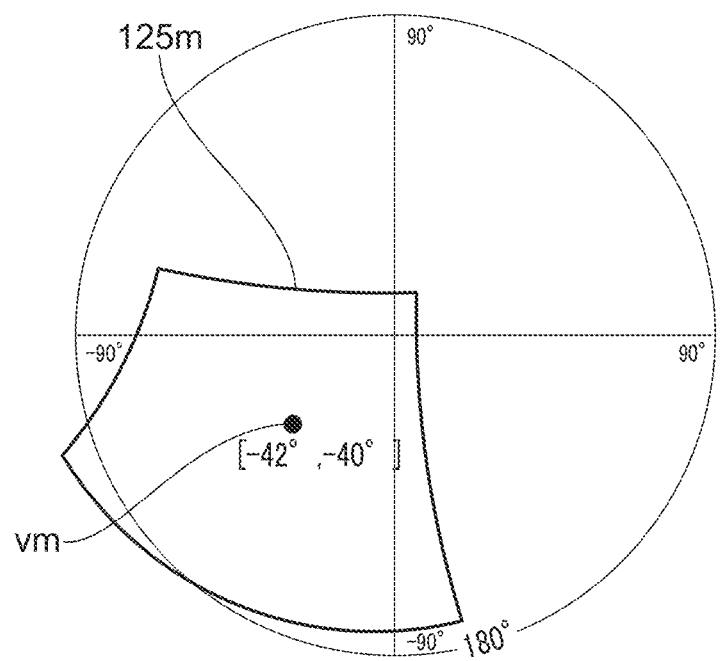
FIG. 12C is a view showing another example of the target visual field set in the superwide-angle image in a case where the field-angle set value is identical to that of the target visual field in FIG. 12A and where the observation direction differs.
Figure 12D:
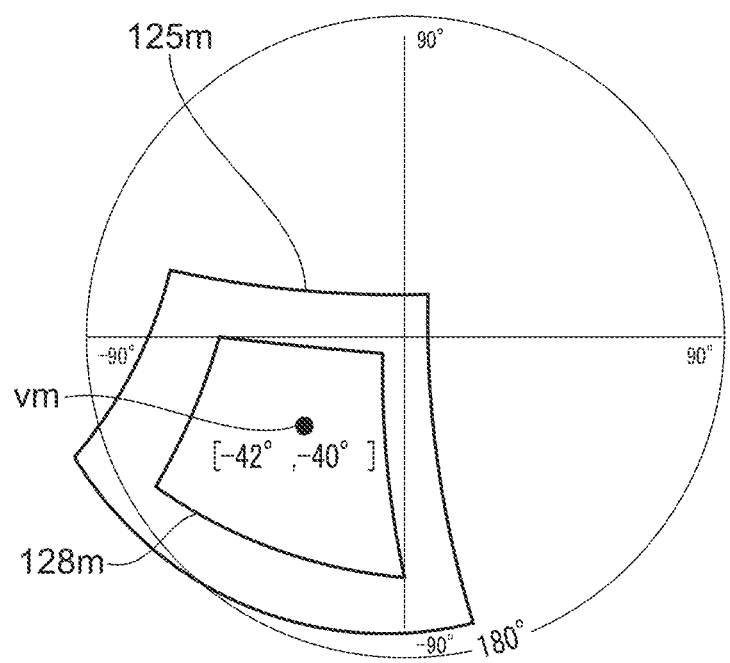
FIG. 12D is a view showing an example of the target visual field set in the superwide-angle image in a case where the observation direction is identical to that of the target visual field in FIG. 12C and where the field-angle set value is smaller.
Figure 12E:
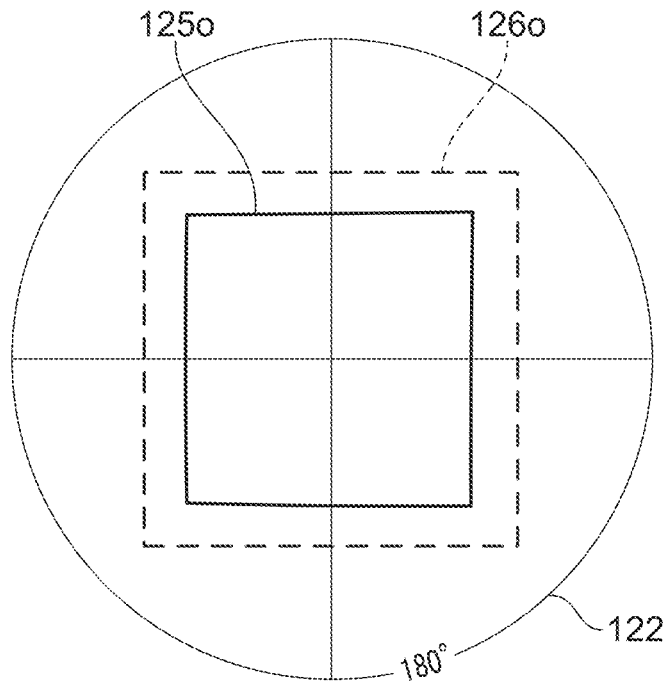
FIG. 12E is a view showing an example that gives an image stabilization margin corresponding to a predetermined image stabilization level around the target visual field shown in FIG. 12A.

FIG. 12E is a view showing an example that gives an image stabilization margin corresponding to a predetermined image stabilization level around the target visual field 125o shown in FIG. 12A. The following description assumes that the image stabilization level is "middle" (i.e., the image-stabilization-margin pixel number $P_{is}$ is "100 pixels").

As shown by a dotted line in FIG. 12E, an image stabilization margin 126o of which the width is "100 pixels" that is the image-stabilization-margin pixel number $P_{is}$ is established around the target visual field 125o.

FIG. 12A and FIG. 12E show the case where the observation direction vi matches the center O (the optical axis center of the image pickup lens 16) of the effective projection area 122 for simplification of the description. In the meantime, when the observation direction vi is directed to a periphery of the effective projection area 122, conversion is required to reduce influence of optical distortion.

In the step S303, the shape of the target visual field 125 established in the step S301 is corrected in consideration of the observation direction vi and the optical property of the image pickup lens 16 to convert the distortion and generate the target visual field 125i. Similarly, the image-stabilization-margin pixel number $P_{is}$ set in the step S302 is also corrected in consideration of the observation direction vi and the optical property of the image pickup lens 16.

For example, the user's observation direction shall be a right direction by 45° from the center o and the field-angle set value $V_{ang}$ shall be 90°. In this case, the observation direction vr (vector information (45°, 0°)) is determined in the step S212 and the target visual field 125 is established as a range of 45° in each of left, right, upper, and lower directions centering on the observation direction vr. Furthermore, the target visual field 125 is corrected to the target visual field 125r shown in FIG. 12B in consideration of the optical property of the image pickup lens 16.

As shown in FIG. 12B, the target visual field 125r becomes wider toward the periphery of the effective projection area 122. And the position of the observation direction vr approaches inside a little from the center of the target visual field 125r. This is because the optical design of the image pickup lens 16 in this embodiment is close to that of a stereographic projection fish-eye lens. It should be noted that contents of the correction depend on the optical design of the image pickup lens 16. If the image pickup lens 16 is designed as an equidistant projection fish-eye lens, an equal-solid-angle projection fish-eye lens, or an orthogonal projection fish-eye lens, the target visual field 125 is corrected according to its optical property.

Figure 12F:
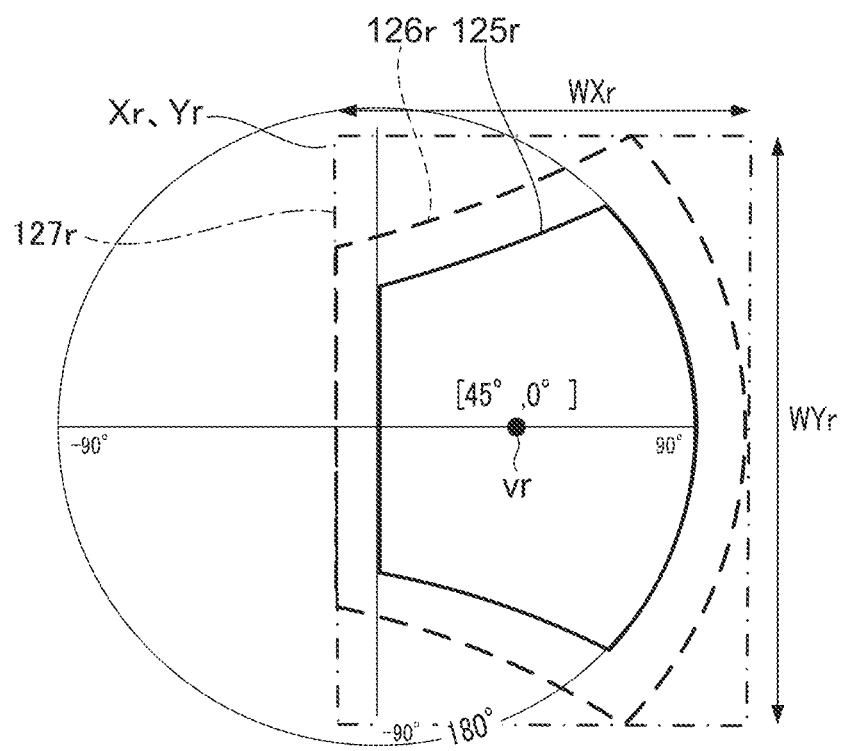
FIG. 12F is a view showing an example that gives an image stabilization margin corresponding to the same image stabilization level of the image stabilization margin in FIG. 12E around the target visual field shown in FIG. 12B.

FIG. 12F is a view showing an example that gives an image stabilization margin 126r corresponding to the same image stabilization level "middle" of the image stabilization margin in FIG. 12E around the target visual field 125r shown in FIG. 12B. The image stabilization margin 126o (FIG. 12E) is established at the left, right, upper, and lower sides of the target visual field 125o with the fixed width of 100 pixels that is the image-stabilization-margin pixel number $P_{is}$ corresponding to the level "middle". As compared with this, the image-stabilization-margin pixel number $P_{is}$ of the image stabilization margin 126r (FIG. 12F) is corrected to increase toward the periphery of the effective projection area 122.

In this way, the shape of the image stabilization margin required for the image stabilization around the target visual field 125r is also corrected as with the target visual field 125r so that the correction amount will increase toward the periphery of the effective projection area 122 as shown by the image stabilization margin 126r in FIG. 12F. This is also because the optical design of the image pickup lens 16 in this embodiment is close to that of a stereographic projection fish-eye lens. It should be noted that contents of the correction depend on the optical design of the image pickup lens 16. If the image pickup lens 16 is designed as an equidistant projection fish-eye lens, an equal-solid-angle projection fish-eye lens, or an orthogonal projection fish-eye lens, the image stabilization margin 126r is corrected according to its optical property.

The process executed in the step S303 that switches successively the shapes of the target visual field 125 and its image stabilization margin in consideration of the optical property of the image pickup lens 16 is a complicated process. Accordingly, in this embodiment, the process in the step S303 is executed using a table that keeps shapes of the target visual field 125i and its image stabilization margin for every observation direction vi stored in the internal nonvolatile memory 102. It should be noted that the overall control CPU 101 may have a computing equation depending on the optical design of the image pickup lens 16. In such a case, the overall control CPU 101 can calculate an optical distortion value using the computing equation.

In a step S304, a position and size of an image recording frame are calculated. As mentioned above, the image stabilization margin 126i required for the image stabilization is established around the target visual field 125i. However, when the position of the observation direction vi is close to the periphery of the effective projection area 122, the shape of the image stabilization margin becomes considerably special as shown by the image stabilization margin 126r, for example.

The overall control CPU 101 can extract an image in such a special-shaped area and apply the development process to the extracted image. However, it is not general to use an image that is not rectangular in recording as image data in the step S600 or in transmitting image data to the display apparatus 800 in the step S700. Accordingly, in the step S304, the position and size of the image recording frame 127i of a rectangular shape that includes the entire image stabilization margin 126i are calculated.

FIG. 12F shows the image recording frame 127r that is calculated in the step S304 to the image stabilization margin 126r by an alternate long and short dash line. In a step S305, the position and size of the image recording frame 127i that are calculated in the step S304 are recorded into the primary memory 103.

In this embodiment, an upper-left coordinate (Xi, Yi) of the image recording frame 127i in the superwide-angle image is recorded as the position of the image recording frame 127i, and a lateral width WXi and a vertical width WYi that start from the coordinate (Xi, Yi) are recorded as the size of the image recording frame 127ii. For example, a coordinate (Xr, Yr), a lateral width WXr, and a vertical width WYr of the image recording frame 127r shown in FIG. 12F are recorded in the step S305. It should be noted that the coordinate (Xi, Yi) is a XY coordinate of which the origin is a predetermined reference point, specifically the optical center of the image pickup lens 16.

When the image stabilization margin 126i and the image recording frame 127i have been determined in this way, the process exits this subroutine shown in FIG. 7D.

In the description so far, the observation directions of which the horizontal angle is 0°, such as the observation direction v0 (the vector information (0°, 0°)) and the observation direction vr (the vector information (45°, 0°)), have been described for simplifying the description of the complicated optical distortion conversion. In the meantime, an actual observation direction vi of the user is arbitrary. Accordingly, the recording area development process executed in a case where the horizontal angle is not 0° will be described hereinafter.

Figure 12G:
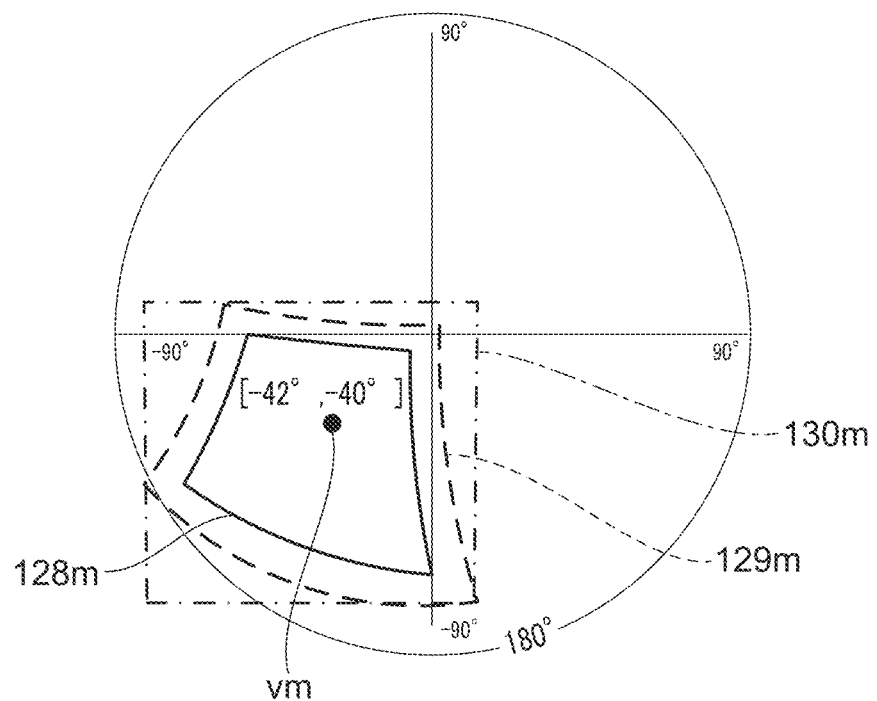
FIG. 12G is a view showing an example that gives an image stabilization margin corresponding to the same image stabilization level of the image stabilization margin in FIG. 12E around the target visual field shown in FIG. 12D.

For example, when the field-angle set value $V_{ang}$ is 90° and the observation direction vm is (−42°, −40°), a target visual field 125m appears as shown in FIG. 12C. Moreover, when the field-angle set value $V_{ang}$ is 45° and the observation direction vm is (−42°, −40°), a target visual field 128m, which is smaller than the target visual field 125m, appears as shown in FIG. 12D. Furthermore, an image stabilization margin 129m and an image recording frame 130m are established around the target visual field 128m as shown in FIG. 12G.

Since the process in the step S400 is a fundamental image pickup operation and employs a general sequence of the image pickup unit 40, its detailed description is omitted. It should be noted that the image signal processing circuit 43 in the image pickup unit 40 in this embodiment also performs a process that converts signals of an inherent output form (standard examples: MIPI, SLVS) output from the solid state image sensor 42 into pickup image data of a general sensor reading system.

When the video image mode is selected by the image pickup mode switch 12, the image pickup unit 40 starts recording in response to a press of the start switch 14. After that, the recording is finished when the stop switch 15 is pressed. In the meantime, when the still image mode is selected by the image pickup mode switch 12, the image pickup unit 40 picks up a static image every time when the start switch 14 is pressed.

Figure 7E:
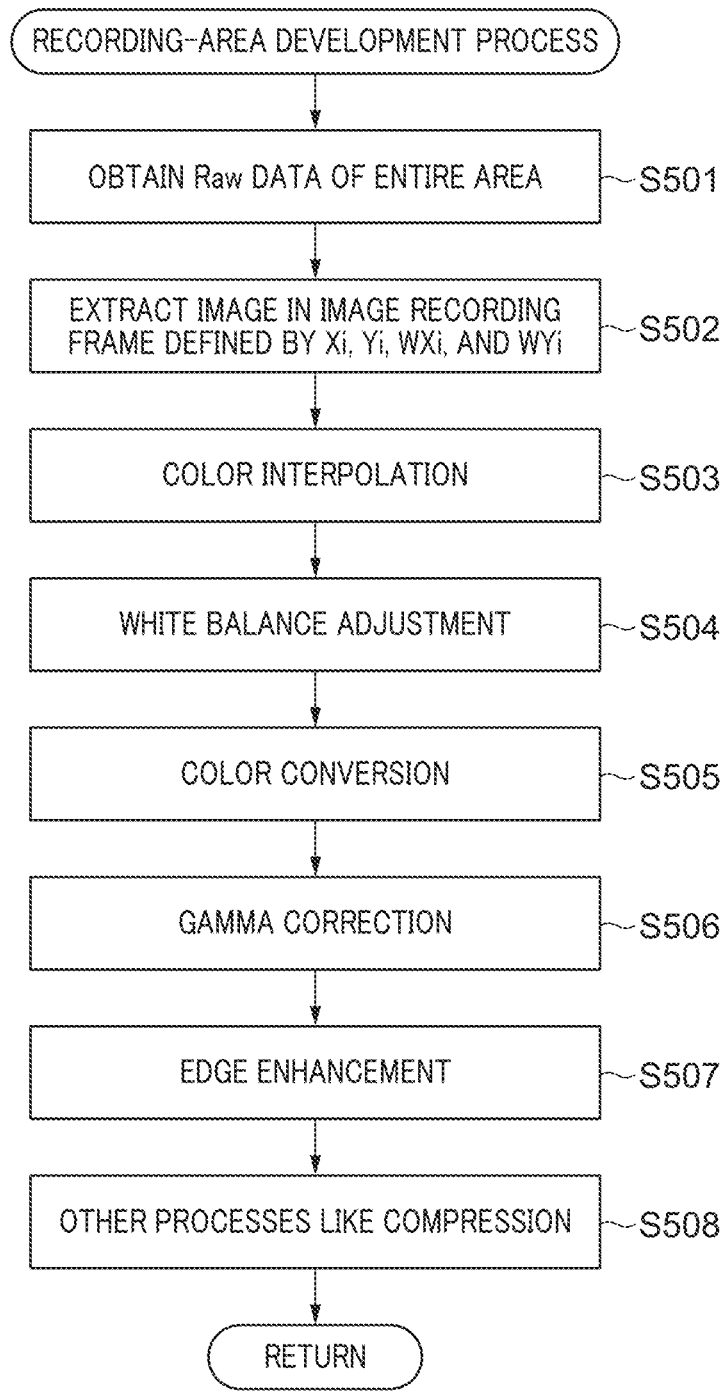
FIG. 7E is a flowchart showing a subroutine of a recording-area development process in a step S500 in FIG. 7A according to the first embodiment.

FIG. 7E is a flowchart showing a subroutine of the recording-area development process in the step S500 in FIG. 7A. In a step S501, Raw data of the entire area of the pickup image data (superwide-angle image) generated by the image pickup unit 40 in the step S400 is obtained and is input into an image capturing unit called a head unit (not shown) of the overall control CPU 101.

In the next step S502, the part within the image recording frame 127i is extracted from the superwide-angle image obtained in the step S501 on the basis of the coordinate (Xi, Yi), lateral width WXi, and vertical width WYi that are recorded into the primary memory 103 in the step S305. After the extraction, a crop development process (FIG. 7F) consisting of steps S503 through S508 is executed only to the pixels within the image stabilization margin 126i. This can reduce a calculation amount significantly as compared with a case where the development process is executed to the entire area of the superwide-angle image read in the step S501. Accordingly, calculation time and electric power consumption can be reduced.

Figure 7F:
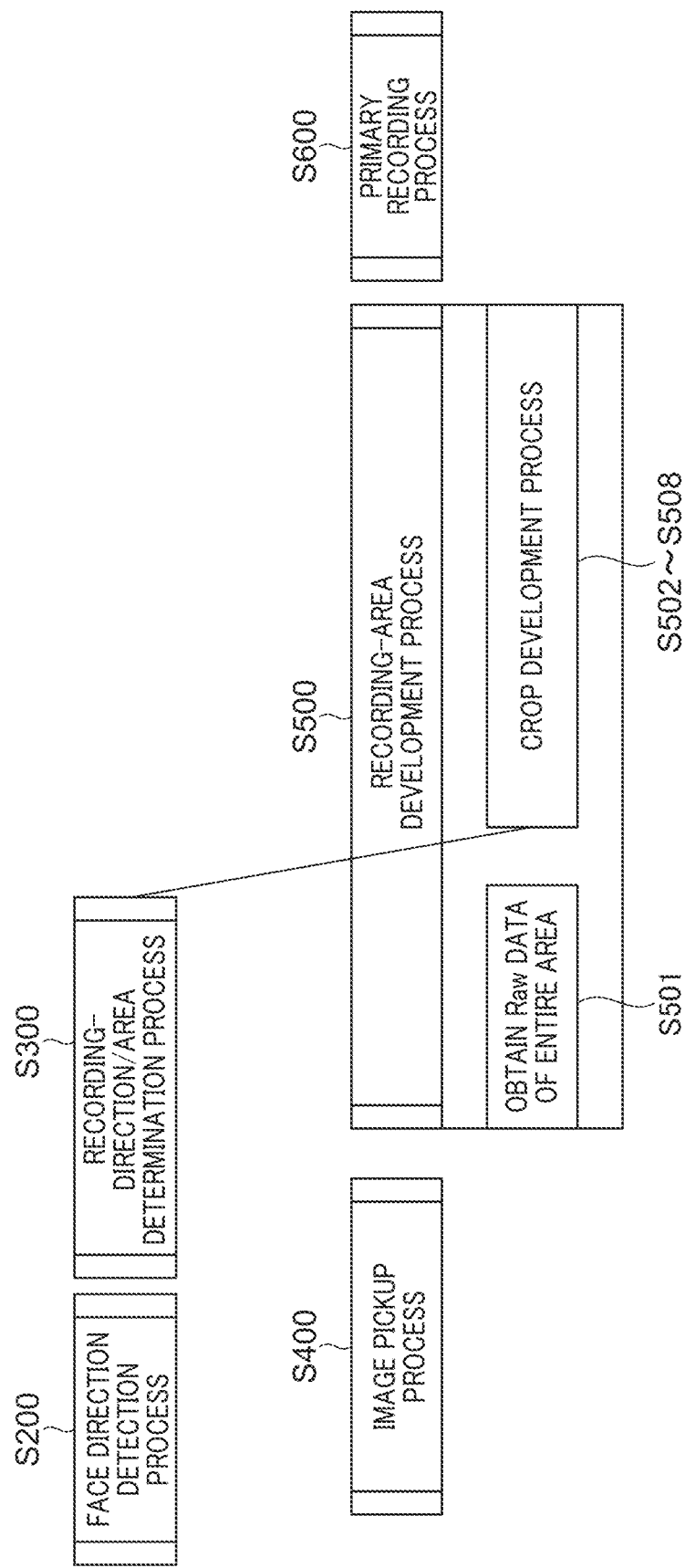
FIG. 7F is a view for describing a process in the steps S200 through S600 in FIG. 7A in a video image mode.

As shown in FIG. 7F, when the video image mode is selected by the image pickup mode switch 12, the processes of the steps S200 and S300 and the process of step S400 are executed in parallel by the same frame rate or different frame rates. Whenever the Raw data of the entire area of one frame generated by the image pickup unit 40 is obtained, the crop development process is executed on the basis of the coordinate (Xi, Yi), lateral width WXi, and vertical width WYi that are recorded in the primary memory 103 at that point.

When the crop development process is started to the pixels within the image stabilization margin 126i, color interpolation that interpolates data of color pixels arranged in the Bayer arrangement is executed in the step S503.

After that, a white balance is adjusted in a step S504 and a color conversion is executed in a step S505. In a step S506, gamma correction that corrects gradation according to a gamma correction value set up beforehand is performed. In a step S507, edge enhancement is performed corresponding to an image size.

In the step S508, the image data is converted into a format that can be stored primarily by applying processes like compression. The converted image data is stored into the primary memory 103. After that, the process exits the subroutine. Details of the data format that can be stored primarily will be mentioned later.

The order of the processes of the steps S503 through S508 executed during the crop development process may be changed according to the property of the camera system. A part of the processes may be omitted. The order and presences of the processes of the steps S503 through S508 do not restrict the present disclosure.

Moreover, when the video image mode is selected, the processes of the steps S200 through S500 are repeatedly executed until the recording is finished.

According to this process, the calculation amount is significantly reduced as compared with a case where the development process is executed to the entire area read in the step S501. Accordingly, an inexpensive and low-power consumption microcomputer can be employed as the overall control CPU 101. Moreover, heat generation in the overall control CPU 101 is reduced and the life of the battery 94 becomes longer.

Moreover, in order to reduce a control load on the overall control CPU 101, the optical correction process (the step S800 in FIG. 7A) and the image stabilization process (the step S900 in FIG. 7A) to the image are not executed by the camera body 1 in this embodiment. These processes are executed by the display-apparatus controller 801 after transferring the image to the display apparatus 800. Accordingly, if only data of a partial image extracted from a projected superwide-angle image is transferred to the display apparatus 800, neither the optical correction process nor the image stabilization process can be executed. That is, since the data of the extracted image does not include position information that will be substituted to a formula of the optical correction process and will be used to refer the correction table of the image stabilization process, the display apparatus 800 cannot execute these processes correctly. Accordingly, in this embodiment, the camera body 1 transmits correction data including information about an extraction position of an image from a superwide-angle image together with data of the extracted image to the display apparatus 800.

When the extracted image is a still image, since the still image data corresponds to the correction data one-to-one, the display apparatus 800 can execute the optical correction process and image stabilization process correctly, even if these data are separately transmitted to the display apparatus 800. In the meantime, when the extracted image is a video image, if the video image data and the correction data are separately transmitted to the display apparatus 800, it becomes difficult to determine correspondence between each frame of the video image data and the correction data. Particularly, when a clock rate of the overall control CPU 101 in the camera body 1 slightly differs from a clock rate of the display-apparatus controller 801 in the display apparatus 800, the synchronization between the overall control CPU 101 and the display-apparatus controller 801 will be lost during the video image pickup operation for several minutes. This may cause a defect that the display-apparatus controller 801 corrects a frame with correction data different from the corresponding correction data.

Accordingly, in this embodiment, when transmitting data of an extracted video image to the display apparatus 800, the camera body 1 gives its correction data appropriately to the data of the video image. Hereinafter, the method is described.

Figure 14:
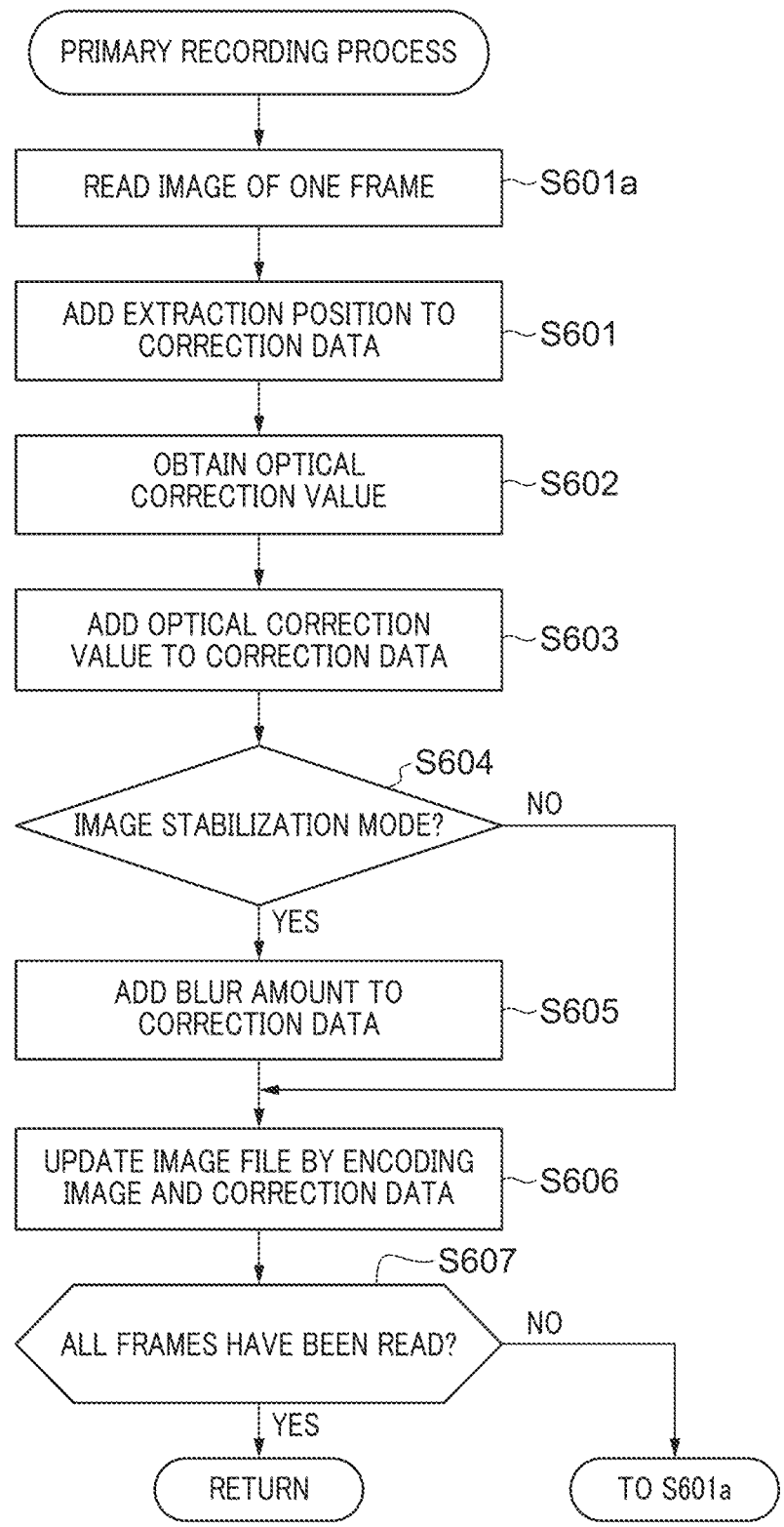
FIG. 14 is a flowchart showing a subroutine of a primary recording process in a step S600 in FIG. 7A.

FIG. 14 is a flowchart showing the subroutine of the primary recording process in the step S600 in FIG. 7A. Hereinafter, this process will be described by also referring to FIG. 15. FIG. 14 shows the process of a case where the video image mode is selected by the image pickup mode switch 12. When the still image mode is selected, this process starts from a step S601 and is finished after a process of a step S606.

In a step S601a, the overall control CPU 101 reads an image of one frame to which the processes in steps S601 through S606 have not been applied from among the video image developed in the recording area development process (FIG. 7E). Moreover, the overall control CPU (a metadata generation unit) 101 generates correction data that is metadata of the read frame.

In the step S601, the overall control CPU 101 attaches the information about the extraction position of the image of the frame read in the step S601a to the correction data. The information attached in this step is the coordinate (Xi, Yi) of the image recording frame 127i obtained in the step S305. It should be noted that the information attached in this step may be the vector information that shows the observation direction vi.

In a step S602, the overall control CPU (an optical-correction-value obtainment unit) 101 obtains an optical correction value. The optical correction value is the optical distortion value set up in the step S303. Alternatively, the optical correction value may be a marginal-light-amount correction value or a diffraction correction value corresponding to the lens optical property.

In a step S603, the overall control CPU 101 attaches the optical correction value used for the distortion conversion in the step S602 to the correction data.

In a step S604, the overall control CPU 101 Determines whether the image stabilization mode is effective. Specifically, when the image stabilization mode is "Middle" or "Strong", it is determined that the image stabilization mode is effective and the process proceeds to a step S605. In the meantime, when the image stabilization mode set up in advance is "OFF", it is determined that the image stabilization mode is not effective and the process proceeds to the step S606. The reason why the step S605 is skipped when the image stabilization mode is "OFF" is because the calculation data amount of the overall control CPU 101 and the data amount of the wireless communication are reduced and the power consumption and heat generation of the camera body 1 can be reduced by skipping the step S605. Although the reduction of the data used for the image stabilization process is described, the data about the marginal-light-amount correction value or the data about the diffraction correction value obtained as the optical correction value in the step S602 may be reduced.

Although the image stabilization mode is set up by the user's operation to the display apparatus 800 in advance in this embodiment, the mode is set up as a default setting of the camera body 1. Moreover, when the camera system is configured to switch the effectiveness of image stabilization process after transferring image data to the display apparatus 800, the process may directly proceed to the step S605 from the step S603 by omitting the step S604.

In the step S605, the overall control CPU (a moving amount detection unit) 101 attaches the image stabilization mode, which is obtained in the step S302, and the gyro data, which is obtained during the pickup operation of the video image in association with the frame that is read from the primary memory 813 in the step S601a, to the correction data.

In the step S606, the overall control CPU 101 updates a video file 1000 (FIG. 15) by data obtained by encoding the image data and correction data. The image data corresponds to the frame read in the step S606. The correction data includes the various data attached in the steps S601 through S605. It should be noted that when a first frame of the video image is read in the step S601a, the video file 1000 is generated in the step S606.

In a step S607, the overall control CPU 101 determines whether all the frames of the video image developed by the recording area development process (FIG. 7E) have been read. When not all the frames have been read, the process returns to the step S601a. In the meantime, when all the frames have been read, the process exits this subroutine. The generated video file 1000 is stored into the internal nonvolatile memory 102. The video image may be stored into the large-capacity nonvolatile memory 51 too in addition to the primary memory 813 and the internal nonvolatile memory 102. Moreover, the transmission process (the step S700 in FIG. 7A) that transfers the generated image file 1000 to the display apparatus 800 immediately is executed. The image file 1000 may be stored into the primary memory 813 after transferring it to the display apparatus 800.

In this embodiment, the encoding means to combine the image data and the correction data into one file. At that time, the image data may be compressed or the data file that is combined by the image data and correction data may be compressed.

Figure 15:
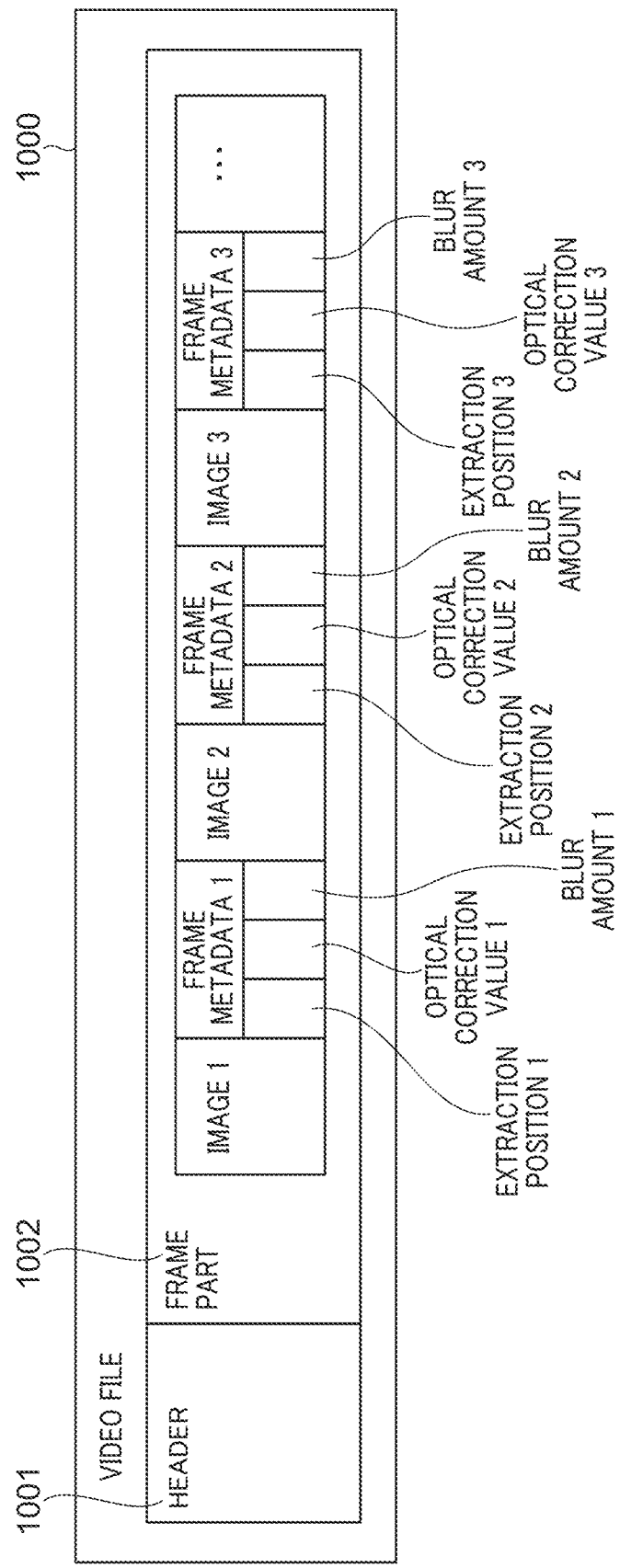
FIG. 15 is a view showing a data structure of an image file generated by the primary recording process.

FIG. 15 is a view showing a data structure of the video file 1000. The video file 1000 consists of a header part 1001 and a frame part 1002. The frame part 1002 consists of frame data sets each of which consists of an image of each frame and corresponding frame metadata. That is, the frame part 1002 includes frame data sets of the number of the total frames of the video image.

In this embodiment, frame metadata is information obtained by encoding correction data to which an extraction position (in-image position information), an optical correction value, and gyro data are attached if needed. However, the frame metadata is not limited to this. An information amount of the frame metadata may be changed. For example, other information may be added to the frame metadata according to the image pickup mode selected by the image pickup mode switch 12. Alternatively, a part of the information in the frame metadata may be deleted.

A head address and offset values to the respective frame data sets of the frame are recorded in the header part 1001. Alternatively, metadata like the time and size corresponding to the video file 1000 may be stored in the header part 1001.

In the primary recording process (FIG. 14), the video file 1000 is transferred to the display apparatus 800. The video file 100 includes data sets each of which consists of a frame of the video image developed by recording area development process (FIG. 7E) and its metadata. Accordingly, even when the clock rate of the overall control CPU 101 in the camera body 1 slightly differs from the clock rate of the display-apparatus controller 801 in the display apparatus 800, the display-apparatus controller 801 certainly applies the correction process to the video image developed in the camera body 1.

Although the optical correction value is included in the frame metadata in this embodiment, the optical correction value may be given to the entire image.

Figure 16:
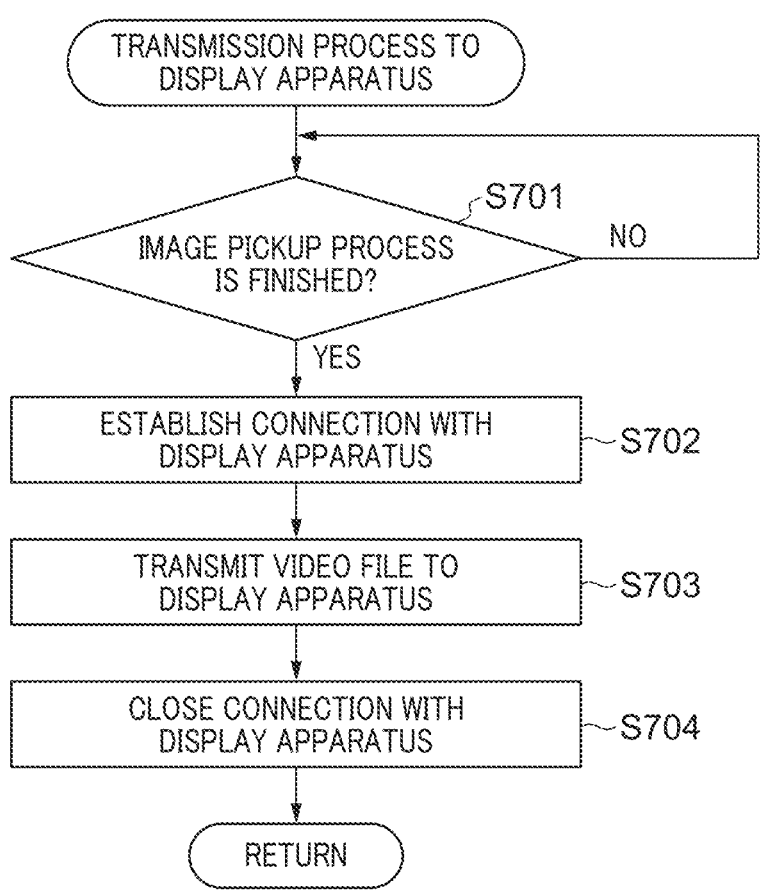
FIG. 16 is a flowchart of the subroutine of a transmission process to the display apparatus in a step S700 in FIG. 7A.

FIG. 16 is a flowchart of the subroutine of the transmission process to the display apparatus 800 in the step S700 in FIG. 7A. FIG. 16 shows the process of a case where the video image mode is selected by the image pickup mode switch 12. It should be noted that when the still image mode is selected, this process starts from a process in a step S702.

In a step S701, it is determined whether the image pickup process (the step S400) of the video image by the image pickup unit 40 is finished or it is under recording. When the video image is recording (during the video image pickup operation), the recording area development process (the step S500) for each frame and the update of the image file 1000 (the step S606) in the primary recording process (step S600) are executed sequentially. Since a power load of wireless transmission is large, if the wireless transmission is performed during the video image pickup operation in parallel, the battery 94 is needed to have large battery capacity or a new measure against heat generation is needed. Moreover, from a viewpoint of arithmetic capacity, if the wireless transmission is performed during the video image pickup operation in parallel, an arithmetic load will become large, which needs to prepare a high-specification CPU as the overall control CPU 101, increasing the cost. In view of these points, in this embodiment, the overall control CPU 101 proceeds with the process to a step S702 after the video image pickup operation is finished (YES in the step S701), and establishes the wireless connection with the display apparatus 800. In the meantime, if the camera system of the embodiment has a margin in the electric power supplied from the battery 94 and a new measure against heat generation is unnecessary, the overall control CPU 101 may beforehand establish the wireless connection with the display apparatus 800 when the camera body 1 is started or when the video image pickup operation is not yet started.

In the step S702, the overall control CPU 101 establishes the connection with the display apparatus 800 through the high-speed wireless communication unit 72 in order to transfer the video file 1000 having much data volume to the display apparatus 800. It should be noted that the small-power wireless communication unit 71 is used for transmission of a low-resolution image for checking a field angle to the display apparatus 800 and is used for exchange of various set values with the display apparatus 800. In the meantime, the small-power wireless communication unit 71 is not used for transfer of the video file 1000 because a transmission period becomes long.

In a step S703, the overall control CPU 101 transfers the video file 1000 to the display apparatus 800 through the high-speed wireless communication unit 72. When the transmission is finished, the overall control CPU 101 proceeds with the process to a step S704. In the step S704, the overall control CPU 101 closes the connection with the display apparatus 800 and exits this subroutine.

The case where one image file including the image of all the frames of one video image is transferred has been described so far. In the meantime, if the recording period of the video image is longer than several minutes, the video image may be divided by a unit time into a plurality of image files. When the video file has the data structure shown in FIG. 15, even if one video image is transferred to the display apparatus 800 as a plurality of image files, the display apparatus 800 becomes available to correct the video image without the timing gap with the correction data.

Figure 17:
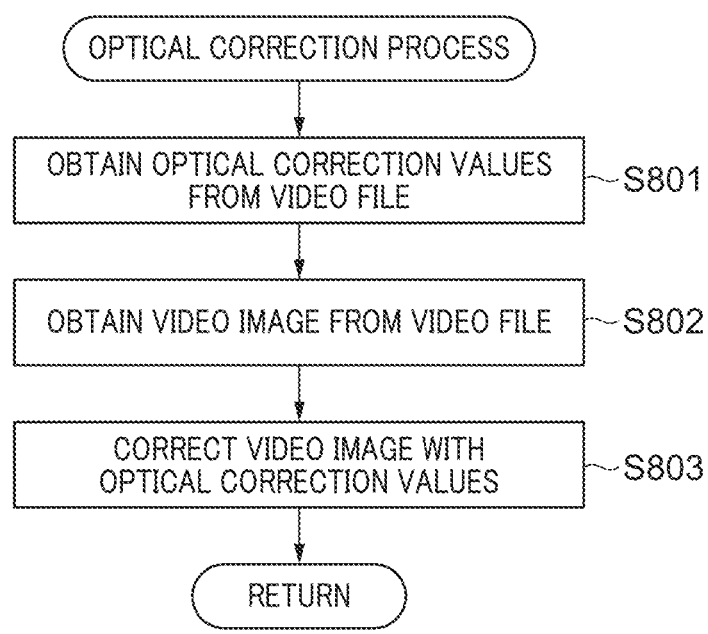
FIG. 17 is a flowchart showing a subroutine of an optical correction process in a step S800 in FIG. 7A.

FIG. 17 is a flowchart showing a subroutine of the optical correction process in the step S800 in FIG. 7A. Hereinafter, this process will be described by also referring to FIG. 18A through FIG. 18E. As mentioned above, this process is executed by the display-apparatus controller 801 of the display apparatus 800.

In the step S801, the display-apparatus controller (a video file reception unit) 801 first receives the video file 1000 from the camera body 1 transferred in the transmission process (the step S700) to the display apparatus 800. After that, the display-apparatus controller (a first extraction unit) 801 obtains the optical correction values extracted from the received video file 1000.

In the next step S802, the display-apparatus controller (a second extraction unit) 801 obtains an image (an image of one frame obtained by the video image pickup operation) from the video file 1000.

In a step S803, the display-apparatus controller (a frame image correction unit) 801 performs the optical correction process to correct optical aberrations of the image obtained in the step S802 with the optical correction value obtained in the step S801, and stores the corrected image into the primary memory 813. An image area (extraction-development area) that is narrower than the development area (target visual field 125i) determined in the step S303 is extracted from the image obtained in the step S802 and the optical correction process is applied to the extracted image area.

Figure 18A:
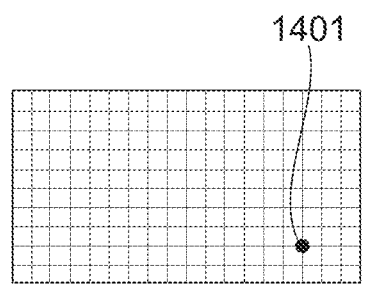
FIG. 18A through FIG. 18F are views for describing a process of applying distortion correction in a step S803 in FIG. 17.
Figure 18B:
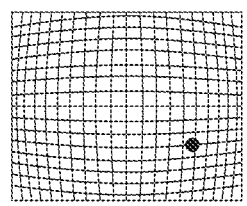

FIG. 18A through FIG. 18F are views for describing a process of applying distortion correction in the step S803 in FIG. 17. FIG. 18A is a view showing a position of an object 1401 at which the user looks with a naked eye in picking up an image. FIG. 18B is a view showing an image of the object 1401 formed on the solid state image sensor 42.

Figure 18C:
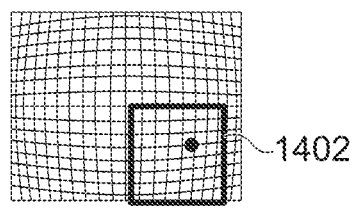

FIG. 18C is a view showing a development area 1402 in the image in FIG. 18B. The development area 1402 is the extraction-development area mentioned above.

Figure 18D:
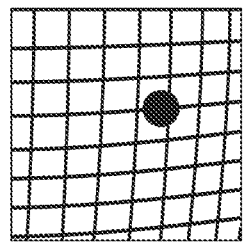
Figure 18E:
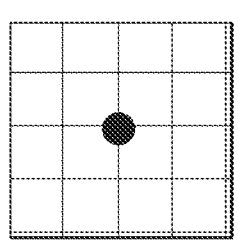

FIG. 18D is a view showing an extraction-development image obtained by extracting the image of the development area 1402. FIG. 18E is a view showing an image obtained by correcting distortion in the extraction-development image in FIG. 18D. Since an extraction process is performed in correcting distortion of the extraction-development image, a field angle of the image shown in FIG. 18E becomes still smaller than that of the extraction-development image shown in FIG. 18D.

Figure 18F:
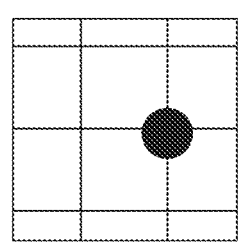
Figure 19:
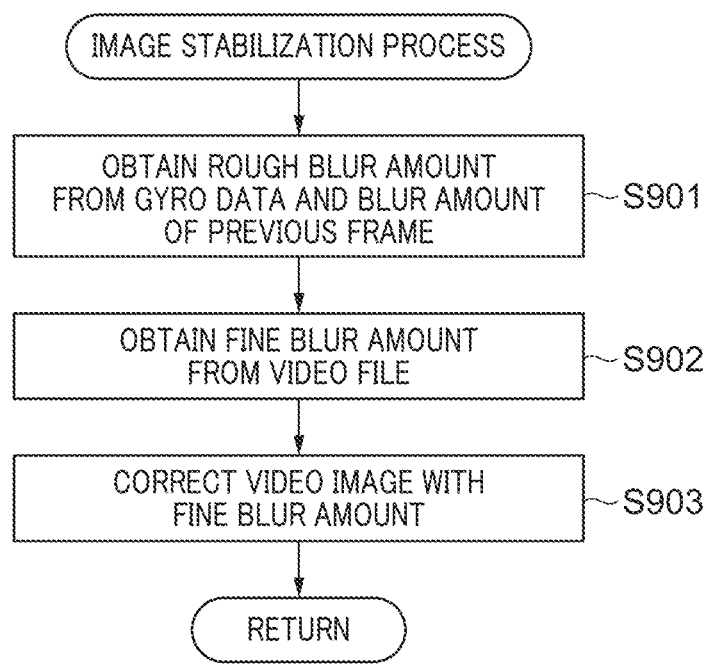
FIG. 19 is a flowchart showing a subroutine of an image stabilization process in a step S900 in FIG. 7A.

FIG. 19 is a flowchart showing a subroutine of the image stabilization process in the step S900 in FIG. 7A. Hereinafter, this process will be described by also referring to FIG. 18F. As mentioned above, this process is executed by the display-apparatus controller 801 of the display apparatus 800.

In a step S901, the display-apparatus controller 801 obtains gyro data of a current frame, gyro data of a previous frame, and a blur amount $V_{n-1}^{Det}$, which is calculated in a below-mentioned step S902 for the previous frame, from the frame metadata of the video file 1000. After that, a rough blur amount $V_n^{Pre}$ is calculated from these pieces of information. It should be noted that a current frame in this embodiment is a frame under processing and that a previous frame is an immediately preceding frame.

In the step S902, the display-apparatus controller 801 calculates a fine blur amount $V_n^{Det}$ from the video file. A blur amount is detected by calculating a moving amount of a feature point from a previous frame to a current frame.

A feature point can be extracted by a known method. For example, a method using a luminance information image that is generated by extracting only luminance information of an image of a frame may be employed. This method subtracts an image that shifts the original luminance information image by one or several pixels from the original luminance information image. A pixel of which an absolute value of difference exceeds a threshold is extracted as a feature point. Moreover, an edge extracted by subtracting an image generated by applying a high-pass filter to the above-mentioned luminance information image from the original luminance information image may be extracted as a feature point.

Differences are calculated multiple times while shifting the luminance information images of the current frame and previous frame by one or several pixels. The moving amount is obtained by calculating a position at which the difference at the pixel of the feature point diminishes.

Since a plurality of feature points are needed as mentioned later, it is preferable to divide each of the images of the present frame and previous frame into a plurality of blocks and to extract a feature point for each block. A block division depends on the number of pixels and aspect ratio of the image. In general, 12 blocks of 4*3 or 54 blocks of 9*6 is preferable. When the number of blocks is too small, trapezoidal distortion due to a tilt of the image pickup unit 40 of the camera body 1 and rotational blur around the optical axis, etc. cannot be corrected correctly. In the meantime, when the number of blocks is too large, a size of one block becomes small, which shortens a distance between adjacent feature points, causing error. In this way, the optimal number of blocks is selected depending on the pixel number, ease of detection of feature points, a field angle of an object, etc.

Since the obtainment of the moving amount needs a plurality of difference calculations while shifting the luminance information images of the current frame and previous frame by one or several pixels, the calculation amount increases. Since the moving amount is actually calculated on the basis of the rough blur amount $V_n^{Pre}$ and deviation (the number of pixels) therefrom, the difference calculations are performed only near the rough blur amount, which can significantly reduce the calculation amount.

Next, in a step S903, the display-apparatus controller 801 performs the image stabilization process using the fine blur amount $V_n^{Det}$ obtained in the step S902. And then, the process exits this subroutine. It should be noted that Euclidean transformation and affine transformation that enable rotation and parallel translation, and projective transformation that enables keystone correction are known as the method of the image stabilization process.

Although the Euclidean transformation can correct movements in the X-axis direction and Y-axis direction and rotation, it cannot correct blur caused by camera shake of the image pickup unit 40 of the camera body 1 in a front-back direction or directions of pan and tilt. Accordingly, in this embodiment, the image stabilization process is executed using the affine transformation that enables correction of skew. The affine transformation from a coordinate (x, y) of the feature point used as criteria to a coordinate (x', y') is expressed by the following formula 100.

$$\begin{pmatrix} x' \\ y' \\ 1 \end{pmatrix} = \begin{pmatrix} a & b & c \\ d & e & f \\ 0 & 0 & 1 \end{pmatrix} \begin{pmatrix} x \\ y \\ 1 \end{pmatrix} \qquad \text{Formula 100}$$

Affine coefficients of a 3×3 matrix of the formula 100 are computable if deviations of at least three feature points are detected. However, when the detected feature points are mutually near or are aligned on a straight line, the image stabilization process becomes inaccurate in areas distant from the feature points or distant from the straight line. Accordingly, as for the feature point detected, it is preferable to select what is in a far distance mutually and does not get on a straight line. Accordingly, when a plurality of feature points are detected, mutually near feature points are excluded and remaining feature points are normalized by a least square method.

FIG. 18F is a view showing an image obtained by applying the image stabilization process in the step S903 to the distortion-corrected image shown in FIG. 18E. Since the extraction process is performed in executing the image stabilization process, a field angle of the image shown in FIG. 18F becomes smaller than that of the image shown in FIG. 18E.

It is available to obtain a high quality image of which blur is corrected by performing such an image stabilization process. In the above, the series of operations executed by the camera body 1 and display apparatus 800 that are included in the camera system of this embodiment have been described.

When the user selects the video image mode by the image pickup mode switch 12 after turning the power switch 11 ON and observes the front without turning the face in the vertical and horizontal directions, the face direction defection unit 20 detects the observation direction vo (vector information (0°, 0°)) as shown in FIG. 12A. After that, the recording-direction/field-angle determination unit 30 extract the image (FIG. 11B) in the target visual field 125o shown in FIG. 12A from the superwide-angle image projected onto the solid state image sensor 42.

Figure 11C:
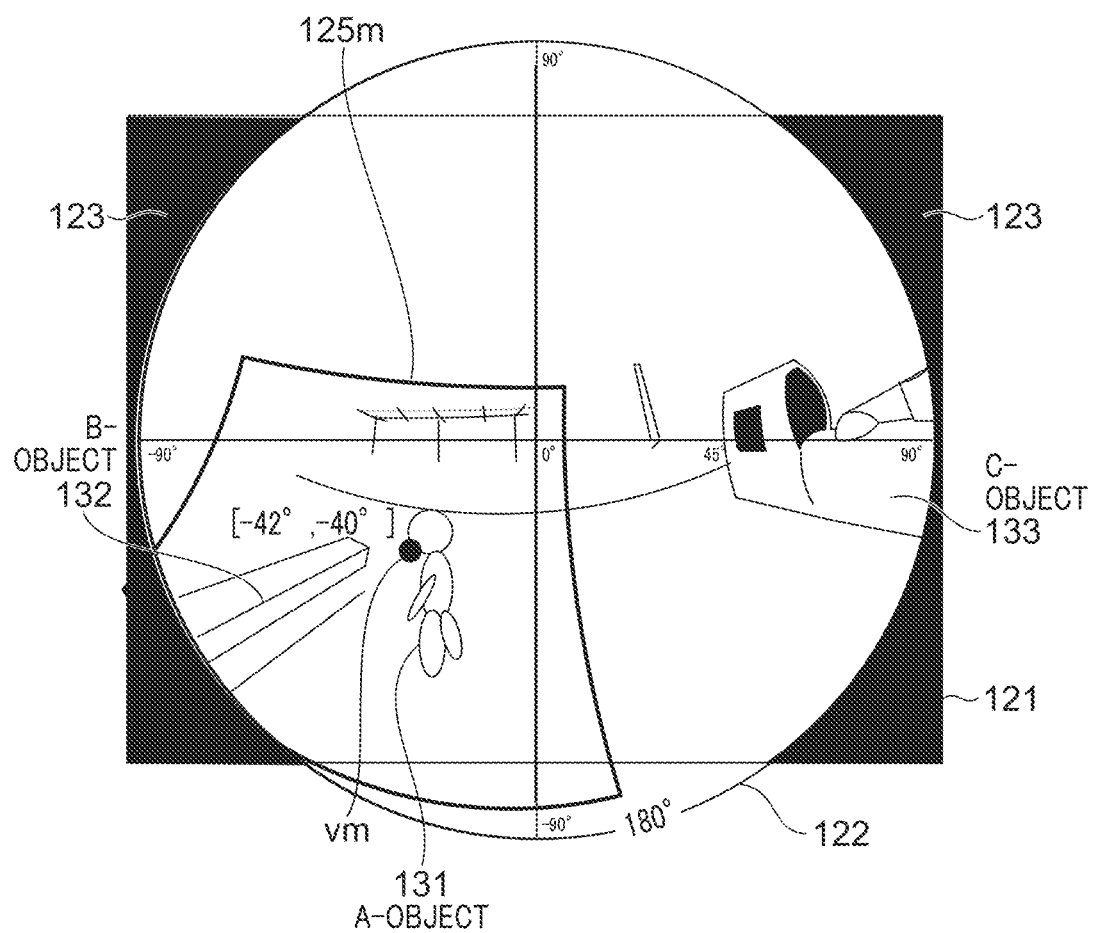
FIG. 11C is a view showing the target visual field set in the superwide-angle image in a case where the user is observing an A-object.

After that, when the user starts observing the child (A-object 131) in FIG. 11A, for example, without operating the camera body 1, the face direction detection unit 20 detects the observation direction vm (vector information (−42°, −40°)) as shown in FIG. 11C. After that, the recording-direction/field-angle determination unit 30 extracts the image (FIG. 11C) in the target visual field 125m from the superwide-angle image picked up by the image pickup unit 40.

Figure 11D:
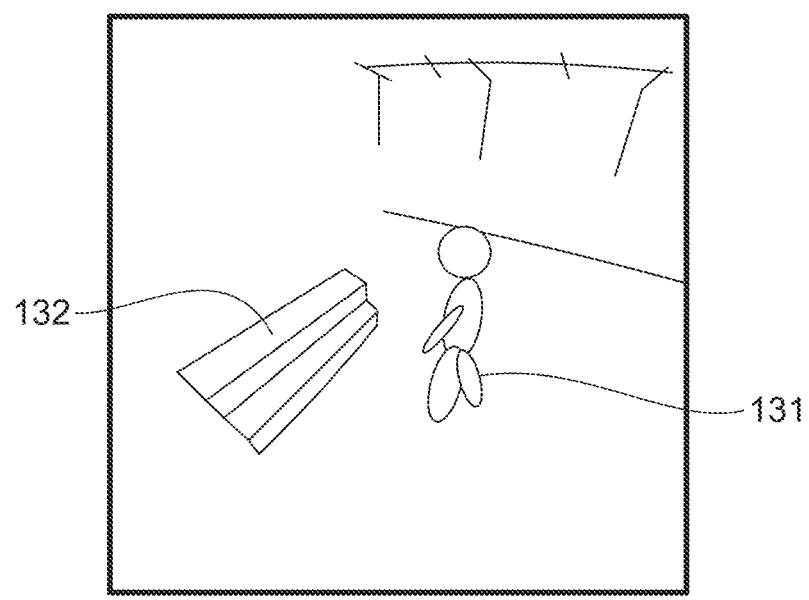
FIG. 11D is a view showing an image that is obtained by correcting distortion and blur of an image in the target visual field in FIG. 11C extracted from the superwide-angle image.

In this way, the display apparatus 800 applies the optical correction process and image stabilization process to the extracted image of the shape depending on the observation direction in the steps S800 and S900. Thereby, even if the specification of the overall control CPU 101 of the camera body 1 is low, the significantly distorted image in the target visual field 125m (FIG. 11C) is converted into the image around the child (A-object 131) of which the blur and distortion are corrected as shown in FIG. 11D. That is, after the user turns the power switch 11 ON and selects the mode with the image pickup mode switch 12, the user is able to obtain an image of the own observation direction, even if the user does not touch the camera body 1.

Hereinafter, the preset mode will be described. Since the camera body 1 is a compact wearable device, operation switches, a setting screen, etc. for changing advanced set values are not mounted on the camera body 1. Accordingly, in this embodiment, the advanced set values of the camera body 1 is changed using the setting screen (FIG. 13) of the display apparatus 800 as an external device.

For example, a case where the user would like to change the field angle from 90° to 45° while picking up a video image continuously is considered. In such a case, the following operations are needed. Since the field angle is set to 90° in a regular video image mode, the user performs the video image pickup operation in the regular video image mode, once finishes the video image pickup operation, displays the setting screen on the display apparatus 800, and changes the field angle to 45° on the setting screen. However, this operation to the display apparatus 800 during the continuous image pick-up operation is troublesome and an image that the user wants to pick up may be missed.

In the meantime, when the preset mode is preset to a video image pickup operation at the field angle of 45°, the user can change to a zoom-up video image pickup operation at the field angle of 45° immediately by only sliding the image pickup mode switch 12 to "Pre" after finishing the video image pickup operation at the field angle of 90°. That is, the user is not required to suspend the current image pickup operation and to perform the above-mentioned troublesome operations.

The contents of the preset mode may include the image stabilization level ("Strong", "Middle", or "OFF") and a set value of voice recognition that is not described in this embodiment in addition to the field angle.

Figure 11E:
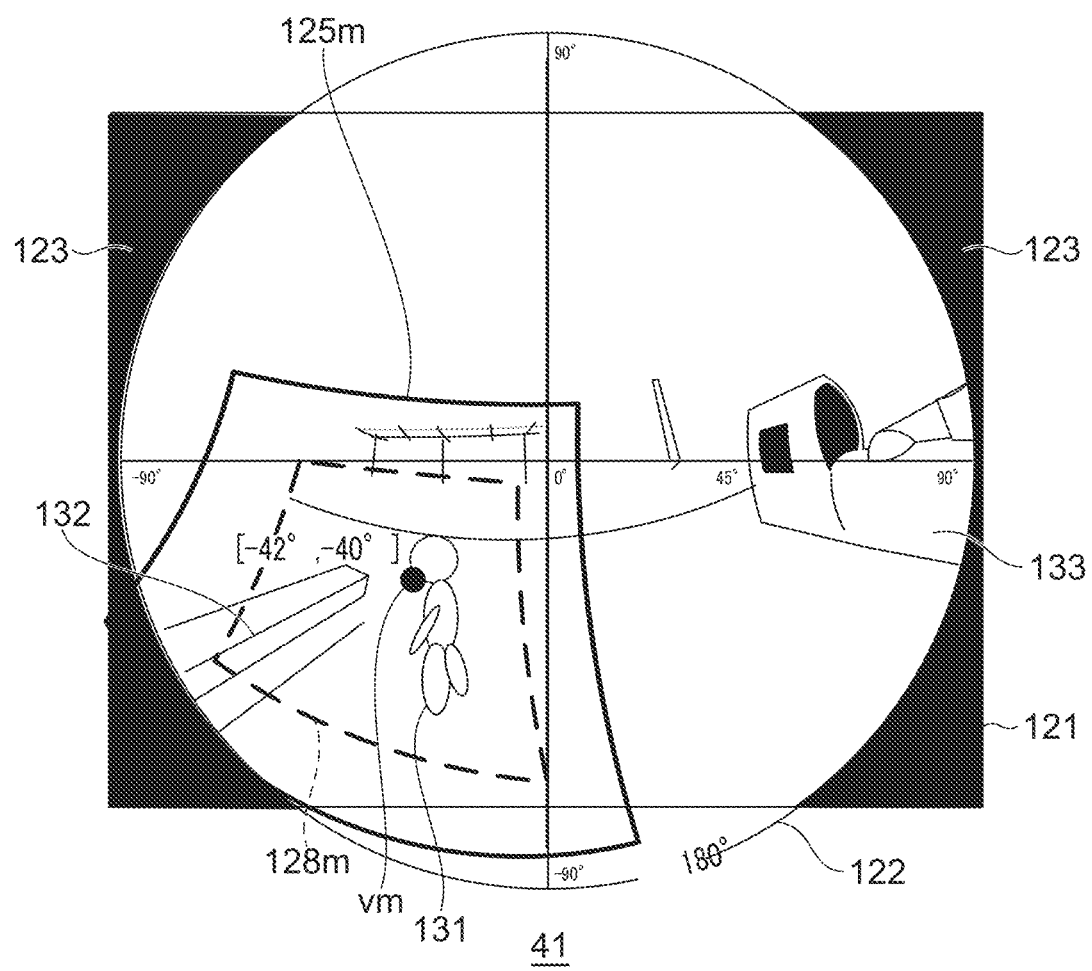
FIG. 11E is a view showing a target visual field set in the superwide-angle image in a case where the user is observing the A-object at a field-angle set value smaller than that in FIG. 11C.

For example, when the user switches the image pickup mode switch 12 from the video image mode to the preset mode while continuously observing the child (A-object 131) in the previous situation, the field-angle set value $V_{ang}$ is changed from 90° to 45°. In this case, the recording-direction/field-angle determination unit 30 extracts the image in the target visual field 128m shown by a dotted frame in FIG. 11E from the superwide-angle image picked up by the image pickup unit 40.

Figure 11F:
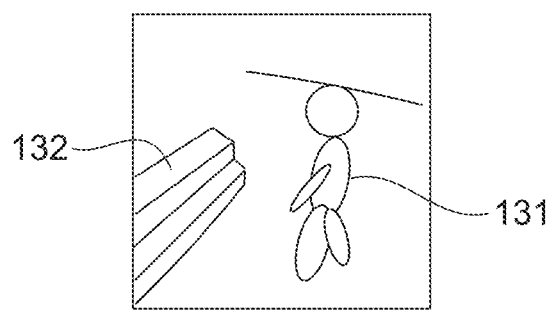
FIG. 11F is a view showing an image that is obtained by correcting distortion and blur of an image in the target visual field in FIG. 11E extracted from the superwide-angle image.

Also in the preset mode, the optical correction process and image stabilization process are performed in the display apparatus 800 in the steps S800 and S900. Thereby, even if the specification of the overall control CPU 101 of the camera body 1 is low, the zoom-up image around the child (A-object 131) of which the blur and distortion are corrected as shown in FIG. 11F is obtained. Although the case where the field-angle set value $V_{ang}$ is changed from 90° to 45° in the video image mode has been described, the process in the still image mode is similar. Moreover, a case where the field-angle set value $V_{ang}$ of a video image is 90° and the field-angle set value $V_{ang}$ of a static image is 45° is also similar.

In this way, the user is able to obtain the zoom-up image that picks up the own observation direction by just switching the mode with the image pickup mode switch 12 of the camera body 1.

Although the case where the face direction detection unit 20 and the image pickup unit 40 are integrally constituted in the camera body 1 is described in this embodiment, the configuration is not limited to this as long as the face direction detection unit 20 is worn on the user's body other than the head and the image pickup unit 40 is worn on the user's body. For example, the image-pickup/detection unit 10 of this embodiment can be worn on a shoulder or an abdomen. However, when the image pickup unit 40 is worn on a right shoulder, an object of the left side is obstructed by the head. In such a case, it is preferable that a plurality of image pickup units are worn on places including a right shoulder. Moreover, when the image pickup unit 40 is worn on an abdomen, spatial parallax occurs between the image pickup unit 40 and the head. In such a case, it is preferable to perform a correction calculation of the observation direction that compensate such parallax as described in a third embodiment.

Hereinafter, a second embodiment will be described. In the second embodiment, a method to calibrate individual difference and adjustment difference of a user who wears the camera body 1 is described in detail using FIG. 20A through FIG. 23E.

This embodiment is described as a derivation from the first embodiment basically. Accordingly, configurations of the camera system in the second embodiment that are identical to the configurations of the camera system in the first embodiment are indicated by the same reference numerals and duplicated descriptions are omitted. A different configuration will be described by adding details.

A user who wears the camera body 1 has individual difference and adjustment difference, such as a physique, a tilt angle of periphery of a neck to which the camera body 1 is worn, a state of a cloth like a collar in wearing, and adjustment states of the band parts 82L and 82R. Accordingly, the optical axis center of the image pickup lens 16 of the camera body 1 and the visual field center in a state (henceforth a natural state) where the user faces the front do not coincide usually. It is preferable for a user to match a center of an extraction recording area (target visual field 125) to a visual field center of the user in a current posture or operation rather than to match the center of the recording area to the optical axis center of the image pickup lens 16 of the camera body 1.

Moreover, there is individual difference not only in a visual field center of a user in the natural state but also in a visual field center depending on a head direction (up, down, right, left, or slants) and in a motion space of a head. Accordingly, individual difference also generates in the relationship between the face direction (observation direction) detected by the face direction detection unit 20 and the center position (hereinafter referred to as a visual field center position) of the target visual field 125 established according to the observation direction. Accordingly, a calibration operation that associates a face direction to a visual field center position is needed.

Usually, the calibration operation is preferably performed as a part of the preparation process (the step S100) in FIG. 7A. Although it is estimated of performing the calibration operation at the first start-up of the camera body 1 usually, the calibration operation may be performed when a predetermined time elapses after the previous calibration or when the position of the camera body 1 to the user is changed from the position at the previous calibration. The calibration operation may be performed when the face direction detection unit 20 becomes impossible to detect a user's face. Moreover, when it is detected that the user detaches the camera body 1, the calibration operation may be performed at the time when the user again wears the camera body 1. In this way, it is preferable to perform the calibration operation suitably at a timing when it is determined that the calibration is needed to use the camera body 1 appropriately.

Figure 20A:
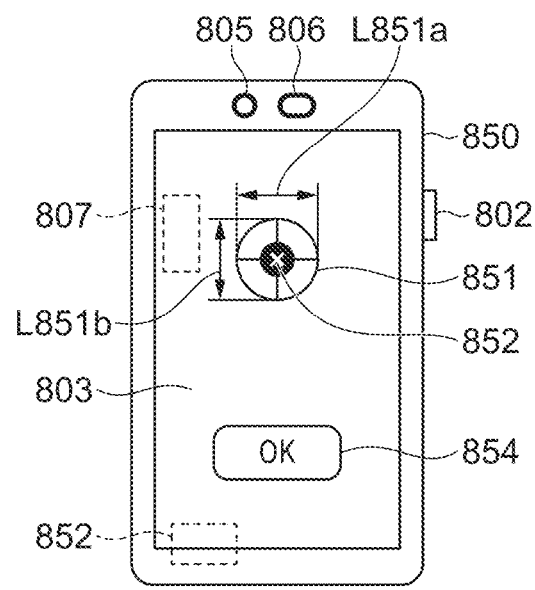
FIG. 20A and FIG. 20B are the views showing details of a calibrator used for a calibration process according to a second embodiment.
Figure 20B:
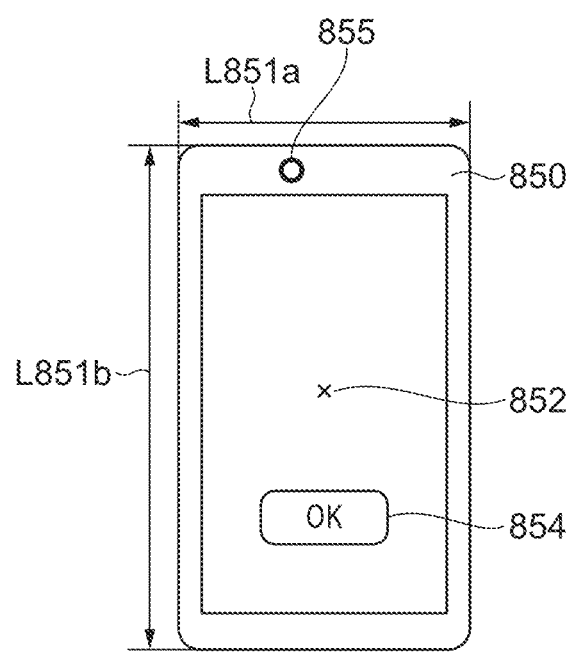

FIG. 20A and FIG. 20B are the views showing details of the calibrator 850 used for the calibration process according to the second embodiment. In this embodiment, the calibrator 850 shall combine the function of the display apparatus 800.

The calibrator 850 includes a positioning index 851 and calibration button 854 in addition to the A-button 802, display unit 803, in-camera 805, face sensor 806, and angular speed sensor 807 that are the components of the display apparatus 800 shown in FIG. 1D. The B-button 804 provided in the first embodiment is not illustrated in FIG. 20A because it is not used in this embodiment and is replaceable with the calibration button 854 as mentioned later.

FIG. 20A shows a case where the positioning index 851 is a specific pattern displayed on the display unit 803. FIG. 20B shows a case where the external appearance of the calibrator 850 is used as the positioning index. In the case of FIG. 20B, a positioning index center 852 mentioned later is calculated from the information about the contour of the calibrator 850.

It should be noted that the positioning index is not limited to the examples of FIG. 20A and FIG. 20B. For example, the positioning index may be separated from the calibrator 850. The positioning index may be anything as long as its size is easily measured and its shape is suitable to be looked at by the user. For example, the positioning index may be a lens cap of the image pickup lens 16 or the and a charge unit for the camera body 1. Anyway, since a fundamental way of thinking in the calibration operation is common, the calibrator 850 shown in FIG. 20A is exemplified and is mainly described hereinafter.

It should be noted that the calibrator 850 in this embodiment shall combine the function of the display apparatus 800. Moreover, the calibrator 850 may be a dedicated device, a general smart phone, or a tablet terminal, for example.

The positioning index 851 is an index displayed on the display unit 803 of the calibrator 850. A lateral width L851$a$ and vertical width L851$b$ of the positioning index 185 and the positioning index center 852 can be calculated. Since the user directs the face toward the vicinity of the central part of the positioning index 851 in the calibration process mentioned later, the positioning index 851 is preferably shaped so as to be caught at the visual field center. In FIG. 20A, the positioning index 851 is shown by a circle in which a cross and a small black circle at the center of the cross are arranged. However, the shape of the positioning index 851 is not limited to this shape. Otherwise, the positioning index may be a rectangle, a triangle, a star-shaped figure, or an illustration of a character.

The positioning index 851 is picked up by the image pickup unit 40 of the camera body 1. The display-apparatus controller (a position calculation unit and a distance calculation unit) 801 calculates a distance between the image-pickup/detection unit 10 and the calibrator 850 and a positional coordinate of the positioning index 851 appeared in an image area on the basis of the pickup image. The calibrator 850 equipped with the function of the display apparatus 800 performs these calculations in this embodiment. If the calibrator 850 does not combine the function of the display apparatus 800, these calculations are performed by the overall control CPU 101 of the camera body 1.

The angular speed sensor 807 can measure movement of the calibrator 850. On the basis of the measurement value of the angular speed sensor 807, the display-apparatus controller 801 calculates later-mentioned movement information that shows the position and posture of the calibrator 850.

The calibration button 854 is pressed when the user directs the face toward the vicinity of the central part of the positioning index 851. Although the calibration button 854 is a touch button displayed on the touch-sensitive display unit 803 in FIG. 20A, the A-button 802 or the B-button 804 may function as the calibration button.

Next, the calibration process executed in extracting an image from a superwide-angle image picked up by the image pickup unit 40 according to a user's face direction and in applying the image process to the extracted image will be described in detail using a flowchart in FIG. 21.

Figure 21:
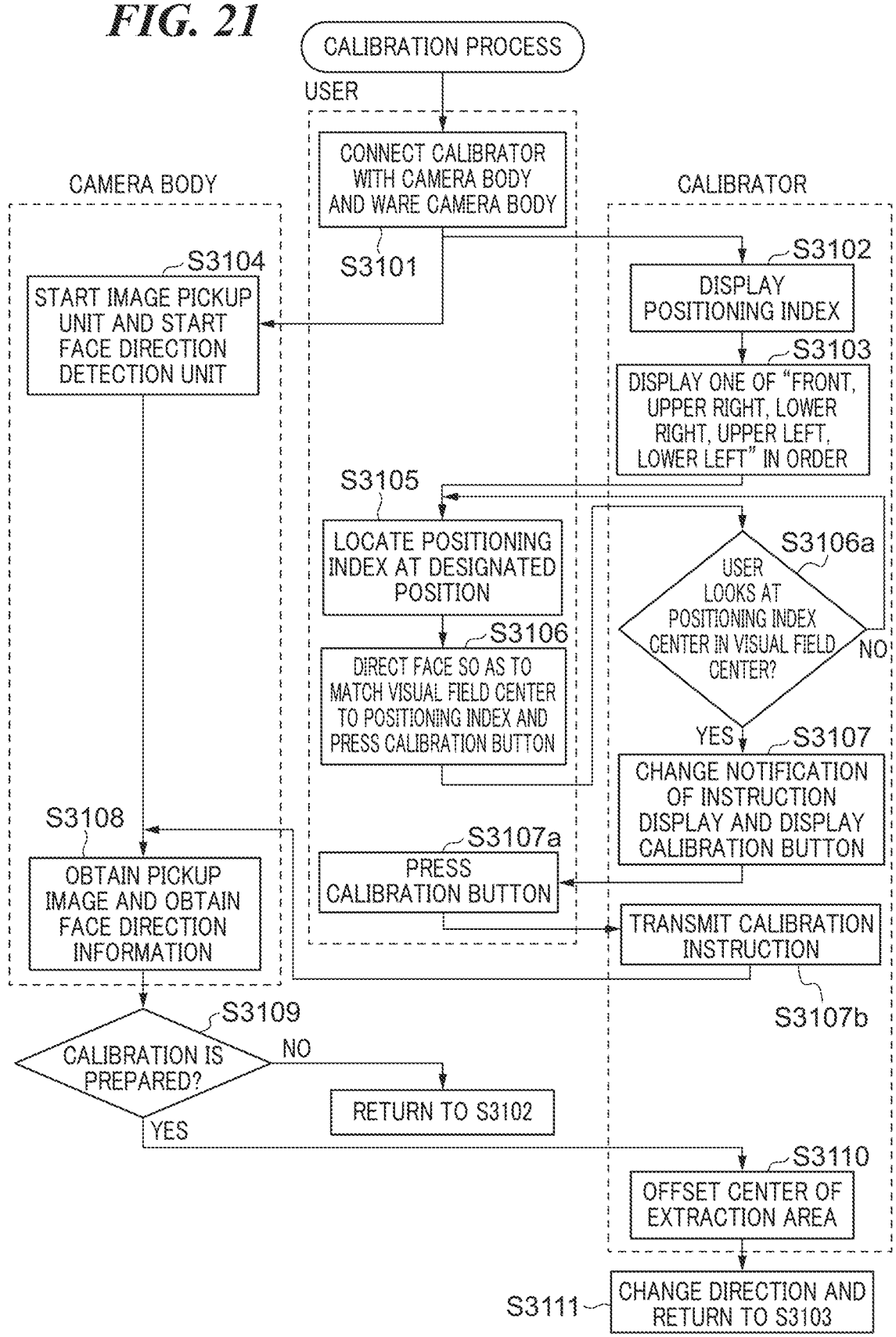
FIG. 21 is a flowchart showing the calibration process according to the second embodiment executed by the camera body and the calibrator.

FIG. 21 is the flowchart showing the calibration process according to the second embodiment executed by the camera body (a first calibration unit) 1 and calibrator 805.

In order to assist the description, a step in which the camera body 1 or the calibrator 850 receives a user's instruction is included in a frame of which an operation subject is the user. Moreover, in FIG. 21, a step executed by the display-apparatus controller 801 of the calibrator 850 in response to the user's instruction is included in a frame of which an operation subject is the calibrator 850. Similarly, in FIG. 21, a step executed by the overall control CPU 101 of the camera body 1 in response to the user's instruction is included in a frame of which an operation subject is the camera body 1.

Specifically, the operation subject of steps S3104 and S3108 in FIG. 21 is the camera body 1. And the operation subject of steps S3101, S3105, and S3106 is the user. Moreover, the calibrator 850 is the operation subject of steps S3102, S3103, S3106$a$, S3107, S3107$b$, and S3110.

In this process, when the power of the calibrator 850 is not ON, the user turns the power of the calibrator 850 ON by operating the A-button 802 in a step S3101. Similarly, when the power of the camera body 1 is not ON, the user turns ON the power of the camera body 1 by switching the power switch 11 to ON. After that, the user establishes a connection between the calibrator 850 and the camera body 1. When this connection is established, the display-apparatus controller 801 and the overall control CPU 101 enter a calibration mode, respectively.

Moreover, in the step S3101, the user wears the camera body 1, and adjusts the lengths of the band parts 82L and 82R and the angle of the camera body 1 so that the camera body 1 will be arranged in a suitable position and the image-pickup/detection unit 10 can pick up an image.

In a step S3102, the display-apparatus controller (a first display unit) 801 displays the positioning index 851 on the display unit 803.

Figure 22A:
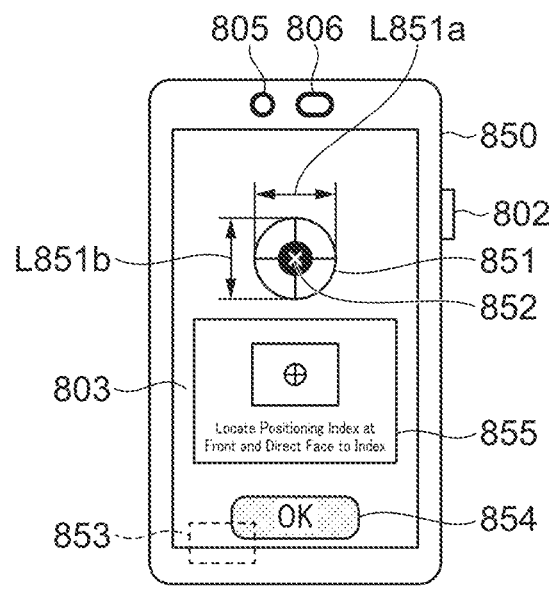
FIG. 22A is a view showing a screen displayed on a display unit of the calibrator in a step S3103 in FIG. 21 during a calibration operation for a front direction of the user.

In the next step S3103, the display-apparatus controller 801 notifies the user of a designation position at which the user should hold the calibrator 850 by an instruction display 855 (FIG. 22A). In this embodiment, five positions including front, upper right, lower right, upper left, and lower left are designated as the designation positions in order. The designation positions may be set to other positions as long as the calibration is available.

In a step S3104, the overall control CPU 101 activates the image pickup unit 40 so as to enable an image pickup operation and activates the face direction detection unit 20 so as to enable detection of a user's face direction. In a step S3105, the user holds the calibrator 850 at the designation position notified in the step S3103.

In the next step S3106, the user directs the face in the direction of the positioning index 851 to match a user's visual field center with the positioning index 851 and presses the calibration button 854 while maintaining the position of the calibrator 850 at the designation position.

In a step S3106a, the display-apparatus controller (a second display unit) 801 determines whether the user looks at the positioning index center 852 of the positioning index 851, i.e., determines whether the user's visual field center matches the positioning index center 852. When it is determined that the user looks at the positioning index center 852 (YES in the S3106a), the display-apparatus controller 801 notifies the user of start of the calibration for the designation position by the instruction display 855 in a step S3107 and redisplays the calibration button 854. When the determination result in the step S3106a is NO, the user repeats the process from the step S3105.

When the user presses the calibration button 854 in the step S3107a, the display-apparatus controller 801 transmits a calibration instruction to the camera body 1 in a step S3107b.

In a step S3108, the overall control CPU (an obtainment/detection unit) 101 obtains a superwide-angle image including the positioning index 851 picked up by the image pickup unit 40 and detects a face direction by the face direction detection unit 20 in response to the calibration instruction from the calibrator 850. After that, the overall control CPU (a generation unit) 101 calculates positional coordinate information about the positioning index center 852 in the obtained superwide-angle image and generates the information showing the relationship between the calculated positional coordinate information and the detected face direction.

Hereinafter, the details of the process in the steps S3103 through S3108 will be described using FIG. 22A through FIG. 22F. FIG. 22A through FIG. 22F are views for describing the calibration operation for the front direction of the user. The calibration operation is performed so that the center position of the target visual field 125 in the image picked up by the image pickup unit 40 of the camera body 1 will match the visual field center position of the user in the natural state.

FIG. 22A is a view showing a screen displayed on the display unit 803 of the calibrator 850 in the step S3103 in FIG. 21 during the calibration operation for the front direction of the user.

As shown in FIG. 22A, the positioning index 851 and the instruction display 855 that indicates a position at which the user should locate the positioning index 851 are displayed on the display unit 803 of the calibrator 850.

The instruction display 855 is a character string that instructs the user to locate the positioning index 851 at the visual field center of the user in directing the face to the front. It should be noted that the instruction displayed as the instruction display 855 is not restricted to the character string. For example, the instruction may be displayed by another method using an illustration, a picture, a moving image, or the like. Moreover, the instruction display 855 like what is called a general tutorial may be displayed first and the positioning index 851 may be displayed after that.

Figure 22B:
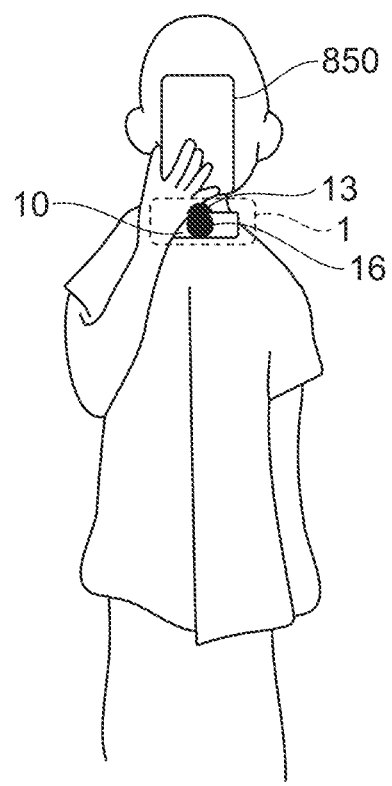
FIG. 22B is a view showing a state where the user holds the calibrator in the front according to an instruction shown as an instruction display in FIG. 22A.

FIG. 22B is a view showing a state where the user holds the calibrator 850 in the front according to the instruction displayed as the instruction display 855 in FIG. 22A.

In a step S3105, the user holds the calibrator 850 in the front according to the instructions displayed as the instruction display 855 in FIG. 22A. Then, in a step S3106, the user holds the calibrator 850 so that the positioning index 851 will match the visual field center of the user in directing the face to the front, and the user presses the calibration button 854 (FIG. 22A). In response to the press of the calibration button 854, the determination in the step S3106a is performed. The concrete procedure of this determination method will be mentioned later. When the determination result in the step S3106a is YES, the display-apparatus controller 801 changes the instruction display 855 shown in FIG. 22A to a notification of "Calibration for Front Direction is Started" and displays the calibration button 854.

Then, the user presses the calibration button 854 after confirming the change of the instruction display 855 shown in FIG. 22A to the notification of "Calibration for Front Direction is Started" (a step S3107a). In response to the press of the calibration button 854, a calibration instruction is transmitted to the camera body 1 in a step S3107b. And the image pickup unit 40 obtains a pickup image in a step S3108.

Figure 22C:
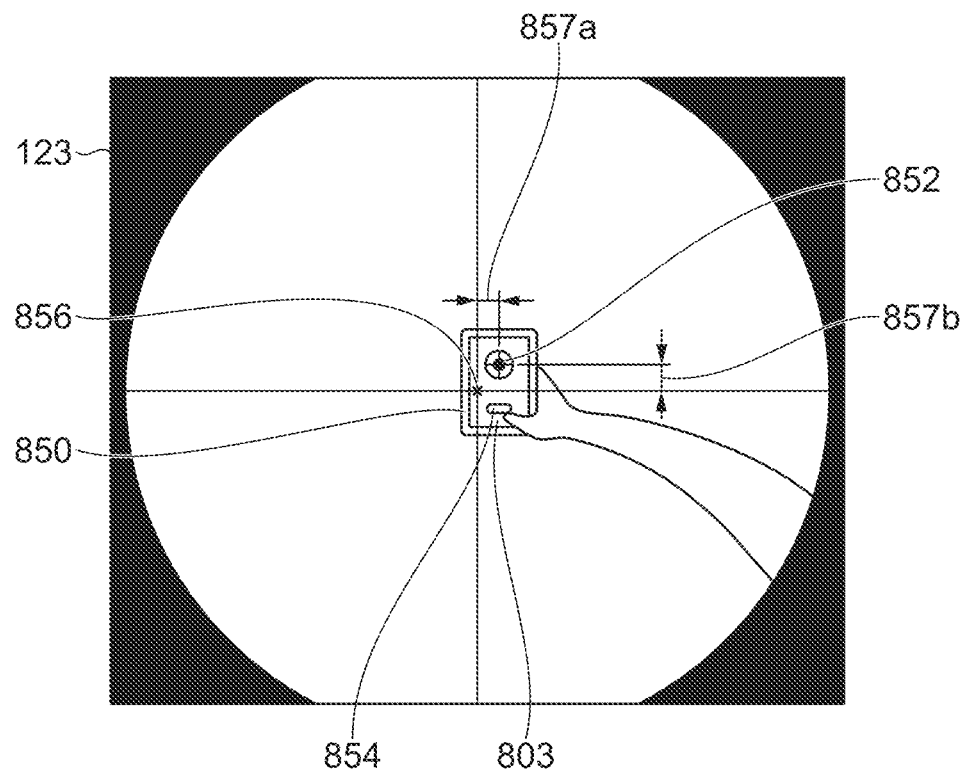
FIG. 22C is a schematic view showing an entire superwide-angle image that is caught by an image pickup lens in the state in FIG. 22B.
Figure 22D:
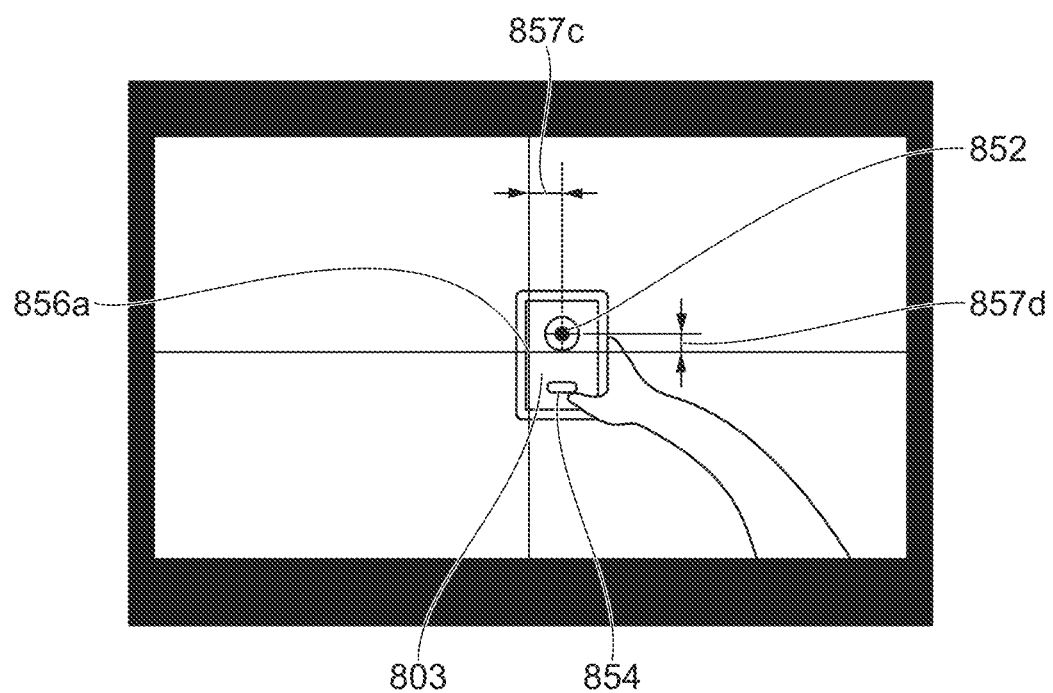
FIG. 22D is a schematic view showing an image that is obtained by correcting aberrations of the superwide-angle image shown in FIG. 22C.

FIG. 22C is a schematic view showing the entire superwide-angle image that is caught by the image pickup lens 16 in the state of FIG. 22B. FIG. 22D is a schematic view showing an image obtained by correcting aberrations of the superwide-angle image shown in FIG. 22C.

Moreover, in response to the press of the calibration button 854 by the user in the state of FIG. 22B, the face direction detection unit 20 obtains a face direction in the step S3108.

Figure 22E:
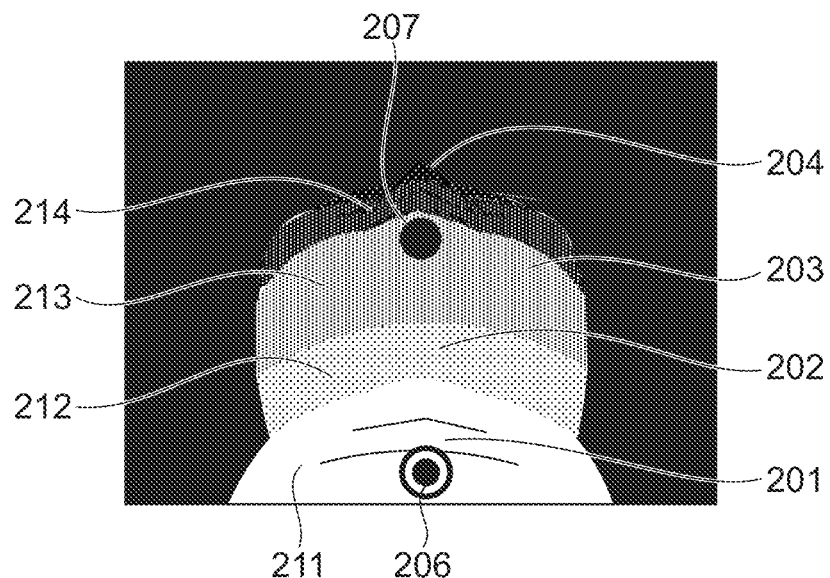
FIG. 22E is a schematic view showing a face direction image that is obtained by a face direction detection unit in a step S3108 in FIG. 21 during the calibration operation for the front direction of the user.

FIG. 22E is a schematic view showing a face direction image that is recorded by the face direction detection unit 20 in the step S3108 in FIG. 21 during the calibration operation for the front direction of the user.

As described in the first embodiment using FIG. 8G through FIG. 8K, the face direction detection unit 20 calculates the angles in the lateral and vertical directions of the face using the distances and angles of the chin positions 207, 207r, and 207u with respect to the throat position 206. However, since the distances and angles of the chin positions 207, 207r, and 207u with respect to the throat position 206 also have the individual difference and adjustment difference due to the user's physique etc. mentioned above as with the image center, they are not fixed. Accordingly, in this embodiment, the relationship between the chin position and the throat position 206 at the time of pressing the calibration button 854 is defined as a value of a case where the user puts the visual field center in the front. This enables correct calculation of the user's face direction irrespective of the individual difference and adjustment difference.

Returning back to FIG. 21, in a step S3109, the overall control CPU 101 determines whether the calibration for the front direction is prepared. That is, it is determined whether the information required to calculate the chin position 207, throat position 206, and positioning index center 852 has been obtained.

At this time, when the obtainment of the required information is not completed, it is determined that the calibration is not prepared (NO in the step S3109), and the operations from the step S3102 are repeated so as to obtain deficient information among the required information. When the obtainment of the required information is not completed, not all the operations from the step S3102 are necessary. Only the operations to obtain the deficient information may be performed again.

The determination in the step S3106a is performed using the face sensor 806 or in-camera 805 mounted in the calibrator 850. Hereinafter, the concrete procedure of this determination method will be described using a case where the calibration operation for the front direction is performed using the in-camera 805. Although a case using the face sensor 806 is different from the case using the camera in the dimension of information (two-dimensional information or three-dimensional information), a fundamental way of thinking is common. Accordingly, detailed description of the case using the face sensor 806 is omitted. When the face sensor 806 is used in the determination in the step S3106a, the face direction detection unit 20 of the camera body 1 does not perform the face detection that irradiates the user with the infrared light 23 during a period when the user is irradiated with the infrared light 823 from the face sensor 806. This aims to prevent interference of the infrared lights 23 and 823.

First, when the user presses the calibration button 854 in FIG. 22A in the step S3106, the display-apparatus controller 801 obtains an in-camera image 858 (FIG. 22F) with the user in it by picking up an image with the in-camera (a face detection unit) 805. Furthermore, the display-apparatus controller 801 detects the position information about the neck front part 201, chin 203, face 204 including a nose, and image-pickup/detection unit 10 (the image pickup unit 40) from the obtained in-camera image 858.

The display-apparatus controller (a determination unit) 101 determines whether the user is looking at the positioning index center 852 of the positioning index 851 at the visual field center in the step S3106a using the position information detected from the in-camera image 858.

As a result of the determination, when it is determined that the user is looking in a different direction, the display-apparatus controller 801 displays a message indicating that the correct information cannot be obtained as the instruction display 855. This can instruct the user to perform the calibration operation again.

The display-apparatus controller 801 can determine that the correct calibration operation cannot be performed using the in-camera image 858 when the image-pickup/detection unit 10 tilts beyond a certain angle or when the face direction detection window 13 is blocked or is dirty. In such a case, the display-apparatus controller 801 may display the message indicating that the correct information cannot be obtained as the instruction display 855.

Furthermore, it is also able to obtain information required for parallax correction mentioned later in a fifth embodiment using the in-camera image 858 obtained in the step S3106a and the superwide-angle image obtained in the step S3108.

Specifically, the information about the size (the lateral width L851a and vertical width L851b) of the positioning index 851 is transmitted to the camera body 1 beforehand from the calibrator 850 before the positioning index 851 is picked up by the image pickup unit 40 in the step S3108.

Thereby, the overall control CPU 101 can calculate the distance between the image-pickup/detection unit 10 and the positioning index 851 by using the information about the size of the positioning index 851 and the image of the positioning index 851 appeared in the superwide-angle image obtained in the step S3108. Since the positioning index 851 is included in the calibrator 850 that is the same housing as the in-camera 805 and the calibrator 850 is directly faced to the user in FIG. 22B, the distance between the in-camera 805 and the image-pickup/detection unit 10 is equal to the distance between the positioning index 851 and the image-pickup/detection unit 10.

Figure 22F:
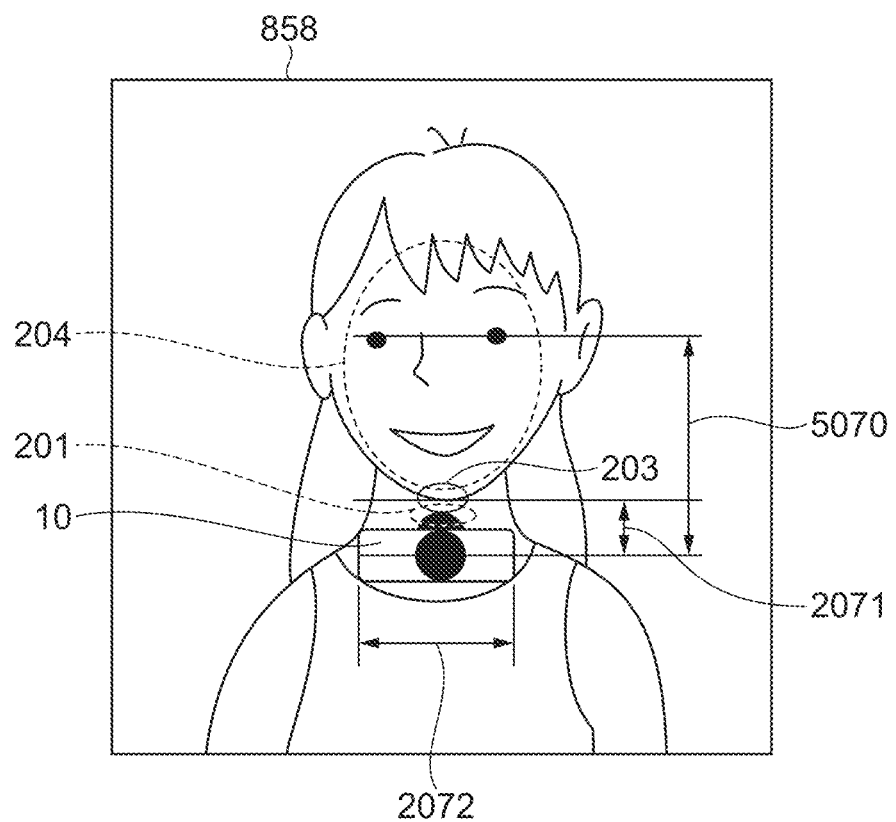
FIG. 22F is a schematic view showing an in-camera image displayed in a step S3107 in FIG. 21.

Similarly, information about the size of the image-pickup/detection unit 10 is transmitted to the calibrator 850 beforehand from the camera body 1 before the in-camera image shown in FIG. 22F is picked up by the in-camera 805 in the step S3106a. Thereby, the display-apparatus controller (a vertical distance calculation unit) 801 can estimate a vertical distance 5070 between the optical axis center the image pickup lens 16 and a view position of the user by using the information about the size of the image-pickup/detection unit 10 and the image of the image-pickup/detection unit 10 appeared in the in-camera image 858 shown in FIG. 22F. In addition, the display-apparatus controller 801 can estimate a distance 2071 between the image pickup lens 16 and the chin 203 of the user. The distance 2071 may be a distance between the face direction detection window 13 and the chin 203.

In order that the face direction detection unit 20 calculates the throat position 206 and chin position of the user, it is necessary to separate the user's face from the face direction detection window 13 at a distance more than a certain distance according to design of the face direction detection unit 20. Accordingly, this estimated result can be employed as one of determination conditions in determining whether the face direction detection unit 20 is able to detect the face direction correctly.

Returning back to FIG. 21, the overall control CPU 101 proceeds with the process to the step S3110 when determining that the required information is obtained and that the preparation of the calibration for the front direction is completed.

In the step S3110, the display-apparatus controller (the first calibration unit) 801 calculates information required to offset the extraction center position so as to absorb the individual difference and adjustment difference and offsets the extraction center position on the basis of the information.

Details of the calculation in the step S3110 will be described as follows. If the user is in an ideal state according to design values and the camera body 1 is worn ideally, a center 856 of the superwide-angle image obtained in the step S3108 shown in FIG. 22C should be almost coincident with the positioning index center 852 appeared in the superwide-angle image. However, since there are individual difference and adjustment difference due to the user's physique etc. actually, the center 856 of the superwide-angle image does not match with the positioning index center 852 usually.

It is preferable for a user to match the extraction center position to a visual field center of the user in a current posture or operation (i.e., the positioning index center 852 in the superwide-angle image) rather than to match to the center 856 of the superwide-angle image shown by the camera body 1.

Accordingly, a deviation amount of the positioning index center 852 from the center 856 of the superwide-angle image is measured, and the extraction center position is offset to a position based on the positioning index center 852 that differs from the center 856 of the superwide-angle image. Moreover, the face direction that is detected by the face direction detection unit 20 in that time is also offset in a similar way.

Concrete offset methods will be described by referring to FIG. 22C and FIG. 22D. The deviation amount of the positioning index center 852 to the center 856 of a superwide-angle image is measured. And the measured deviation amount is divided into a lateral deviation amount 857*a* and a vertical deviation amount 857*b* as shown in FIG. 22C. An offset amount is determined on the basis of the deviation amounts 857*a* and 857*b* after performing a suitable conversion process corresponding to the projection method of the entire field angle.

Moreover, as shown in FIG. 22D, the offset amount may be determined after applying the suitable conversion process to the superwide-angle image corresponding to the projection method. That is, the deviation amount of the center 856*a* from the positioning index center 852 in the superwide-angle image after conversion is measured. And the deviation amount is divided into a lateral deviation amount 857*c* and a vertical deviation amount 857*d*. Then, the offset amount may be determined on the basis of the deviation amounts 857*c* and 857*d*.

The offset method can be arbitrarily selected from among the methods shown in FIG. 22C and FIG. 22D in consideration of the processing load and the object of the camera system.

By performing the above-mentioned calibration operation for the front direction, a face direction of a user who wears the camera body 1, a visual field center in the face direction within a superwide-angle image, and a face direction detected by the face direction detection unit 20 are appropriately associated irrespective of individual difference and adjustment difference.

The calibration operation for the front direction is described up to here among the five directions (front, upper right, lower right, upper left, and lower left). It is necessary to execute similar calibration operations for the remaining four directions.

Accordingly, when the process in the step S3110 in FIG. 21 is completed, the process proceeds to a step S3111. In the step S3111, when there is a direction for which the calibration operation is not performed among the five directions, a target direction of the calibration operation is changed, and the process returns to the step S3103. Thereby, the calibration operation is similarly repeated for the remaining four directions other than the already finished front direction.

Although it is not shown in FIG. 21, when it is determined that there is no direction for which the calibration operation is not performed in the step S3111, this process is finished as-is.

FIG. 23A through FIG. 23E are views for describing the calibration operation for an upper right direction of the user (the upper right direction in the superwide-angle image). FIG. 23A through FIG. 23E respectively correspond to FIG. 22A through FIG. 22E and the fundamental operation is also identical. Accordingly, the common description is omitted.

Figure 23A:
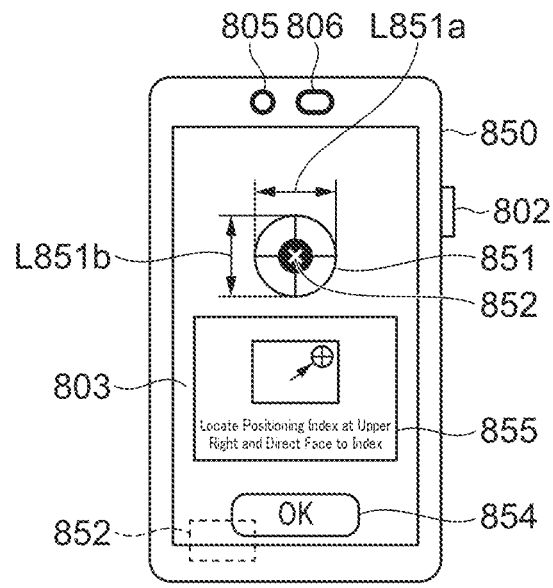
FIG. 23A is a view showing a screen displayed on the display unit of the calibrator in the step S3103 in FIG. 21 during the calibration operation in an upper right direction of the user.

As shown in FIG. 23A, the instruction display 855 displays a character string that instructs the user to locate the positioning index 851 at the visual field center of the user in directing the face to the upper right.

Figure 23B:
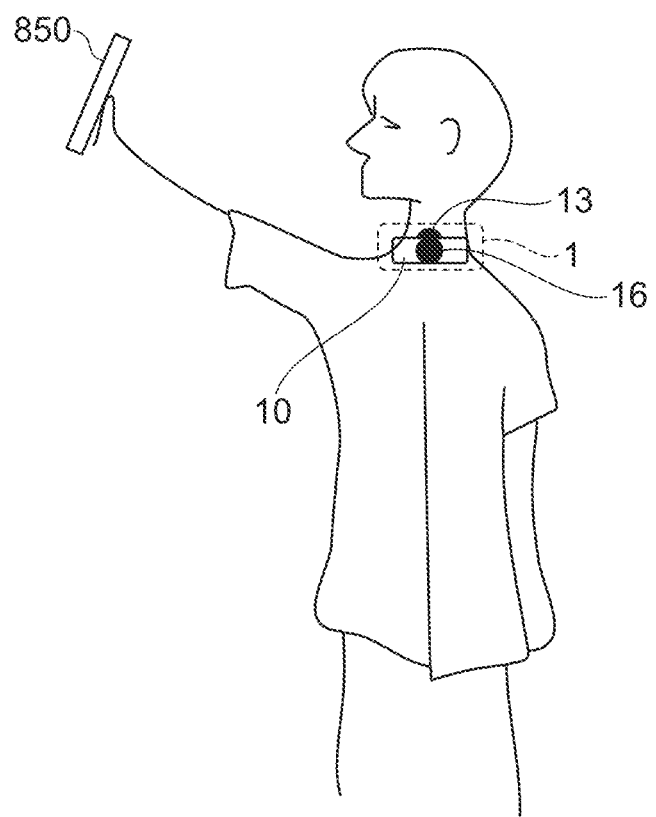
FIG. 23B is a view showing a state where the user holds the calibrator to upper right according to an instruction shown as the instruction display in FIG. 23A.
Figure 23C:
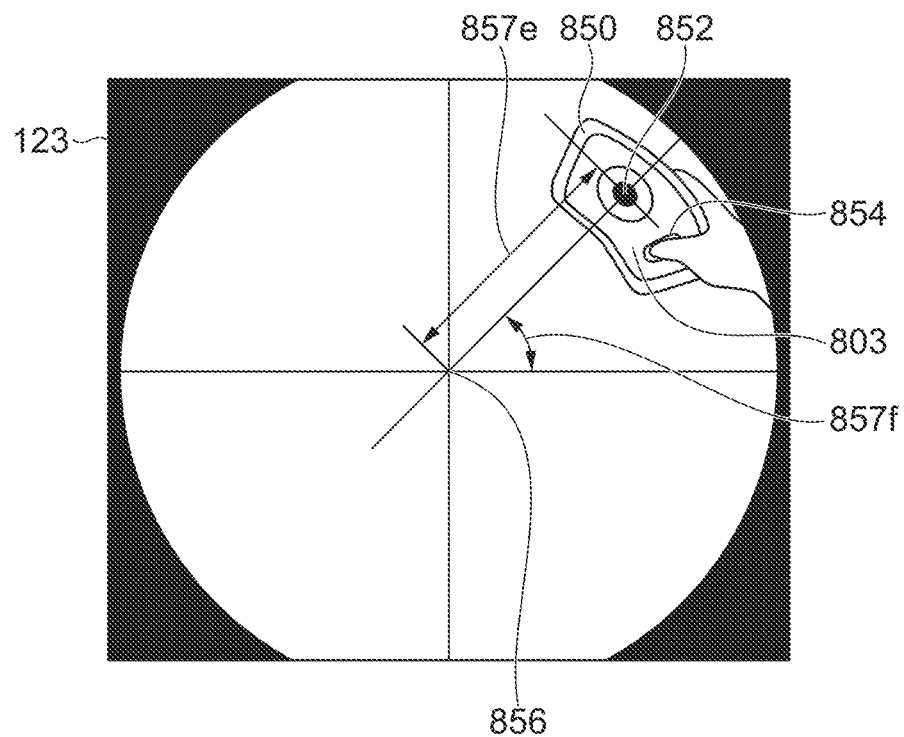
FIG. 23C is a schematic view showing the entire superwide-angle image that is caught by the image pickup lens in the state in FIG. 23B.

FIG. 23B is a view showing a state where the user holds the calibrator 850 to upper right according to an instruction shown by the instruction display 855 in FIG. 23A. FIG. 23C is a schematic view showing the entire superwide-angle image that is caught by the image pickup lens 16 in the state in FIG. 23B.

As shown in FIG. 23C, a deviation amount between the center 856 of the superwide-angle image and the positioning index center 852 is measured first according to a concrete offset method. After that, the measured deviation amount is divided into a radial deviation amount 857*e* and an angular deviation amount 857*f*. An offset amount is determined on the basis of the deviation amounts 857*e* and 857*f* after performing a suitable conversion process corresponding to the projection method of the entire field angle.

Figure 23D:
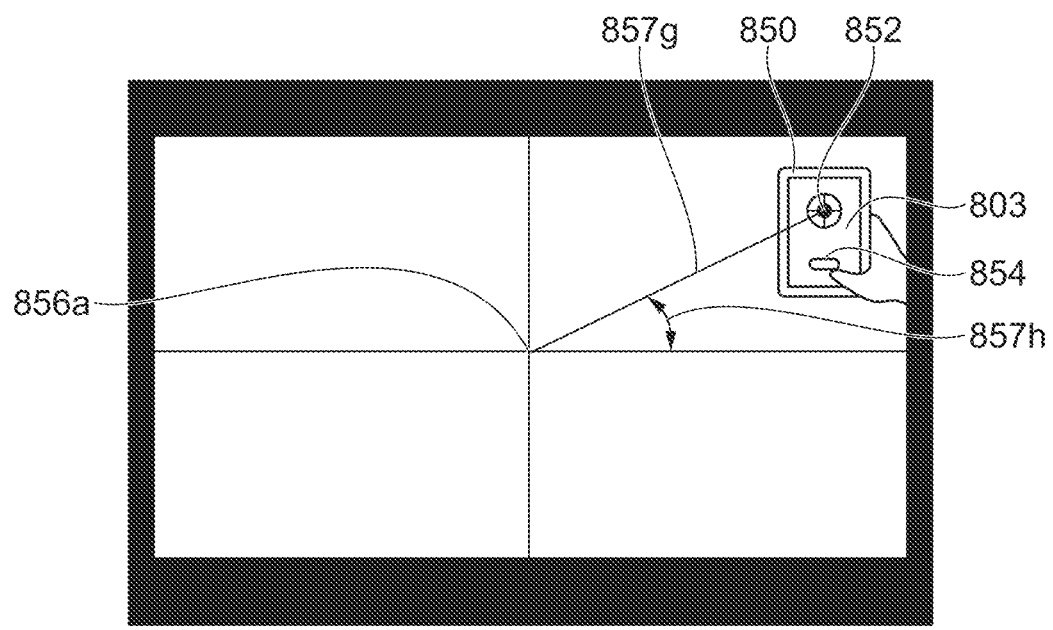
FIG. 23D is a schematic view showing an image that is obtained by correcting aberrations of the superwide-angle image shown in FIG. 23C.
Figure 23E:
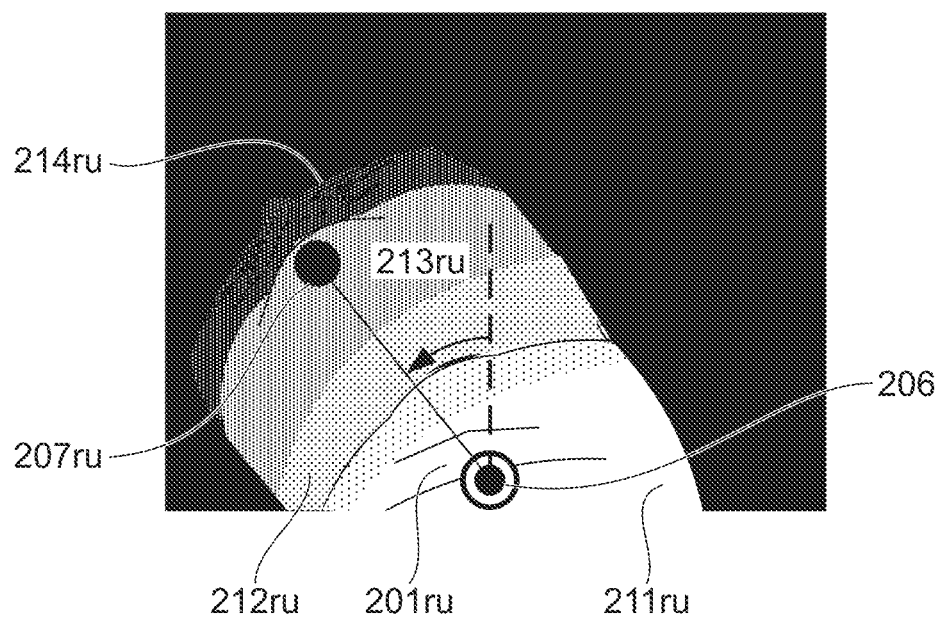
FIG. 23E is a schematic view showing a face direction image that is obtained by the face direction detection unit in the step S3108 in FIG. 21 during the calibration operation for the upper right direction of the user.

Moreover, as shown in FIG. 23D, the offset amount may be determined after applying the suitable conversion process to the superwide-angle image corresponding to the projection method. That is, the deviation amount of the center 856*a* from the positioning index center 852 in the superwide-angle image after conversion is measured. And the deviation amount is divided into a radial deviation amount 857*g* and an angular deviation amount 857*h*. Then, the offset amount may be determined on the basis of the deviation amounts 857*g* and 857*h*.

The determination of the offset amount described using FIG. 22A through FIG. 22E employs the method of dividing the deviation amount into the lateral deviation amount and vertical deviation amount. As compared with this, the determination of the offset amount described using FIG. 23A through FIG. 23E employs the method of dividing the deviation amount into the radial deviation amount and angular deviation amount. The difference in method is only for convenience of description, and either method can be employed.

Moreover, the face direction detection unit 20 has obtained, as shown in FIG. 23 E, the throat position 206 and the chin position 207*ru* required to calculate the face direction in directing the face to the upper right. Accordingly, the face direction of the user in looking in the direction (in this case, the upper right direction) toward the positioning index center 852 can be correctly measured irrespective of individual difference and adjustment difference of the user.

As mentioned above, the calibration operations for upper right, lower right, upper left, and lower left directions in addition to the front direction will be performed in the calibration process shown in FIG. 21. Thereby, when the user turns the head in either of the upper, lower, right, and left directions, the face direction detection unit 20 can correctly detect the direction in which the user turns. Accordingly, the user can use the camera body 1 appropriately irrespective of individual difference and adjustment difference.

In the above description, the method of performing the calibration operation repeatedly for the five directions (front, upper right, lower right, upper left, and lower left) is described to simplify the description.

However, the calibration operation is not limited to this method. For example, the following method may be employed. That is, a user continuously moves the calibrator 850 according to the instruction display 855. At the same time, the user continuously catches the positioning index 851 displayed on the calibrator 850 at the visual field center. The user moves the calibrator 850 along a Z-shaped locus, a spiral locus, a polygonal locus, or the like. In this method, the display-apparatus controller 801 transmits the calibration instructions to the camera body 1 multiple times while the calibrator 850 is moving.

Whenever receiving the calibration instruction, the overall control CPU 101 obtains the face direction detected by the face direction detection unit 20 and the positional coordinate information about the positioning index center 852 in the superwide-angle image picked up by the image pickup unit 40, and saves them as history information. After that, the overall control CPU 101 calculates the relationship of the extraction center position of the image and the face direction of the user by combining the information extracted from the obtained history information. Furthermore, in this method, the information extracted from the history information may be limited to the information obtained when the user looks at the positioning index 851. The information is limited using the information about the in-camera 805 and face sensor 806 obtained by the calibrator 850 during movement of the calibrator 850. Thereby, the information obtained when the user is looking away is no longer extracted from the history information, which raises the accuracy of calculation of the relationship.

Moreover, the display-apparatus controller 801 may transmit a measurement value of the angular speed sensor 807 to the camera body 1 together with the calibration instruction. In this case, the overall control CPU 101 obtains movement information showing a moving locus of the calibrator 850 by the user and the position and posture of the calibrator 850 from the transmitted measurement value of the angular speed sensor 807. The movement information is also saved as the history information. Thereby, the calibration operation can be performed easily and correctly on the basis of the movement information based on the measurement value of the angular speed sensor 807, the face direction detected by the face direction detection unit 20, and the positional coordinate information about the positioning index center 852 in the superwide-angle image picked up by the image pickup unit 40.

In this case, the movement information based on the measurement value of the angular speed sensor 807 should be coincident with the movement information based on the positional coordinate information about the positioning index 851. Accordingly, when the measurement value of the angular speed sensor 807 is used, it is required to synchronize communication between the camera body 1 and the calibrator 850.

As mentioned above, the second embodiment describes the calibration method that enables to associate the face direction of the user with the center position of the target visual field 125 set in the superwide-angle image irrespective of individual difference and adjustment difference. In the meantime, the present disclosure is not limited to the various configurations exemplified in the second embodiment and various modifications are available within the scope of the present disclosure.

Next, a third embodiment will be described. In the third embodiment, a method to prevent visually induced motion sickness caused by the secondarily recorded image is described using FIG. 24A through FIG. 26.

This embodiment is described as a derivation from the first embodiment basically. Accordingly, configurations of the camera system in the third embodiment that are identical to the configurations of the camera system in the first embodiment are indicated by the same reference numerals and duplicated descriptions are omitted. A different configuration will be described by adding details.

As a result of advance of imaging technology, a CG image just like a photographed image and a powerful 3D video image can be easily enjoyed.

In the meantime, when such a 3D video image is an image with dynamic movement like a VR video image or an image with much camera shake, the visually induced motion sickness tends to occur while viewing the image. Since the visually induced motion sickness causes a symptom like motion sickness, interest in its safety measure is increasing.

The camera system shall be designed so that an image in a direction toward which a user's face is directing is extracted and developed as-is in the recording area development process (the step S500). In such a case, when the user's face moves quickly during the image pickup operation by the image pickup unit 40 (step S400), image scenes also switch at a fast speed.

Although the user who moves the face quickly during the image pickup operation by the image pickup unit 40 does not get sick, an appreciation person who appreciates the image that is secondarily recorded in the step S1000 may suffer from the visually induced motion sickness when the image includes the image scene of the quick movement.

The above-mentioned publications disclose the technique of picking up an image in a direction toward which a face is directed, but they do not disclose a counterplan to such visually induced motion sickness. Accordingly, this embodiment provides a camera system that prevents an appreciation person from suffering from the visually induced motion sickness. Therefore, even if the user moves the face quickly during the image pickup operation by the image pickup unit 40, the camera system controls so that the finished image does not include image scenes that are switched at a fast speed.

As described using FIG. 8H through FIG. 8K or FIG. 10B through FIG. 10D, the user's face may turn in the upper/lower/right/left directions during the image pickup operation by the image pickup unit 40. Accordingly, the direction and speed of the movement of the user's face are represented by an angular speed $\omega$, and its moving amount is represented by an angle $\theta$. The angular speed $\omega$ is calculated by dividing the angle $\theta$ detected by the face direction detection unit 20 by a detection period.

Human actions that quickly move a face include looking back, a glance, a moving object observation, etc.

The looking back is an action that a person looks back when loud sound occurs, for example. The glance is an action that a person once looks at something that caused worrisome change in a visual field and then returns the face to the former position because it is almost uninterested. The moving object observation is an action that a person continuously observes a moving object, such as a bird and a kite that fly in the sky freely.

When such an action occurs during the image pickup operation by the image pickup unit 40, and when an image in a direction toward which a user's face is directing is extracted and developed as-is in the recording area development process, an appreciation person who appreciates a finished image may suffer from the visually induced motion sickness as mentioned above.

Accordingly, the overall control CPU 101 determines that the action that quickly moves the face (one of the looking back, glance, and moving object observation) occurs when the state where the angular speed $\omega$ is equal to or more than a threshold $\omega_0$ is kept beyond a first predetermined time. Furthermore, when the overall control CPU 101 determines that the occurred action is neither the glance nor the moving object observation according to a method mentioned later using FIG. 25A and FIG. 25B, the overall control CPU 101 determines that the action is the looking back. In this case, the overall control CPU 101 does not immediately extract the image in the direction toward which the user's face is directing in the recording area development process. Instead, the overall control CPU 101 delays the extraction of the image with respect to the movement of the user's face (delay extraction).

In this embodiment, the threshold $\omega_0$ is set to $\pi/8$ rad/s. This is a speed at which a face turns from the front (0°) to the just side (90°) in 4 seconds. In the meantime, the threshold $\omega_0$ is not limited to $\pi/8$ rad/s. For example, the threshold $\omega_0$ may be set to $(n \cdot \pi)/x$ rad/s (x is any value) on the basis of a frame rate n fps.

The angular speed con can be calculated by the following formula 200 on the basis of the angle $\theta_n$ and obtained time $t_n$ of the image of the current frame n and the angle $\theta_{n-1}$ and obtained time $t_{n-1}$ of the image of the previous frame n−1.

$$\omega_n = \frac{\theta_n - \theta_{n-1}}{t_n - t_{n-1}} \qquad \text{Formula 200}$$

In the meantime, the angular speed $\omega$ may be an arithmetic mean of angular speeds of x-frames from the angular speed $\omega_{n-x}$ of the frame n−x to the angular speed $\omega_n$ of the current frame n.

Furthermore, although the predetermined period is set to 0.2 second in this embodiment, it is not limited to this value.

Figure 24A:
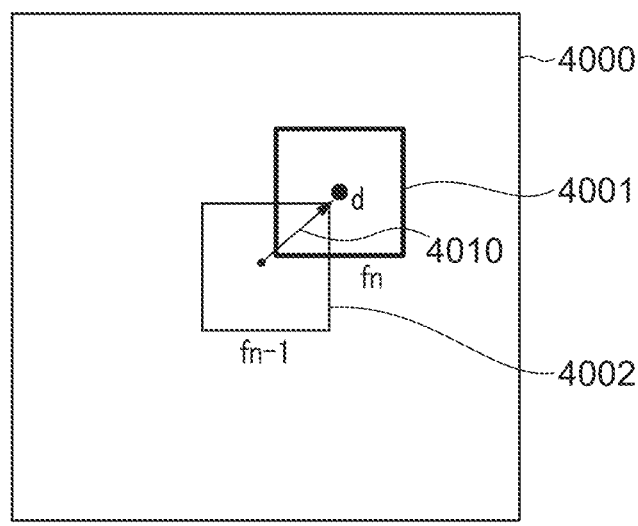
FIG. 24A, FIG. 24B, and FIG. 24C are views for describing delay extraction of an image in a third embodiment.
Figure 24B:
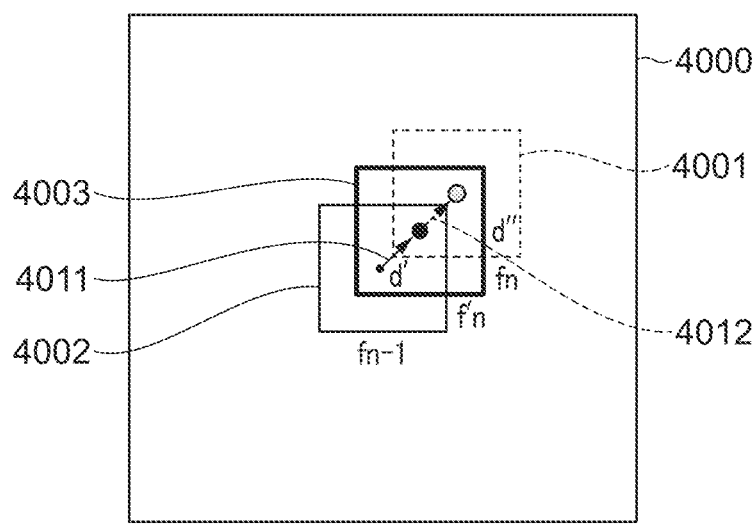

Hereinafter, the delay extraction in a case where the user is looking back will be described using FIG. 24A, FIG. 24B, and FIG. 24C.

Although the descriptions using FIG. 11A through FIG. 11F and FIG. 12A through FIG. 12G in the first embodiment take the distortion into consideration, the distortion of the image pickup lens 16 is not taken into consideration in this embodiment to simply descriptions. Moreover, the following description assumes that the calibration process of the second embodiment has been applied to images of frames and a center of an image of each frame is coincident with a visual field center of a user in picking up the image. Moreover, in order to describe a case where a face turns a just side, a case where light rays within the maximum field angle 192° are projected to the solid state image sensor 42 is described as an example.

An area 4000 indicates the pixel area that can be picked up by the solid state image sensor 42. An image 4001 (FIG. 24A and FIG. 24B) is an image of the frame $f_n$ that is extracted as the target visual field 125 in the direction toward which the face is currently directing.

An image 4002 (FIG. 24A and FIG. 24B) is an image of the frame $f_{n-1}$ that is extracted as the target visual field 125 in the direction toward which the face was directed at the previous time.

Hereinafter, a value d indicates a distance 4010 (FIG. 24A) from the center of the image 4002 of the frame $f_{n-1}$ to the center of the image 4001 of the frame $f_n$.

An image 4003 (FIG. 24B) is extracted from the image projected to the area 4000 as an image of a delay extraction frame $f'_n$ in a case where the angular speed $\omega$ of the face based on the face direction detected by the face direction detection unit 20 is equal to or more than the threshold $\omega_0$.

Hereinafter, a value d' indicates a distance 4011 between the center of the image 4002 of the frame $f_{n-1}$ and the center of the image 4003 of the delay extraction frame $f'_n$.

A value d" is a delay distance 4012 from the center of the image 4001 of the frame $f_n$ to the center of the image 4003 of the frame $f'_n$. At this time, the value d of the distance 4010 is larger than the value d' of the distance 4011 (d>d').

Figure 24C:
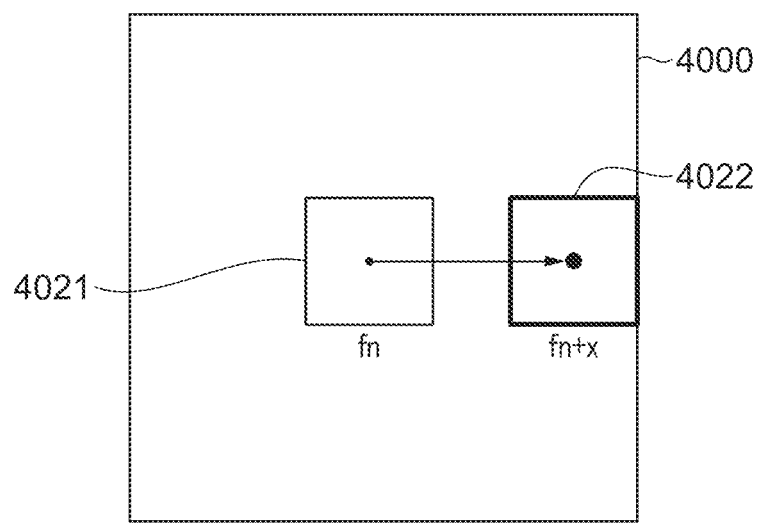

Next, a method to determine the value d' is described using FIG. 24C. Hereinafter, a case where a user quickly moves a face rightward from the front (observation direction vo (vector information (0°, 0°))) to the just side (90°) is described. In this case, an image 4021 of a frame $f_n$ extracted when the face is directed to the front (the observation direction vo (vector information (0°, 0°))) is obtained first. After a short period, an image 4022 of a frame $f_{n+x}$ extracted when the face is directed rightward to the just side (90°) is obtained.

In order to prevent the visually induced motion sickness, it shall be necessary to spend at least t seconds (for example, 4 seconds) for turning the face from the front to the just right side (90°), When the frame rate of the image is n fps (for example, 30 fps), the distance d' is obtained by the following equation.

$$d' = \frac{f_{n+x} - f_n}{n \cdot t}$$

In the meantime, when the distance d" from the frame $f_n$ to the frame $f'_n$ becomes larger, the object at which the user looks may not be picked up in the frame $f_n$ because the face direction differs from the recording direction.

When the delay period becomes equal to or more than a predetermined period $Th_{delay}$ (second predetermined time), the delay extraction is stopped and extraction of a direction toward which the face is currently directing (referred to as a current face direction) is started.

The delay period is a difference between start time $t_0$ at which the delay starts (a step S4211 in FIG. 26) and current time $t_n$ (a step S4213 in FIG. 26) at which the face is continuously moving.

Although the predetermined value $Th_{delay}$ is set as 1 second in this embodiment, it is not limited to 1 second. For example, the predetermined value $Th_{delay}$ may be set to 20/n seconds based on the frame rate n fps. When the predetermined value $Th_{delay}$ is 20/n seconds, the predetermined value $Th_{delay}$ becomes shorter as the frame rate becomes higher. Since the possibility of the visually induced motion sickness becomes lower as the frame rate becomes higher, the process can be returned to the extraction of the current face direction in a short delay period.

In the meantime, when the delay extraction is stopped and the extraction of the current face direction is restarted, the image scene switches suddenly. Since such sudden switching of the image scene causes unnatural feeling to the user, image effects, such as fade-out and fade-in, may be employed.

Moreover, the locus of the current face direction is saved so that the extraction of the current face direction can be restarted. The saved locus of the face direction in a case where it is determined that the user is glancing is described using FIG. 25A.

The process that stops the delay extraction and restarts the extraction of the current face direction is executed when the delay period becomes equal to or more than the predetermined value $Th_{delay}$ as mentioned above. In addition, the process is also executed in a case of glance, i.e., the case where the user once changes the face direction to a certain direction and immediately returns to the previous direction.

Figure 25A:
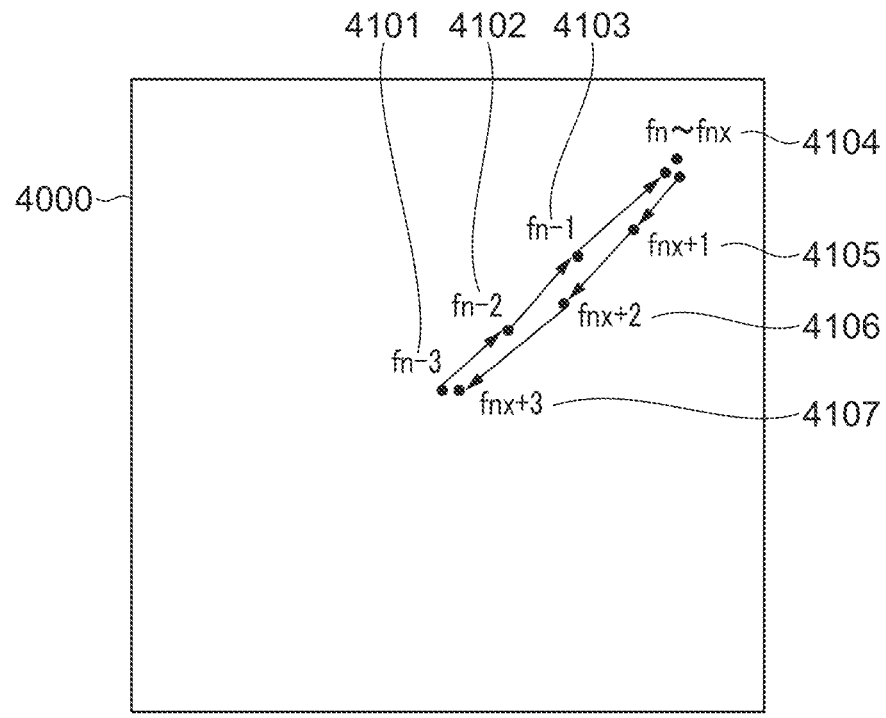
FIG. 25A and FIG. 25B are views showing—loci of face movements held in the third embodiment.

FIG. 25A is the view showing the example of the locus of the face direction in a case where the user is glancing. A center position 4101 of an image of a frame $f_{n-3}$ coincides with the user's visual field center in beginning of movement of the face. After that, the user's visual field center sequentially moves to center positions 4102, 4103 and 4104 of images of frames $f_{n-2}$, $f_{n-1}$, and $f_n$. Hereinafter, such a movement of the user's visual field center is called a face motion vector.

The user's visual field center stops at the center position 4104 for a while, then moves to center positions 4105, 4106, and 4107 of images of frames $f_{nx+1}$, $f_{nx+2}$, and $f_{nx+3}$, and stops at the center position 4107 of the image of the frame $f_{nx+3}$. That is, the direction of the face motion vector from the position 4101 to the position 4104 is opposite to the direction of the face motion vector from the position 4104 to the position 4107.

When frame groups of which motion vectors are mutually opposite are detected as exemplified in FIG. 25A, the overall control CPU 101 determines that the frame groups correspond to the glance.

In this case, the overall control CPU 101 performs the delay extraction from the position 4101 at which the face starts moving to the position 4104 at which the motion vector starts moving conversely. This is because the position 4101 is considered as a position of an object that the user wants to glance.

In the meantime, after performing the delay extraction to the position 4101, the overall control CPU 101 stops the delay extraction and restarts the extraction of the current face direction to the position 4107 at which the movement of the face stops.

Furthermore, when a body is detected near the center of the view field in the face direction during the movement of the user's face, and when the body keeps its position near the center of the view field in the face direction, the overall control CPU 101 determines that the user is observing a moving object. In this case, the delay extraction is not performed in this embodiment.

Figure 25B:
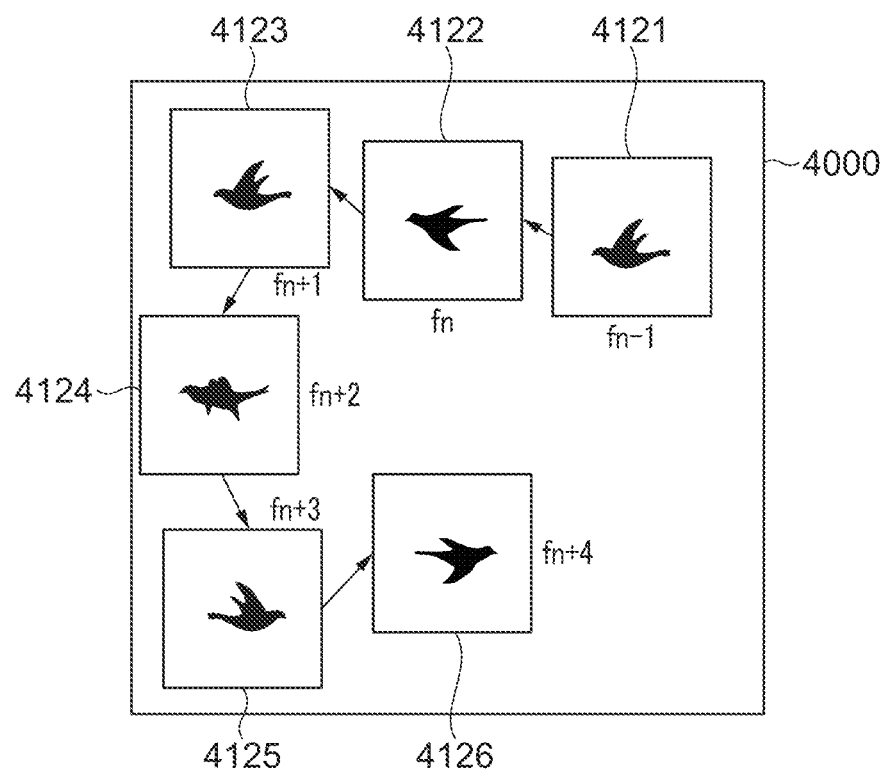

FIG. 25B is a view showing examples of images of frames of a case where the user is observing a moving object. A center position of an image 4121 of a frame $f_{n-3}$ coincides with the user's visual field center in starting of movement of the face. After that, the user's visual field center moves to center positions of images 4122, 4123, 4123, 4125, and 4126 of frames $f_n$, $f_{n+1}$, $f_{n+2}$, $f_{n+3}$, and $f_{n+4}$ When detecting that the same object keeps its position near the centers of images of continuous frames as exemplified in FIG. 25B, the overall control CPU 101 determines that the frames belong to a frame group of the moving object observation.

In this case, the overall control CPU 101 does not perform the delay extraction. This is because the delay extraction during the moving object observation increases a possibility that an object is not captured in an image.

Moreover, when an appreciation person appreciates the video of the images 4121 through 4126 extracted in response to the fast movement of the user's face during the moving object observation, the appreciation person may suffer from the visually induced motion sickness. Accordingly, the overall control CPU 101 does not perform the image extraction about the frame group of the moving object observation and records an image of the entire pixel area 4000 that can be captured by the solid state image sensor 42.

It should be noted that margins called blind zones may be given to the threshold $\omega_0$, the predetermined period, and the predetermined value $Th_{delay}$.

Figure 26:
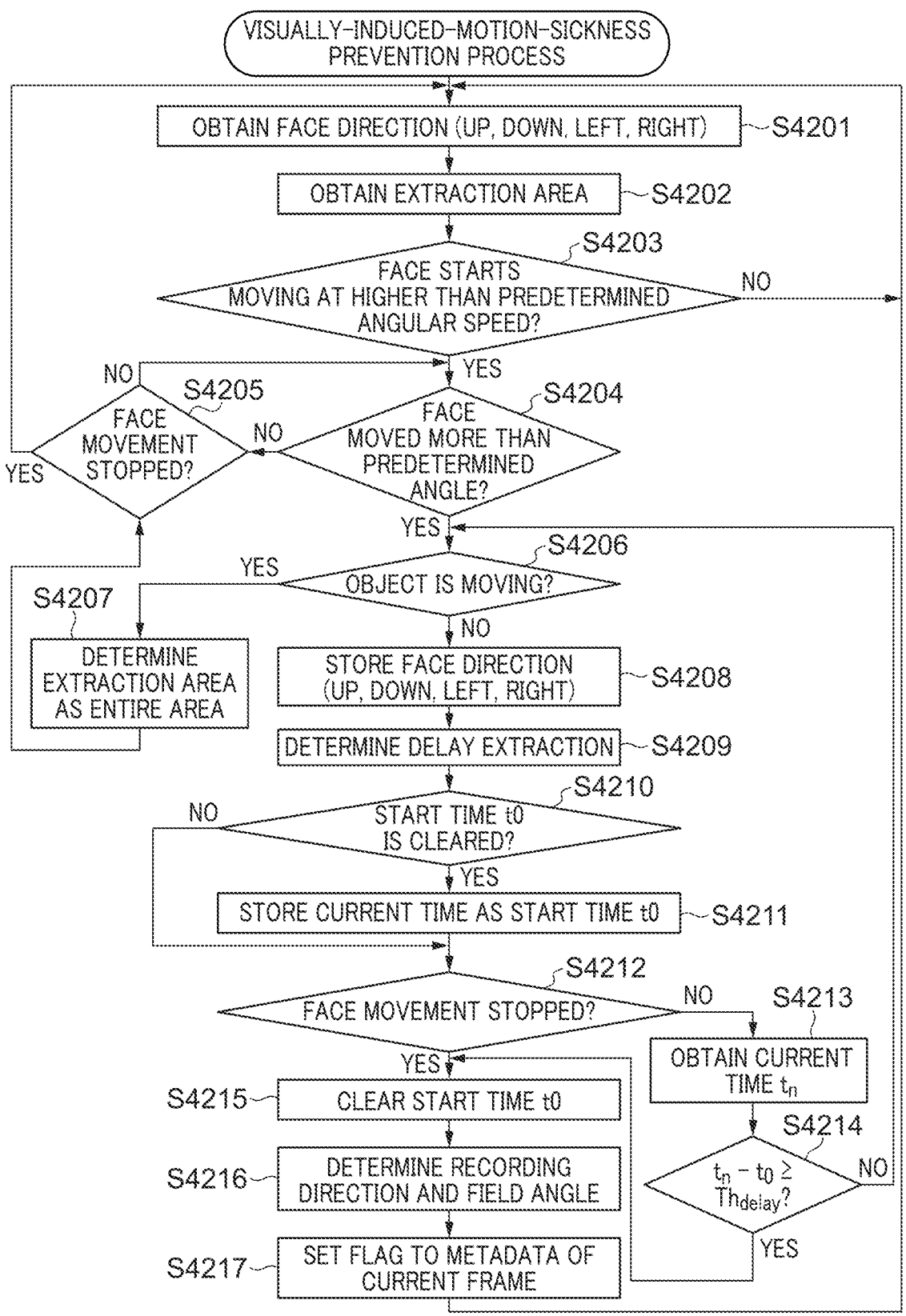
FIG. 26 is a flowchart showing a visually-induced-motion-sickness prevention process according to the third embodiment.

Next, a visually-induced-motion-sickness prevention process according to this embodiment will be described using a flowchart in FIG. 26. It should be noted that this process is executed whenever the image pickup unit 40 picks up a frame image in the step S400 during the video image pickup operation.

In a step S4201, the overall control CPU 101 obtains the face direction (observation direction) recorded on the primary memory 103 in the face direction detection process executed for the current frame image pickup operation.

In a step S4202, the overall control CPU 101 obtains the position and size (extraction area) of the image recording frame recorded on the primary memory 103 in the recording-direction/area determination process executed for the current frame image pickup operation.

In a step S4203, the overall control CPU (a calculation unit) calculates the angular speed $\omega$ of the face on the basis of the face direction of the current frame image pickup operation obtained in the step S4201, the face direction of the previous frame image pickup operation stored in the primary memory 103, and the frame rate. After that, the overall control CPU 101 determines whether the face starts moving at the angular speed $\omega$ beyond the threshold $\omega_0$.

Specifically, when the user's face starts moving at the angular speed $\omega$ beyond the threshold $\omega_0$ beyond a predetermined period (0.2 seconds), the overall control CPU 101 determines that the face starts moving at the angular speed $\omega$ beyond the threshold $\omega_0$. When it is determined that the face starts moving (YES in the step S4203), the process proceeds to a step S4204. Otherwise (NO in the step S4203), the process returns to the step S4201. That is, even if the user's face moves at the angular speed $\omega$ beyond the threshold $\omega_0$, when the period is less than the predetermined period (less than a first predetermined period), the process returns to the step S4201. Moreover, when the angular speed of the face cannot be calculated in the step S4203 because the face direction at the previous frame image pickup operation is not saved in the primary memory 103, the process returns to the step S4201.

In the step S4204, the overall control CPU 101 determines whether the face moved more than the predetermined angle on the basis of the angular speed $\omega$ of the face calculated in the step S4203. When it is determined that the face moved (YES in the step S4204), the process proceeds to a step S4206. Otherwise (NO in the step S4204), the process proceeds to a step S4205. It should be noted that the overall control CPU 101 may determine whether the face moved at the angular speed beyond the predetermined angular speed beyond the predetermined period (0.2 seconds) in the step S4204.

In the step S4205, the overall control CPU 101 determines whether the movement of the face stopped on the basis of the angular speed $\omega$ of the face calculated in the step S4203. When it is determined that the movement stopped (YES in the step S4205), the process returns to the step S4201. Otherwise (NO in the step S4205), the process returns to the step S4204.

In the step S4206, the overall control CPU 101 determines whether the picked-up object is moving, i.e., determines whether the user is observing a moving object. When it is determined that the object is moving (YES in the step S4206), the process proceeds to a step S4207. Otherwise (NO in the step S4206), the process proceeds to a step S4208.

In the step S4207, the overall control CPU 101 determines not to perform the crop development process in the recording area development process of the current frame and to perform the development process of entire-area RAW data obtained from the entire area of the solid state image sensor 42. Then, the process proceeds to the step S4205.

In the step S4208, the overall control CPU 101 stores the face direction at the current frame image pickup operation obtained in the step S4201 to the primary memory 103. Then, the process proceeds to a step S4209.

In the step S4209, the overall control CPU (a delay unit) 101 determines to perform the crop development process (to perform the delay extraction) in the recording area development process of the current frame about the extraction area centering on the position shifted from the face direction of the previous frame by the distance d. After that, the process proceeds to a step S4210.

In the step S4210, the overall control CPU 101 determines whether the start time $t_0$ of the time period stored in the primary memory 103 is cleared. When it is determined that the start time is cleared (YES in the step S4210), the process proceeds to a step S4211. Otherwise (NO in the step S4210), the process proceeds to a step S4212.

In the step S4211, the overall control CPU 101 stores current time as the start time $t_0$ to the primary memory 103. Then, the process proceeds to the step S4212.

In the step S4212, the overall control CPU 101 determines whether the movement of the face stopped before the delay period reaches the predetermined value $Th_{delay}$ on the basis of the angular speed to of the face calculated in the step S4203. When it is determined that the movement stopped (NO in the step S4212), the process proceeds to a step S4215. Otherwise (NO in the step S4212), the process proceeds to a step S4213.

In the step S4213, the overall control CPU 101 stores current time as time $t_0$ to the primary memory 103. Then, the process proceeds to the step S4214.

In the step S4214, the overall control CPU 101 calculates the delay period by subtracting the start time $t_0$ from the time $t_n$ that are stored in the primary memory 103 and determines whether the delay period is equal to or more than the predetermined period $Th_{delay}$. When the delay period is equal to or more than the predetermined period $Th_{delay}$ (YES in the step S4214), the process proceeds to the step S4215. Otherwise (NO in the step S4214), the process returns to the step S4206.

In the step S4215, the overall control CPU 101 clears the start time $t_0$ stored in the primary memory 103. Then, the process proceeds to the step S4216. In the step S4216, the overall control CPU 101 determines a recording direction and a field angle by the recording-direction/field-angle determination unit 30 on the basis of the face direction detected by the face direction detection unit 20. Then, the process proceeds to a step S4217.

In the step S4217, the overall control CPU 101 sets a flag to metadata of the current frame. Then the process returns to the step S4201. The flag set to the metadata is used to determine timings at which image effects (fade effects), such as fade-in and fade-out mentioned above, are added in the secondary recording process described in the step S1000 in the first embodiment.

As mentioned above, in this embodiment, when the angular speed ω of the face becomes beyond the threshold ω₀, the frame in the face direction is not extracted as-is and the frame is extracted according to the movement of the face. This has an effect to reduce the visually induced motion sickness.

Next, a fourth embodiment will be described. Fourth embodiment describes how to correct the extraction area of an image depending on the movement speed of the orientation a user's face using FIG. 27A, through FIG. 27 F, FIG. 28A, and FIG. 28 B.

This embodiment is described as a derivation from the first embodiment basically. Accordingly, configurations of the camera system in the fourth embodiment that are identical to the configurations of the camera system in the first embodiment are indicated by the same reference numerals and duplicated descriptions are omitted. A different configuration will be described by adding details.

A person's action to change an observation direction will be described first. Usually, when a person finds an interested item in a peripheral area of a visual field deviated from a center of the visual field and turns an observation direction toward the item, a face moves first and a body follows after movement of the face exceeds a certain amount.

That is, in such a case, the direction of the image pickup lens 16 of the image-pickup/detection unit 10 (FIG. 10A) in front of the clavicles does not change while only the face is changing the orientation in an initial motion. After that, when the user starts changing an orientation of the entire body, the direction of the image pickup lens 16 of the camera body 1 also moves. The following description presupposes such a characteristic feature of a human action.

Moreover, when the face direction detection unit 20 detects a face direction, variation due to a detection error occurs. When an extraction position of an image is calculated on the basis of the detection result of the face direction including the variation, blur like a result of a camera shake appears in a video image secondarily recorded in the step S1000, which deteriorates the appearance. Accordingly, slight variation is removed by applying a low pass filter to the detection result of the face direction in order to correct a slight detection shake.

Moreover, if the face direction is detected following a momentary movement (for example, a right and left check while walking along a public road), a video image secondarily recorded in the step S1000 tends to cause the visually induced motion sickness. Accordingly, in this embodiment employs a process that removes (smooths) a slight moving component of the face direction detected by following a momentary movement for about 1 through 2 seconds. Thereby, the appearance of the video image secondarily recorded in the step S100 is improved.

Next, a summary of an extraction-area correction process in this embodiment will be described using FIG. 27A through FIG. 27F.

A horizontal axis of each graph shown in FIG. 27A through FIG. 27F indicates elapsed time. A vertical axis in FIG. 27A indicates an angular movement of an actual observation center. Vertical axes in FIG. 27B and FIG. 27C indicate an angle of a face direction. A vertical axis in FIG. 27D indicate an angle of a direction of the image pickup lens 16. And vertical axes in FIG. 27E and FIG. 27F indicate an angle of an extraction position. It should be noted that the upper direction in the vertical axis shows the right direction.

Figure 27A:
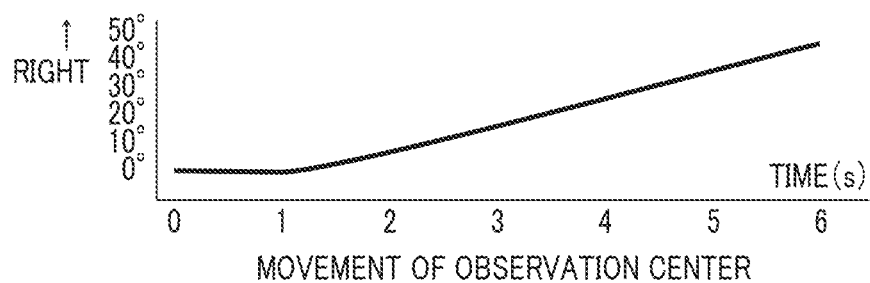
FIG. 27A through FIG. 27F are graphs for describing an extraction-area correction process according to a fourth embodiment.

FIG. 27A is a graph showing movement of an actual observation center (face direction). The angle of the vertical axis of FIG. 27A indicates a face direction of a user with respect to a fixed location like a ground surface (a ground standard) and does not indicate an angle showing a face direction detected by the face direction detection unit 20. That is, the graph in FIG. 27A shows that the user faces the front at the beginning and starts turning the face rightward at about 1 second.

Figure 27B:
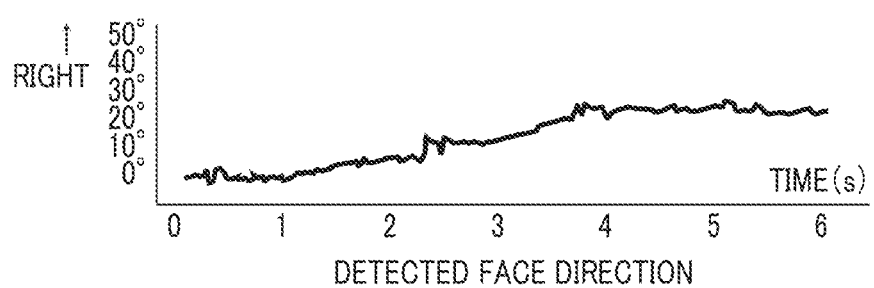

FIG. 27B is a graph showing the detection result (observation direction vi) of the face direction detection unit 20. The reason why the line showing the detection result in FIG. 27B is not smooth is because the detection result contains variation due to a detection error as mentioned above. Accordingly, in this embodiment, a low pass filter is applied to the detection result of the face direction detection unit 20.

Moreover, a process that removes (smooths) a quick change of the face direction detected by following a momentary movement of the face is also performed. FIG. 27B does not show such a quick change.

Figure 27C:
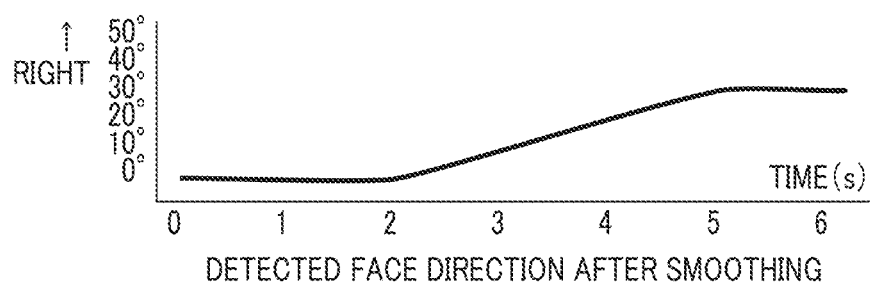

FIG. 27C is a graph showing a result of smoothing obtained by applying the low pass filter to the detection result of the face direction detection unit 20 in FIG. 27B. As shown in FIG. 27C, the line showing the detection result in FIG. 27B turns into the smooth line by applying the low pass filter. In the meantime, as a result of applying such a filter, the turning of the face from the front to the right is detected at about 2 second in FIG. 27C. That is, delay (time lag) has occurred in the graph in FIG. 27C from the graph in FIG. 27B that directly corresponds to the movement in FIG. 27A. It should be noted that the angle of the vertical axes in FIG. 27B and FIG. 27C shows an angle from the direction of the image pickup lens 16 (the camera body 1 is made standard) and is not the angle of the ground standard in FIG. 27A.

Figure 27D:
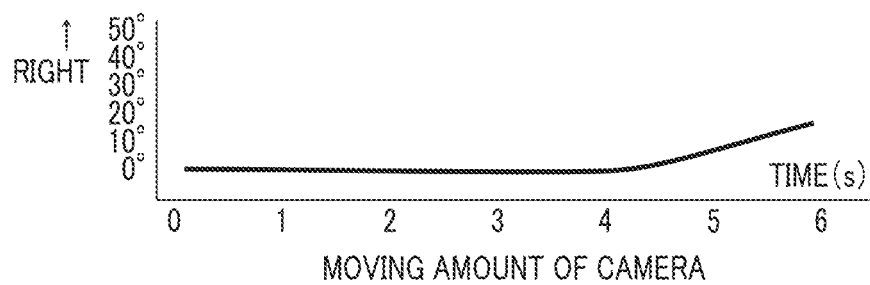

Moreover, in FIG. 27B, a tilt becomes gradual from about 4 second as compared with FIG. 27A. This means that the moving speed of the face direction detected by the face direction detection unit 20 is relatively slowing down because the camera body 1 (the direction of the image pickup lens 16) starts moving with the body of the user from about 4 second as shown in FIG. 27D.

Figure 27E:
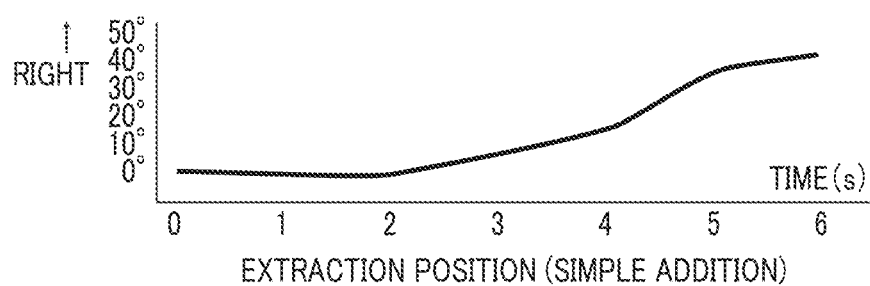

FIG. 27E shows a result of a simple addition method that calculates the extraction position (i.e., the observation direction as the center of the target visual field 125) by adding the moving amount of the camera body (FIG. 27D) to the face direction detection result (FIG. 27C) that is smoothed by applying the low pass filter. However, when the extraction position is calculated by this simple addition method, the crop position does not follow the movement of the actual observation center. Accordingly, the video image finished in the secondary recording process includes a scene where panning accelerates suddenly from about 4.5 second from which the movement of the body starts.

Figure 27F:
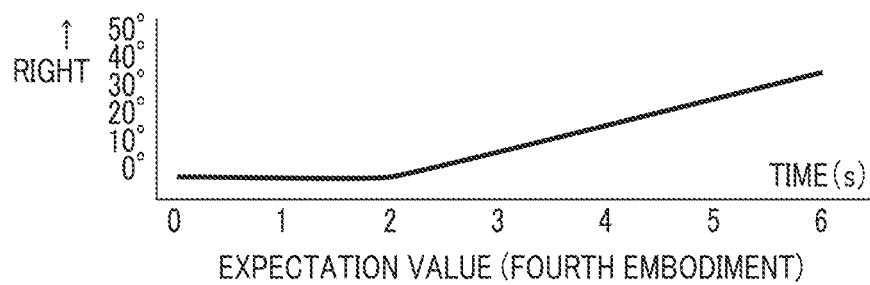

That is, in order to eliminate discomfort to the movement of the actual observation center, it is preferable to calculate the extraction position (expectation value) so as to keep the panning approximately constant as shown in FIG. 27F.

Accordingly, in this embodiment, the extraction position is calculated so as to avoid the scene when panning accelerates suddenly as shown in FIG. 27E. When there are two moving speeds (0°/s and 10°/s) of the extraction position as shown in FIG. 27F, the expectation value shown in FIG. 27F is calculated by adding the moving amount of the camera body 1 in FIG. 27D at timing preceding by the time lag (1 second in this embodiment) to the face direction detection result in FIG. 27C. Actually, the moving speed of the extraction position is not limited to the above two kinds and varies gradually. That is, the observation direction is not accelerated suddenly and is not stopped suddenly. Slowdown is gradual. However, the expectation value cannot draw a gradual slowdown curve according to the above-mentioned calculation method. Accordingly, in this embodiment, when the movement of the camera body 1 stops, the moving speeds of the extraction position within a period from start to stop of the movement of the observation direction or within a past certain period are allocated among several frames so that the expectation value will draw a gradual slowdown curve.

Hereinafter, the extraction-area correction process in this embodiment will be described in order using flowcharts in FIG. 28A and FIG. 28B. Hereinafter, descriptions about the same portions as the first through third embodiments will be simplified or omitted.

Figure 28A:
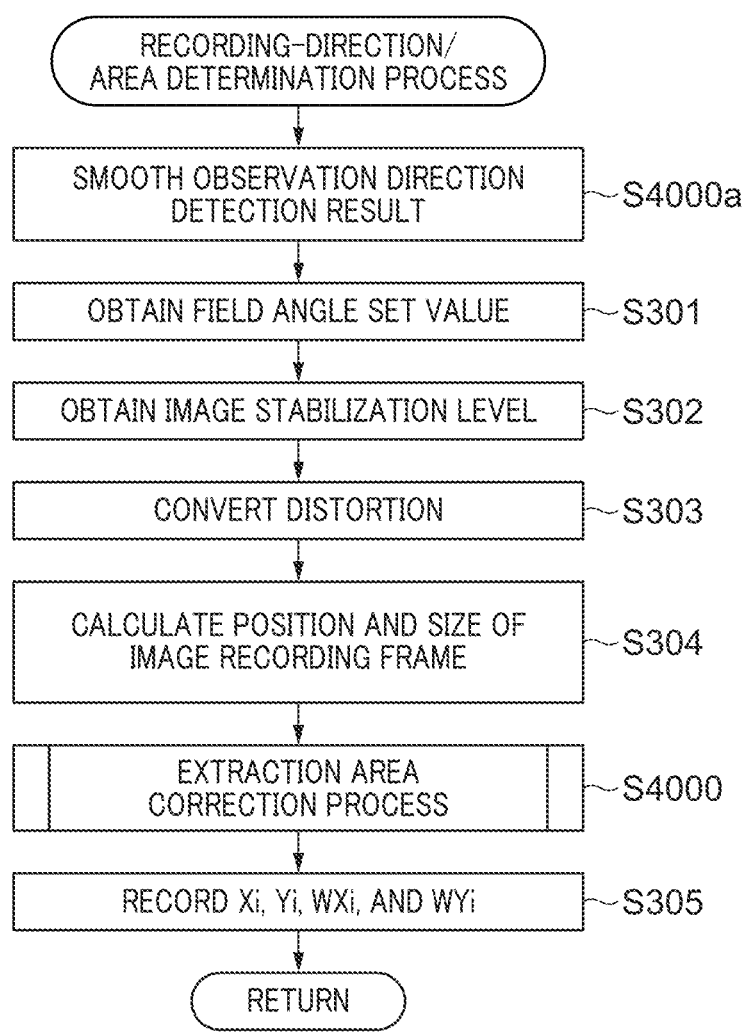
FIG. 28A is a flowchart showing a recording-direction/area determination process according to the fourth embodiment.

FIG. 28A is the flowchart showing a subroutine of the recording-direction/area determination process in the step S300 in FIG. 7A according to this embodiment.

In a step S4000*a*, the observation direction vi obtained by the face direction detection process in the step S200 is smoothed using the low pass filter (a smoothing unit). As mentioned above using FIG. 27B, this is because the observation direction vi has variation due to some detection error. The low pass filter takes a simple moving average of past several times, for example, 5 to 10 times. At this time, the delay of tracking when the face direction is moved becomes larger as the times of taking the average increases. Moreover, when the user turns the face to the right and immediately turns to the left, the observation direction vi in turning to the rightmost may not be detected.

Furthermore, since a mixture state of a detection error depends on a detection method, a degree of the smoothing may be changed according to a detection method. An application method of the low pass filter in the vertical direction may be changed from that in the lateral direction.

Moreover, a momentary movement of a face does not need to record in many cases from a viewpoint of storing user's experience as an image. For example, the user has no choice but to check safety of right and left while walking as mentioned above. An image picked up at such a moment is not needed to record. Accordingly, in this embodiment, the observation direction vi obtained when a moved observation direction returns to the previous direction within about 2 seconds is also smoothed in the step S4000*a*.

Although safety checks in the left-right direction and the lower direction are needed in many cases, there is little need of safety check in the upper direction. Accordingly, the low pass filter may not be applied to the upward movement.

When the extraction area is determined by the process in the steps S301 through S304 (FIG. 7D), the overall control CPU (a second calibration unit) 101 proceeds with the process to a step S4000 and executes the extraction-area correction process.

After that, the extraction area after the correction is recorded in the step S305, and the process exits this subroutine. The extraction-area correction process is described using the flowchart in FIG. 28B.

Figure 28B:
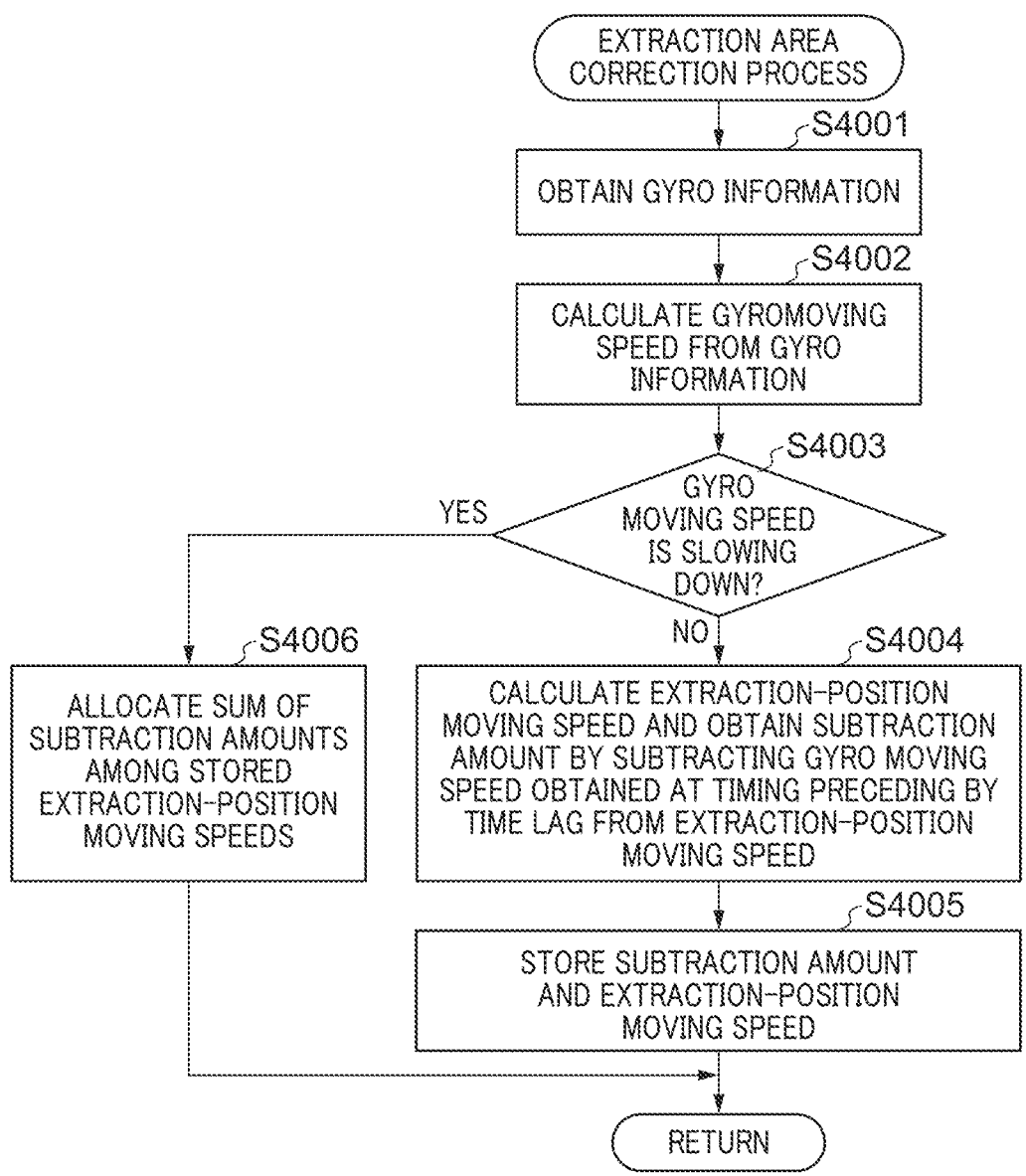
FIG. 28B is a flowchart showing the extraction-area correction process in a step 400 in FIG. 28A.

FIG. 28B is the flowchart showing the extraction-area correction process in the step S4000. In a step S4001 in FIG. 28B, the overall control CPU (moving speed calculation unit) 101 obtains gyro information, i.e., movement (a gyro moving amount) of the camera body 1 in the current frame, from the angular speed sensor 107.

Although the angular speed sensor 107 is used in this embodiment, another sensor may be used as long as the movement of the camera body 1 can be detected. For example, a magnetometric sensor (not shown) that measures a size and direction of a magnetic field may be used, and the acceleration sensor 108 that detects acceleration may be used. Furthermore, a method that extracts a feature point, detects a motion vector by calculating a moving amount of the feature point, and calculates the moving amount of the camera body 1 may be used. A feature point can be extracted by a known method. For example, a moving amount can be calculated by calculating a position at which difference becomes small by subtracting a plurality of edge images in a deviated state that are extracted by applying a bandpass filter to images obtained by extracting only luminance information from two image. Although this method increases a calculation amount, since the hardware like the angular speed sensor 107 becomes unnecessary and the weight saving of the camera body 1 is available, it is one of the preferable aspects.

The following description exemplifies a case where the gyro information is obtained from the angular speed sensor 107. In a step S4002, a moving speed (gyro moving speed) of the camera body 1 is calculated from the gyro information obtained in the step S4001 and the gyro information obtained in the past.

In a step S4003, it is determined whether the gyro moving speed calculated in the step S4002 is slowing down. When the moving speed is not slowing down (NO in the step S4003), the process proceeds to a step S4004. Otherwise (YES in the step S4003), the process proceeds to a step S4006.

In the step S4004, the overall control CPU (the second calibration unit and observation direction correction unit) 101 calculates the moving speed of the extraction position (an extraction-position moving speed) from the extraction position determined in the step S304 and the extraction position obtained in the past. Next, the overall control CPU 101 obtains a subtraction amount by subtracting the gyro moving speed obtained at timing preceding by the time lag caused by applying the low pass filter from the calculated extraction-position moving speed.

In a step S4005, the overall control CPU 101 stores the extraction-position moving speed and subtraction amount that are obtained in the step S4004 to the primary memory 103. And then, the process exits this subroutine.

In the step S4006, the overall control CPU 101 calculates the expectation value by allocating the sum total of the subtraction amounts stored in the primary memory 103 among the extraction-position moving speeds stored in the primary memory 103 so that the variation of the extraction-position moving speed in a past certain period will become constant. And then, the process exits this subroutine. The past certain period may be a period from the start of actual movement of the extraction position to the present, or may be a period from detection of movement of the camera body 1 by the angular speed sensor 107 to the present. Moreover, in order to simplify the process, the past certain period may be a fixed period of 0.5 through 3 seconds. It should be noted that an expectation value prior to the past certain period is set to the extraction-position moving speed obtained in the step S4004.

The following Table 1 shows variations of the data (speeds) of the graphs shown in FIG. 27A through FIG. 27F. That is, the extraction-position moving speeds determined in the step S304 are shown in a line C of Table 1. The gyro moving speed calculated in the step S4002 are shown in a line D of Table 1. Moreover, the expectation values calculated in the step S4006 is shown in a line E of Table 1.

TABLE 1

|  | 0-1 sec | 1-2 sec | 2-3 sec | 3-4 sec | 4-5 sec | 5-6 sec |
| --- | --- | --- | --- | --- | --- | --- |
| (A) Movement of Observation center | 0°/s | 10°/s | 10°/s | 10°/s | 10°/s | 10°/s |
| (B) Detected Face Direction | 0°/s | 10°/s | 10°/s | 10°/s | 0°/s | 0°/s |
| (C) Detected Face Direction after Smoothing | 0°/s | 0°/s | 10°/s | 10°/s | 10°/s | 0°/s |
| (D) Moving Amount of Camera | 0°/s | 0°/s | 0°/s | 0°/s | 10°/s | 10°/s |
| (E) Extraction Position (Simple Addition) | 0°/s | 0°/s | 10°/s | 10°/s | 20°/s | 10°/s |
| (F) Expectation Value (Fourth Embodiment) | 0°/s | 0°/s | 10°/s | 10°/s | 10°/s | 10°/s |

Hereinafter, the subroutine of the extraction-area correction process in FIG. 28B will be described about a case where the user first faces the front and gradually turns the face to the right as shown in Table 1.

Since the user looks at the front at the beginning, the gyro moving speed calculated in the step S4002 becomes about 0°/s. That is, it is determined that the gyro moving speed is not slowing down in the step S4003, and the process proceeds to the step S4004. In this case, since the position of the face does not change, the extraction-position moving speed also becomes 0°/s. Moreover, the subtraction amount calculated in the step S4004 also becomes 0°/s.

Although the user starts turning the face to the right at about 1 second, the extraction-position moving speed still keeps 0°/s. because of the time lag due to the low pass filter as shown in FIG. 27C. In the meantime, since the camera body 1 does not move, the gyro moving speed is about 0°/s as shown in FIG. 27D. Accordingly, the subtraction amount calculated in the step S4004 also becomes 0°/s like the time when the user still faces the front.

When the user further turns the face to the right at about 2 second, the extraction-position moving speed becomes 10°/s as shown in FIG. 27C. In the meantime, since the camera body 1 does not move, the gyro moving speed is about 0°/s as shown in FIG. 27D. Accordingly, the subtraction amount calculated in the step S4004 becomes 10°/s.

When the user further turns the face to the right at about 4 second, the user's body starts turning to the right. That is, since the direction of the camera body 1 changes as shown in FIG. 27D, the gyro moving speed becomes 10°/s. Since the user's body starts turning, the actual angular speed of the face slows down by a relative speed between the camera body 1 and face direction as shown in FIG. 27B. In the meantime, the extraction-position moving speed shown in FIG. 27C still keeps 10°/s because of the time lag due to the low pass filter. Accordingly, the subtraction amount calculated in the step S4004 becomes 10°/s by taking the time lag into consideration, When the user further turns the face to the right at about 5 second, the gyro moving speed still keeps 10°/s (FIG. 27D). In the meantime, the extraction-position moving speed shown in FIG. 27C slows down and becomes 0°/s Accordingly, the subtraction amount calculated in the step S4004 becomes −10°/s.

When the user finishes the action turning to the right after 6 second (not shown in FIG. 27A through FIG. 27F), the gyro moving speed becomes 0°/s and the process is allowed to proceed to the step S4006 in this case. In this case, the sum total of the subtraction amounts calculated up to now and stored in the primary memory 103 becomes +10°/s. The expectation value is calculated by allocating the sum total of the subtraction amounts so that the variation of the extraction-position moving speeds stored in the primary memory 103 in the past certain period will become constant. In this case, the extraction-position moving speeds shown in FIG. 27C in the period from start of acceleration up to now (2 second through 6 second) are 10°/s, 10°/s, 10°/s, and 0°/s as shown in Table 1. Accordingly, all the expectation values in the period from 2 second to 6 second are set to 10°/s so as to keep the variation of the extraction-position moving speed in this period constant (no variation in this embodiment).

Although the data are described by every second in this embodiment in order to simplify the description, the frame rate of the video image pickup operation is usually 24 through 60 fps. In the meantime, since it is not necessary to detect the face direction and gyro moving speed at 60 times per second in many cases, the timing at which the face direction detection process and extraction-area correction process are executed is preferably changed from the image pickup timing. For example, even when the frame rate of the video image pickup operation is 60 fps, the timing at which the face direction detection process and extraction-area correction process may be set to 10 fps. The timing can be changed suitably in consideration of a usage, power consumption, etc.

As described above, this embodiment shows the example that keeps the moving speed of the observation direction constant so as to avoid bad appearance of the video image due to change of the moving speed of the visual field caused when the movement of the face and the movement of the user's body (the camera body) are combined during great movement of the observation direction.

Although this embodiment shows the example that crops the superwide-angle image according to the observation direction. the present disclosure is not limited to this. For example, the overall control CPU (an image pickup direction changing unit) 101 may change an image pickup direction of the image pickup unit 40 according to the observation direction. In this case, the camera body 1 is required to provide a mechanism (drive mechanism) that mechanically changes the image pickup direction of the image pickup unit 40, specifically the direction of the image pickup lens 16 and solid state image sensor 42, in a yaw direction and a pitch direction.

Moreover, the process that smooths the face direction detection result shown in this embodiment is preferably performed when the overall control CPU (the image stabilization unit) 101 performs the image stabilization process described in the first embodiment, because the image stabilization process causes the delay of tracking of the face direction.

Next, a fifth embodiment will be described. The fifth embodiment describes a method for reducing difference between a user's visual field and secondarily recorded image (hereinafter referred to as a "recorded image") caused by parallax between an eye position of a user and a worn position of the image-pickup/detection unit 10 using FIG. 29A through FIG. 34C.

This embodiment is described as a derivation from the first embodiment basically. Accordingly, configurations of the camera system in the fifth embodiment that are identical to the configurations of the camera system in the first embodiment are indicated by the same reference numerals and duplicated descriptions are omitted. A different configuration will be described by adding details. In order to support understanding, the difference between the user's visual field and recorded image will be described first.

Figure 29A:
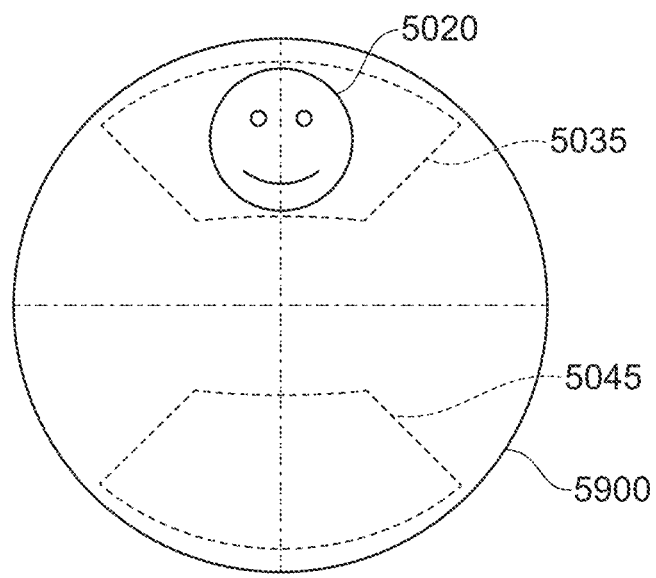
FIG. 29A and FIG. 29B are schematic views for describing a relationship between a user's visual field and a target visual field in a case where a short distance object is an observation target in the first embodiment.
Figure 29B:
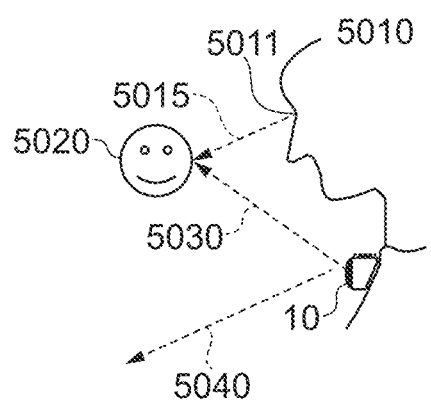

FIG. 29A and FIG. 29B are schematic views for describing a relationship between the visual field of the user 5010 and target visual field in a case where a short distance object is an observation target 5020 in the first embodiment.

FIG. 29A is the schematic view showing an image 5900 including the observation object 5020 captured by the solid state image sensor 42. FIG. 29B is the schematic view showing a positional relationship between the user 5010 and the observation object 5020.

As shown in FIG. 29B, when the observation object 5020 is below a height of a user's eyes 5011, a face direction 5015 of the user 5010 turns downward. At this time, the observation object 5020 with a background like a floor (not shown) is caught in the visual field of the user 5010.

In the first embodiment, the observation direction 5040 (FIG. 29B) parallel to the user's face direction 5015 detected by the face direction detection unit 20 is set as a recording direction. Accordingly, when the short distance object is the observation object 5020 as shown in FIG. 29B, an area 5045 that does not include the observation object 5020 will be set as the target visual field.

In such a case, even if a background (for example, a ceiling (not shown)) caught by the image-pickup/detection unit 10 will be different from the background (for example, a floor (not shown)) of the visual field of the user 5010, the observation direction should be set to a direction 5030 so that an area 5035 including the observation target 5020 will be a target visual field.

The above issue is caused by the parallax due to the difference between the position of the eye 5011 of the user 5010 and the worn position of the image-pickup/detection unit 10. Accordingly, in this embodiment, a parallax correction mode process that appropriately adjusts the recording direction set on the basis of the face direction of the user 5010 corresponding to the parallax is executed.

Figure 30:
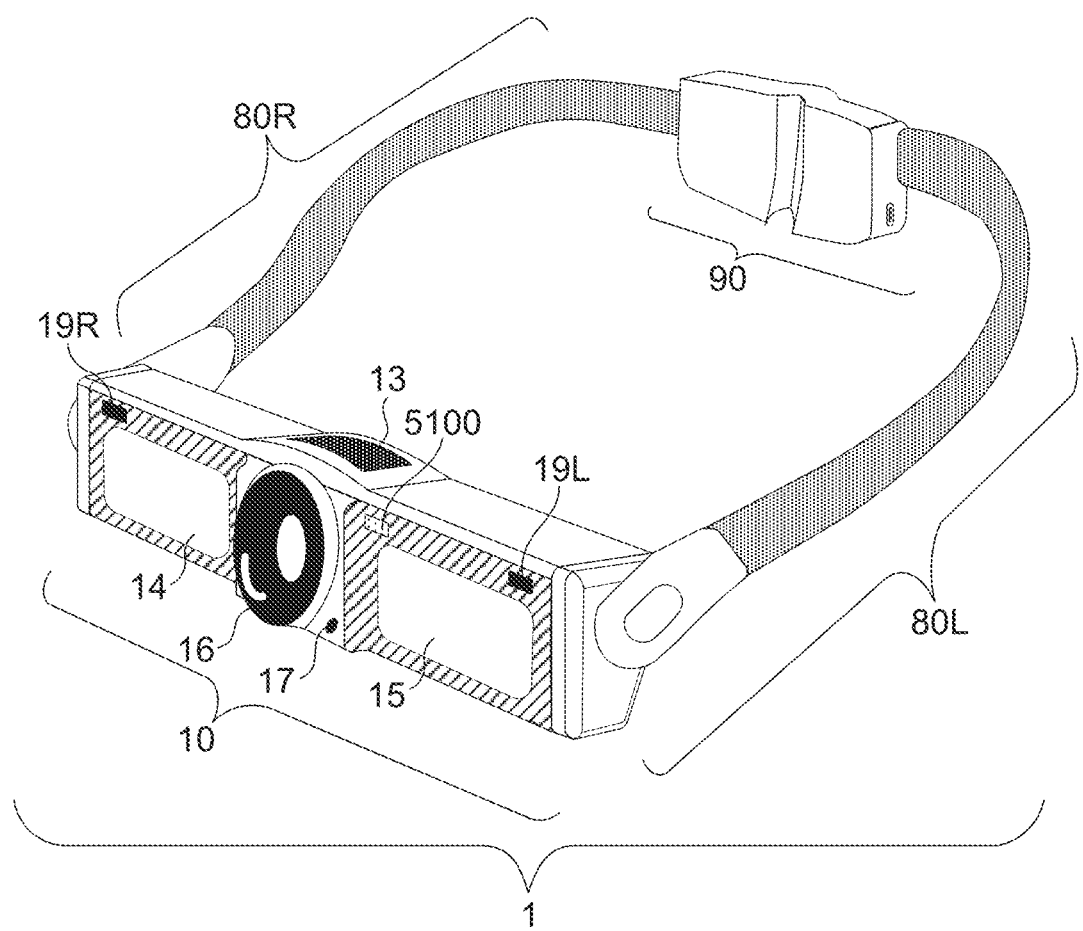
FIG. 30 is an external view showing a camera body including an image pickup apparatus according to a fifth embodiment.
Figure 31:
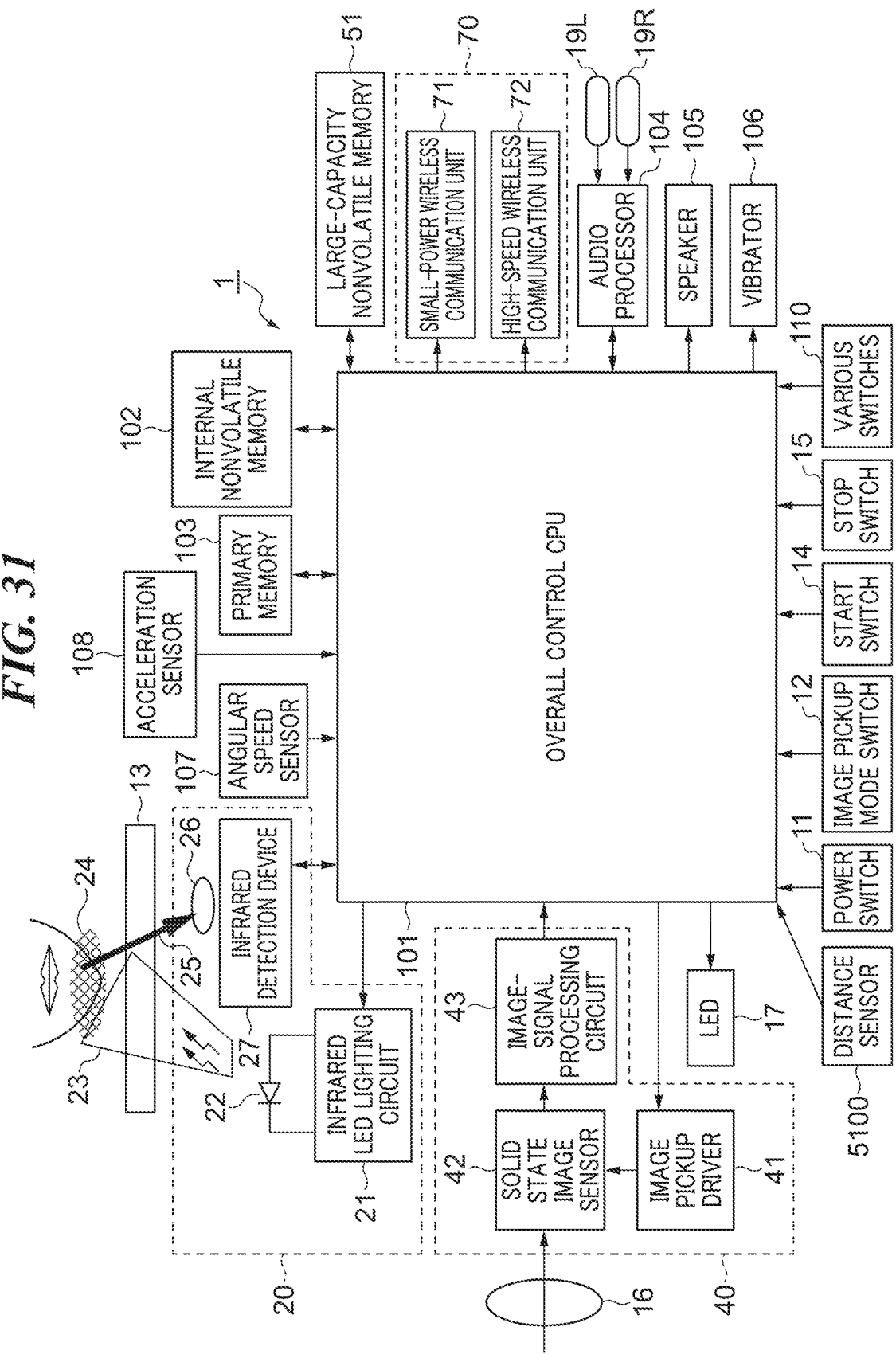
FIG. 31 is a block diagram showing a hardware configuration of the camera body according to the fifth embodiment.

FIG. 31 is a block diagram showing a hardware configuration of the camera body 1 according to this embodiment. The hardware configuration of the camera body 1 in this embodiment differs from that of the camera body 1 in the first embodiment shown in FIG. 5 in that a distance sensor 5100 is added. In this embodiment, the distance sensor 5100 is provided in an outer edge of the stop switch 15 as shown in FIG. 30. However, a mount position of the distance sensor 5100 is not limited to a certain position.

The distance sensor 5100 measures a distance to an object. It should be noted that the configuration of the distance sensor 5100 is not limited in particular. In this example, the distance sensor 5100 is an active type sensor that projects infrared light, laser, millimeter wave, etc. to an object and measures a distance to the object by receiving its reflection. Moreover, the distance sensor 5100 may be a passive type sensor that measures a distance to an object on the basis of phase difference of incident light through the image pickup lens 16. The distance sensor 5100 is connected to the overall control CPU 101 and is controlled by the overall control CPU 101.

Figure 32A:
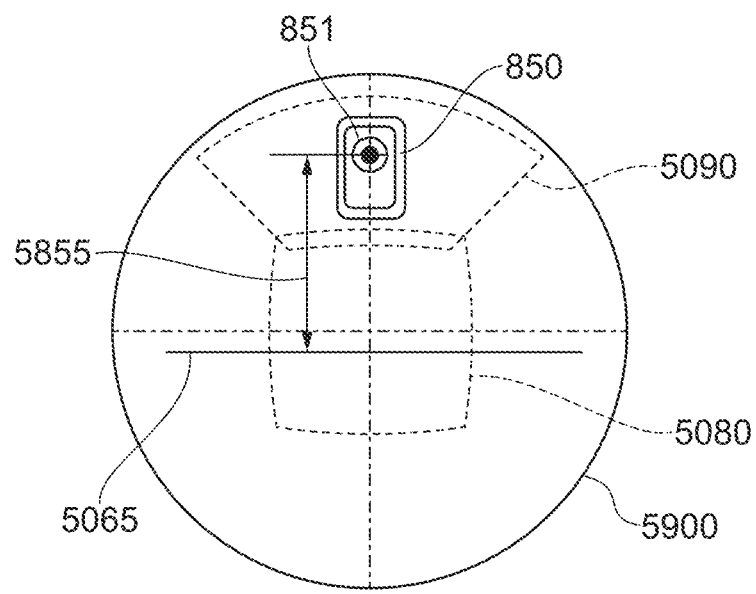
FIG. 32A and FIG. 32B are schematic views for describing a relationship between a user, a calibrator, and a target visual field during a calibration process including a parallax correction mode process in the fifth embodiment.
Figure 32B:
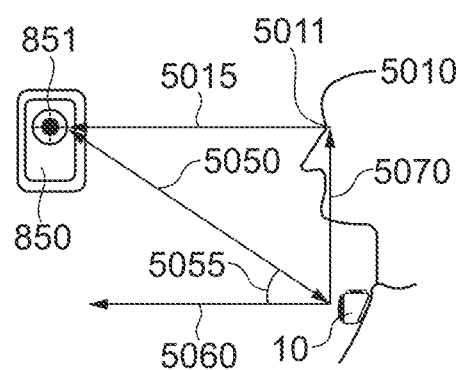

FIG. 32A and FIG. 32B are schematic views for describing a relationship between a user, a calibrator 850, and a target visual field 5080 during a calibration process including the parallax correction mode process in this embodiment. FIG. 32A is the schematic view showing an image 5900 including the calibrator 850 captured by the solid state image sensor 42. FIG. 32B is the schematic view showing a positional relationship between the user 5010 and the calibrator 850.

The target visual field 5080 in FIG. 32A is a target visual field in a case where the calibration process including the below-mentioned parallax correction mode process has not yet applied and a face direction 5015 detected by the face direction detection unit 20 is directed to the front.

In the meantime, a target visual field 5090 in FIG. 32A is a target visual field in a case where the calibration process including the below-mentioned parallax correction mode process has already applied and the face direction 5015 detected by the face direction detection unit 20 is directed to the front.

Figure 33A:
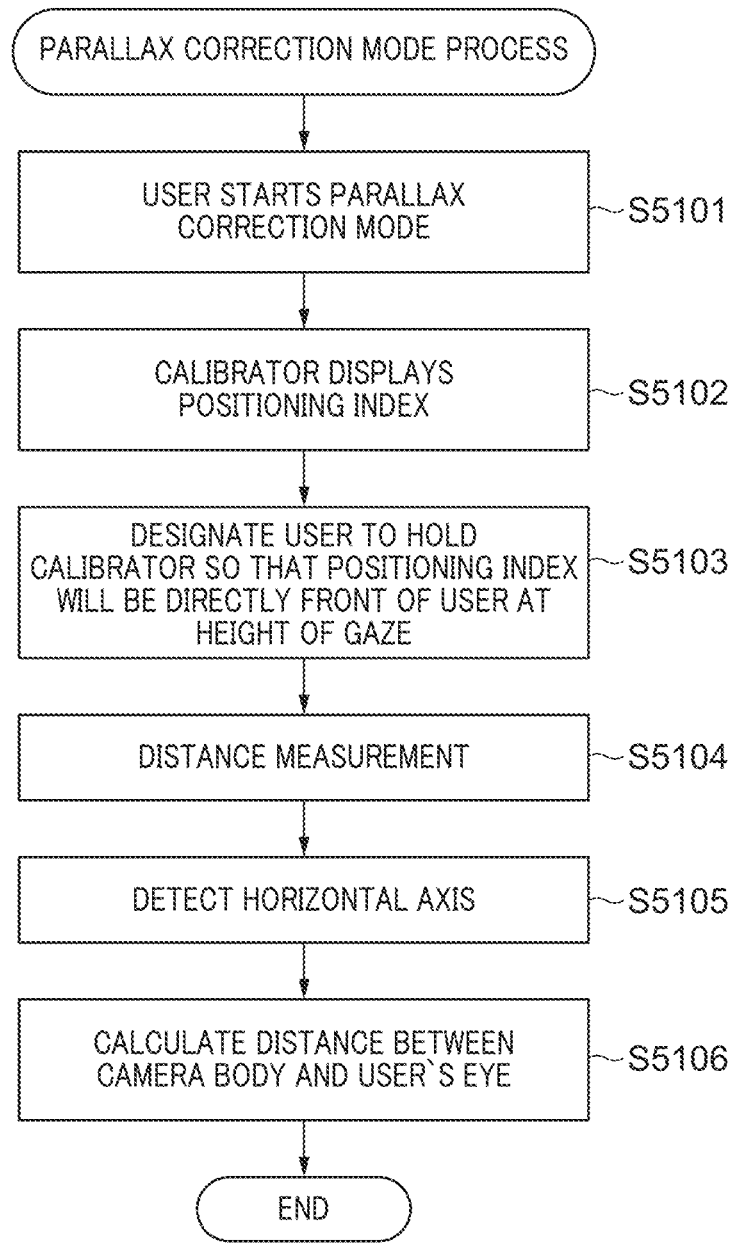
FIG. 33A is a flowchart showing the parallax correction mode process that is a part of the preparation process in the step S100 in FIG. 7A according to the fifth embodiment.

FIG. 33A is a flowchart showing the parallax correction mode process that is a part of the preparation process in the step S100 in FIG. 7A according to this embodiment. Hereinafter, details of this process will be described also by using FIG. 32A and FIG. 32B.

In the preparation process in the step S100 in FIG. 7A, when the parallax correction mode starts by an operation of the user 5010 to the calibrator 850 (a step S5101), the display-apparatus controller 801 displays the positioning index 851 (a step S5102).

Subsequently, the display-apparatus controller 801 designates a position (designation position) to which the user should hold the calibrator 850. Specifically, the display-apparatus controller 801 instructs the user 5010 to locate the positioning index 851 to the front at height of a gaze by giving an instruction display similar to the instruction display 855 shown in FIG. 22A (a step S5103).

After checking the instruction display, the user 5010 holds the calibrator 850 at the designation position designated in the step S5103 and directs the face direction 5015 toward the positioning index 851 (the front). At this time, the user 5010, positioning index 851, and image-pickup/detection unit 10 constitute the positional relationship shown in FIG. 32B.

After that, when determining that the user looked at the positioning index center 852 in the visual field center, the display-apparatus controller 801 measures a distance 5050 (FIG. 32B) between the image-pickup/detection unit 10 and the positioning index 851 with the distance sensor 5100 (a step S5104).

Subsequently, the overall control CPU 101 detects a horizontal axis 5060 of the image-pickup/detection unit 10 by the angular speed sensor (a posture detection unit) 107 (a step S5105). Thereby, a horizontal position 5065 of the image 5900 (FIG. 32A) captured by the solid state image sensor 42 is specified.

Moreover, the overall control CPU 101 obtains a distance 5855 (FIG. 32A) between the center of the positioning index 851 and the horizontal position 5065 on the image 5900 in the step S5105. After that, the overall control CPU (an angle calculation unit) 101 calculates an angle 5055 (FIG. 32B) between the horizontal axis 5060 and the direction of the positioning index 851 seen from the image-pickup/detection unit 10. This calculation is performed using the distance 5855 and the information about a relation between a point on the image 5900 and an incident angle of a light ray that images on the point. The information is saved in a memory (for example, the internal nonvolatile memory 102).

After that, a step S5106, the overall control CPU (a vertical distance calculation unit) 101 calculates a vertical distance 5070 between the image-pickup/detection unit 10 and the eye 5011 of the user 5010 using the distance 5050 and the angle 5055 calculated in the step S5105. Then, the process exits this subroutine.

In this embodiment, the vertical distance 5070 between the image-pickup/detection unit 10 and the eye 5011 of the user 5010 is measured by the method different from that of the second embodiment. However, the measurement method is not limited to this. For example, the vertical distance 5070 between the image-pickup/detection unit 10 and the eye 5011 of the user 5010 may be measured by the method described in the second embodiment, or the user 5010 may input the value of the vertical distance 5070 directly.

Since the calibration process including the parallax correction mode process in this embodiment is basically identical to the process in the steps S3101 through S3111 in FIG. 21 executed in the second embodiment, its description is omitted.

However, in the step S3110, a process to correct the parallax based on the vertical distance 5070 (FIG. 32B) calculated by the parallax correction mode process in FIG. 33A is added to the process described in the second embodiment. That is, the calibration such that the visual field of the user 5010 matches the target visual field 125 in infinity is performed.

Figure 33B:
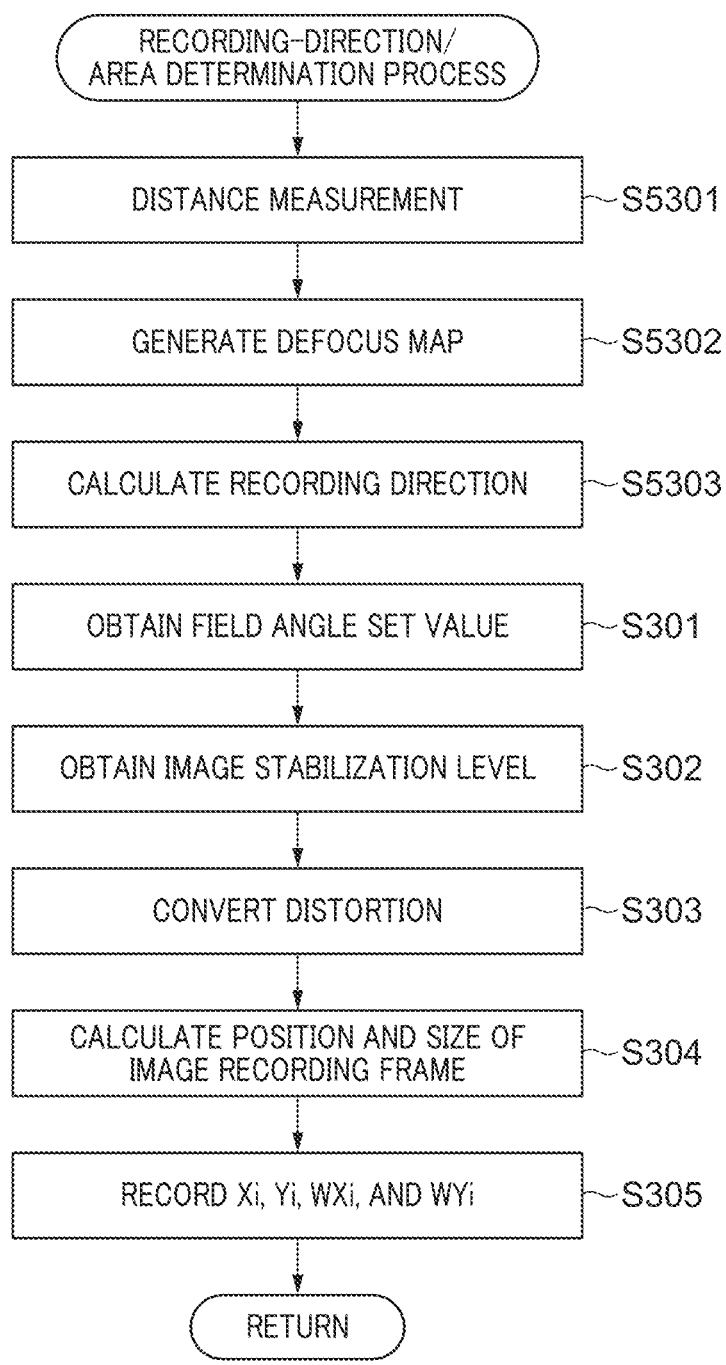
FIG. 33B is a flowchart showing a subroutine of a recording-direction/area determination process in the step S300 in FIG. 7A according to the fifth embodiment.

FIG. 33B is a flowchart showing a subroutine of a recording-direction/area determination process in the step S300 in FIG. 7A according to this embodiment. Hereinafter, this process will be described by also referring to FIG. 34A, FIG. 34B, and FIG. 34C. The steps in FIG. 33B that are identical to that in FIG. 7D are indicated by the same reference numerals and duplicated descriptions are omitted.

In FIG. 33B, the overall control CPU 101 first obtains distance information about an available image pickup area (image pickup target area) with the distance sensor (distance measurement unit) 5011 (a step S5301).

In the next step S5302, the overall control CPU (a creation unit) 101 creates a defocus map 5950 (FIG. 34A; distance map information) on the basis of the distance information (a measurement result by the distance sensor 5100) obtained in the step S5301.

Figure 34A:
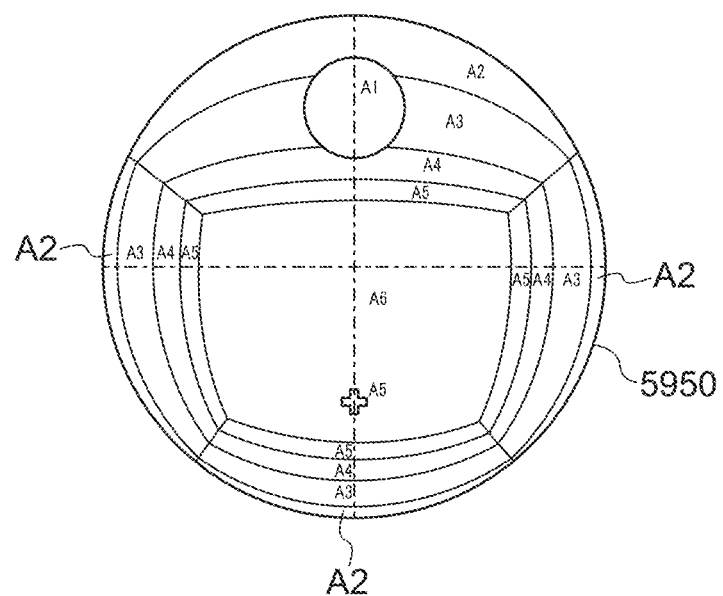
FIG. 34A, FIG. 34B, and FIG. 34C are schematic views showing a relationship between a defocus map generated in a step S5302 in FIG. 33B and a recording direction.
Figure 34B:
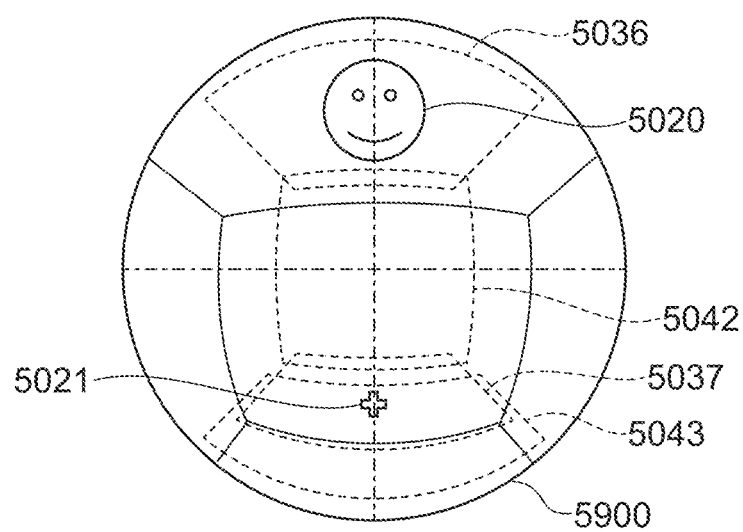
Figure 34C:
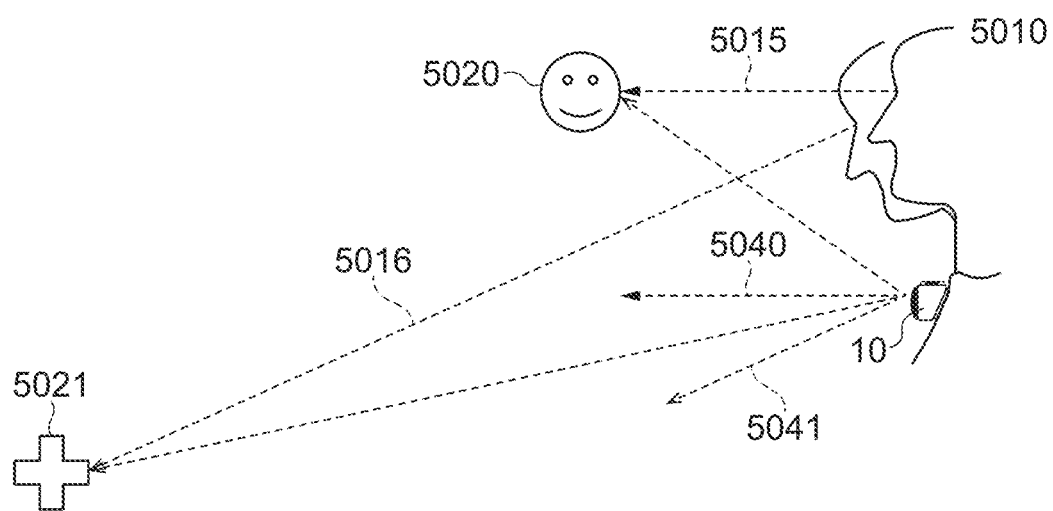

The defocus map 5950 in FIG. 34A is created when the situation shown in FIG. 34C where the observation object 5020 is appearing indoors is picked up. In order to show the distance information in the defocus map 5950 intelligibly, six distance areas A1 through A6 that are divided by the distance from the image-pickup/detection unit 10 are indicated stepwise. The distance area A1 is the nearest to the image-pickup/detection unit 10. In the meantime, the defocus map may be created stepless.

In the next step S5303, the overall control CPU 101 calculates the direction of the observation object 5020 seen from the image-pickup/detection unit 10 on the basis of the defocus map 5950, face direction 5015, and vertical distance 5070 (FIG. 32B). That is, the parallax correction is applied to the observation direction established on the basis of the face direction.

After that, the process in the steps S301 through S305 in FIG. 7D is performed, and the process exits this subroutine.

Use of the defocus map 5950 created in this way and the detection result of the face direction 5015 enables the calculation of the direction of the observation object 5020 seen from the image-pickup/detection unit 10. Since there is the parallax described using FIG. 29A and FIG. 29B, the distance to the observation object 5020 cannot be measured with the distance sensor 5100 unless creating the defocus map 5950.

The degree of the influence of the parallax described in this embodiment depends on the distance between the user 5010 and the observation object 5020. When an observation object is distant from the user 5010, the influence of the parallax can be disregarded. In such a case, the image can be extracted by the target visual field including the observation object and can be recorded by the recording-direction/area determination process in the first embodiment. For example, when the user 5010 observes an observation object 5021 (FIG. 34C) that is positioned in the middle distance area A5 distant to some extent from the user 5010, the parallax correction may not be applied to the recording direction in the step S5303. This is because the observation object 5021 is also included in the target visual field 5043 (FIG. 34B) established according to the recording direction (observation direction) 5041 that is estimated on the basis of the face direction 5016 detected by the face direction detection unit 20.

In the meantime, this embodiment can extend an allowable range of the distance between the user 5010 and the observation object of the user 5010 in which the observation object is held within the target visual field to the nearer side than the first embodiment. For example, the user 5010 shall be observing the observation object 5020 (FIG. 34A) that is positioned in the nearest area A1 of which the distance from the user 5010 is short. In this case, the observation direction (recording direction) 5040 is estimated on the basis of the face direction 5015 detected by the face direction detection unit 20 in the first embodiment. However, the target visual field 5042 (FIG. 34B) established according to this observation direction 5040 does not include the observation object 5020. In the meantime, in this embodiment, the parallax correction is applied to the observation direction 5040 in the step S5303 in FIG. 33B. As a result, the target visual field 5036 including the observation object 5020 is established according to the parallax-corrected recording direction. Accordingly, an observation object of which the distance to the user 5010 is short to such an extent that influence of parallax cannot be disregarded, such as the observation object 5020, can be also satisfactorily picked up.

Moreover, according to this embodiment, an observation object positioned in the middle distance area A5 can be recorded at nearer position to the center of the target visual field. For example, when the user 5010 is observing the observation object 5021 (FIG. 34A) positioned in the middle distance area A5, if the parallax correction is not applied to the recording direction 5041 like the first embodiment, the target visual field 5043 in which the observation object 5021 is located in an upper end will be established. In the meantime, in this embodiment, since the parallax correction is applied to the recording direction 5041 in the step S5303 in FIG. 33B, a recording area (target visual field) 5037 in which the observation object 5021 is located at the center is generated according to the parallax-corrected recording direction.

In this way, when the parallax correction of this embodiment is applied, an observation object can be captured at nearer position to a center of an extracted image in comparison with the first embodiment.

In this embodiment, the parallax correction is performed in the calibration so that a visual field of a user matches a target visual field in infinity. And then, when an image is picked up, the parallax correction is applied so that deviation of recording directions before and after the correction becomes larger as a distance between a user and an observation object becomes shorter. In the meantime, the parallax correction of this embodiment may be applied in the calibration process in the second embodiment to an object that is closer to the user than the position of the calibrator 850 or an object that is more distant from the user than the position of the calibrator 850.

Next, a sixth embodiment will be described. In the sixth embodiment, an extraction-area determination method used when calculation of an observation direction fails will be described using FIG. 35, FIG. 36A, and FIG. 36B.

This embodiment is described as a derivation from the first embodiment basically. Accordingly, configurations of the camera system in the sixth embodiment that are identical to the configurations of the camera system in the first embodiment are indicated by the same reference numerals and duplicated descriptions are omitted. A different configuration will be described by adding details.

In the first embodiment, as shown in FIG. 7A, the target visual field is established in the recording-direction/area determination process in the step S300 on the basis of the observation direction calculated from the face direction detected by the face direction detection unit 20 in the step S200. However, the face direction detection unit 20 may be covered by obstacles, such as a collar and hair, may break down, or may separate from the user. In such a case, the face direction of the user cannot be obtained and an image of a target visual field that the user wanted to pick up cannot be picked up.

In JP 2007-74033A, when the second camera that is used to capture a user cannot detect a user, detection of a user is retried without storing failure of detection in a history of detection information about a user. Moreover, if detection of the face direction fails during an image pickup operation by tracking a face direction, an image that does not largely depart from user's intention is picked up by determining an image pickup direction depending on a situation.

Against this, in this embodiment, when a face direction of a user can be detected, the face direction is detected by the face direction detection unit 20 and picks up an image of a target visual field according to a recording direction that is calculated on the basis of the observation direction as with the first embodiment. In the meantime, when a face direction of a user cannot be detected and an observation direction of the user cannot be calculated, an image of a target visual field to which user's intention is reflected is picked up. That is, in this embodiment, after the face direction detection process in the step S200 is completed, an observation direction determination process is executed before executing the recording-direction/area determination process in the step S300. In the observation direction determination process, when the face direction detection unit 20 fails in detection of a user's face direction, an observation direction is estimated by determining user's intention according to a situation. That is, an image of a target visual field in a recording direction based on a factor other than the observation direction calculated from a face direction is picked up.

Figure 35:
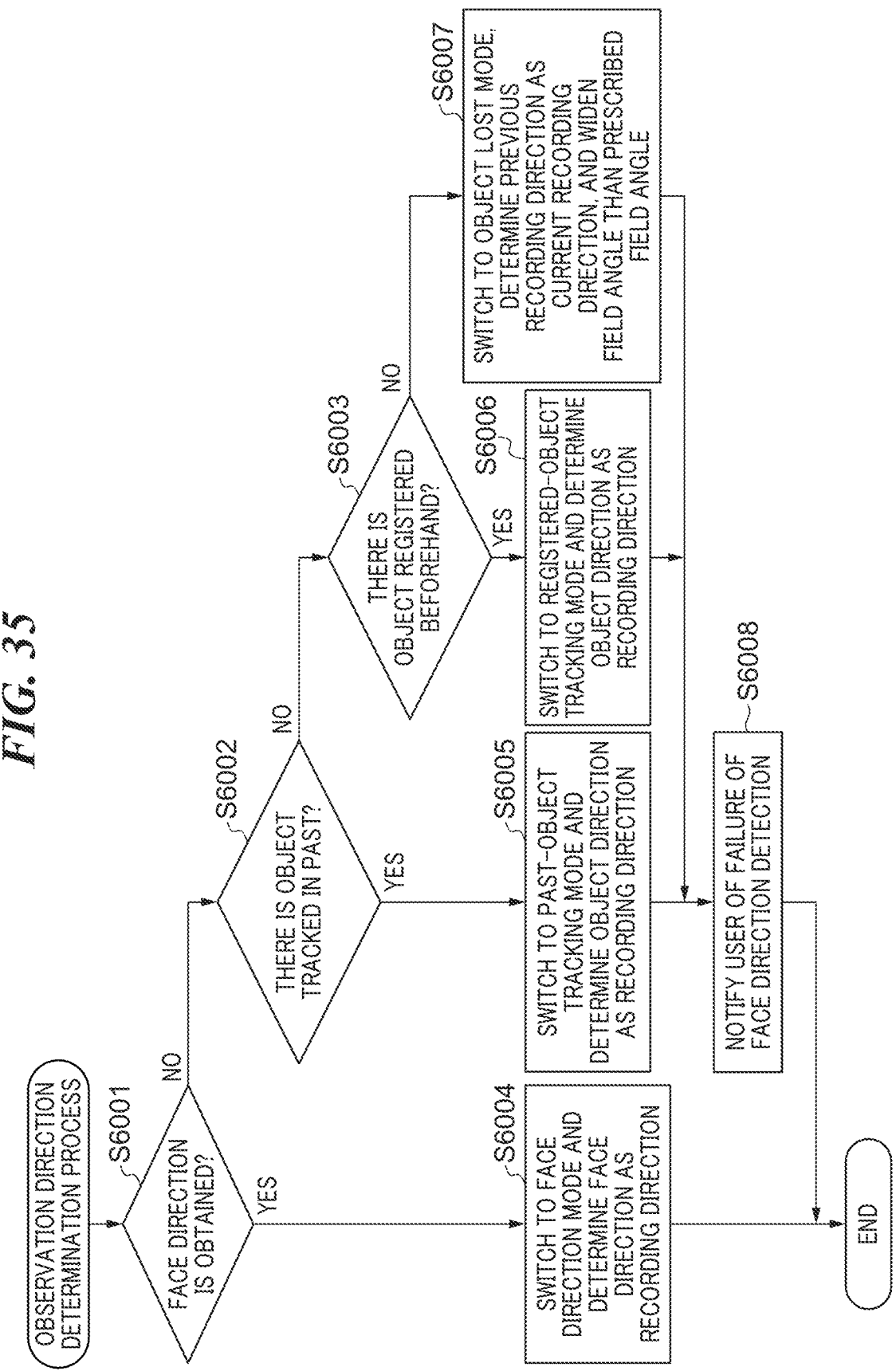
FIG. 35 is a flowchart showing an observation direction determination process according to a sixth embodiment.

FIG. 35 is a flowchart of the observation direction determination process according to this embodiment executed by the overall control CPU 101. Hereinafter, this process will be described by also using FIG. 36A and FIG. 36B.

In a step S6001, it is determined whether a face direction is detected by the face direction detection unit 20. When the face direction is obtained, the process proceeds to a step S6004. In the step S6004, the overall control CPU (a mode switching unit) 101 switches a mode of this process to a face direction mode (first image pickup mode) and decides the observation direction calculated from the face direction by the method shown in the first embodiment as the recording direction. After that, the process exits this subroutine.

In the meantime, when a face direction is not obtained (NO in the step S6001), the overall control CPU (mode switching unit) 101 proceeds with the process to a step S6002 in order to shift to another mode. In the step S6002, it is determined whether there is any object that was tracked in the past.

The determination process in the step S6002 will be described using FIG. 36A that shows relationship between an observation direction detection state of the user and a pickup image for every frame.

In FIG. 36A, "n" denotes a frame number of the image, "θ" denotes a horizontal moving angle of a user's face, a user's state shows positional relationship between the user and an observation object in each frame. Moreover, an entire image shows a superwide-angle image picked up by the image pickup unit 40 in each frame, and a pickup image shows an image that is secondarily recorded in each frame and corresponds to an area shown by a dotted line in the entire image.

As shown in each screen of the user's state in FIG. 36A, the user is observing an object shown by a quadrangle in a bottom position of the screen as an observation object. FIG. 36A exemplifies a case where a user's observation direction cannot be detected in the fifth frame (n=5).

In this embodiment, a period including four previous frames based on a current frame is defined as a predetermined period. When an object that can be determined as the same in three or more times within the predetermined period is included in the pickup image, it is determined that there is an object that was tracked in the past.

As shown in FIG. 36A, although the moving angle θ varies by every +10° from the first frame (n=1) to the fourth frame (n=4), the object shown by the quadrangle that can be determined as the identical object is included in the pickup image. Accordingly, in the fifth frame (n=5), it is determined that there is an object that was tracked in the past. It should be noted that the criterion of the determination in the step S6002 may be changed corresponding to the detection cycle of the face direction or the accuracy of the face direction detection unit 20.

Returning back to FIG. 35, when it is determined that there is the identical object that was tracked in the past predetermined period (YES in the step S6002), the process proceeds to the step S6005.

In the step S6005, the mode of this process is switched to a past-object tracking mode (second image pickup mode) in which a past-object direction is determined as the recording direction, and the recording direction is determined so as to track the past object. And then, the process proceeds to a step S6008. In this way, in this embodiment, even if the face direction cannot be detected, since the mode is switched to the past-object tracking mode and the recording direction is determined when there is an object that was tracked in the past, the user's immediately preceding intention can be reflected to the image. Since a method of recognizing an object within a pickup image and an object tracking detection method performed by the overall control CPU (an object recognition unit) 101 are publicly known, their detailed descriptions are omitted.

In the meantime, when it is determined that there is no object that was tracked in the past (NO in the step S6002), the process proceeds to a step S6003. In the step S6003, it is determined whether the object registered into the internal nonvolatile memory (an object registration unit) beforehand is detected in the newest pickup image.

In this embodiment, a user designates an image in which a person that the user wants to pick up from among images stored in the display apparatus 800. The display-apparatus controller 801 recognizes features of the person and registers the object beforehand by transmitting the features to the overall control CPU 101 in the camera body 1. It should be noted that an object detected in the step S6003 is not limited to this. For example, an object included in a pickup image obtained at a reading completion timing or other detection timings may be detected in the step S6003. Moreover, whether the object registered beforehand matches the object in the newest pickup image is determined with a pattern matching technique. Since the pattern matching technique is publicly known, its detailed description is omitted.

When it is determined that the object registered beforehand is detected in the newest pickup image (YES in the step S6003), the process proceeds to a step S6006. In the step S6006, the mode of this process is switched to a registered-object tracking mode (third image pickup mode) in which a registered-object direction is determined as the recording direction, and the recording direction is determined so as to track the registered object. And then, the process proceeds to the step S6008.

In the meantime, when it is determined that the object registered beforehand is not detected in the newest pickup image (NO in the step S6003), it is determined that an observation object cannot be estimated, and the process proceeds to the step S6007.

In the step S6007, the overall control CPU (a field-angle change unit) 101 switches the mode of this process to an object lost mode (a fourth image pickup mode) in which the recording direction prior to the failure of the face direction detection is kept and the image pickup field angle is widened than a prescribed field angle. After that, the process proceeds to the step S6008. It should be noted that the recording direction in the object lost mode may be continuously moved by the change amount of the observation direction prior to the failure of the face direction detection.

Hereinafter, a case proceeds to the step S6007 entering into the object lost mode is described using FIG. 36B. FIG. 36B exemplifies a case where the user's observation direction cannot be detected in the fifth frame (n=5).

In the example in FIG. 36B, a main object is not found from the first frame (n=1) to the fourth frame (n=4) and an object registered beforehand is not found in the pickup image of the fifth frame (n=5). Accordingly, the observation direction in the fifth frame (n=5) is moved rightward in the entire image by inertia of the movement in the first through fourth frames. Moreover, the field angle extracted from the entire image is changed to a wider angle.

In the step S6008, when the recording direction is determined on the basis of a factor other than the face direction in either of the steps S6005 through S6007, the overall control CPU (a notification unit) 101 notifies the user of an error (a detection error) showing that the face direction detection failed. After that, the process exits this subroutine. In this embodiment, a warning is output to the user using the vibrator 106 in FIG. 5. The notification method in the step S6008 is not limited to this. Other notification methods, such as a warning using the LED 17, and a display of a warning message on a terminal like the display apparatus 800 that cooperates with the camera body 1, may be employed.

As mentioned above, in this embodiment, since the recording direction and the field angle are changed according to a situation when the face direction cannot be detected, the user can avoid a pickup miss of the image of the target visual field that the user inherently wants to pick up.

That is, in this embodiment, when a face direction cannot be detected and when the object that was tracked in the past or the object that is registered beforehand is detected, the object is tracked. In the meantime, when such an object cannot be detected, the image pickup field angle is widened than the prescribed field angle in order to avoid the pickup miss and to facilitate re-detection of an object.

Thereby, a situation where an image that the user does not intend is picked up because of failure of face direction detection can be prevented.

Although the process in the steps S6001 through S6008 is performed for every frame, the mode can be changed according to a mode determination information, such as information about whether the face direction is obtained from the face direction detection unit 20, even after shifting to each mode. For example, in this embodiment, when the object that is registered beforehand is detected as a result of widening the field angle in the object lost mode, the mode is shifted to the registered-object tracking mode in which the direction of the detected object is determined as the recording direction. In this case, the widened field angle is restored to the prescribed field angle.

Moreover, although the mode is changed by one-time determination in this embodiment, the mode may be shifted on the basis of multiple-time determinations according to the frame rate or the performance in the face direction detection.

Next, a seventh embodiment will be described. In the seventh embodiment, a method to determine an observation direction according to an accuracy (reliability) of face direction detection will be described using FIG. 37A through FIG. 40.

This embodiment is described as a derivation from the first embodiment basically. Accordingly, configurations of the camera system in the seventh embodiment that are identical to the configurations of the camera system in the first embodiment are indicated by the same reference numerals and duplicated descriptions are omitted. A different configuration will be described by adding details.

The sixth embodiment prevents an image pickup operation in a recording direction that the user does not intend by switching the mode that determines the observation direction according to whether the face direction can be detected. In the meantime, when a user's face direction cannot be stably detected like JP 2007-74033A, an image may be pick up at a field angle that a user does not intend. When the image-pickup/detection unit 10 of the camera body 1 is worn in front of the clavicles as shown in FIG. 1B, the detection accuracy of the face direction detection may fall under the influence of a collar, hair, etc. If the detection accuracy falls, the face direction cannot be stably detected.

Figure 37A:
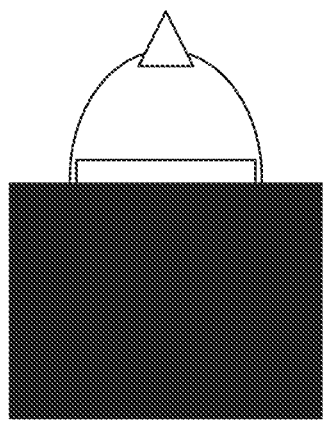
FIG. 37A, FIG. 37B, and FIG. 37C are views for describing relationships between an observation direction and a face area that can be used for detection of the observation direction according to a seventh embodiment.
Figure 37B:
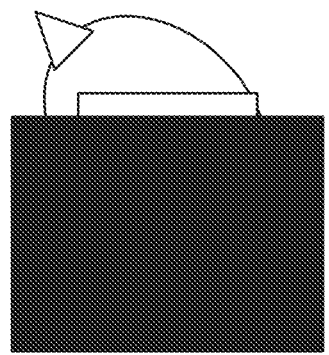
Figure 37C:
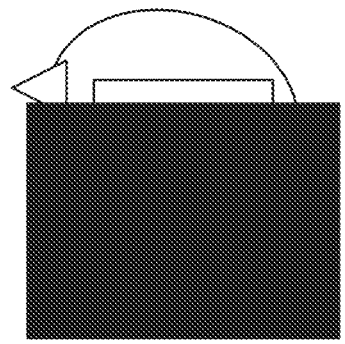

When the user turns the face in the lateral direction (FIG. 37B and FIG. 37C), an area where a jaw and a cheek are hidden by a body or a shoulder becomes larger than that in a case where the user faces the front direction (FIG. 37A). That is, the camera body 1 has such a characteristic that the face area that can be used to detect the face direction becomes narrow in some face directions. The possibility of drop of the detection accuracy increases in such face directions. This characteristic greatly depends on the wearing point of the camera body 1 selected by the user.

In this embodiment, the detection accuracy (reliability) of the face direction is calculated on the basis of detection results of the wearing position of the camera body 1 and the face direction. When the reliability is high, the face direction is largely reflected to the observation direction. When the reliability is low, a factor other than the face direction is largely reflected to the observation direction. Thereby, the user's intention can be reflected to the image pickup operation.

Figure 38:
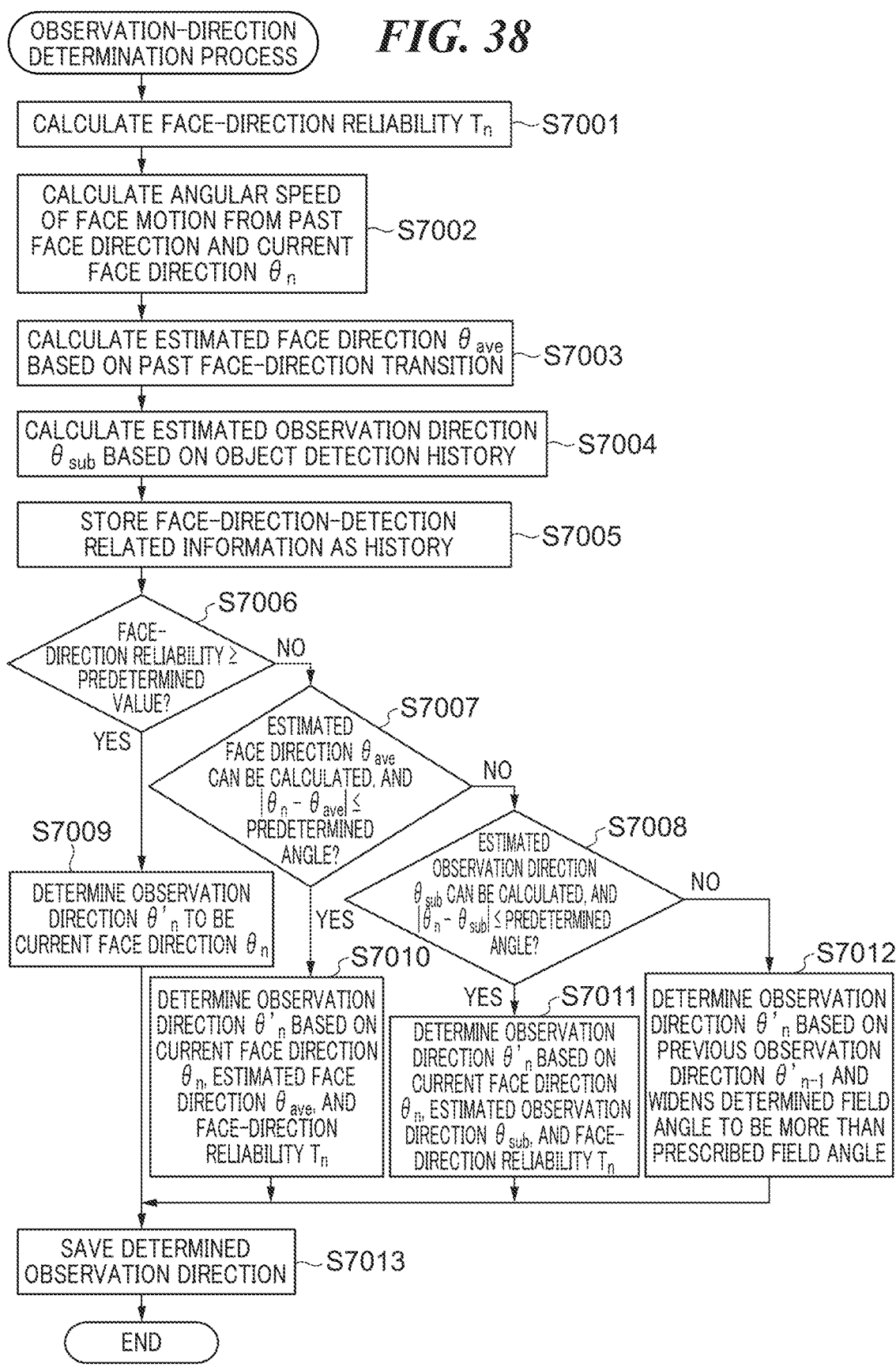
FIG. 38 is a flowchart showing an observation direction determination process according to the seventh embodiment in obtaining the face direction that is executed instead of the process in a step S6004 in FIG. 35.

FIG. 38 is a flowchart showing an observation direction determination process according to this embodiment in obtaining the face direction that is executed instead of the process in the step S6004 in FIG. 35. This process is executed by the overall control CPU (an observation-direction determination unit) 101.

In a step S7001, the overall control CPU (a first-observation-direction calculation unit and a reliability calculation unit) calculates a face direction reliability $T_n$ on the basis of the face direction (a first observation direction) $\theta_n$ obtained by the face direction detection unit 20 in picking up the image of the frame n.

The face direction reliability $T_n$ is calculated as follows. First, the face direction $\theta_n$ is divided into three components, a face direction $\theta_{yaw}$, a face direction $\theta_{pitch}$, and a face direction $\theta_{roll}$. The face direction $\theta_{yaw}$ is a rotation component of face movement in the lateral direction. The face direction $\theta_{pitch}$ is a rotation component of the face movement in the vertical direction. The face direction $\theta_{roll}$ is a rotation component of a tilt of the head.

Since this embodiment assumes that the user wears the camera body on the user's clavicular and detects the face direction from a position under the face, the face direction reliability $T_n$ ($0 \leq T_n \leq 1$) is found by the following formula 701.

$$T_n = \frac{1}{1 + |\tan(2 \cdot \theta_{yaw})| \cdot |\tan(2 \cdot \theta_{pitch})| \cdot |\tan(2 \cdot \theta_{roll})|} \quad \text{Formula 701}$$

Figure 39:
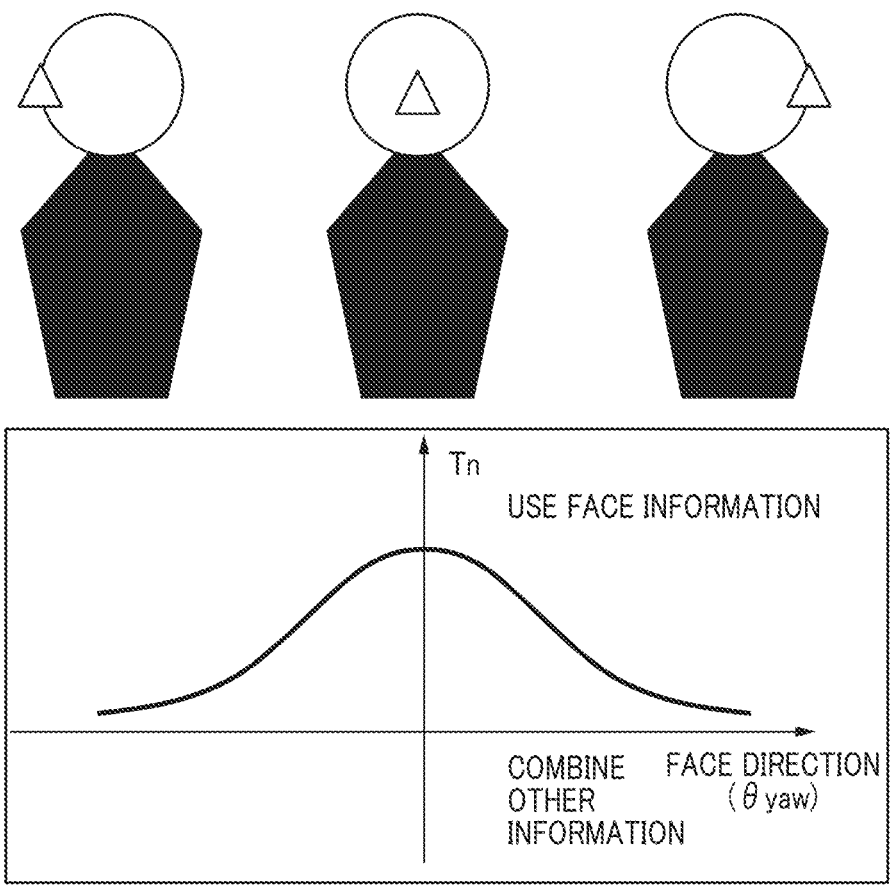
FIG. 39 is a view showing a relationship between the face direction and a face direction reliability in the seventh embodiment.

FIG. 39 shows the relationship between the face direction $\theta_{yaw}$ the face direction reliability $T_n$. A graph in FIG. 39 shows that the face direction reliability $T_n$ becomes lower as the angle of the face direction $\theta_{yaw}$ from the front becomes larger.

The face direction reliability $T_n$ is calculated using the formula 701 in this embodiment. In the meantime, the face direction reliability may be obtained by weight-averaging values calculated by weighting the past face direction reliabilities according to the detection accuracy of the face direction by the face direction detection unit 20 and the frame rate of the detection. Moreover, the accuracy of pattern matching, the wearing position, etc. may be weighted in calculating the face direction reliability $T_n$.

Moreover, in this embodiment, the face direction reliability that estimates the observation direction is calculated by the formula 701. However, the calculation method of the face direction reliability is not limited to this. For example, a face direction reliability adjusted according to the wearing point of the camera body 1 that is estimated by the calibration in the second embodiment may be employed. Moreover, when it is determined a detection accuracy is low in the calibration, the face direction reliability may be changed according to the detection accuracy. Furthermore, when the face direction is detected using machine learning, a precision ratio may be reflected to the face direction reliability.

In a step S7002, the overall control CPU 101 finds the angular speed $\omega_n$ of movement of the face. Specifically, the angular speed $\omega_n$ is found by the following formula 702 using the face direction $\theta n$ obtained by the face direction detection unit 20 in picking up the image of the frame n, its face direction obtainment time $t_n$, the face direction $\theta_{n-1}$ of the previous frame stored in the primary memory 103, and its face direction obtainment time $t_{n-1}$.

$$\omega_n = \frac{\theta_n - \theta_{n-1}}{t_n - t_{n-1}} \qquad \text{Formula 702}$$

Although the angular speed $\omega_n$ is calculated using the information about the current frame and the information about the previous frame in this embodiment, the angular speed may be found using one or more pieces of past information depending on the frame rate etc.

In a step S7003, the overall control CPU (an observation-direction estimation unit) 101 estimates the current face direction from the transition of the past face directions stored in the primary memory 103. In this embodiment, a period including four previous frames based on a current frame is defined as a predetermined period. When the continuous change of face direction in a certain direction is determined at three or more times within the predetermined period, it is determined that the observation direction can be estimated from the past face directions and angular speeds. Moreover, in this estimation, an estimated angular speed $\omega_{ave}$ that is a weighted average of the angular speeds obtained from the past four frames is calculated by the following formula 703, and an estimated face direction $\theta_{ave}$ (first observation direction) is calculated by the following formula 704. The calculations of the formulae 703 and 704 respectively correspond to processes a1 and a2 shown in FIG. 40.

It should be noted that the length of the predetermined period and the weights of the weighted average used in the step S7003 may be changed according to the frame rate and the detection accuracy of the face direction detection unit 20.

$$\omega_{ave} = \frac{\sum_{k=1}^{3} \omega_{n-t}}{3} \qquad \text{Formula 703}$$

$$\theta_{ave} = \theta_{n-1} + (t_n - t_{n-1}) \cdot \omega_{ave} \qquad \text{Formula 704}$$

In a step S7004, the overall control CPU 101 estimates the observation direction using internal information other than the information from the face direction detection unit 20 from among the information stored in the primary memory 103. Specifically, in this embodiment, it is determined whether the object is currently tracked on the basis of an object detection history. When it is determined that the object is currently tracked, an estimated observation direction $\theta_{sub}$ (a second observation direction) based on the movement of the object is calculated. In this embodiment, a period including four previous frames based on a current frame is defined as a predetermined period. When an object that can be determined as the identical object is detected at three or more times within the predetermined period, it is determined that the object is currently tracked. The criterion of the object tracking determination may be changed corresponding to the cycle and accuracy of the detection by the overall control CPU 101. Since an object tracking detection technique is publicly known, its detailed description is omitted.

Although the internal information used for the estimation of the observation direction in the step S7004 is the object detection history in this embodiment, it is not limited to this. For example, the observation direction may be estimated according to the wearing position and performance of the camera body 1 using face information of the user captured by the image pickup unit 40 or the information about movement and posture of the camera body 1 detected by the angular speed sensor 107 and the acceleration sensor 108. Moreover, when there is an object registered beforehand, the overall control CPU (a third observation direction estimation unit) 101 may determine the direction of the object registered beforehand in the newest pickup image as the estimated observation direction $\theta_{sub}$ as with the step S6006 in the sixth embodiment.

In a step S7005, the overall control CPU 101 stores face-direction-detection related information into the primary memory 103 as a history. The face-direction-detection related information includes the angular speed $\omega$n of movement of the face generated in the step S7002, the face direction reliability $T_n$ calculated in the step S7001, the face direction $\theta_n$ detected by the face direction detection unit 20, the face direction obtainment time $t_n$, and the generated time points of these values.

In a step S7006, the overall control CPU 101 determines whether the face direction reliability $T_n$ calculated in the step S7001 is equal to or more than a predetermined value. When the face direction reliability $T_n$ is equal to or more than the predetermined value, it is determined that the face direction reliability is high and the process proceeds to a step S7009. In the step S7009, the overall control CPU 101 determines the face direction as the current observation direction $\theta'_n$. Then, the process proceeds to the step S7013.

In the meantime, when the face direction reliability $T_n$ calculated in the step S7001 is less than the predetermined value (NO in the step S7006), the process proceeds to a step S7007. In the step S7007, it is determined that whether the estimated face direction $\theta_{ave}$ can be calculated in the step S7003 and whether $|\theta_n - \theta_{ave}|$ is equal to or less than a predetermined angle. When the two conditions are satisfied, the process proceeds to a step S7010. In this embodiment, the predetermined angle is set to $\pi/8$ in the determination.

In the step S7010, the overall control CPU (a first observation-direction estimation unit) 101 determines the current observation direction $\theta'_n$ using the face direction $\theta$n, the estimated observation angle $\theta_{ave}$, and the face direction reliability $T_n$. In this embodiment, the current observation direction $\theta$'n is calculated by the following formula 705, and the process proceeds to the step S7013. The calculation of the formula 705 corresponds to a process b1 shown in the in FIG. 40. As shown in FIG. 39, the face direction reliability $T_n$ becomes higher as the absolute value of the face angle $\theta_{yaw}$ becomes smaller. Accordingly, when the absolute value of the face angle $\theta_y$aw is small, the face direction $\theta_n$ is largely reflected to the current observation direction $\theta'_n$ as shown by the formula 705. In the meantime, when the absolute value of the face angle $\theta_{yaw}$ is large, the factor other than the face direction $\theta$n (specifically, the estimated face direction $\theta'_{ave}$) is largely reflected to the current observation direction $\theta$'n as shown by the formula 705.

$$\theta'_n = T_n \cdot \theta_n + (1 - T_n) \cdot \theta_{ave} \qquad \text{Formula 705}$$

When the above-mentioned conditions are not satisfied in the step S7007, the process proceeds to a step S7008. In the step S7008, it is determined whether the estimated observation direction $\theta_{sub}$ can be calculated and whether $|\theta_n - \theta_{sub}|$ is equal to or smaller than a predetermined angle. When the conditions in the step S7008 are satisfied, the process proceeds to a step S7011. In this embodiment, the predetermined angle is set to $\pi/8$ in the determination as with the step S7010.

In the step S7011, the overall control CPU (a second observation-direction estimation unit) 101 determines the current observation direction $\theta'_n$ using the face direction $\theta_n$, the estimated observation direction $\theta_{sub}$, and the face direction reliability $T_n$. In this embodiment, the current observation direction $\theta'n$ is found by the following formula 706, and the process proceeds to the step S7013. As shown in FIG. 39, the face direction reliability $T_n$ becomes higher as the absolute value of the face angle $\theta_{yaw}$ becomes smaller in the same manner as the step S7010. Accordingly, when the absolute value of the face angle $\theta_{yaw}$ is small, the face direction $\theta_n$ is largely reflected to the current observation direction $\theta'_n$ as shown by the formula 706. In the meantime, when the absolute value of the face angle $\theta_{yaw}$ is large, the factor other than the face direction $\theta_n$ (specifically, the estimated observation direction $\theta_{sub}$) is largely reflected to the current observation direction $\theta'_n$ $$\theta'_n = T_n \cdot \theta_n + (1 - T_n) \cdot \theta_{sub} \qquad \text{Formula 706}$$

When the above conditions are not satisfied in the step S7008, it is determined that reliable observation direction cannot be obtained in the present situation, and the process proceeds to a step S7012. In the S7012, the current observation direction $\theta'_n$ is determined by moving the previous observation direction $\theta'_{n-1}$ with inertia based on the transition of the past observation directions and the field angle is widened than the prescribed field angle. Then, the process proceeds to the step S7013. This reduces a possibility that the user misses picking up an object that the user intends.

Although the calculation method of the current observation direction $\theta'_n$ is switched according to the face direction reliability $T_n$ and the detection state of the object in this embodiment, it is not limited to this. For example, when the estimated face direction $\theta_{ave}$ and estimated observation direction $\theta_{sub}$ are calculated, their reliabilities (estimated direction reliabilities) may be also calculated. In such a case, the calculated observation direction $\theta'_n$ can be corrected according to the calculated reliabilities.

Moreover, since the possibility that the user misses picking up an object that the user intends becomes high when the calculated reliabilities are not more than the predetermined value, it is preferable to widen the field angle than the prescribed field angle. Moreover, in such a case, the process may proceed to the step S7012. After that, when one of the calculated reliabilities will become larger than the predetermined value, it is preferable to restore the widened field angle to the prescribed field angle.

As a result of the process in FIG. 38, when the face direction reliability $T_n$ is high, the face direction $\theta_n$ is determined as the current observation direction $\theta'_n$. In the meantime, when the face direction reliability $T_n$ is low, the current observation direction $\theta'_n$ (recording direction) is determined using the face directions obtained under the high face direction reliability $T_n$, the factor other than the face direction, or the like according to the situation. Furthermore, the field angle is widened if needed.

Namely, when the low detection accuracy of the face direction is estimated because of the low face direction reliability $T_n$ the estimated face direction $\theta_{ave}$ or the estimated observation direction $\theta_{sub}$ is used. Thereby, a situation where an image that the user does not intend is picked up because of failure of face direction detection can be prevented.

Next, an eighth embodiment will be described. In the eighth embodiment, a method to wear the camera body 1 at a stable position will be described using FIG. 41A through FIG. 45G. This embodiment is described as a derivation from the first embodiment basically. Accordingly, configurations of the camera system in the eighth embodiment that are identical to the configurations of the camera system in the first embodiment are indicated by the same reference numerals and duplicated descriptions are omitted. A different configuration will be described by adding details.

Figure 41A:
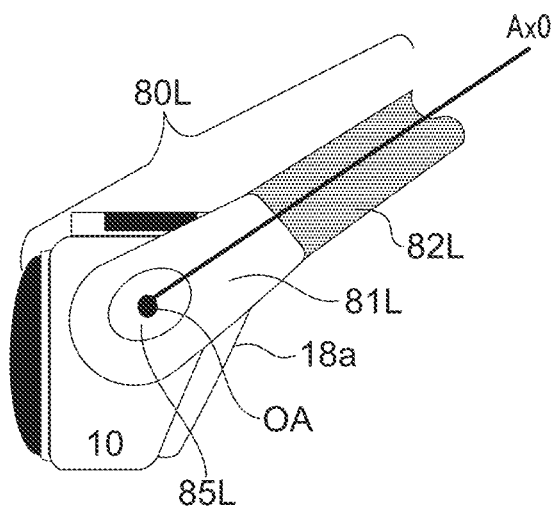
FIG. 41A, FIG. 41B, and FIG. 41C are enlarged side views showing the image-pickup/detection unit.
Figure 41B:
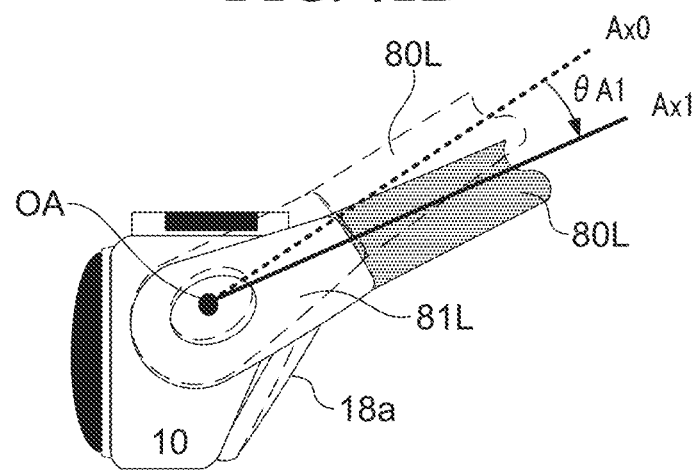
Figure 41C:
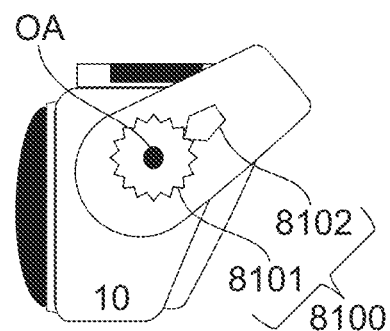

The angle adjustment of the connection members 80L and 80R (neck hanging members) is described first. FIG. 41A, FIG. 41B, and FIG. 41C are enlarged side views showing the image-pickup/detection unit 10. Although the following description exemplifies the left connection member 80L, the right connection member 80R is adjusted similarly.

FIG. 41A is a view showing a state where the connection member 80L is set in a standard position Ax0. FIG. 41B is a view showing a state where the connection member 80L has rotated by an angle $\theta A1$ with respect to the standard position Ax0 around a rotation axis OA. FIG. 41C is a schematic view showing a mechanical structure inside the angle holding member 81L that can be seen when an exterior of the angle holding member 81L is removed.

As shown in FIG. 41C, an angle adjustment mechanism (neck-hanging-angle adjustment mechanism) 8100 is arranged inside the angle holding member 81L.

The angle adjustment mechanism 8100 consists of an angle adjustment cam 8101 that adjusts the angle of the angle holding member 81L with respect to the image-pickup/detection unit 10 and a latching member 8102 that latches the angle adjustment cam 8101. It should be noted that the rotation axis OA of the angle holding member 81L agrees with the center of the angle adjustment cam 8101.

The latching member 8102 is energized to the angle adjustment cam 8101 with a spring (not shown). While the angle adjustment button 85L (FIG. 2F) is pressed, the energization is released and the latching member 8102 can separate from the angle adjustment cam 8101. Namely, only while the angle adjustment button 85L is pressed, the angle holding member 81L of the connection member 80L becomes rotatable with respect to the image-pickup/detection unit 10.

When rotating the angle holding member 81L with respect to the image-pickup/detection unit 10 while pressing the angle adjustment button 85L, the user is able to adjust the connection member 80L from the standard position Ax0 (FIG. 41A) to a position Ax1 (FIG. 41B).

Although this embodiment employs a stepped adjustment mechanism, which consists of the angle adjustment cam 8101 and latching member 8102, as the mechanism that holds the angle of the angle holding member 81L with respect to the image-pickup/detection unit 10, a stepless adjustment mechanism using sliding resistance may be employed.

Moreover, although this embodiment employs the configuration that the user rotates the angle holding member 81L while pressing the angle adjustment button 85L, it is not limited to this. For example, a configuration that does not need the angle adjustment button 85L may be used. Such a configuration allows rotation of the angle holding member 81L when external force more than a threshold is applied. For example, a ball may be used instead of the latching member 8102 and sliding resistance may be used.

Figure 42A:
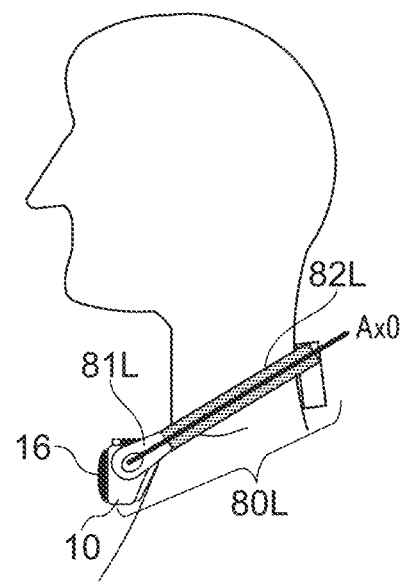
FIG. 42A, FIG. 42B, and FIG. 42C are side views showing a state where the user wears the camera body.
Figure 42B:
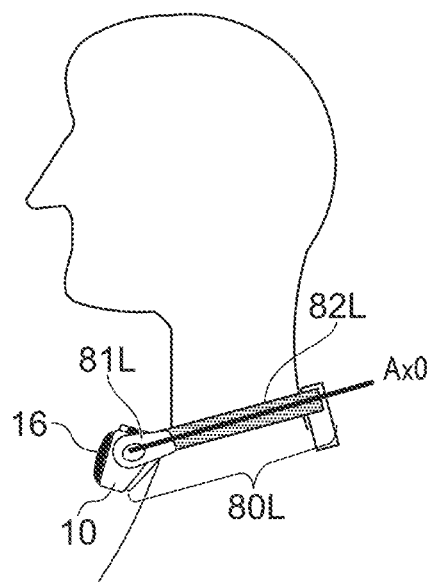
Figure 42C:
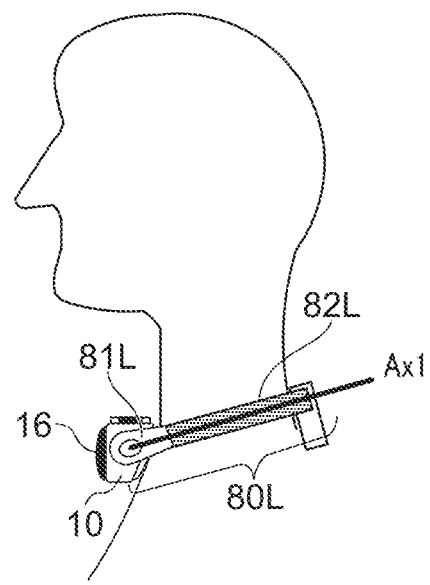

FIG. 42A, FIG. 42B, and FIG. 42C are side views showing a state where the user wears the camera body 1. FIG. 42A is a view showing the user who wears the camera body 1 of which the connection member 80L is set in the standard position Ax0 and the band part 82L is elongated. FIG. 42B is a view showing the user who wears the camera body 1 of which the connection member 80L is set in the standard position Ax0 and the band part 82L is shortened. FIG. 42C is a view showing the user who wears the camera body 1 of which the connection member 80L is set in the position Ax1 and the band part 82L is shortened.

As shown in FIG. 42A and FIG. 42C, when the relationship between the position of the connection member 80L and the length of the band part 82L is suitable for the user, the image pickup lens 16 is directed to the user's front. In the meantime, as shown in FIG. 42B, when the relationship between the position of the connection member 80L and the length of the band part 82L is not suitable for the user, the image pickup lens 16 is not directed to the user's front. In the case in FIG. 42B, the optical axis of the image pickup lens 16B is directed upward.

In this way, since the connection member 80L is constituted to be adjustable in its position, the user is able to wear the camera body 1 so that the optical axis of the image pickup lens 16 will be approximately parallel to a visual line in a user's natural state. When the optical axis of the image pickup lens 16 matches the horizontal direction when the user wears the camera body 1 at the suitable position, suitable wearing is available similarly.

Figure 43A:
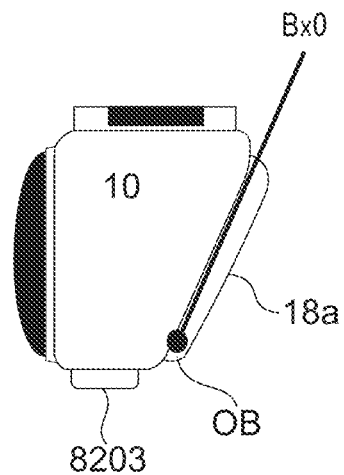
FIG. 43A, FIG. 43B, and FIG. 43C are enlarged side views showing the image-pickup/detection unit without showing the connection members.
Figure 43B:
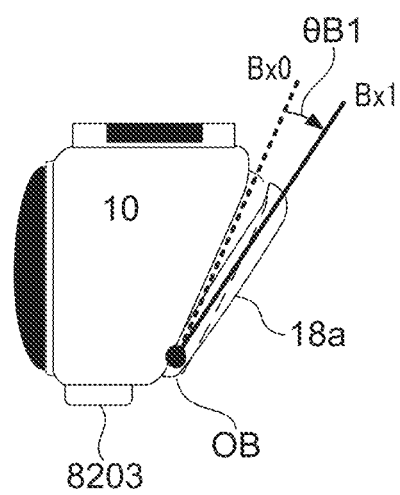
Figure 43C:
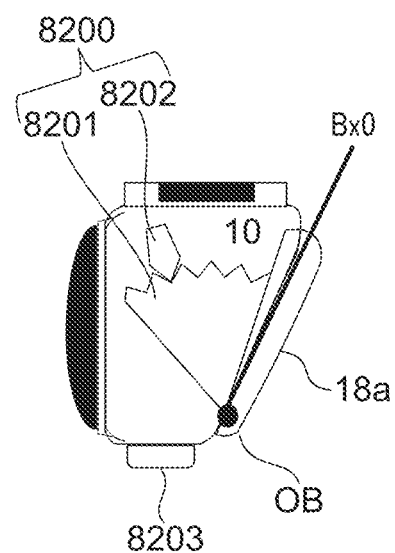

Next, the angle adjustment of the chest contact pads 18a and 18b will be described. FIG. 43A, FIG. 43B, and FIG. 43C are enlarged side views showing the image-pickup/detection unit 10 without showing the connection members 80L and 80R. Although the following description exemplifies the left chest contact pad 18a, the right chest contact pad 18b is adjusted similarly.

FIG. 43A is a view showing a state where the chest contact pad 18a is set in a standard position Bx0. FIG. 43B is a view showing a state where the chest contact pad 18a has rotated by an angle θB1 with respect to the standard position Bx0 around a rotation axis OB. FIG. 43C is a schematic view showing a mechanical structure inside the image-pickup/detection unit 10 that can be seen when an exterior of the image-pickup/detection unit 10 is removed.

As shown in FIG. 43C, a contact-angle adjustment mechanism 8200 is arranged inside the image-pickup/detection unit 10. The contact-angle adjustment mechanism 8200 consists of an angle adjustment cam 8201 that adjusts the angle of the chest contact pad 18a with respect to the image-pickup/detection unit 10 and a latching member 8202 that latches the angle adjustment cam 8201. The rotation axis OB shown in FIG. 43A through FIG. 43C is a rotation center of the chest contact pad 18a.

The latching member 8202 is energized to the angle adjustment cam 8201 with a spring (not shown). While an angle adjustment button 8203 is pressed, the energization is released and the latching member 8202 can separate from the angle adjustment cam 8101. Namely, only while the angle adjustment button 8203 is pressed, the chest contact pad 18a becomes rotatable with respect to the image-pickup/detection unit 10.

When rotating the chest contact pad 18a with respect to the image-pickup/detection unit 10 while pressing the angle adjustment button 8203, the user is able to adjust the chest contact pad 18a from the standard position Bx0 to a position Bx1.

Although this embodiment employs a stepped adjustment mechanism, which consists of the angle adjustment cam 8201 and latching member 8202, as the mechanism that holds the angle of the chest contact pad 18a with respect to the image-pickup/detection unit 10, a stepless adjustment mechanism using sliding resistance may be employed.

Moreover, although this embodiment employs the configuration that the user rotates the chest contact pad 18a while pressing the angle adjustment button 8203, it is not limited to this. For example, a configuration that does not need the angle adjustment button 8203 may be used. Such a configuration allows rotation of the chest contact pad 18a when external force more than a threshold is applied. For example, a ball may be used instead of the latching member 8202 and sliding resistance may be used.

Figure 44A:
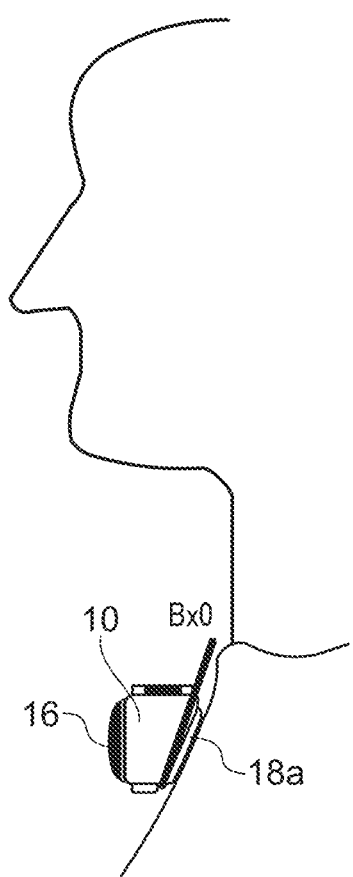
FIG. 44A, FIG. 44B, and FIG. 44C are side views showing a state where the user wears the camera body without showing the connection members.
Figure 44B:
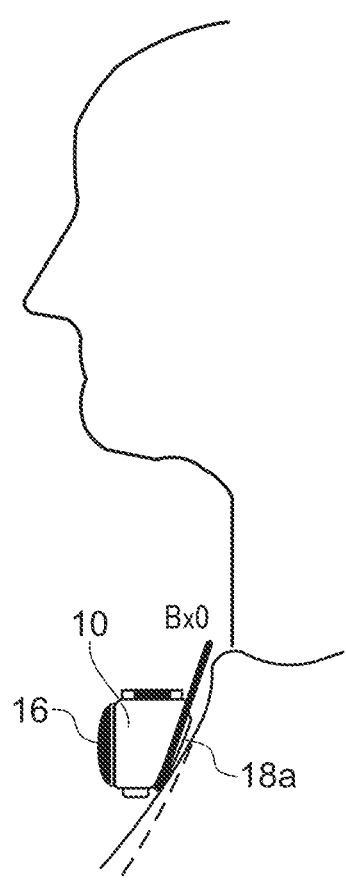
Figure 44C:
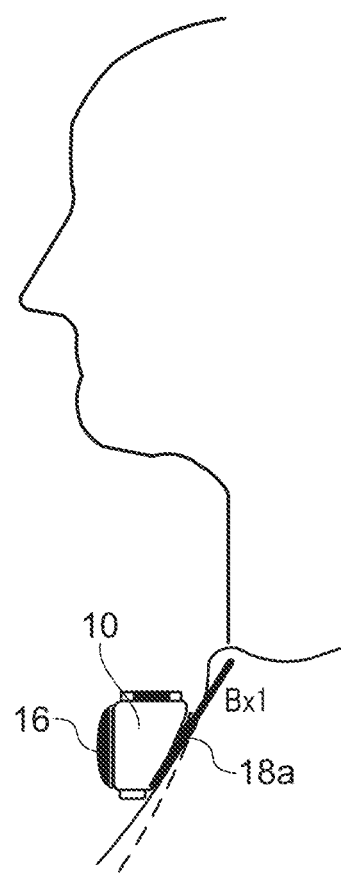

FIG. 44A, FIG. 44B, and FIG. 44C are side views showing states where users wear the camera body 1 without showing the connection members 80L and 80R. FIG. 44A shows a state where a user whose chest is steep wears the camera body 1 of which the chest contact pad 18a is set at the standard position Bx0. FIG. 44B shows a state where a user whose chest is gentle wears the camera body 1 of which the chest contact pad 18a is set at the standard position Bx0. FIG. 44C shows a state where a user whose chest is gentle wears the camera body 1 of which the chest contact pad 18a is set at the position Bx1.

As shown in FIG. 44A and FIG. 44C, when the position of the chest contact pad 18a is suitable for the inclination of the chest of the user, the chest contact pad 18a contacts the chest of the user in a wide area. In the meantime, as shown in FIG. 44B, when the position of the chest contact pad 18a is not suitable for the inclination of the chest of the user, the chest contact pad 18a contacts the chest of the user in only a few areas. When the area in which the chest contact pad 18a contacts the chest of the user becomes small as shown in FIG. 44B, the image-pickup/detection unit 10 will deviate from the user's body easily due to movement of the user's body, which causes great blur in a pickup image.

Since the chest contact pad 18a is constituted so as to adjust its angle easily, the user is able to wear the camera body 1 so that the chest contact pad 18a contacts the user's chest in a wide area, which reduces blur in a pickup image.

Although the chest contact pad 18a is arranged in the image-pickup/detection unit 10 in this embodiment, it may be arranged in the connection member 80L. Even in such a case, similar effect is obtained. In this case, for example, a mechanism similar to the angle adjustment mechanism 8100 shown in FIG. 41C will be arranged inside the connection member 80L as a mechanism that adjusts the angle of the chest contact pad 18a with respect to the connection member 80L.

Next, the configurations of the band part 82L and electric cable 84 will be described in detail. As described in the first embodiment, the battery unit (power source unit) 90 and image-pickup/detection unit 10 of the camera body 1 are the separate modules that are electrically connected through the electric cable 84.

If the electric cable 84 and the band part 82L are separated, the appearance of the camera body 1 deteriorates and a wearing operation of the camera body 1 becomes troublesome. It is not preferable. Accordingly, it is preferable to integrate the band part 82L and the electric cable 84. In the meantime, an integrated configuration is not limited to the configuration shown in FIG. 2B.

Figure 45A:
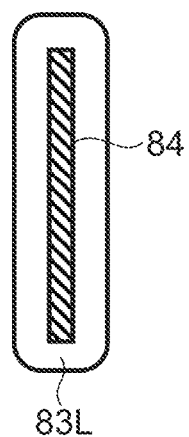
FIG. 45A through FIG. 45G are views showing various combinations of the band part and a connection surface that is a section of an electric cable united with the band part.
Figure 45B:
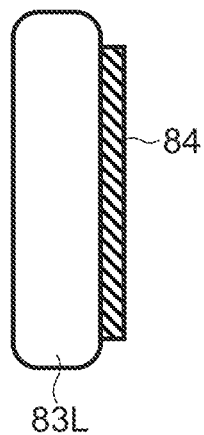
Figure 45C:
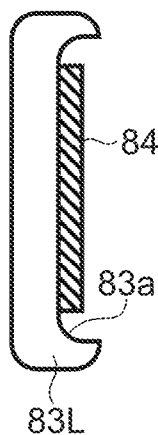

FIG. 45A through FIG. 45G are views showing various configurations of the band part 82L and the connection surface 83L that is a section of the electric cable 84 united with the band part 82L. FIG. 45A through FIG. 45C show configurations where the electric cable 84 is constituted by a flexible substrate (FPC). FIG. 45D through FIG. 45G show configurations where the electric cable 84 is constituted by the thin wire cable.

Figure 45D:
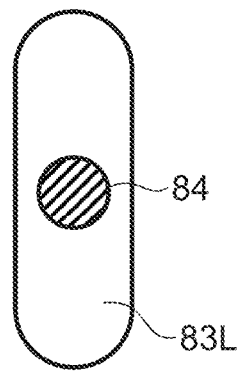

FIG. 45A and FIG. 45D show configurations where the electric cable 84 is embedded inside the band part 82L viewed from the connecting face 83L. In this case, the band part 82L is preferably made from elastic materials, such as silicone rubber, elastomer, rubber, and a plastic, that enable injection molding. For example, the band part 82L is inserted into the electric cable 84 at the time of the injection molding. Otherwise, the band part 82L may be constituted from two components. In such a case, the electric cable 84 is sandwiched between the components of the band part 82L and they are united by adhesive or heat welding. Manufacturing methods are not limited to the above two methods. Any other methods can be employed as long as the band part 821 and the electric cable 84 are united as shown in FIG. 45A and FIG. 45D.

Figure 45E:
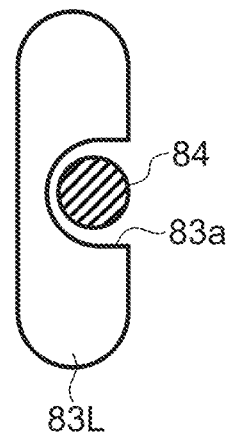

FIG. 45B, FIG. 45C, and FIG. 45E show configurations where the electric cable 84 is connected to the outer side of the band part 82L viewed from the connecting face 83L. FIG. 45B shows a configuration where the electric cable 84 is adhered to the band part 82L. The band part 82L has no specific configuration to unite with the electric cable 84. This configuration can be manufactured at low cost. When the electric cable (FPC in this case) 84 appears externally, the appearance of product can be improved by painting the FPC or by covering the FPC with a film. Moreover, when the electric cable (FPC in this case) 84 is arranged on the inner side (neck side) of the band part 82L in the configuration shown in FIG. 45B, wearing feeling can be improved by painting the FPC or by covering the FPC with a film.

FIG. 45C and FIG. 45E show configurations where a concave portion 83a is formed in the band part 82L viewed from the connecting face 83L in order to unite with the electric cable 84. The electric cable 84 is arranged in the concave portion 83a. In this case, when the concave portion 83a is arranged on the inner side (neck side) of the band part 82L, good appearance can be maintained and good wearing feeling is also kept without performing a special process because the electric cable 84 is stored in the concave part 83a and does not directly contact the user's neck. Furthermore, since the concave shape 83a does not need additional cost if it is designed before manufacturing, it has a merit in respect of cost.

Figure 45F:
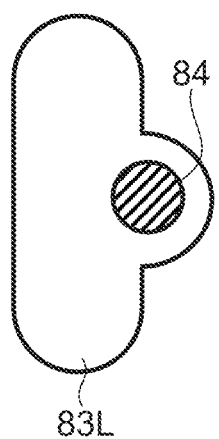
Figure 45G:
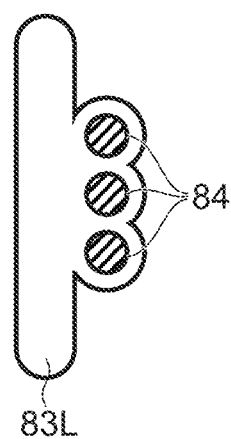

FIG. 45F and FIG. 45G show configurations where the electric cable 84 is embedded inside the band part 82L viewed from the connecting face 83L. FIG. 45F shows a configuration where the electric cable 84 consists of single line. FIG. 45G shows a configuration where the electric cable 84 consists of three lines. A characteristic feature of the configurations in FIG. 45F and FIG. 45G is that cross-sectional area in the connecting face 83L of the band part 82L is secured. That is a different point from the configurations in FIG. 45A and FIG. 45D. The cross-sectional area in the connecting face 83L of the band part 82L gives influence to twist rigidity and bending rigidity. And such rigidity influences stability for the image-pickup/detection unit 10 to be continuously stabilized at a fixed position of the user's bod when the user wears the camera body 1. That is, the stability of the image-pickup/detection unit 10 improves as the cross-sectional area in the connecting face 83L increases because the twist rigidity and flexural rigidity become strong.

The projection side of the electric cable 84 is preferably arranged at the outer side of the band part 82L in order to obtain comfortable wearing feeling. The configurations in FIG. 45F and FIG. 45G expose the projection side to the outer appearance but ensure the rigidity of the band part 82L.

As mentioned above, the configuration in FIG. 45C or FIG. 45E has an advantage if a priority is given to balance between the appearance and the wearing feeling. If a priority is given to the cost or rigidity, another configuration in FIG. 45A, FIG. 45B, FIG. 45D, FIG. 45F, or FIG. 45G can be employed.

Next, a ninth embodiment will be described. In the ninth embodiment, a modified example of the camera system including the camera body 1 will be described using FIG. 46A and FIG. 46B. This embodiment is described as a derivation from the first embodiment basically. Accordingly, configurations of the camera system in the ninth embodiment that are identical to the configurations of the camera system in the first embodiment are indicated by the same reference numerals and duplicated descriptions are omitted. A different configuration will be described by adding details.

The display apparatus 800 in the first embodiment uses the general smart phone. There are various smart phones in the commercial scene and their arithmetic capacities are also various. For example, the display apparatus 800 in the first embodiment has relatively high arithmetic capacity. Accordingly, when the camera body 1 transfers the image of the recording direction that is extracted from the superwide-angle image to the display apparatus 800, the information required for the optical correction process or the image stabilization process is added to the image. The display apparatus 800 in the first embodiment performs the distortion correction process and the image stabilization process based on the added information. However, such processes are hard for a smart phone having relatively low arithmetic capacity.

The camera system of this embodiment is provided with a camera body 1' including an image pickup apparatus and a display apparatus 9800 of which arithmetic capacity is lower than that of the display apparatus 800. When the camera body 1' has performed the processes from the preparation process to the primary recording process (the steps S100 through S600 in FIG. 7A), the camera body 1' performs the optical correction process and the image stabilization process (the steps S800 and S900) without performing the transmission process to the display apparatus (the step S700). After that, the camera body 1' performs a process that transfers the image that has been subjected to the processes in the steps S800 and S900 to the display apparatus 9800.

In the meantime, the display apparatus 9800 performs the secondary recording process (S1000) to the image from the camera body 1' without performing the processes in the steps S800 and S900.

Figure 46A:
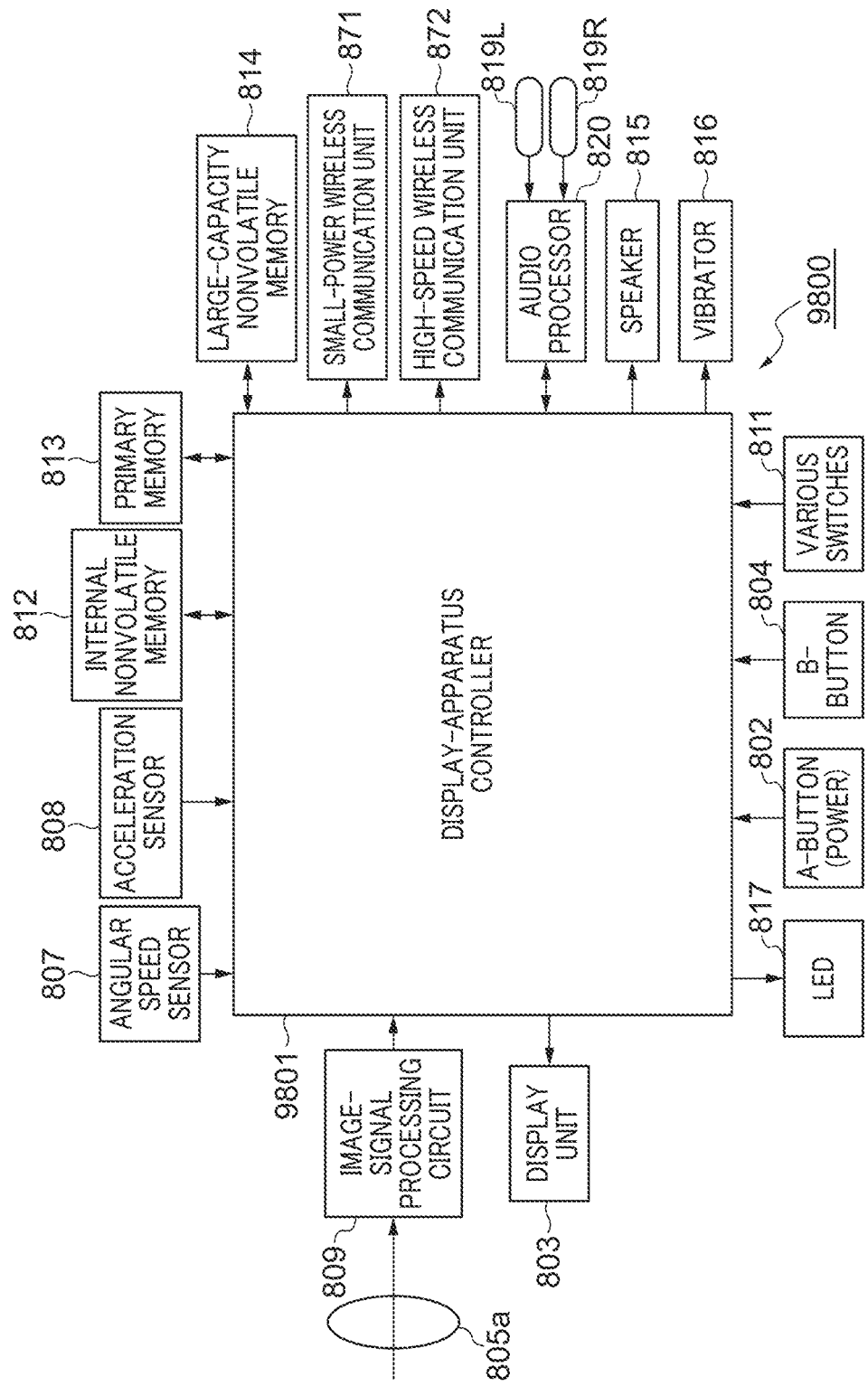
FIG. 46A is a block diagram showing a hardware configuration of a display apparatus connected to a camera body including an image pickup apparatus according to a ninth embodiment.

Hereinafter, the camera system of this embodiment will be described specifically. FIG. 46A is a block diagram showing a hardware configuration of the display apparatus 9800 connected to the camera body 1' including the image pickup apparatus according to this embodiment.

In FIG. 46A, hardware configurations of the display apparatus 9800 that are identical to the hardware configurations of the display apparatus 800 according to the first embodiment shown in FIG. 6 are indicated by the same reference numerals and duplicated descriptions are omitted.

The display apparatus 9800 has a display-apparatus controller 9801 instead of the display-apparatus controller 801 of the display apparatus 800, and does not have the face sensor 806.

The display-apparatus controller 9801 is constituted by a CPU of which arithmetic capacity is lower than the CPU that constitutes the display-apparatus controller 801 (FIG. 6). Moreover, capacities of the internal nonvolatile memory 812 and the primary memory 813 may be lower than that in the first embodiment.

Figure 46B:
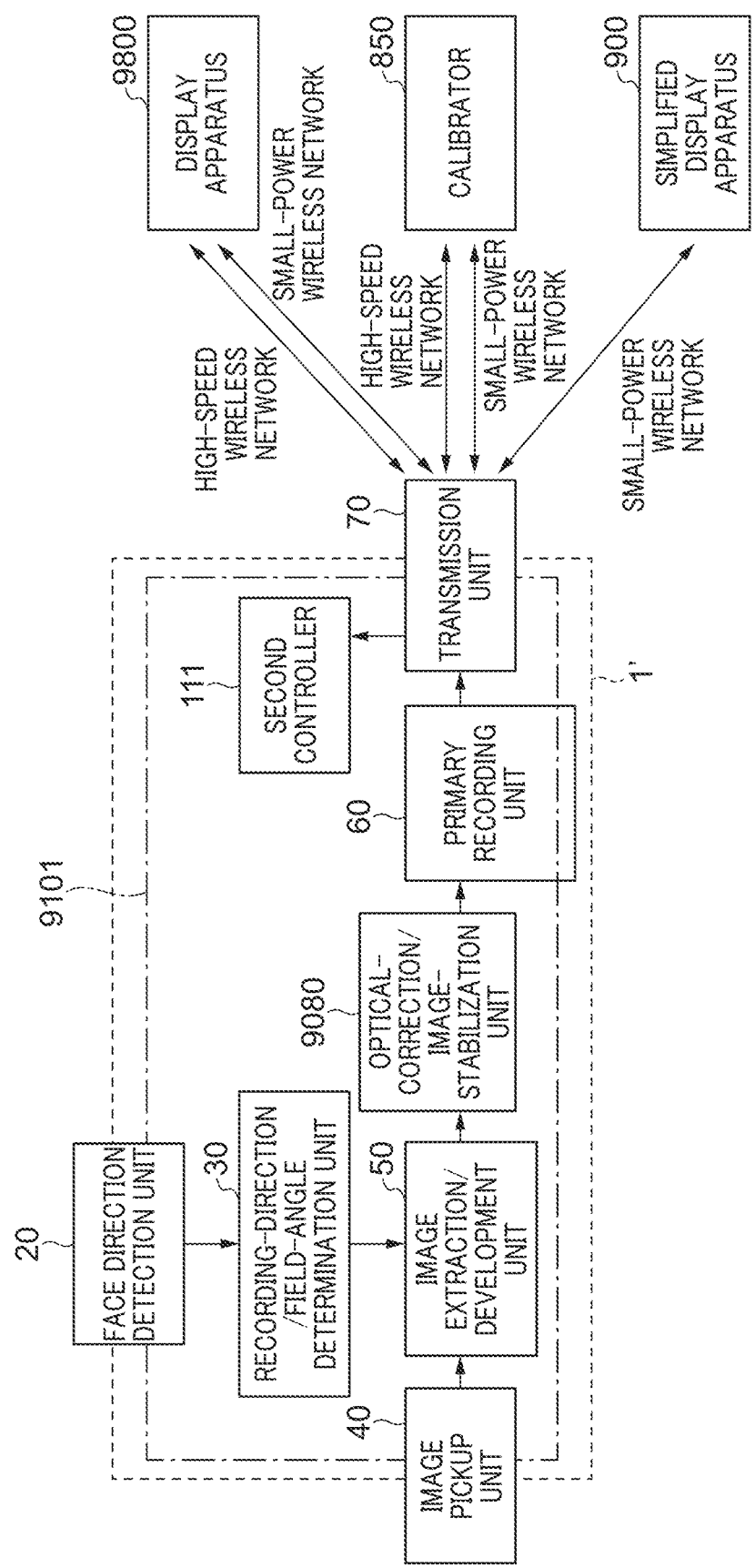
FIG. 46B is a functional block diagram showing the camera body according the ninth embodiment.

FIG. 46B is a functional block diagram showing the camera body 1'. In FIG. 46B, function blocks of the camera body 1' that are identical to the hardware blocks of the camera body 1 according to the first embodiment shown in FIG. 4 are indicated by the same reference numerals and duplicated descriptions are omitted.

The functional block diagram in FIG. 46B differs from the function block diagram in FIG. 4 in the following points. That is, an optical-correction/image-stabilization unit 9080 that performs the optical correction process and image stabilization process is provided. And an overall control CPU 9101 is provided instead of the overall control CPU 101. Moreover, the transmission units 70 communicates with the display apparatus 9800 instead of the display apparatus 800.

That is, in this embodiment, the optical-correction/image-stabilization unit 9080 of the overall control CPU 9101 performs the optical distortion correction and the image stabilization process using the optical correction values and gyro data. Accordingly, since the transmission unit 70 transmits a video file to the display apparatus 9800 after applying the optical correction process and image stabilization process in this embodiment, a data amount of the video file in this embodiment is smaller than that of the video file 1000 that the transmission unit 70 transfers to the display apparatus 800 in the first embodiment.

Moreover, the display apparatus 9800 does not need the high arithmetic capacity equal to that of the display apparatus 800 because it does not perform the processes in the steps S800 and S900. Moreover, the image picked up by camera body 1' can be seen by the simplified display device (an appreciation device) 900 like a smart watch.

Next, a tenth embodiment will be described. In the tenth embodiment, a modified example of the camera system including the camera body 1 will be described using FIG. 47 and FIG. 48. This embodiment is described as a derivation from the first embodiment basically. Accordingly, configurations of the camera system in the tenth embodiment that are identical to the configurations of the camera system in the first embodiment are indicated by the same reference numerals and duplicated descriptions are omitted. A different configuration will be described by adding details.

In the ninth embodiment, the camera body 1' needs high performance instead of using the display apparatus 9800 having the low arithmetic capacity. When the performance of the camera body is improved, the cost of the overall controller CPU and its peripheral devices may rise and heat generation due to a processing load may occur. Accordingly, in the tenth embodiment, a configuration that decreases the arithmetic capacity of the camera body and increases the arithmetic capacity of the display apparatus will be described.

Figure 47:
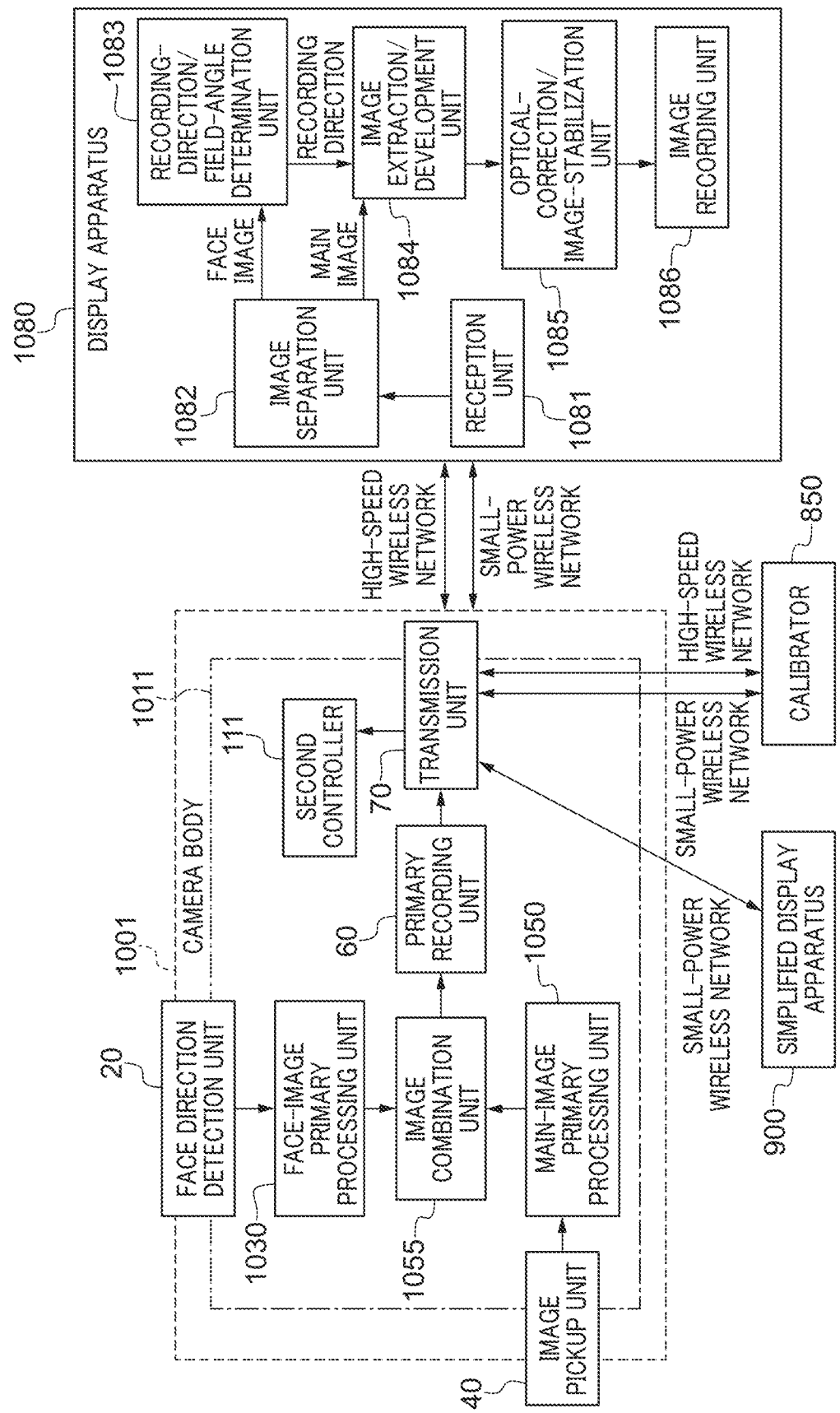
FIG. 47 is a functional block diagram showing the camera body and display apparatus according a tenth embodiment.

FIG. 47 is a functional block diagram showing a camera system of this embodiment including a camera body 1001 and a display apparatus 1080. In FIG. 47, function blocks of the camera body 1001 that are identical to the hardware blocks of the camera body 1 according to the first embodiment shown in FIG. 4 or the camera body 1' according to the ninth embodiment shown in FIG. 46B are indicated by the same reference numerals and duplicated descriptions are omitted.

The functional block diagram shown in FIG. 47 differs from FIG. 4 and FIG. 46B greatly in that the display apparatus 1080 is provided with a recording-direction/field-angle determination unit 1083, an image extraction/development unit 1084 that extracts and develops an image, and an optical-correction/image-stabilization unit 1085 that performs the optical correction process and image stabilization process.

A face-image primary processing unit 1030 that processes the face image detected by the face direction detection unit 20, a main-image primary processing unit 1050 that processes the main image picked up by the image pickup unit 40, and an image combination unit 1055 that combines these images are added to the camera body 1001. The recording-direction/field-angle determination unit 1083 and image extraction/development unit 1084 are moved to the display apparatus 1080. And an image separation unit 1082 is added to the display apparatus 800. Moreover, a reception unit 1081 of the display apparatus 1080, which is not shown in FIG. 4 and FIG. 46B, is added to FIG. 47.

Figure 48:
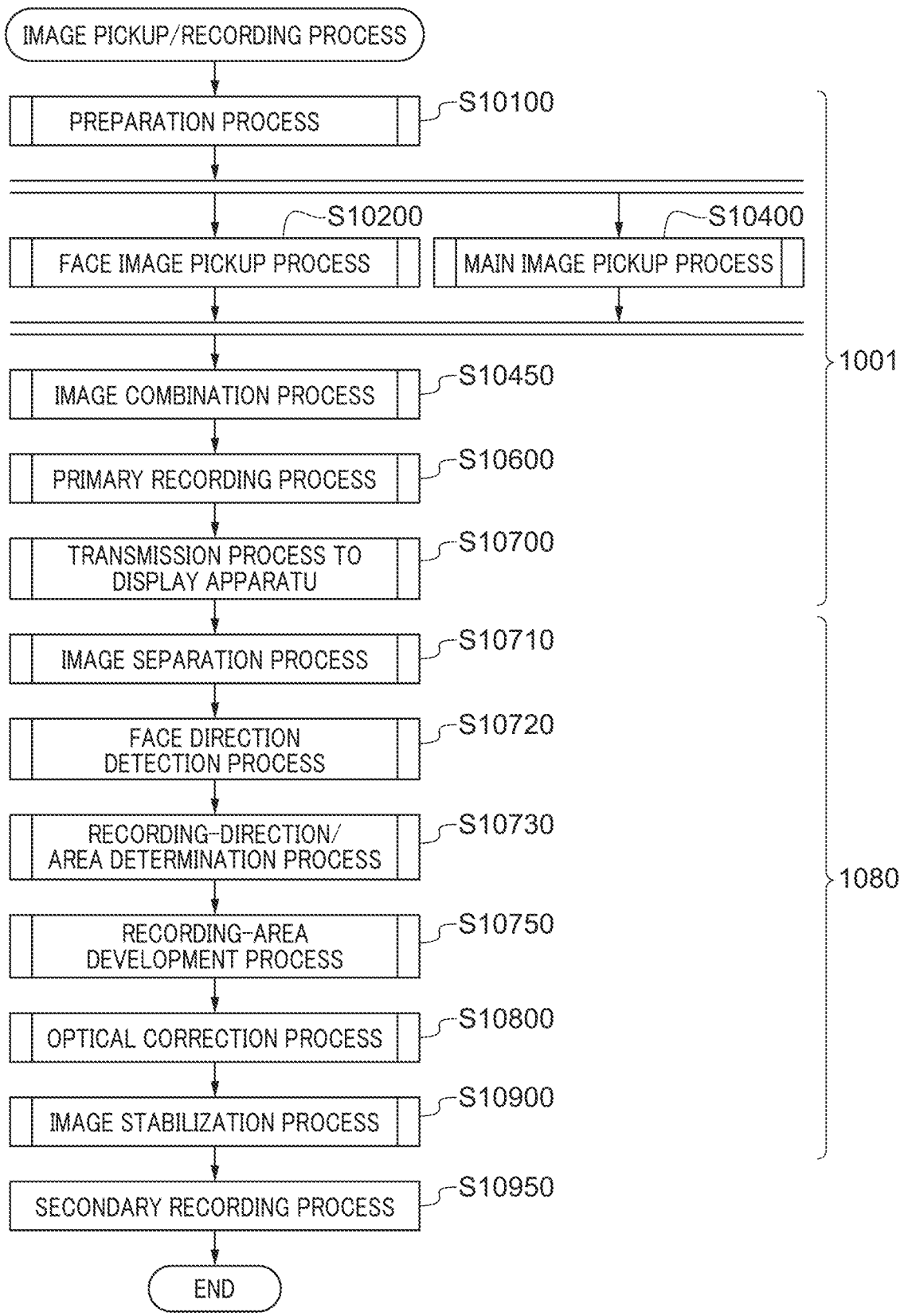
FIG. 48 is a flowchart schematically showing an image-pickup/recording process according to the tenth embodiment executed by the camera body and display apparatus.

An order of the process will be described using a flowchart in FIG. 48. A process in the flowchart in FIG. 48 that is equivalent to a process in the flowchart in FIG. 7A is indicated by a step number that is obtained by adding 10000 to the original step number (i.e., "10" is added to upper two digits), and a duplicated description is omitted. Moreover, in order to assist the description, a reference numeral of an apparatus in FIG. 47 that executes a process in each step is shown on a right side of each step in FIG. 48. That is, steps S10100 through S10700 in FIG. 48 are executed by the camera body 1001, and steps S10710 through S10950 are executed by the display apparatus 10800.

In FIG. 7A in the first embodiment, the face direction detection process is performed in the step S200 after the preparation process in the step S100. In this embodiment, a face image pickup process in a step S10200 and a main image pickup process in a step S10400 are executed in parallel after a preparation process in a step S10100. Next, two image data picked up in steps S10200 and S10400 are combined in an image combination process in a by S10450. Several kinds of combination methods are considered. The two images may be combined into one video file or two images may be mutually associated so as not to deviate frames of data of the two images.

This embodiment is described on the basis of the method that combines two images into one video file. In the step S10450, a combined image that is primarily recorded is wirelessly transmitted to the display apparatus 10180 in a step S10700.

The steps from the step S10710 is executed by the display apparatus 1080. In the step S10710, the image combined in S10450 is again separated into a face pickup image and a main pickup image. Subsequently, in a step S10720, the face direction detection process that estimates an observation direction from the separated face pickup image is executed. It should be noted that the contents of the face direction detection process have been described in the first embodiment using FIG. 7C.

In a step S10730, a recording-direction/area determination process is executed. In a step S10750, a recording-area development process is executed. Specifically, an image is extracted from the main pickup image separated in the step S10710 on the basis of the recording-direction/field-angle information determined in the step S10730 and the extracted area is developed. In a step S10800, the optical correction process that corrects optical aberrations is applied to the image that is extracted and developed in the step S10750. The image stabilization process is performed in a step S10900.

Also in this embodiment, the order of the steps S10800 and S10900 may be inverted. That is, the image stabilization process may be executed in advance of the optical correction process.

In the step S10950, the display-apparatus controller (a video recording unit) executes a secondary recording process to record the image into the large-capacity nonvolatile memory 814 after applying the optical correction process in the step S10800 and the image stabilization process in the step S10900. And then, this process is finished.

In this embodiment, since the combination data that combines the main pickup image and the face pickup image is transmitted in the step S10700, the process with the camera body 1001 is simplified, which enables reduction of the cost and reduction of heat generation. It should be noted that the gyro data and posture data that are output from the angular speed sensor 107 and the acceleration sensor 108 may be transmitted to the display apparatus 1080 in the step S10700 as with the first embodiment.

Next, an eleventh embodiment will be described. In the eleventh embodiment, a modified example of the camera system including the camera body 1 will be described using FIG. 49 and FIG. 50. This embodiment is described as a derivation from the first embodiment basically. Since the basic configuration of this embodiment is similar to that of the tenth embodiment, configurations of the camera system in the eleventh embodiment that are identical to the configurations of the camera system in the tenth embodiment are indicated by the same reference numerals and duplicated descriptions are omitted. A different configuration will be described by adding details.

In the tenth embodiment, the configuration that decreases the arithmetic capacity of the camera body and increases the arithmetic capacity of the display apparatus 1080 is described. Although this configuration can reduce a load of the overall control CPU of the camera body, the amount of data transmitted from the transmission unit 70 increases, which may leave issues like heat generation.

Moreover, some controllers loaded on recently developed cameras include a circuit specialized in image processing. For example, a controller including a circuit for a face direction detecting function needed for this disclosure can be developed. Use of such a controller prevents the cost from increasing and reduces power consumption. In this embodiment, such a controller is employed. The camera body 1101 performs until the face direction detection process and the recording-direction/area determination process, adds the result data of these processes to the main pickup image, and transmits the main pickup image to the display apparatus 1180. And the display apparatus 1180 performs the recording-area development process to extract and develop an image.

Figure 49:
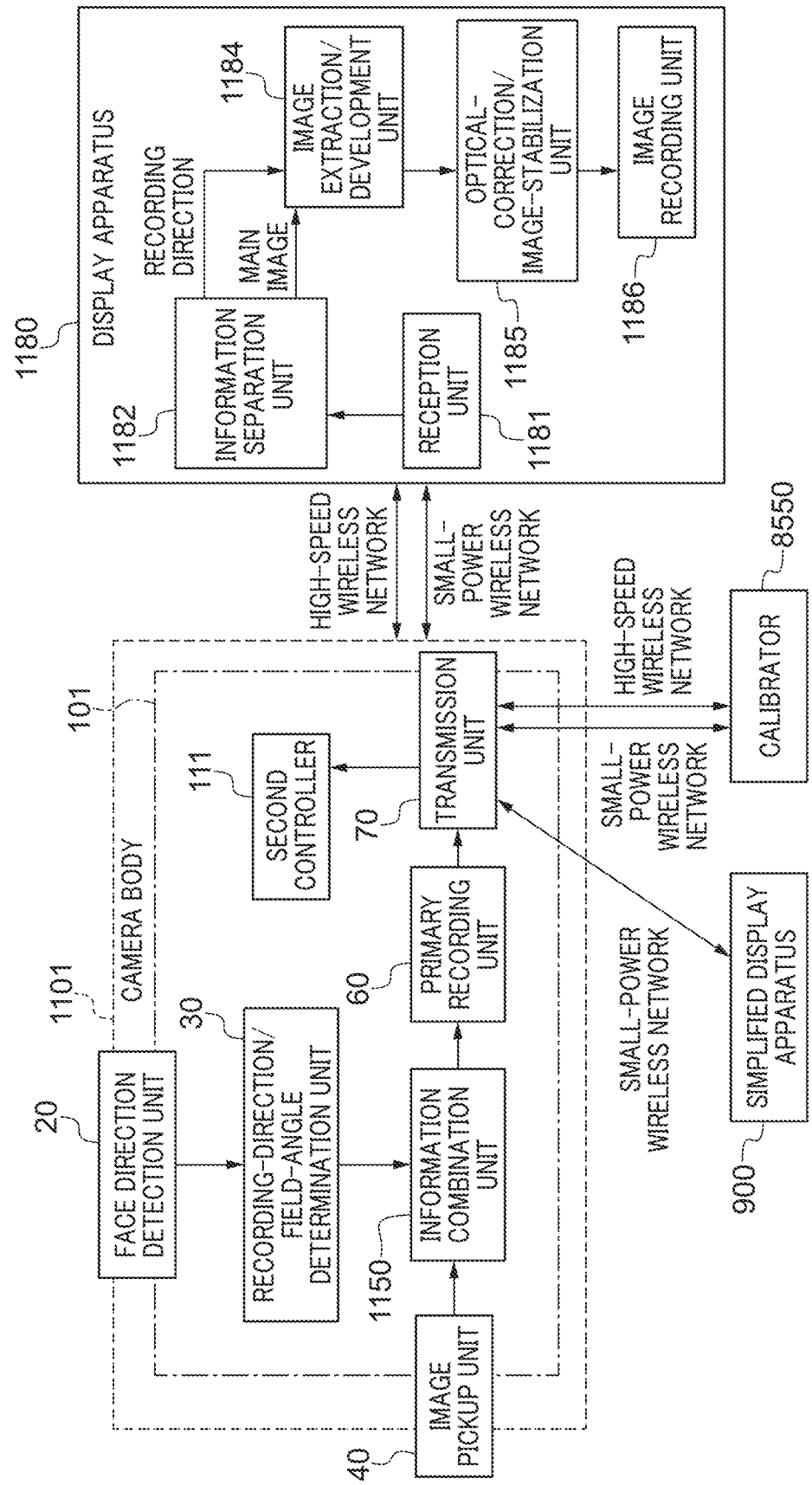
FIG. 49 is a functional block diagram showing a camera body and display apparatus according an eleventh embodiment.

FIG. 49 is a functional block diagram showing a camera system of this embodiment including the camera body 1101 and the display apparatus 1180. In FIG. 49, function blocks of the camera body 1101 that are identical to the hardware blocks of the camera body 1 according to the first embodiment, the camera body 1' according to the ninth embodiment, or the camera body 1001 according to the tenth embodiment are indicated by the same reference numerals and duplicated descriptions are omitted.

The camera system shown in FIG. 49 is different from FIG. 4 and FIG. 46B in that the display apparatus 1180 is equipped with an image extraction/development unit 1184 that extracts an image and develops it and an optical-correction/image-stabilization unit 1185 that performs an optical correction process and an image stabilization process. Moreover, since the image extraction/development unit is moved to the display apparatus 1180, the overall control CPU 101 is equipped with until the recording-direction/field-angle determination unit 30 but is not equipped with the image extraction/development unit 50. An information combination unit 1150 that combines the recording-direction/field-angle information to the main pickup image output from the image pickup unit 40 is added to the camera body 1101. The image extraction/development unit 1184 is moved to the display apparatus 1180 as with the tenth embodiment. An information separation unit 1182 is added to the display apparatus 1180. Moreover, a reception unit 1181, which is not shown in FIG. 4 and FIG. 46B, is added to FIG. 49 in the same manner as the tenth embodiment.

Figure 50:
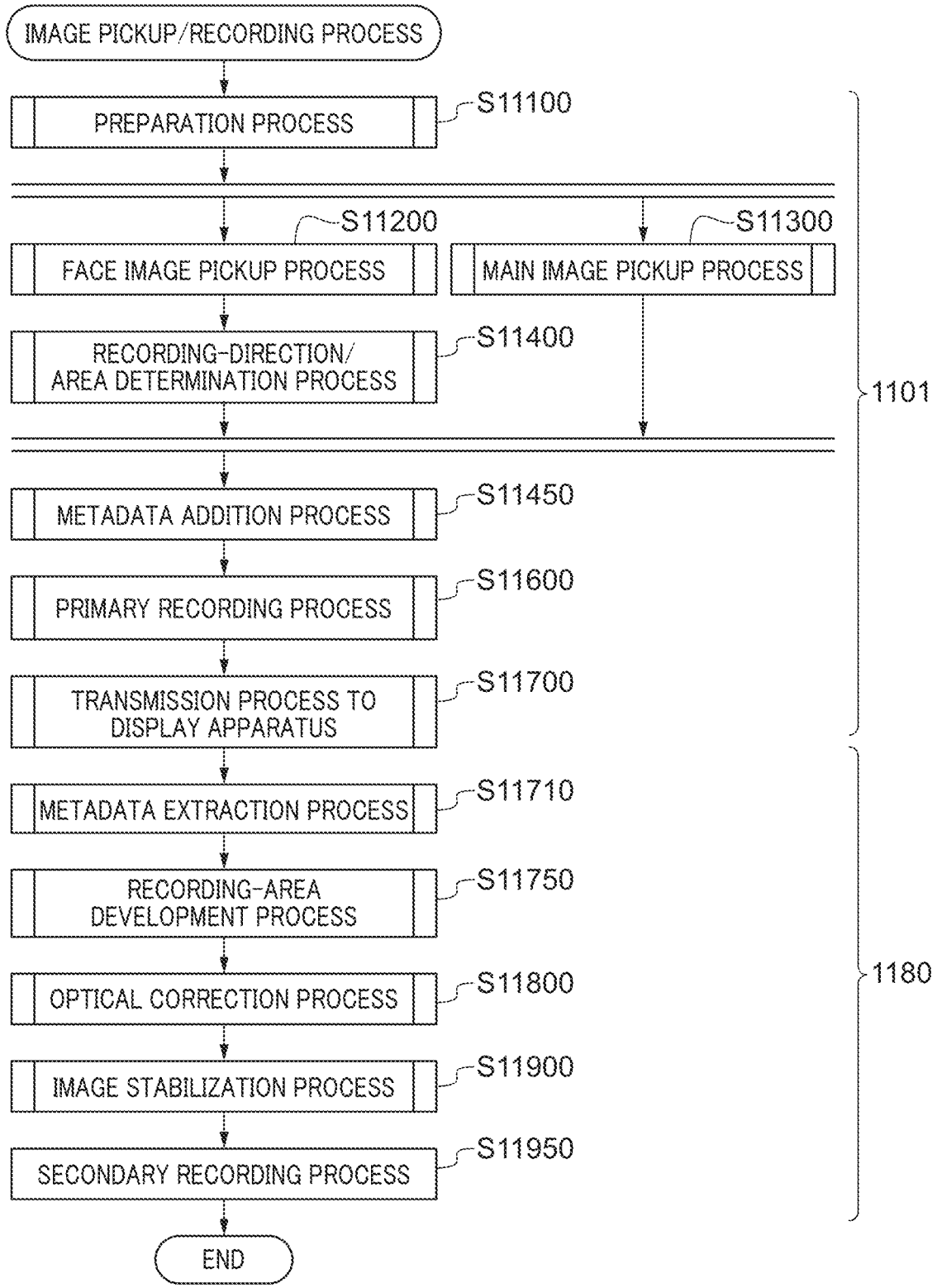
FIG. 50 is a flowchart schematically showing an image-pickup/recording process according to the eleventh embodiment executed by the camera body and display apparatus.

An order of the process will be described using a flowchart in FIG. 50. A process in the flowchart in FIG. 50 that is equivalent to a process in the flowchart in FIG. 7A is indicated by a step number that is obtained by adding 11000 to the original step number (i.e., "11" is added to upper two digits), and a duplicated description is omitted. Moreover, in order to assist the description, a reference numeral of an apparatus in FIG. 49 that executes a process in each step is shown on a right side of each step in FIG. 50. That is, steps S11100 through S11700 in FIG. 50 are executed by the camera body 1101, and steps S11710 through S11950 are executed by the display apparatus 11800.

In the tenth embodiment, the face image pickup process in the step S10200 and the main image pickup process in the step S10400 are executed in parallel, and the two image data ae combined in the step S10450. In the meantime, in the eleventh embodiment, after the face image is picked up in the step S11200, the recording-direction/area determination process is executed in a step S11400 and outputs recording-direction/area data.

After that, the main image data picked up by the main image pickup process in a step S11300 that is executed in parallel and the recording-direction/area data output in the step S11400 are combined in a step S11450.

Although several kinds of combination methods of the recording-direction/area data are considered. In this eleventh embodiment, the recording-direction/area data is recorded as metadata for every fame of the main pickup image data. The configuration of the metadata is the same as the metadata shown in FIG. 15.

The main pickup image data generated in the step S11450 is primarily recorded in a step S11600 and is wirelessly transmitted in the step S11700 to the display apparatus 11180.

The steps from the step S11710 is executed by the display apparatus 1180. In the step S11710, the image data with the metadata generated in the step S11450 is again separated into the main pickup image and the recording-direction/area data.

In the next step S11750, a recording-area development process is executed. Specifically, an image is extracted from the main pickup image separated in the step S11710 on the basis of the recording-direction/field-angle information and the extracted area is developed.

In a step S11800, the optical correction process that corrects optical aberrations is applied to the image that is extracted and developed in the step S11750. The image stabilization process is performed in a step S11900.

Also in this embodiment, the order of the steps S11800 and S11900 may be inverted. That is, the image stabilization process may be executed in advance of the optical correction process.

In the step S11950, the display-apparatus controller (video recording unit) executes a secondary recording process to record the image into the large-capacity nonvolatile memory 814 after applying the optical correction process in the step S11800 and the image stabilization process in the step S11900. And then, this process is finished.

In this embodiment, since the main pickup image and the recording-direction/area data are combined as timed metadata in the step S11450, the capacity of the image data transferred in the step S11700 can be reduced, which can reduce the power consumption, the heat generation, and the load on the display apparatus 1180. It should be noted that the gyro data and posture data that are output from the angular speed sensor 107 and the acceleration sensor 108 may be transmitted to the display apparatus 1180 in the step S11700 as with the first embodiment.

Figure 51A:
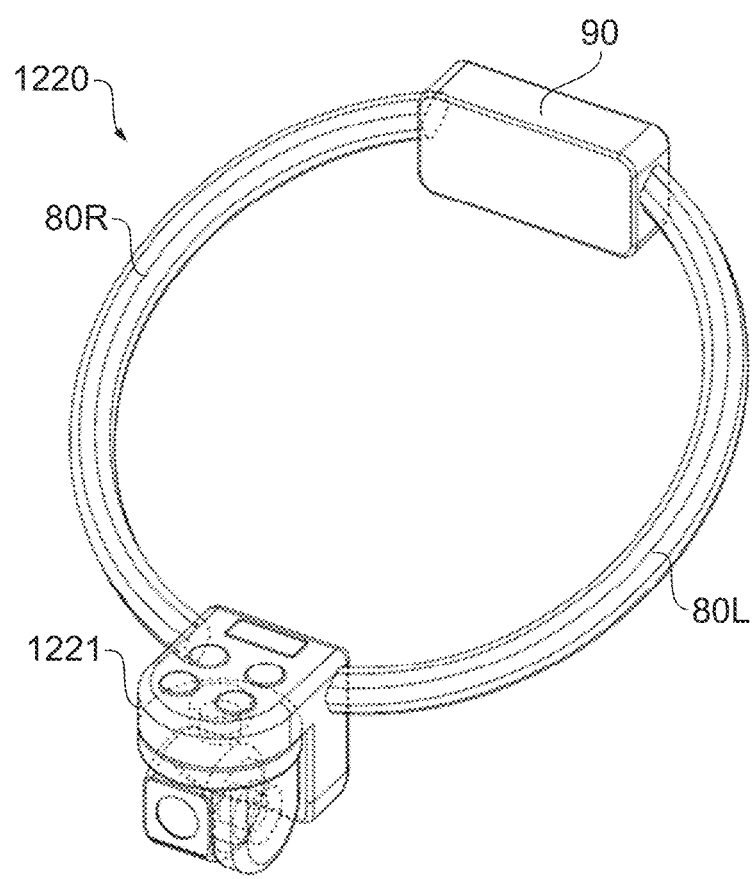
FIG. 51A is an external view showing a camera body according to a twelfth embodiment 12.

Next, a twelfth embodiment will be described. In the twelfth embodiment, an image pickup direction is changed by mechanically driving the direction of the image pickup unit will be described using FIG. 51A through FIG. 56. FIG. 51A is an external view showing a camera body 1220 according to this embodiment.

A part in the twelfth embodiment that has the same function of a part that has been already described in the first embodiment is indicated by the same reference numeral and its description in this specification is omitted. The camera body 1220 is provided with an image-pickup/detection unit 1221, the connection members 80L and 80R, and the battery unit 90.

Figure 51B:
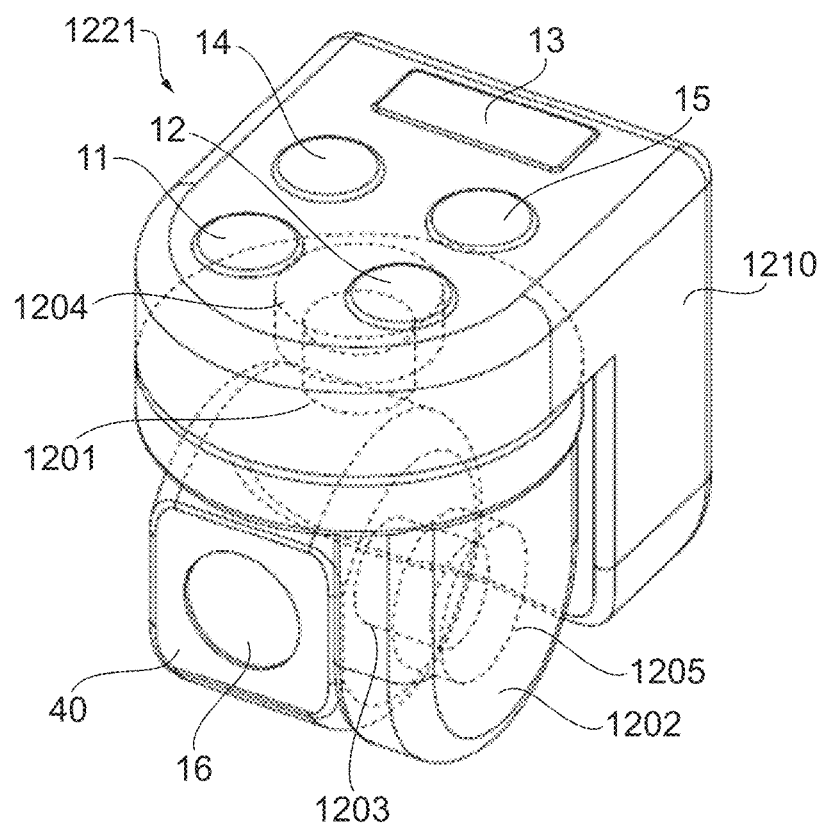
FIG. 51B is a perspective view showing details of an image-pickup/detection unit that is a part of the camera body according to the twelfth embodiment.

FIG. 51B is a perspective view showing details of the image-pickup/detection unit 1221 that is a part of the camera body 1220. The image-pickup/detection unit 1221 is provided with a main body 1210, a yaw drive shaft 1201, a yaw drive base 1202, a pitch drive shaft 1203, and an image pickup unit 40. The main body 1210 is provided with a power switch 11, an image pickup mode switch 12, a face direction detection window 13, a start switch 14, a stop switch 15, and a yaw drive motor 1204.

The yaw drive motor 1204 drives the yaw drive base 1202 in a yaw direction (lateral direction) through the yaw drive shaft 1201. The yaw drive base 1202 is provided with a pitch drive motor 1205. The pitch drive motor 1205 drives the image pickup unit 40 in a pitch direction (vertical direction) through the pitch drive shaft 1203.

The image pickup unit 40 is provided with an image pickup lens 16 and a solid state image sensor (not shown). The image pickup lens 16 guides light from an object and forms an image of the object on the solid state image sensor 42.

Figure 51C:
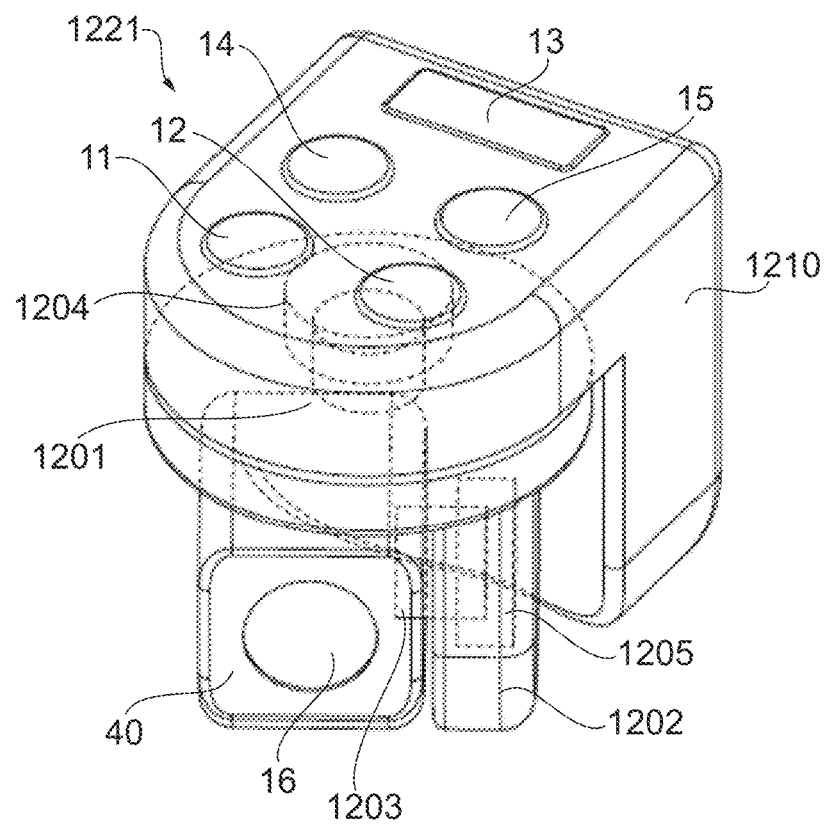
FIG. 51C is a perspective view showing a state where an image pickup unit of the image-pickup/detection unit in FIG. 51B turns leftward by 30°.
Figure 51D:
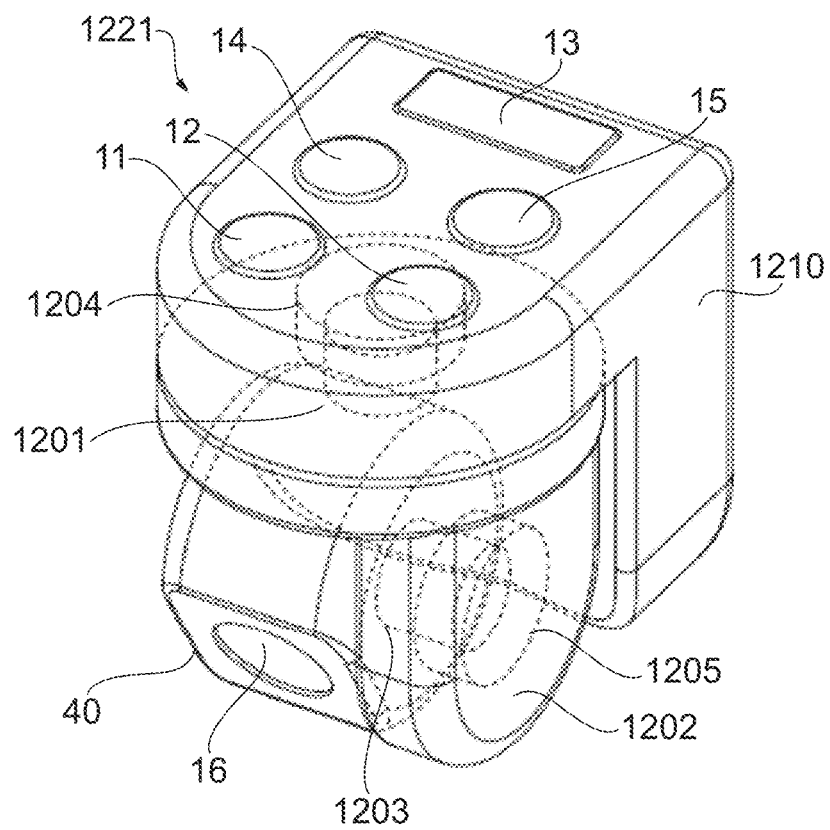
FIG. 51D is a perspective view showing a state where the image pickup unit is directed downward by 30°.

FIG. 51C is a perspective view showing a state where the image pickup unit 40 turns leftward by 30°. FIG. 51D is a perspective view showing a state where the image pickup unit 50 is directed downward by 30°. As shown in FIG. 51C, when the yaw drive motor 1204 is driven, the parts from the yaw drive shaft 1201 rotates in the lateral direction, which changes the direction of the image pickup unit 40 in the lateral direction. As shown in FIG. 51D, when the pitch drive motor 1205 is driven, the parts from the pitch drive shaft 1201 rotates in the vertical direction, which changes the direction of the image pickup unit 40 in the pitch direction.

Figure 52:
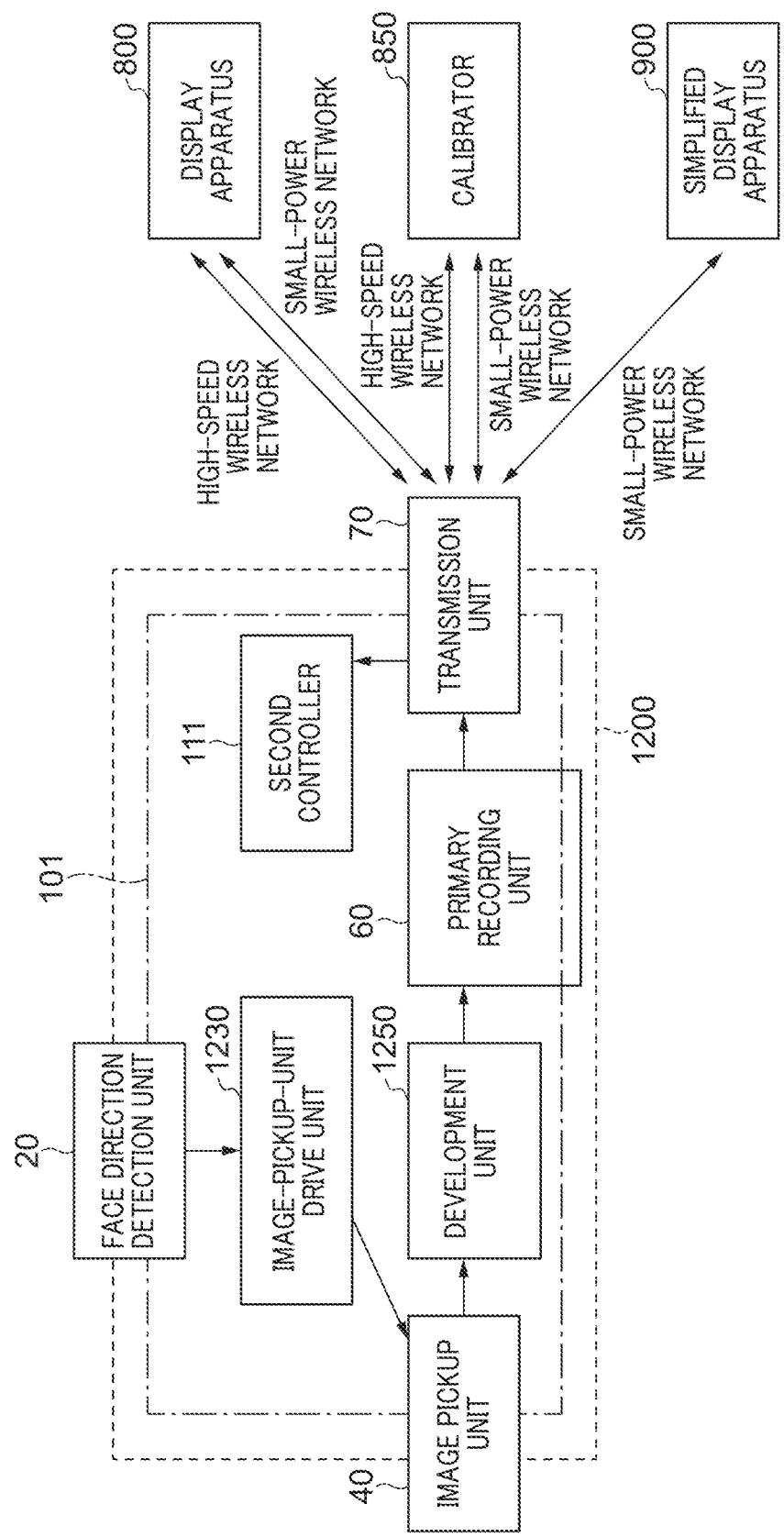
FIG. 52 is a functional block diagram showing the camera body according the twelfth embodiment.

FIG. 52 is a functional block diagram showing the camera body 1220 according the twelfth embodiment. Hereinafter, the process executed by the camera body 1220 will be described roughly using FIG. 52. In the following description, only points changed from FIG. 4 will be described and function blocks that are identical to the hardware blocks in FIG. 4 are indicated by the same reference numerals and duplicated descriptions are omitted.

As shown in FIG. 52, the camera body 1220 is provided with the face direction detection unit 20, an image-pickup-unit drive unit 1230, the image pickup unit 40, a development unit 1250, the primary recording unit 60, the transmission unit 70, and the second controller 111. These functional blocks are achieved by control of the overall control CPU 101 (FIG. 53) that controls the entire camera body 1220.

The face direction detection unit 20 detects a face direction, estimates an observation direction, and passes it to the image-pickup-unit drive unit 1230. The image-pickup-unit drive unit 1230 can change the image pickup direction and the field angle by performing various calculation on the basis of the observation direction estimated by the face direction detection unit 20 and the outputs of the angular speed sensor 107 and acceleration sensor 108.

The image pickup unit 40 converts the light from an object light into an image, forms a wide-angle image of the object and passes the image to the development unit 1250. The development unit 1250 develops the image from the image pickup unit 40, and passes the image of the direction that the users is looking at to the primary recording unit 60. The primary recording unit 60 passes the image to the transmission unit 70 at a required timing. The transmission unit 70 is wirelessly connected with predetermined communication parties, such as the display apparatus 800, a calibrator 850, and a simplified display device 900, and communicates with these.

Figure 53:
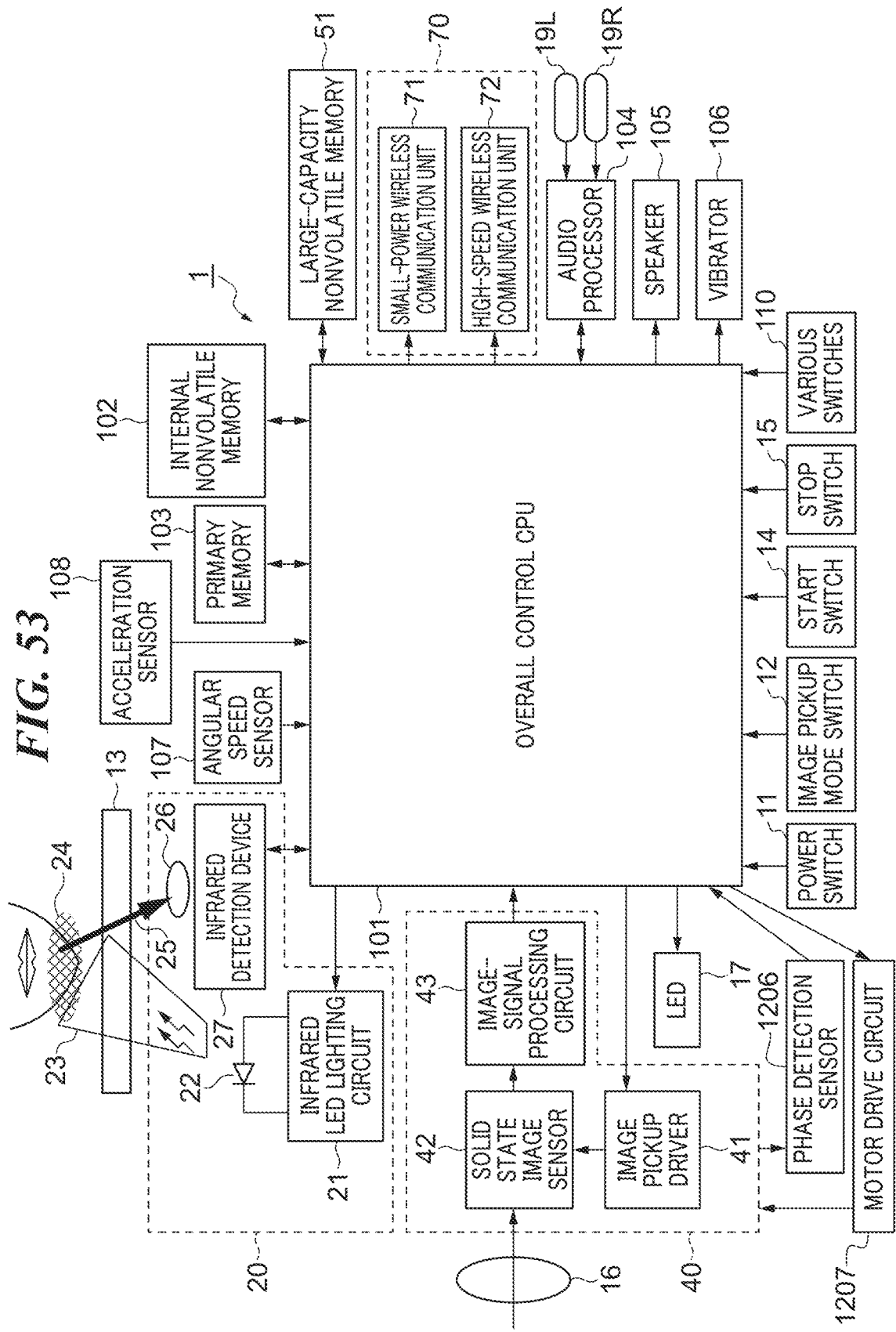
FIG. 53 is a block diagram showing a hardware configuration of the camera body according to the twelfth embodiment.

FIG. 53 is a block diagram showing a hardware configuration of the camera body 1220 according to the twelfth embodiment. Hereinafter, only differences from FIG. 5 of the first embodiment will be described. As shown in FIG. 53, the camera body 1220 is provided with a phase detection sensor 1206 and a motor drive circuit 1207. The phase detection sensor 1206 detects phases of the pitch and yaw of the image pickup unit 40 and outputs them to the overall control CPU 101.

The motor drive circuit 1207 is controlled by the overall control CPU 101 and drives the image pickup unit 40 to a desired direction at a desired driving speed.

Figure 54:
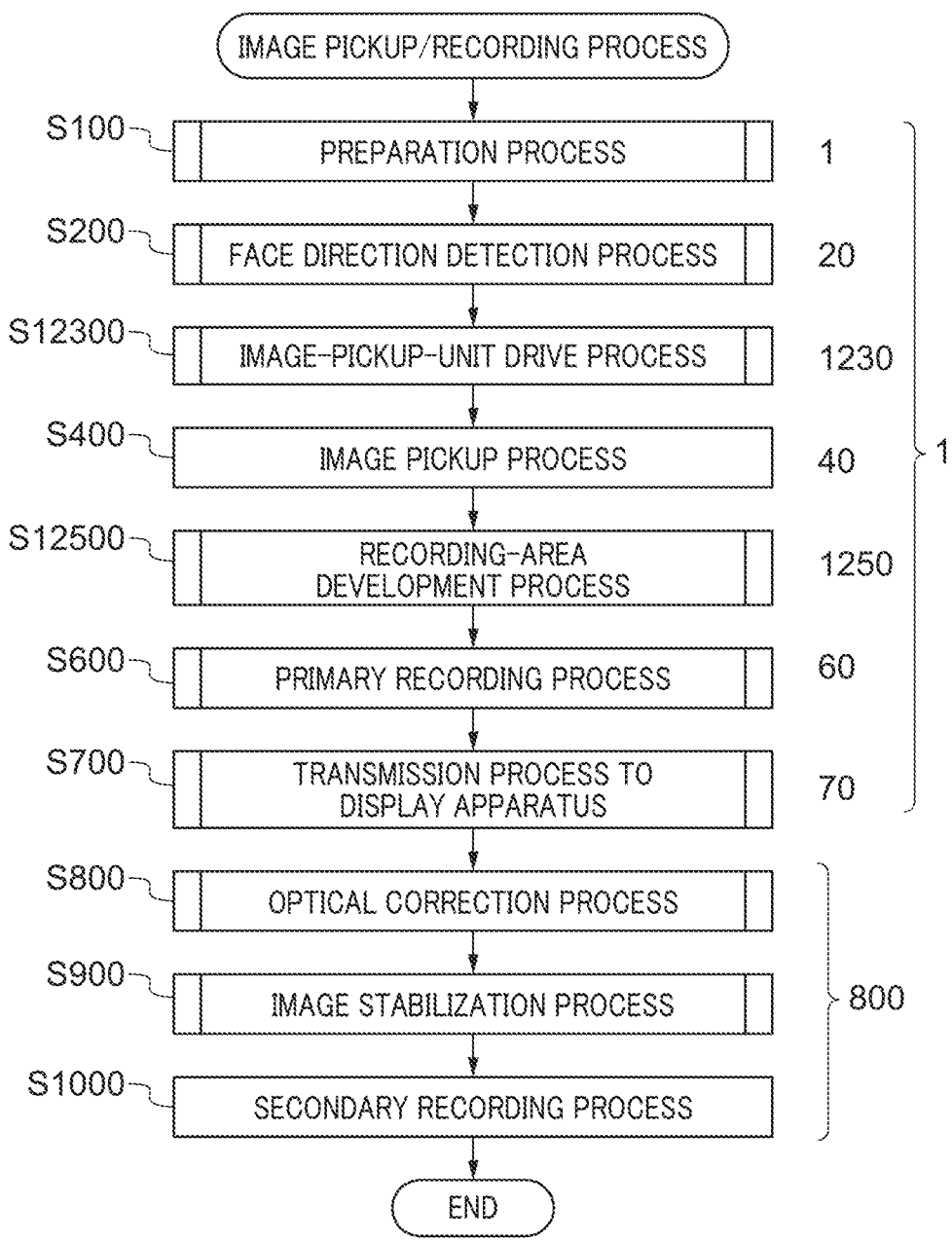
FIG. 54 is a flowchart schematically showing an image-pickup/recording process according to the twelfth embodiment executed by the camera body and display apparatus.

Hereinafter, how to use the camera body 1 and display apparatus 800 will be described. FIG. 54 is a flowchart schematically showing an image pickup/recording process according to this embodiment executed by the camera body 1220 and display apparatus 800. In order to assist the description, a reference numeral of an apparatus in FIG. 52 that executes a process in each step is shown on a right side of each step in FIG. 54.

When the power switch 11 is set to ON and power of the camera body 1 turns ON, the overall control CPU 101 is activated and reads a boot program from the internal nonvolatile memory 102. After that, in a step S100, the overall control CPU 101 executes a preparation process that performs setting of the camera body 1 before an image pickup operation.

In a step S200, the face direction detection process that estimates an observation direction based on a face direction detected by the face direction detection unit 20 is executed. This process is executed at a predetermined frame rate.

In a step S12300, the image-pickup-unit drive unit 1230 performs an image-pickup-unit drive process to calculate a dive amount of the image pickup unit 40 and to drivingly control the image pickup unit 40. Details of the image-pickup-unit drive process will be mentioned later using FIG. 55.

In a step S400, the image pickup unit 40 picks up an image and generates pickup image data. In a step S12500, the development unit 1250 executes the recording-area development process that applies the development process to the image data generated in the step S400. Details of the development process will be mentioned later using FIG. 56.

In a step S600, the primary recording unit (image recording unit) 60 executes the primary recording process that stores the image developed in the step S12500 into the primary memory 103 as image data. In the step S700, the transmission unit 70 executes a transmission process to the display apparatus 800 that wirelessly transmits the image primarily recorded in the step S600 to the display apparatus 800 at a designated timing.

The steps from the step S800 is executed by the display apparatus 800. In the step S800, the display-apparatus controller 801 executes an optical correction process that corrects optical aberrations of the image transferred from the camera body 1 in the step S700.

In a step S900, the display-apparatus controller 801 applies the image stabilization process to the image of which optical aberrations have been corrected in the step S800. It should be noted that the order of the step S800 and the step S900 may be inverted. That is, the image stabilization process may be executed in advance of the optical correction process.

In a step S1000, the display-apparatus controller (video recording unit) 801 executes a secondary recording process that records the image to which the optical correction process in the step S800 and the image stabilization process in the step S900 have been applied into the large-capacity nonvolatile memory 814. And then, the display-apparatus controller 801 finishes this process.

Figure 55:
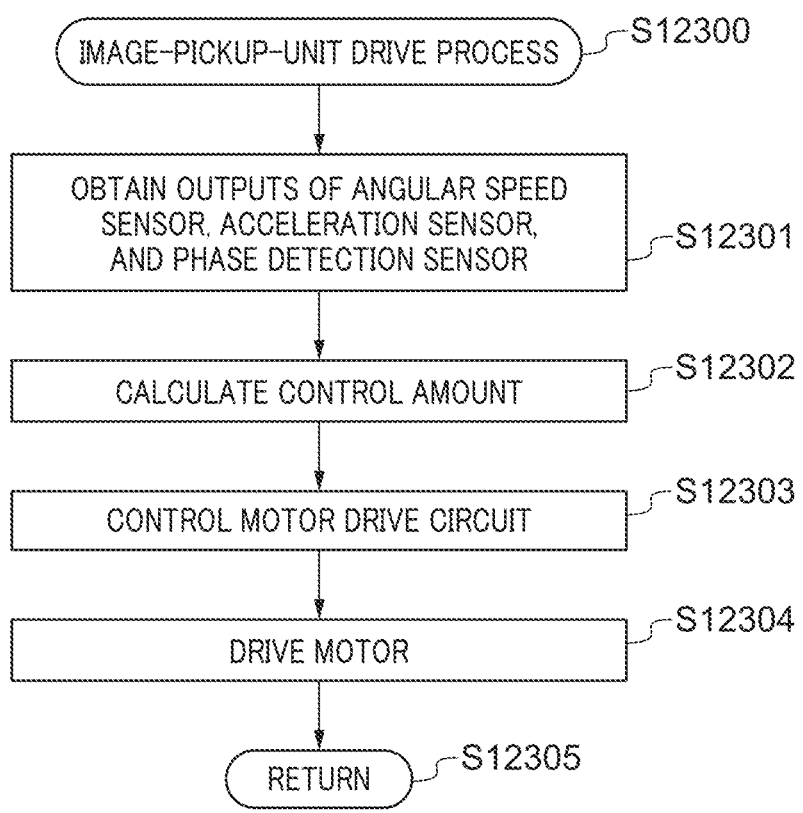
FIG. 55 is a flowchart showing a subroutine of a face direction detection process in a step S12300 in FIG. 54 according to the twelfth embodiment.

FIG. 55 is a flowchart showing the subroutine the image-pickup-unit drive process in the step S1230 in FIG. 54. In a step S12301, the overall control CPU 101 obtains outputs of the angular speed sensor 107, the acceleration sensor 108, and the phase detection sensor 1206.

In a step S12302, the overall control CPU 101 calculates the control amounts of the pitch drive motor 1205 and yaw drive motor 1204 on the basis of the observation direction (direction vector) recorded in the step S212 (FIG. 7C), and the outputs of the various sensors obtained in the step S12301. At this time, the overall control CPU 101 performs feedback control and image stabilization control aimed to a target value. The control amounts can be calculated by a known control process.

The overall control CPU 101 controls the motor drive circuit 1207 (a step S12303) on the basis of the control amounts calculated in the step S12302 to drive the pitch drive motor 1205 and yaw drive motor 1204 (a step S12304), and finishes this process (a step S12305).

Figure 56:
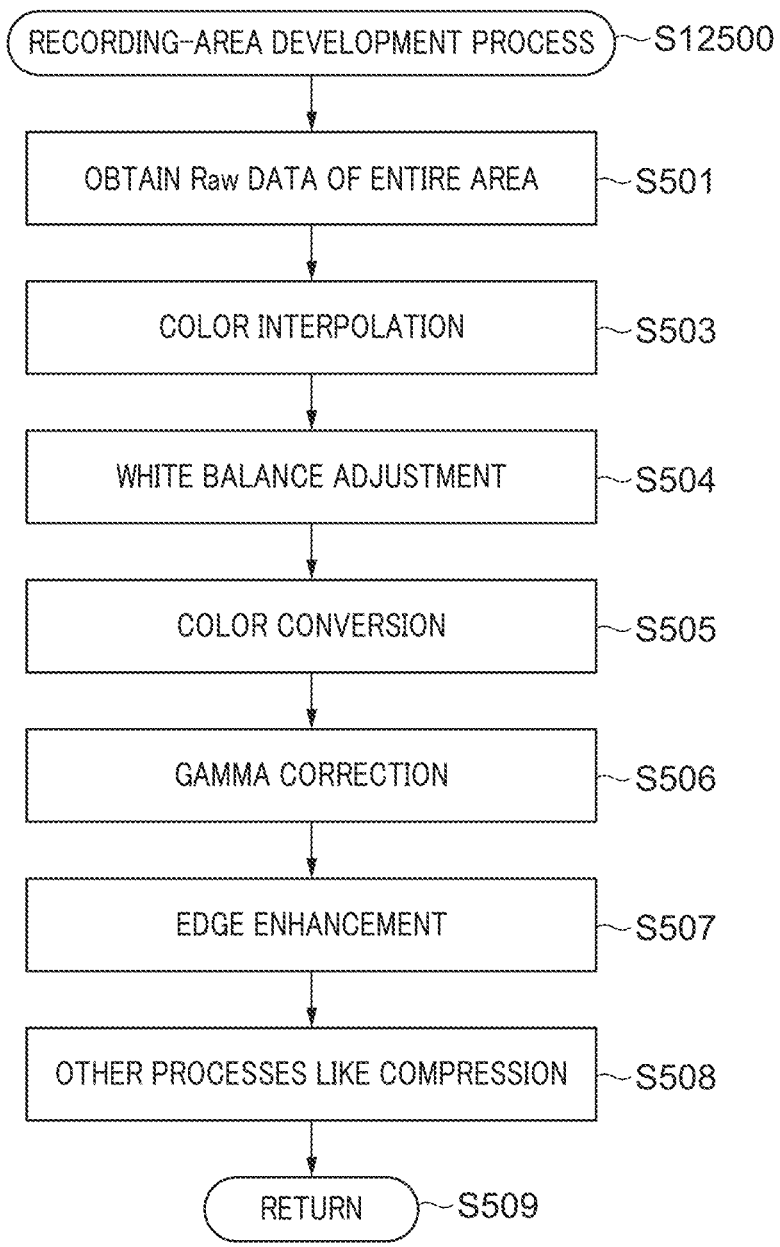
FIG. 56 is a flowchart showing a subroutine of a development process in a step S12500 in FIG. 54 according to the twelfth embodiment.

FIG. 56 is a flowchart showing a subroutine of the recording-area development process in the step S12500 in FIG. 54. Difference from FIG. 7E is that the flowchart in FIG. 56 does not have the step S502 (i.e., does not obtain Xi, Yi, WXi, and WYi) and proceeds to the step S503 immediately after obtaining the entire area Raw data in the step S501.

When the video image mode is selected by the image pickup mode switch 12, the processes in the steps S200 and S12300 and the processes in the step S400, S12500, and S600 are executed in parallel. The drive of the image pickup unit 40 is continued on the basis of the detection result of the observation direction while continuing the image pickup operation by the image pickup unit 40.

When the image pickup operation is executed under the above-mentioned configuration and control, the user is able to pick up an image while directing the image pickup unit 40 toward the user's observation direction without being conscious of the image pickup operation.

Next, a thirteenth embodiment will be described. The thirteenth embodiment detects a face direction using machine learning, such as Deep Learning. In recent years, a model of machine learning that detects a face direction without detecting feature points, such as eyes and a nose, is proposed (reference: Fine-Grained Head Pose Estimation Without Keypoints (2017)). Use of such a machine learning model enables detection of a face direction using a face image picked up from a camera arranged on a clavicle position.

Figure 57:
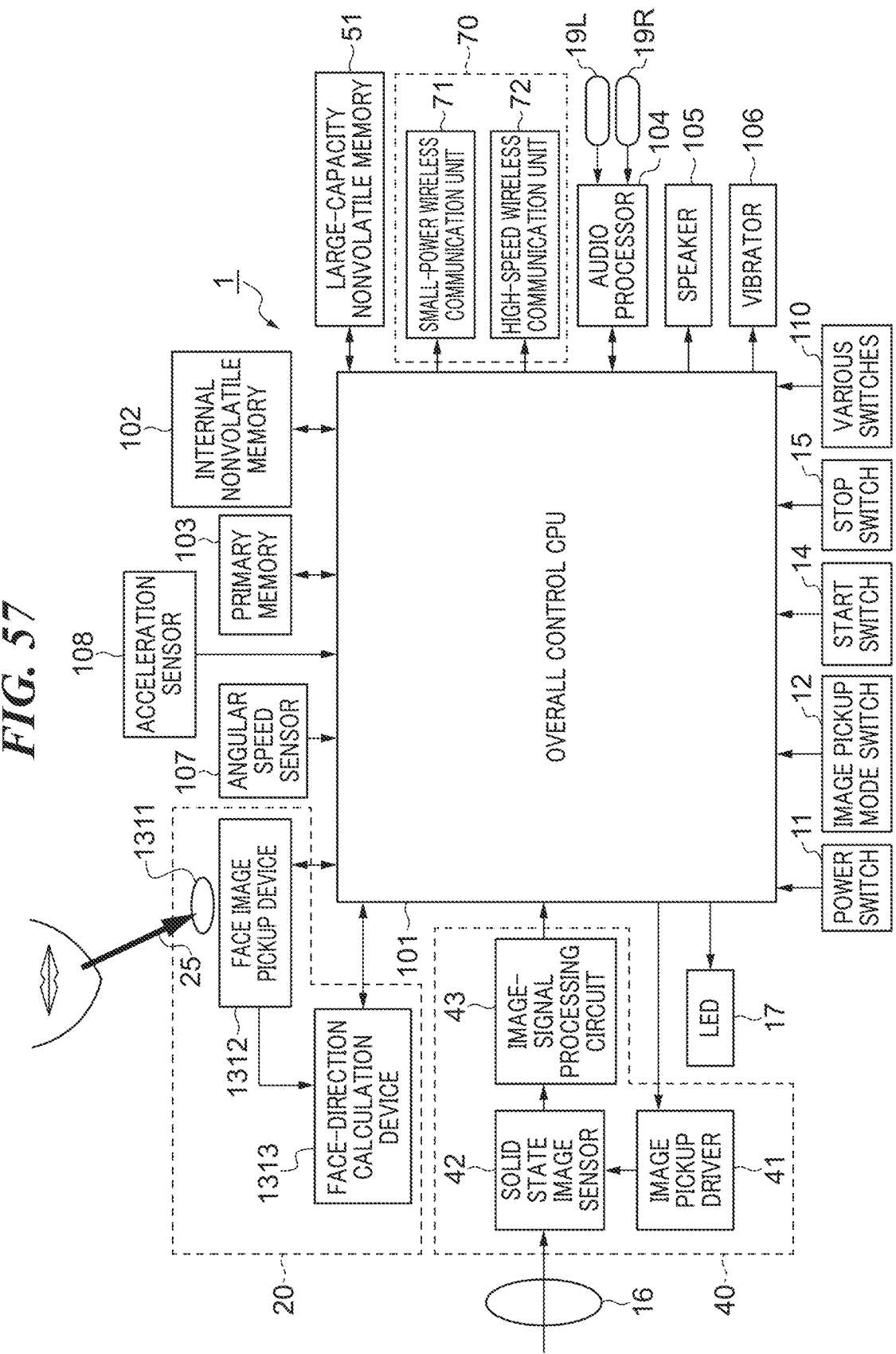
FIG. 57 is a block diagram showing a hardware configuration of a camera body according to a thirteenth embodiment.

FIG. 57 is a block diagram showing a hardware configuration of the camera body according to this embodiment. A condenser lens 1311 condenses reflected light from a user's face. A face image pickup device 1312 consists of an image pickup driver, a solid state image sensor, an image signal processing circuit, etc. like the image pickup unit 40, and picks up a face image.

In the first embodiment, the image near the user's jaw is separated from the background using the reflected infrared light 25. In the meantime, when a face direction is detected using the machine learning as the thirteenth embodiment, the face direction detection unit 20 does not need the infrared LED lighting circuit. This enables to use an image pickup unit equivalent to the image pickup unit 40 that picks up natural light.

The face direction calculation device 1313 performs filter arithmetic as a main process of Deep Learning at high speed. The face direction calculation device 1313 may be achieved by an exclusive processor using ASIC or FPGA, or may be achieved by the overall control CPU 101.

Parameters learned beforehand are set to the face direction calculation device 13143. The face direction calculation device 13143 finds angular information showing a face direction on the basis of the face image output from the face image pickup device 1312 and the preset parameters. Learning of the parameters used for detecting the face direction needs many learning images. Each learning image is a combination of a face image and information about vertical and horizontal angles of the face as correct answers.

Figure 58A:
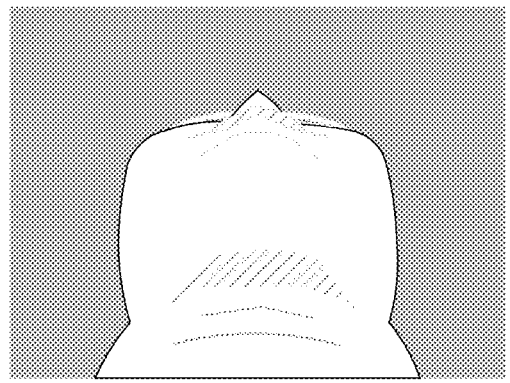
FIG. 58A, FIG. 58B, and FIG. 58C are schematic views showing examples of learning images used in the thirteenth embodiment.
Figure 58B:
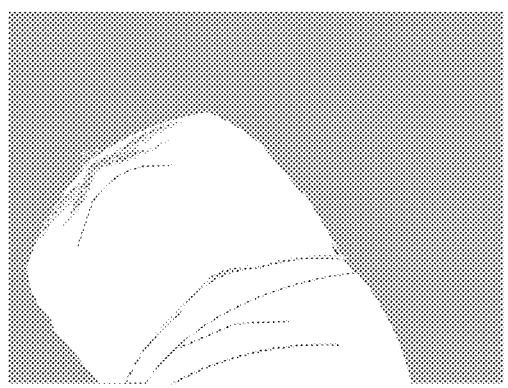
Figure 58C:
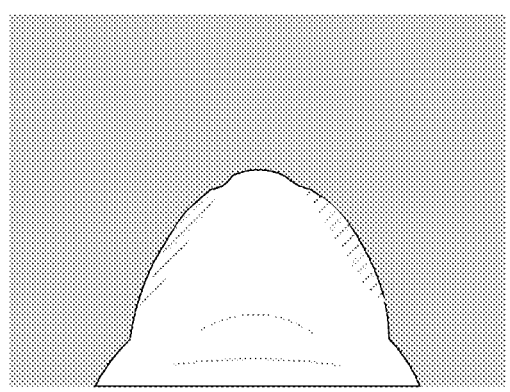

FIG. 58A, FIG. 58B, and FIG. 58C are schematic views showing examples of learning images picked up under conditions of (H: 0°, V: 0°), (H: 30°, V: 0°), and (H: 0°, V: 30°), respectively. Where "H" means the horizontal direction and "V" means the vertical direction. A plurality of learning images are picked up while moving the face by every 10° within the face direction detection range. For example, 100 images are picked up at each position.

For example, the face direction detection range shall be from −60° to +60° in the horizontal direction and from −60° to +50° in the vertical direction. In such a case, learning images are picked up for every 10° in the vertical range −60° to +50° while keeping the angle in the horizontal direction constant. These image pickup operations are repeated for every 10° in the horizontal range −60° to +60°.

Moreover, in order to respond various users and situations, it is necessary to cover various conditions other than the face angle in accumulating learning images. For example, it is necessary to select human objects so as to cover estimated user's physique, age, and gender, in preparing learning images. Moreover, it is necessary to prepare learning images broadly so as to absorb difference of estimated backgrounds, such as indoor and outdoor.

Figure 59:
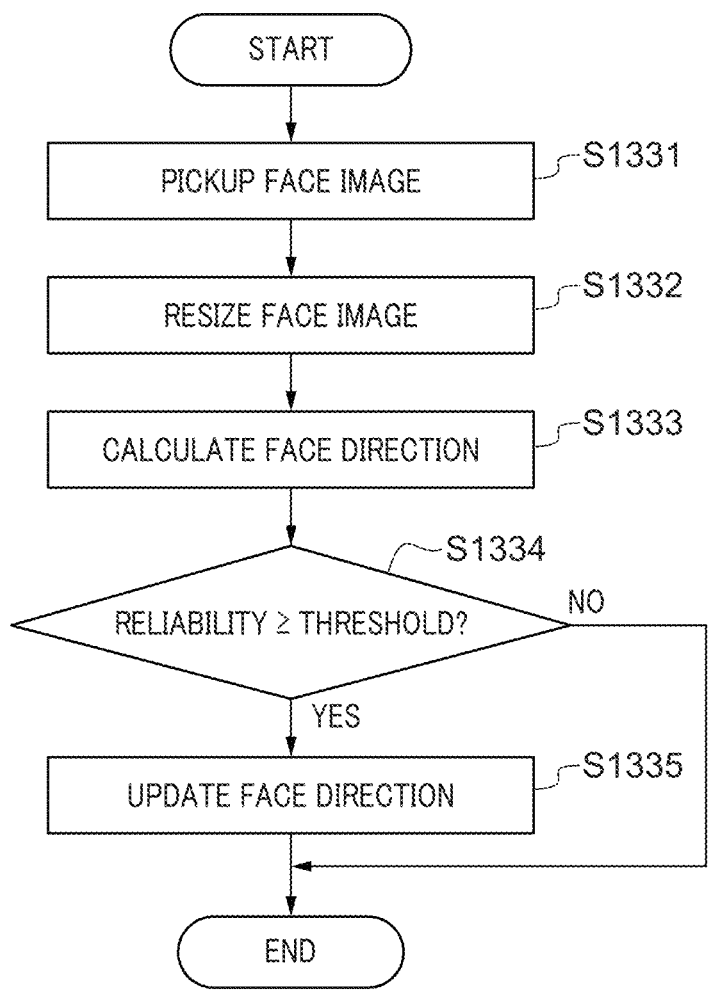
FIG. 59 is a flowchart showing a face direction detection process using machine learning according to the thirteenth embodiment.

FIG. 59 is a flowchart showing a face direction detection process using machine learning according to the thirteenth embodiment. First, a face image is picked up using the image pickup unit 1311 (a step 1331). Next, the pickup face image is resized to the size suitable to input into the face direction calculation device 1314 (a step 1332). Next, the resized face image is input into the face direction calculation device 1314, and a face direction is calculated (a step 1333).

When the process of machine learning like Deep Learning is performed, reliability showing probability of a processing result is calculated in addition to processing results, such as a face direction, in general. In a step 1334, it is determined whether the reliability is equal to or more than a predetermined threshold. As a result of determination in the step S1334, when the reliability is equal to or more than the threshold, the face direction calculated in the step S1333 is set as a new face direction (a step 1335). That is, the face direction is updated. As a result of determination in the step S1334, when the reliability is less than the threshold, the face direction is not updated.

As described above, according to the thirteenth embodiment, the face direction is detectable using the machine learning like Deep Learning.

Figure 60:
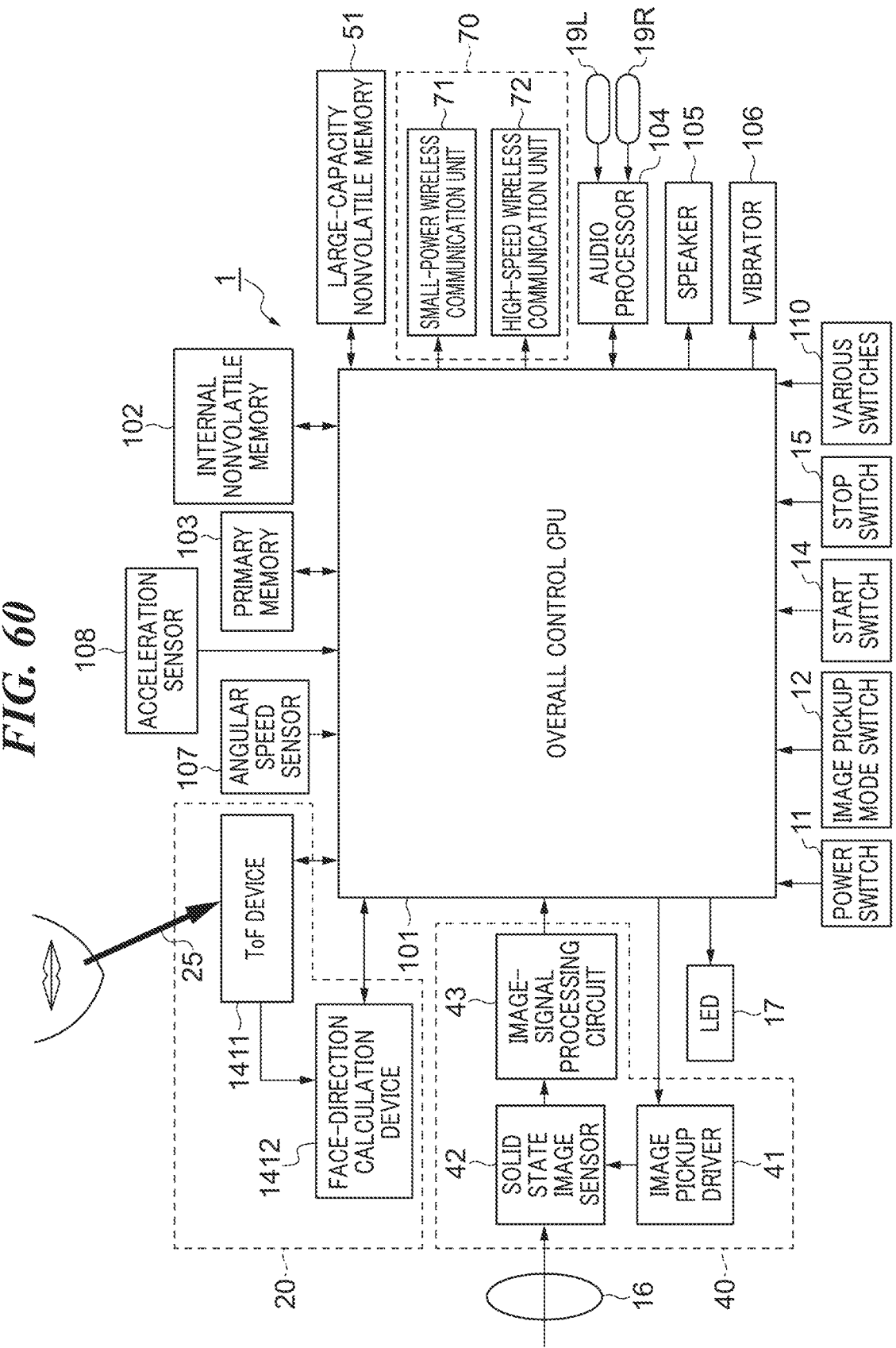
FIG. 60 is a block diagram showing a hardware configuration of a camera body according to a fourteenth embodiment.

Next, a fourteenth embodiment will be described. The fourteenth embodiment detects a face direction using a ToF (Time of Flight) camera. FIG. 60 is a block diagram showing a hardware configuration of the camera body according to this embodiment.

A ToF device 1411 has a light source and measures a distance to an object using light emitted from the light source and reflected by the object. In this embodiment, an object is a user's face.

There are two main ToF distance measurement methods. A direct ToF method measures a distance on the basis of a time period from emission of a light source to reception of reflected light from an object. An indirect ToF method controls a light source to emit light periodically and measures a distance to the object by detecting phase difference between emission light and reflected light. This embodiment can use any ToF methods. The ToF device 1411 generates a distance image (depth map) showing distance information by mapping the measured distance information in two dimensions.

Figure 61A:
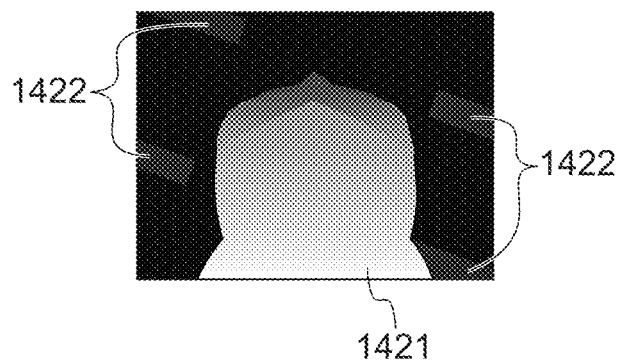
FIG. 61A is a schematic view showing a distance image generated by a ToF (Time of Flight) device of the camera body according to the fourteenth embodiment in a state where the ToF device is arranged in a user's clavicle position and measures upwardly.

FIG. 61A is a schematic view showing a distance image generated by the ToF device 1141 arranged in a user's clavicle position and measures upwardly. In FIG. 61A, a near part is indicated by a white area and a far part is indicated by a black area. The distance image in FIG. 61A includes a face area 1421 from a root of neck to a nose, and objects 1422 in a background. A face-direction calculation device 1412 calculates a face direction based on the distance image generated by the ToF device 1411. In this embodiment, the face-direction calculation device 1412 shall be achieved by the overall control CPU 101. The configuration is not restricted to this. For example, the face-direction calculation device 1412 may be constituted by an exclusive CPU.

Figure 62:
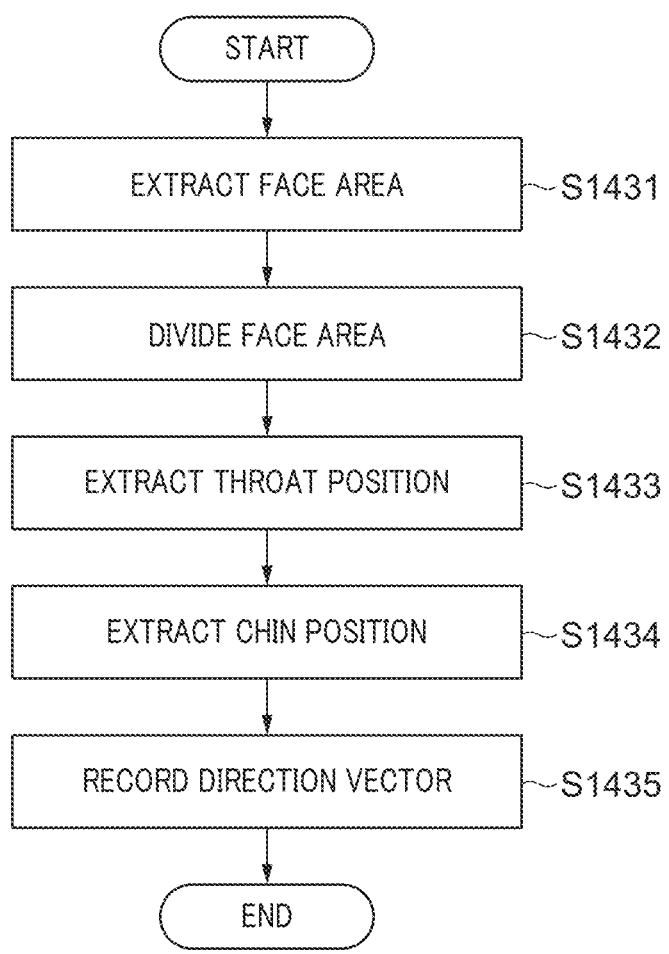
FIG. 62 is a flowchart showing a face-direction calculation process according to the fourteenth embodiment.

FIG. 62 is a flowchart showing a face-direction calculation process. The overall control CPU 101 extracts a face part from the distance image generated by the ToF device 1411 (a step 1431). When the measurement is performed by installing the ToF device 1411 in a clavicle position, the face as a measurement target is located at a short distance, and the other object will be located at a long distance. Accordingly, only a face part is extracted by applying a threshold process to the distance image shown in FIG. 61A. The threshold process converts a pixel of which a pixel value is less than the threshold into a black pixel. The threshold may be a fixed value defined beforehand or may be calculated according to contents of the distance image.

Figure 61B:
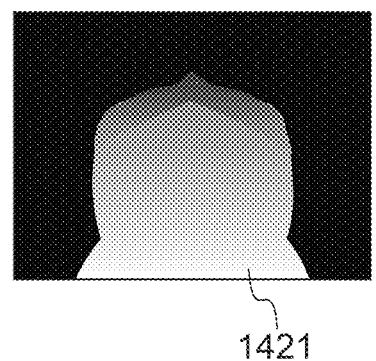
FIG. 61B is a schematic view showing an image that extracted a face part by applying the threshold process to the distance image in FIG. 61A.

FIG. 61B is a schematic view showing an image that extracted a face part by applying the threshold process to the distance image in FIG. 61A. As shown in FIG. 61B, since the objects 1422 in the background in FIG. 61A are below the threshold, they are converted into black pixels, and only the face area 1421 is extracted.

Figure 61C:
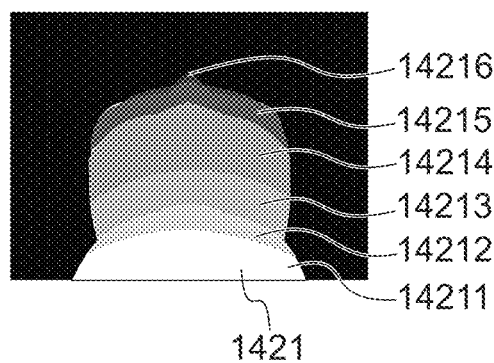
FIG. 61C is a schematic view showing an image obtained by dividing the image in FIG. 61B into areas according to distance information.

Next, the image in FIG. 61B is divided into areas according to the distance information (a step 1432). FIG. 61C is a schematic view showing the image after the area division. FIG. 61C shows that the face area 1421 is divided into six areas 14211 through 14216. The area 14211 is the nearest area and the area 14216 is the most distant area.

Next, a throat position (head rotation center) is extracted (a step 1433).

Figure 61D:
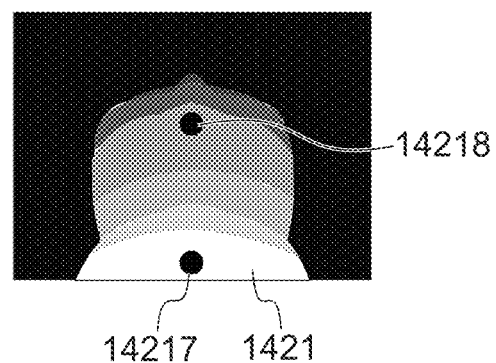
FIG. 61D is a schematic view showing an image that shows a throat position and chin position extracted from the image in FIG. 61C.

As described in the first embodiment, the throat position is located at a center in the lateral direction in the nearest area 14211. Accordingly, a point 14217 in FIG. 61D is set as the throat position. The overall control CPU 101 extracts a chin position next (a step 1434).

As described in the first embodiment, the chin position is located in the shorter area 14512 adjacent to the area 14214 in which the distance increases sharply. Accordingly, the overall control CPU 101 sets a point 14218 in FIG. 61D as the chin position. The point 14218 is located in a center of the area 14214 in the lateral direction, and is the most distant from the throat position 14217.

When the throat position and chin position are determined, face angles in the horizontal and vertical directions are determined, and they are recorded as the observation direction (direction vector) (a step S1435). The face angle in the horizontal direction is detectable on the basis of the throat position and chin position by the method described in the first embodiment. Moreover, when the distance image is obtained using the ToF camera, when the chin position is determined, the distance to the chin position is fixed. Accordingly, the face angle in the vertical direction is also detected by the method described in the first embodiment.

The overall control CPU 101 determines the face angles in the lateral and vertical directions and saves then into the primary memory 103 as a user's observation direction vi.

As mentioned above, the face direction is detectable using a ToF camera according to the fourteenth embodiment.

Although the preferable embodiments of the present disclosure are described above, the present disclosure is not limited to these embodiments. Various modifications and changes are available within the scope of the gist. Moreover, a modification that does not use a part of the functions is also included. Although some embodiment shows the change of the field angle in addition to the recording direction, such embodiments can be performed even when not changing the field angle.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2021-040848, filed Mar. 12, 2021, and No. 2022-029152, filed Feb. 28, 2022, which are hereby incorporated by reference herein in their entirety.

What is claimed is:

1. An image pickup apparatus comprising:
an observation direction detector that is worn on a body other than a head of a user;
an image pickup unit that is worn on the body of the user;
a memory device that stores a set of instructions; and
at least one processor that executes the set of instructions to:
detect an observation direction of the user by the observation direction detector;
pick up an image by the image pickup unit;
output an output image corresponding to the observation direction based on the image picked up by the image pickup unit;
generate metadata including in-image position information that shows a position and a size of the output image corresponding to the observation direction with respect to the image picked by the image pickup unit; and
generate a video file in which the metadata and the output image are encoded for every frame.

2. The image pickup apparatus according to claim 1, wherein the at least one processor executes instructions in the memory device to detect the observation direction of the user as a three-dimensional observation direction.

3. The image pickup apparatus according to claim 1, wherein the at least one processor executes instructions in the memory device to:
output an observation direction of the user in a lateral direction as an angle in a first detection direction, and
output an observation direction of the user in a vertical direction as an angle in a second detection direction that is perpendicular to the first detection direction.

4. The image pickup apparatus according to claim 1, wherein the observation direction detector comprises:
an infrared irradiator that irradiates an infrared irradiation surface of the user with infrared light; and
an infrared detector that detects reflected light of the infrared light reflected by the infrared irradiation surface.

5. The image pickup apparatus according to claim 4, wherein the at least one processor executes instructions in the memory device to:
obtain distance information about each of distance areas of the infrared irradiation surface from the reflected light of the infrared light detected by the infrared detector, and
detect the observation direction based on the distance information.

6. The image pickup apparatus according to claim 5, wherein the at least one processor executes instructions in the memory device to:
detect a head rotation center and a chin position of the user based on the distance information, and
detect the observation direction from the head rotation center and the chin position.

7. The image pickup apparatus according to claim 6, wherein the at least one processor executes instructions in the memory device to:
set the head rotation center at a position that is nearest to the infrared detector and that is located at a center in a lateral direction in a distance area of which a relative distance to the infrared detector is shortest among the distance areas.

8. The image pickup apparatus according to claim 6, wherein the at least one processor executes instructions in the memory device to:
set the chin position at a position that is farthest from the head rotation center and that is near a distance area of which a relative distance to the infrared detector is relatively large among the distance areas.

9. The image pickup apparatus according to claim 8, wherein the at least one processor executes instructions in the memory device to:
output an observation direction of the user in a lateral direction as an angle in a first detection direction and outputs an observation direction of the user in a vertical direction as an angle in a second detection direction that is perpendicular to the first detection direction, and
calculate a moving angle of the chin position around the head rotation center as the angle in the first detecting direction.

10. The image pickup apparatus according to claim 8, wherein the at least one processor executes instructions in the memory device to:
output an observation direction of the user in a lateral direction as an angle in a first detection direction,
output an observation direction of the user in a vertical direction as an angle in a second detection direction that is perpendicular to the first detection direction, and
calculate the angle in the second detecting direction based on intensity of the reflected light of the chin position.

11. The image pickup apparatus according to claim 1, wherein the at least one processor executes instructions in the memory device to:
extract an image corresponding to the observation direction from the image picked up by the image pickup unit, and
output an extracted image.

12. The image pickup apparatus according to claim 1, wherein the at least one processor executes instructions in the memory device to:

perform calibration of the observation direction detector using a calibrator capable of wirelessly connecting to the image pickup apparatus, wherein the calibrator is provided with a face detector that projects infrared light and detects a face of the user, and wherein the observation direction is not detected during a period in which the face detector is projecting the infrared light.

13. The image pickup apparatus according to claim 1, wherein the at least one processor executes instructions in the memory device to:

obtain an optical correction value corresponding to an optical design of an image pickup lens in the image pickup unit, wherein the optical correction value is included in the metadata.

14. The image pickup apparatus according to claim 1, wherein the at least one processor executes instructions in the memory device to:

detect movement of the image pickup apparatus, and obtain a moving amount, wherein the moving amount is included in the metadata.

15. The image pickup apparatus according to claim 14, wherein the moving amount is detected by one of an acceleration sensor that detects acceleration, an angular speed sensor that measures an angular speed, and a magnetometric sensor that measures a direction of a magnetic field.

16. The image pickup apparatus according to claim 1, wherein the observation direction detector comprises a face direction detector that detects a face direction of the user, wherein the at least one processor executes instructions in the memory device to:

obtain an image including a positioning index from the image pickup unit that picks up the positioning index;

detect the face direction by the face direction detector during calibration;

calculate a position of the positioning index in the image picked up during the calibration from a shape of the positioning index included in the image obtained;

generate information showing relationship between the face direction detected and the position of the positioning index calculated; and perform calibration of a center position of a target visual field corresponding to the face direction detected by the face direction detector based on the information generated.

17. The image pickup apparatus according to claim 1, wherein the observation direction detector comprises a face direction detector that detects a face direction of the user, wherein the at least one processor executes instructions in the memory device to:

calculate an angular speed of the face of the user based on the face direction detected by the face direction detector;

determine a recording direction of the output image based on the observation direction; and change the recording direction to a delayed direction that is delayed from movement of the detected face direction in a case where it is determined, as a result of the calculation, that the face of the user moves at the angular speed beyond a predetermined angular speed beyond a first predetermined period.

18. The image pickup apparatus according to claim 17, wherein the at least one processor executes instructions in the memory device to output an entire image picked up by the image pickup unit during an image pickup operation of a moving object even if it is determined, as a result of the calculation, that the face of the user moves at the angular speed beyond the predetermined angular speed beyond the first predetermined period.

19. The image pickup apparatus according to claim 18, wherein the at least one processor executes instructions in the memory device to stop changing the recording direction to the delayed direction in a case where a period elapsed after changing the recording direction to the delayed direction exceeds a second predetermined period.

20. The image pickup apparatus according to claim 17, wherein the at least one processor executes instructions in the memory device not to change the recording direction in a case where it is determined, as a result of the calculation, that a period while the face of the user moves at the angular speed beyond a predetermined angular speed is less than the first predetermined period.

21. The image pickup apparatus according to claim 17, wherein the at least one processor executes instructions in the memory device to add an image effect when the output image is switched from the image of the delayed direction to the image corresponding to the observation direction detected by the observation direction detector.

22. The image pickup apparatus according to claim 17, wherein the at least one processor executes instructions in the memory device to:

switch an immediately preceding mode to a first image pickup mode, in which the recording direction is determined based on the observation direction during the video image pickup operation, in a case where the face direction detector can detect the face direction during the video image pickup operation; and switch an immediately preceding mode to one of other image pickup modes, in which the recording direction is determined based on a factor other than the observation direction during the video image pickup operation, in a case where the face direction detector cannot detect the face direction.

23. The image pickup apparatus according to claim 22, wherein the at least one processor executes instructions in the memory device to:

recognize an object from an image of the recording direction of a frame of a video image picked up by the image pickup unit;

set, in a case where the observation direction detector cannot detect the observation direction and an identical object is recognized in a past predetermined period, the factor other than the observation direction to a direction that tracks the identical object; and switch an immediately preceding mode to a second image pickup mode that is one of the other image pickup modes.

24. The image pickup apparatus according to claim 23, wherein the at least one processor executes instructions in the memory device to:

beforehand register an object to be detected;

set, in a case where the observation direction detector cannot detect the observation direction and the object registered beforehand is detected from a newest pickup image, the factor other than the observation direction to a direction that tracks the object registered beforehand; and switch an immediately preceding mode to a third image pickup mode that is one of the other image pickup modes.

25. The image pickup apparatus according to claim 24, wherein the at least one processor executes instructions in the memory device to:

set, in a case where the observation direction detector cannot detect the observation direction and neither an identical object nor the object registered beforehand can be detected, the factor other than the observation direction to one of the observation directions detected before the observation direction detector lost the observation direction and the observation direction that is moving at a change amount before the observation direction detector lost the observation direction; and switch the immediately preceding mode to a fourth image pickup mode that is one of the other image pickup modes.

26. The image pickup apparatus according to claim 25, wherein the at least one processor executes instructions in the memory device to widen a field angle of the image of the recording direction than a prescribed field angle in the fourth image pickup mode.

27. The image pickup apparatus according to claim 26, wherein the switching of the mode is continuously active even after the mode is switched to one of the first, second, third, and fourth image pickup modes.

28. The image pickup apparatus according to claim 27, wherein the at least one processor executes instructions in the memory device to restore the widened field angle to the prescribed field angle in a case where the fourth image pickup mode is switched to one of the first, second, third image pickup modes.

29. The image pickup apparatus according to claim 26, wherein the at least one processor executes instructions in the memory device to:

notify the user of a detection error of the observation direction in a case where the observation direction detector cannot detect the observation direction: and notify the user of the detection error in a case where the first image pickup mode is switched to one of the other image pickup modes.

30. The image pickup apparatus according to claim 17, wherein the image pickup unit has an image pickup lens and an image sensor that convers an optical image formed by the image pickup lens into RAW data, wherein the image pickup unit outputs RAW data read from a predetermined area of the image sensor as an image picked up by the image pickup unit, wherein the at least one processor executes instructions in the memory device to:

extract data within an area, which is narrower than the predetermined area, including a target visual field in the recording direction and a margin around the target visual field from the RAW data; and develop the data extracted.

31. The image pickup apparatus according to claim 30, wherein the margin is a pixel area used for an image stabilization process.

32. The image pickup apparatus according to claim 30, wherein the at least one processor executes instructions in the memory device to change a shape of the target visual field and a shape of the margin according to the recording direction and an optical property of the image pickup lens.

33. The image pickup apparatus according to claim 30, wherein the at least one processor executes instructions in the memory device to record the data that is extracted and developed as an image of the recording direction without recording data that is not extracted from the predetermined area.

34. The image pickup apparatus according to claim 33, wherein the at least one processor executes instructions in the memory device to transmit the image of the recording direction to an external appreciation device.

35. The image pickup apparatus according to claim 34, wherein the external appreciation device applies an optical correction process and an image stabilization process to the image of the recording direction, and wherein the at least one processor executes instructions in the memory device to transmit information required for the optical correction process and the image stabilization process together with the image of the recording direction.

36. The image pickup apparatus according to claim 1, wherein the at least one processor executes instructions in the memory device to:

detect a moving amount of the image pickup apparatus during a video image pickup operation by the image pickup unit;

delay the moving amount of the observation direction in a case where it is determined, based on a detection of the moving amount, that the image pickup apparatus is accelerating; and accelerate the moving amount of the observation direction to cover a delayed amount in a case where it is determined, based on the detection of the moving amount, that the image pickup apparatus is slowing down.

37. The image pickup apparatus according to claim 36, wherein the moving amount is detected by comparing images of a plurality of frames obtained by the image pickup unit during a video image pickup operation.

38. The image pickup apparatus according to claim 36, wherein the at least one processor executes instructions in the memory device to output a part of the image that is extracted according to the observation direction.

39. The image pickup apparatus according to claim 36, further comprising a driver that drive an image pickup direction of the image pickup unit in a yaw direction and a pitch direction, wherein the at least one processor executes instructions in the memory device to control the driver so as to change the image pickup direction of the image pickup unit based on the observation direction.

40. The image pickup apparatus according to claim 36, wherein the at least one processor executes instructions in the memory device to correct the moving amount of the observation direction so that the moving speed of the observation direction will become approximately constant in an output video image.

41. The image pickup apparatus according to claim 1, further comprising a distance measurement sensor that measures a distance from the image pickup unit to an image pickup target area, wherein the observation direction detector and the image pickup unit are integrally constituted, wherein the at least one processor executes instructions in the memory device to:

create distance map information about the image pickup target area from the measurement result by the distance measurement sensor; and calculate a direction of an observation object of the user seen from the image pickup unit based on the observation direction, the distance map information, and a vertical distance between the image pickup unit and an eye position of the user.

42. The image pickup apparatus according to claim 41, further comprising a posture detector that detects a horizontal axis of the image pickup unit, wherein the at least one processor executes instructions in the memory device to:
- calculate an angle formed between the horizontal axis detected and a direction of an external positioning index seen from the image pickup unit;
- calculate the vertical distance based on the angle calculated and a distance between the image pickup unit and the positioning index measured by the distance measurement sensor.

43. The image pickup apparatus according to claim 42, wherein calibration of the observation direction detected by the observation direction detector is performed based on the vertical distance calculated, an observation direction detected by the observation direction detector in a case where the positioning index is located in each designated position, and the distance between the image pickup unit and the positioning index measured by the distance measurement sensor.

44. The image pickup apparatus according to claim 1, wherein the observation direction detector comprises a face direction detector that detects a face direction of the user, wherein the at least one processor executes instructions in the memory device to:
- detect a face direction of the user by the face direction detector;
- calculate a first observation direction from the face direction detected;
- estimate a second observation direction from a factor other than the face direction detected;
- calculate reliability of the first observation direction;
- determine the observation direction to the first observation direction in a case where the reliability is equal to or more than a threshold; and
- determine the observation direction based on the first observation direction, the second observation direction, and the reliability in a case where the reliability is less than the threshold and the second observation direction is reliable.

45. The image pickup apparatus according to claim 1, wherein a detection optical axis of the observation direction detector and an image pickup optical axis of the image pickup unit are directed in mutually different directions.

46. The image pickup apparatus according to claim 45, wherein the detection optical axis of the observation direction detector is directed to a jaw of the user from the observing direction detector.

47. The image pickup apparatus according to claim 45, wherein the image pickup optical axis of the image pickup unit is directed to a front direction of the user from the image pickup unit.

48. The image pickup apparatus according to claim 45, wherein the image pickup apparatus in which the observation direction detector and the image pickup unit are integrally constituted is built in a camera body, and
wherein a lateral overall length of the image pickup apparatus is longer than its vertical overall length when seen from a front of the user in a state where the user wears the camera body.

49. The image pickup apparatus according to claim 48, wherein the camera body is provided with fixing members that contact a user's body,
wherein the fixing members are respectively arranged in vicinities of right and left ends of the image pickup apparatus in the state where the user wears the camera body.

50. The image pickup apparatus according to claim 49, further comprising contact angle adjusters that adjust angles of the fixing members with respect to the use's body.

51. The image pickup apparatus according to claim 48, wherein the image pickup apparatus is connected with a neck hanging member for wearing the image pickup apparatus on a user's neck,
wherein the neck hanging member is connected to vicinities of right and left ends of the image pickup apparatus in the state where the user wears the camera body.

52. The image pickup apparatus according to claim 51, wherein the neck hanging member is provided with a neck-hanging-angle adjuster that adjusts an angle of the neck hanging member with respect to the image pickup apparatus.

53. The image pickup apparatus according to claim 51, wherein the neck hanging member is provided with a band part of which a sectional shape is not a perfect circle,
wherein distance between right and left portions of the band part that are symmetrical to the image pickup apparatus becomes shorter toward an upper side from a lower side in the state where the user wears the camera body.

54. The image pickup apparatus according to claim 51, wherein the image pickup apparatus is connected with a power source unit through the neck hanging member,
wherein the power source unit is arranged behind the user's neck in the state where the user wears the camera body.

55. The image pickup apparatus according to claim 54, wherein the image pickup apparatus is connected with the power source unit through a power supply member,
wherein the power supply member is arranged inside the neck hanging member.

56. A control method for an image pickup apparatus, the control method comprising:
- detecting an observation direction of a user by an observation direction detector that is worn on a body other than a head of the user;
- picking up an image by an image pickup unit that is worn on the body of the user;
- outputting an image corresponding to the observation direction based on the image picked up;
- generating metadata including in-image position information that shows a position and a size of the output image corresponding to the observation direction with respect to the image picked up; and
- generate a video file in which the metadata and the output image are encoded for every frame.

57. A non-transitory computer-readable storage medium storing a control program causing a computer to execute a control method for an image pickup apparatus, the control method comprising:
- detecting an observation direction of a user by an observation direction detector that is worn on a body other than a head of the user;
- picking up an image by an image pickup unit that is worn on the body of the user;
- outputting an image corresponding to the observation direction based on the image picked up;
- generating metadata including in-image position information that shows a position and a size of the output image corresponding to the observation direction with respect to the image picked up; and
- generate a video file in which the metadata and the output image are encoded for every frame.

58. A portable device capable of wirelessly connecting to an image pickup apparatus, the portable device comprising:
a memory device that stores a set of instructions; and
at least one processor that executes the set of instructions to:
receive a video file in which metadata, which includes in-image position information that shows a position and a size of an image corresponding to an observation direction of a user with respect to an image of each frame picked up by the image pickup apparatus, and an image of each frame are encoded for every frame;
extract the metadata from the video file;
extract the image of the frame encoded with the metadata extracted from the video file;
correct the image of the frame extracted from the video file using the metadata extracted from the video file; and
record the corrected image of the frame as a video image.

59. A control method for a portable device capable of wirelessly connecting to an image pickup apparatus, the control method comprising:
receiving a video file in which metadata, which includes in-image position information that shows a position and a size of an image corresponding to an observation direction of a user with respect to an image of each frame picked up by the image pickup apparatus, and an image of each frame are encoded for every frame;
extracting the metadata from the video file;
extracting the image of the frame encoded with the metadata extracted from the video file;
correcting the image of the frame extracted using the metadata extracted; and
recording the image of the frame corrected as a video image.

60. A non-transitory computer-readable storage medium storing a control program causing a computer to execute a control method for a portable device capable of wirelessly connecting to an image pickup apparatus, the control method comprising:
receiving a video file in which metadata, which includes in-image position information that shows a position and a size of an image corresponding to an observation direction of a user with respect to an image of each frame picked up by the image pickup apparatus, and an image of each frame are encoded for every frame;
extracting the metadata from the video file;
extracting the image of the frame encoded with the metadata extracted from the video file;
correcting the image of the frame extracted using the metadata extracted; and
recording the image of the frame corrected as a video image.

61. An image pickup apparatus comprising:
an observation direction detector that is worn on a body other than a head of a user, and includes an infrared irradiator that irradiates an infrared irradiation surface of the user with infrared light and an infrared detector that detects reflected light of the infrared light reflected by the infrared irradiation surface;
an image pickup unit that is worn on the body of the user;
a memory device that stores a set of instructions; and
at least one processor that executes the set of instructions to:
obtain distance information about each of distance areas of the infrared irradiation surface from the reflected light of the infrared light detected by the infrared detector;
detect a head rotation center and a chin position of the user based on the distance information; and
detect an observation direction of the user from the head rotation center and the chin position;
pick up an image by the image pickup unit; and
output an output image corresponding to the observation direction based on the image picked up by the image pickup unit.

62. A control method for an image pickup apparatus, the control method comprising:
detecting an observation direction of a user by an observation direction detector that is worn on a body other than a head of the user, the observation direction detector including an infrared irradiator that irradiates an infrared irradiation surface of the user with infrared light and an infrared detector that detects reflected light of the infrared light reflected by the infrared irradiation surface;
picking up an image by an image pickup unit that is worn on the body of the user; and
outputting an image corresponding to the observation direction based on the image picked up,
wherein the detecting the observation direction includes
obtaining distance information about each of distance areas of the infrared irradiation surface from the reflected light of the infrared light detected by the infrared detector,
detecting a head rotation center and a chin position of the user based on the distance information, and
detecting the observation direction from the head rotation center and the chin position.

63. A non-transitory computer-readable storage medium storing a control program causing a computer to execute a control method for an image pickup apparatus, the control method comprising:
detecting an observation direction of a user by an observation direction detector that is worn on a body other than a head of the user, the observation direction detector including an infrared irradiator that irradiates an infrared irradiation surface of the user with infrared light and an infrared detector that detects reflected light of the infrared light reflected by the infrared irradiation surface;
picking up an image by an image pickup unit that is worn on the body of the user; and
outputting an image corresponding to the observation direction based on the image picked up, wherein
the detecting the observation direction includes
obtaining distance information about each of distance areas of the infrared irradiation surface from the reflected light of the infrared light detected by the infrared detector,
detecting a head rotation center and a chin position of the user based on the distance information, and
detecting the observation direction from the head rotation center and the chin position.

* * * * *